US012416243B2

United States Patent
(12) United States Patent
Nangariyil et al.

(10) Patent No.: US 12,416,243 B2
(45) Date of Patent: Sep. 16, 2025

(54) SEAL SUPPORT ASSEMBLY FOR A TURBINE ENGINE

(71) Applicants: General Electric Company, Schenectady, NY (US); General Electric Company Polska Sp. z o.o., Warsaw (PL)

(72) Inventors: Sajinu Nangariyil, Bengaluru (IN); Ravindra Shankar Ganiger, Bengaluru (IN); Abhilash Pillai, Bengaluru (IN); Adam Tomasz Pazinski, Warsaw (PL); David Raju Yamarthi, Bengaluru (IN)

(73) Assignees: General Electric Company, Evendale, OH (US); General Electric Company Polska Sp. z o.o, Warsaw (PL)

( * ) Notice: Subject to any disclaimer, the term of this patent is extended or adjusted under 35 U.S.C. 154(b) by 22 days.

(21) Appl. No.: 18/357,282

(22) Filed: Jul. 24, 2023

(65) Prior Publication Data

US 2024/0318573 A1 Sep. 26, 2024

(30) Foreign Application Priority Data

Mar. 24, 2023 (PL) ........................................ 444189

(51) Int. Cl.
*F01D 11/22* (2006.01)
*F01D 11/00* (2006.01)
*F01D 11/08* (2006.01)

(52) U.S. Cl.
CPC ............ *F01D 11/22* (2013.01); *F01D 11/001* (2013.01); *F01D 11/08* (2013.01);
(Continued)

(58) Field of Classification Search
CPC .......... F01D 11/22; F01D 11/08; F01D 11/14; F01D 11/001; F05D 2240/11
See application file for complete search history.

(56) References Cited

U.S. PATENT DOCUMENTS 2,970,808 A 2/1961 Coppa
3,146,992 A 9/1964 Farrell
(Continued)

FOREIGN PATENT DOCUMENTS

CN 108374694 A 8/2018
CN 109973658 A 7/2019
(Continued)

OTHER PUBLICATIONS

Arnold Magnetic Technologies, Recoma HT Rare Earth Magnets for High Temperatures, 2020 (Year: 2020).*
(Continued)

*Primary Examiner* — Eldon T Brockman
(74) *Attorney, Agent, or Firm* — Dority & Manning, P.A.

(57) ABSTRACT

A turbine engine is provided. The gas turbine engine defines a radial direction and includes: a rotor; a stator comprising a carrier; a seal assembly disposed between the rotor and the stator, the seal assembly comprising a seal segment, the seal segment having a seal face configured to form a fluid bearing with the rotor; and a seal support assembly, the seal support assembly including a magnet assembly having a magnet coupled to the carrier or the seal segment for biasing the first seal segment along the radial direction.

20 Claims, 75 Drawing Sheets

(52) U.S. Cl.
CPC .... *F05D 2220/323* (2013.01); *F05D 2240/11* (2013.01); *F05D 2240/55* (2013.01)

(56) References Cited

U.S. PATENT DOCUMENTS 3,511,511 A 5/1970 Voitik
4,251,185 A 2/1981 Karstensen
4,307,993 A 12/1981 Hartel
4,334,822 A 6/1982 Rossmann
4,632,635 A 12/1986 Thoman et al.
4,747,603 A 5/1988 Sugino et al.
4,856,963 A 8/1989 Klapproth et al.
4,974,821 A 12/1990 Balsells
4,983,051 A 1/1991 Hibner et al.
5,100,158 A 3/1992 Gardner
5,143,384 A 9/1992 Lipschitz
5,301,957 A 4/1994 Hwang et al.
5,388,843 A 2/1995 Sedy
5,431,533 A 7/1995 Hobbs
5,509,664 A 4/1996 Borkiewicz
5,639,210 A 6/1997 Carpenter et al.
5,975,537 A 11/1999 Turnquist et al.
6,145,843 A 11/2000 Hwang
6,202,302 B1 3/2001 Descoteaux
6,210,103 B1 4/2001 Ramsay
6,273,671 B1 8/2001 Ress, Jr.
6,368,054 B1 4/2002 Lucas
6,505,837 B1 1/2003 Heshmat
6,514,041 B1 2/2003 Matheny et al.
6,543,992 B2 4/2003 Webster
6,655,696 B1 12/2003 Fang et al.
6,692,006 B2 2/2004 Holder
6,811,154 B2 11/2004 Proctor et al.
6,877,952 B2 4/2005 Wilson
6,895,757 B2 5/2005 Mitchell et al.
6,896,038 B2 5/2005 Arilla et al.
7,066,470 B2 6/2006 Turnquist et al.
7,079,957 B2 7/2006 Finnigan et al.
7,086,649 B2 8/2006 Plona
7,125,223 B2 10/2006 Turnquist et al.
7,334,980 B2 2/2008 Trinks et al.
7,367,776 B2 5/2008 Albers et al.
7,435,049 B2 10/2008 Ghasripoor et al.
7,438,526 B2 10/2008 Enderby
7,448,849 B1 11/2008 Webster et al.
7,459,081 B2 12/2008 Koenig et al.
7,596,954 B2 10/2009 Penda et al.
7,614,792 B2 11/2009 Wade et al.
7,726,660 B2 6/2010 Datta
7,752,849 B2 7/2010 Webster et al.
7,901,186 B2 3/2011 Cornett et al.
8,002,285 B2 8/2011 Justak
8,047,765 B2 11/2011 Wilson et al.
8,052,380 B2 11/2011 Willett, Jr.
8,056,902 B2 11/2011 Roddis et al.
8,113,771 B2 2/2012 Turnquist et al.
8,142,141 B2 3/2012 Tesh et al.
8,177,476 B2 5/2012 Andrew et al.
8,186,945 B2 * 5/2012 Bhatnagar ............... F01D 11/22 415/173.1
8,210,799 B1 7/2012 Rawlings
8,240,986 B1 8/2012 Ebert
8,434,766 B2 5/2013 Zeng et al.
8,556,578 B1 10/2013 Memmen et al.
8,608,427 B2 12/2013 Bock
8,641,045 B2 2/2014 Justak
8,678,742 B2 3/2014 Klingels
8,790,067 B2 7/2014 McCaffrey et al.
8,864,443 B2 10/2014 Narita et al.
8,985,938 B2 3/2015 Petty
9,045,994 B2 6/2015 Bidkar et al.
9,068,471 B2 6/2015 Klingels
9,103,223 B2 8/2015 Uehara et al.
9,115,810 B2 8/2015 Bidkar et al.
9,145,785 B2 9/2015 Bidkar et al.
9,169,741 B2 10/2015 Szwedowicz et al.
9,200,530 B2 12/2015 McCaffrey
9,255,489 B2 2/2016 DiTomasso et al.
9,255,642 B2 2/2016 Bidkar et al.
9,359,908 B2 6/2016 Bidkar et al.
9,394,801 B2 7/2016 Willett, Jr.
9,435,218 B2 9/2016 Casavant et al.
9,528,554 B2 12/2016 Moratz
9,587,746 B2 3/2017 Bidkar et al.
9,598,971 B2 3/2017 Hasnedl et al.
9,683,451 B2 6/2017 Sonokawa et al.
9,869,196 B2 1/2018 Day et al.
9,869,205 B2 1/2018 Ganiger et al.
9,890,650 B2 2/2018 Von Berg et al.
9,963,988 B2 5/2018 Swedowicz et al.
9,976,435 B2 5/2018 Borja et al.
10,041,534 B2 8/2018 Ganiger et al.
10,060,280 B2 8/2018 Crawley, Jr. et al.
10,077,782 B2 9/2018 Zhang et al.
10,100,660 B2 10/2018 Sippel et al.
10,161,259 B2 12/2018 Gibson et al.
10,184,347 B1 1/2019 D'Ambruoso
10,190,431 B2 1/2019 Bidkar et al.
10,196,980 B2 2/2019 Ganiger et al.
10,323,541 B2 6/2019 Ganiger et al.
10,344,612 B2 7/2019 Hudson et al.
10,352,455 B2 7/2019 Berard et al.
10,385,715 B2 8/2019 Wong et al.
10,415,418 B2 9/2019 McCaffrey et al.
10,415,419 B2 9/2019 Sun et al.
10,422,431 B2 9/2019 Chuong et al.
10,436,070 B2 10/2019 McCaffrey
10,443,424 B2 10/2019 McCaffrey
10,533,446 B2 1/2020 Barak et al.
10,920,593 B2 2/2021 Millier et al.
10,962,024 B2 3/2021 Nesteroff et al.
10,962,118 B2 3/2021 Duffy et al.
10,995,861 B2 5/2021 Hilbert et al.
11,047,481 B2 6/2021 Bidkar et al.
11,193,590 B2 12/2021 Black
2001/0007632 A1 7/2001 Pesek et al.
2007/0053772 A1 3/2007 Couture, Jr. et al.
2007/0248452 A1 * 10/2007 Brisson ................... F01D 11/06 415/10
2008/0056895 A1 3/2008 Senoo
2008/0265513 A1 10/2008 Justak
2010/0078893 A1 4/2010 Turnquist et al.
2010/0303612 A1 * 12/2010 Bhatnagar ............... F01D 11/22 415/127
2012/0177484 A1 7/2012 Lusted et al.
2012/0211944 A1 8/2012 Nishimoto et al.
2012/0223483 A1 9/2012 Bidkar et al.
2012/0248704 A1 10/2012 Fennell et al.
2013/0034423 A1 2/2013 Adaickalasamy et al.
2014/0008871 A1 1/2014 Bidkar et al.
2014/0062024 A1 3/2014 Bidkar et al.
2014/0117624 A1 5/2014 Bidkar et al.
2014/0119912 A1 5/2014 Bidkar et al.
2015/0159498 A1 6/2015 Mukhopadhyay et al.
2016/0010480 A1 1/2016 Bidkar et al.
2016/0097291 A1 4/2016 Hayford et al.
2016/0130963 A1 5/2016 Wilson et al.
2016/0138412 A1 5/2016 Rioux
2016/0376907 A1 12/2016 O'Leary et al.
2017/0051621 A1 2/2017 Ackermann et al.
2017/0051834 A1 2/2017 Webster et al.
2017/0211402 A1 7/2017 Peters et al.
2018/0045066 A1 2/2018 Chuong
2018/0058240 A1 3/2018 Chuong et al.
2018/0179908 A1 * 6/2018 D'Alessandro ....... F01D 11/001
2018/0372229 A1 12/2018 Bidkar et al.
2019/0072186 A1 3/2019 Bidkar et al.
2019/0085712 A1 3/2019 Wesling et al.
2019/0203842 A1 7/2019 Bidkar et al.
2019/0218926 A1 7/2019 DiFrancesco et al.
2019/0276851 A1 9/2019 Lin
2020/0040735 A1 2/2020 Millier et al.
2020/0063588 A1 2/2020 Morliere et al.
2020/0102845 A1 4/2020 DiFrancesco et al.

(56) References Cited

U.S. PATENT DOCUMENTS

| | | | |
|---|---|---|---|
| 2020/0191162 | A1 | 6/2020 | Weihard et al. |
| 2020/0318489 | A1 | 10/2020 | Webb |
| 2020/0362716 | A1 | 11/2020 | Glahn et al. |
| 2021/0207487 | A1 | 7/2021 | George et al. |
| 2022/0154580 | A1 | 5/2022 | Gainger et al. |
| 2022/0235667 | A1 | 7/2022 | Mizumi et al. |
| 2022/0349475 | A1 | 11/2022 | Nguyen et al. |
| 2022/0389825 | A1 | 12/2022 | Johnson et al. |

FOREIGN PATENT DOCUMENTS

| | | | |
|---|---|---|---|
| CN | 113446069 | A | 9/2021 |
| DE | 4011710 | A1 | 10/1991 |
| EP | 2239423 | A1 | 10/2010 |
| FR | 3042555 | A1 | 4/2017 |
| FR | 3059041 | B1 | 5/2020 |
| JP | S57195803 | A | 12/1982 |
| JP | S58206807 | A | 12/1983 |
| JP | S60111004 | A | 6/1985 |
| WO | WO2010/112421 | A1 | 10/2010 |

OTHER PUBLICATIONS

Bruce et al., Advanced Seal Technology Role in Meeting Next Generation Turbine Engine Goals, National Aeronautics and Space Administration Lewis Research Center, France, May 11-15, 1998, pp. 1-14.

Chupp et al., Sealing in Turbomachinery, NASA/TM-2006-214341, National Aeronautics and Space Administration, Cleveland, OH, 2006, 62 Pages.

Delgado et al., A Review of Engine Seal Performance and Requirements for Current and Future Army Engine Platforms, NASA/TM-2008-215161, 43rd Joint Propulsion Conference Co-Sponsored by AIAA, ASME, SAE, and ASEE, Cincinnati, OH, Jul. 8-11, 2007, 22 Pages.

Grondahl et al., Film Riding Leaf Seals for Improved Shaft Sealing, Proceeding of ASME Turbo Expo 2010: Power for Land, Sea and Air, GT2010-23629, Glasgow, UK, Jun. 14-18, 2010, 8 Pages.

Hamidizadeh, Study of Magnetic Properties and Demagnetization Models of Permanent Magnet for Electric Vehicles Application, Thesis McGill University, 2016, 84 Pages. https://escholarship.mcgill.ca/downloads/qb98mj16r.pdf.

Moore, Lip Seal, Materials Science, Fluoroelastomers Handbook 2006, 16 Pages. Retrieved Dec. 9, 2022 from Weblink https://www.sciencedirect.com/topics/materials-science/lip-seal.

Munson et al., Development of Film Riding Face Seals for a Gast Turbine Engine, Tribology Transactions, vol. 35, Issue 1, 1992, pp. 65-70.

Steinetz et al., Advanced Seal Technology Role in Meeting Next Generation Turbine Engine Goals, RTO AVT Symposium on Design Principles and Methods for Aircraft Gas Turbine Engines, Toulouse, France, May 11-15, 1998, 14 Pages.

* cited by examiner

SEAL SUPPORT ASSEMBLY FOR A TURBINE ENGINE

PRIORITY INFORMATION

The present application claims priority to Polish Patent Application Number P.444189 filed on Mar. 24, 2023.

FIELD

The present disclosure relates to seal support assemblies for a turbine engine.

BACKGROUND

Gas turbine engines, such as turbofan engines, may be used for aircraft propulsion. A turbofan engine generally includes a bypass fan section and a turbomachine such as a gas turbine engine to drive the bypass fan. The turbomachine generally includes a compressor section, a combustion section, and a turbine section in a serial flow arrangement. Both the compressor section and the turbine section are driven by one or more rotor shafts and generally include multiple rows or stages of rotor blades coupled to the rotor shaft. Each individual row of rotor blades is axially spaced from a successive row of rotor blades by a respective row of stator or stationary vanes. A radial gap is formed between an inner surface of the stator vanes and an outer surface of the rotor shaft.

BRIEF DESCRIPTION OF THE DRAWINGS

FIG. 124 is a perspective view of portion of a prestressed spring assembly of FIGS. 121 through 123.

FIG. 125 is a close-up, schematic, cross-sectional view of a rotor, a stator having a carrier, a seal assembly, and a seal support assembly in accordance with another embodiment of the present disclosure in a first position.

FIG. 126 is a close-up, schematic, cross-sectional view of the embodiment of FIG. 125 in a second position.

FIG. 127 is a close-up view of a section of a pneumatic engagement assembly of FIGS. 125 and 126 (in the position depicted in FIG. 125).

FIG. 128 is a close-up, schematic, cross-sectional view of a rotor, a stator having a carrier, a seal assembly, and a seal support assembly in accordance with another embodiment of the present disclosure.

FIG. 129 is a close-up, schematic, cross-sectional view of a rotor, a stator having a carrier, a seal assembly, and a seal support assembly in accordance with another embodiment of the present disclosure.

FIG. 130 is a close-up, schematic, cross-sectional view of a rotor, a stator having a carrier, a seal assembly, and a seal support assembly in accordance with another embodiment of the present disclosure.

FIG. 131 is a close-up, schematic, cross-sectional view of a rotor, a stator having a carrier, a seal assembly, and a seal support assembly in accordance with another embodiment of the present disclosure in a first position.

FIG. 132 is a close-up, schematic, cross-sectional view of the embodiment of FIG. 131 in a second position.

FIG. 133 is a close-up, schematic, cross-sectional view of a rotor, a stator having a carrier, a seal assembly, and a seal support assembly in accordance with another embodiment of the present disclosure in a first position.

FIG. 134 is a close-up, schematic, cross-sectional view of the embodiment of FIG. 133 in a second position.

FIG. 135 is a close-up, schematic, cross-sectional view of a rotor, a stator having a carrier, a seal assembly, and a seal support assembly in accordance with another embodiment of the present disclosure.

Figure 136:
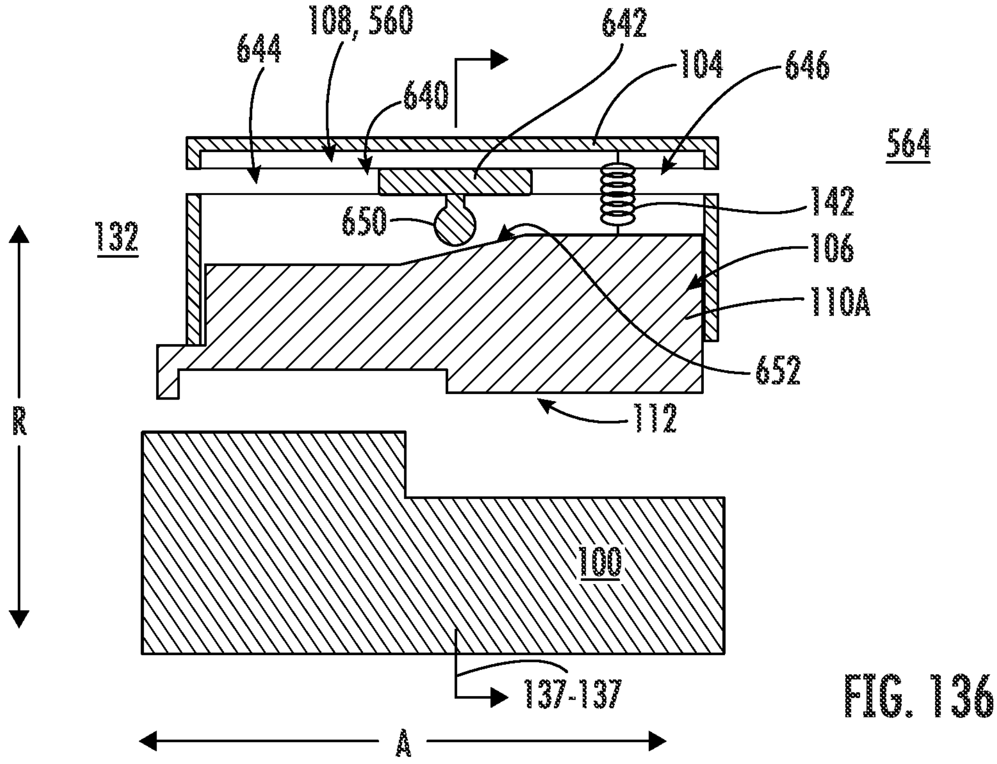

FIG. 136 is a close-up, schematic, cross-sectional view of a rotor, a stator having a carrier, a seal assembly, and a seal support assembly in accordance with another embodiment of the present disclosure.

Figure 137:
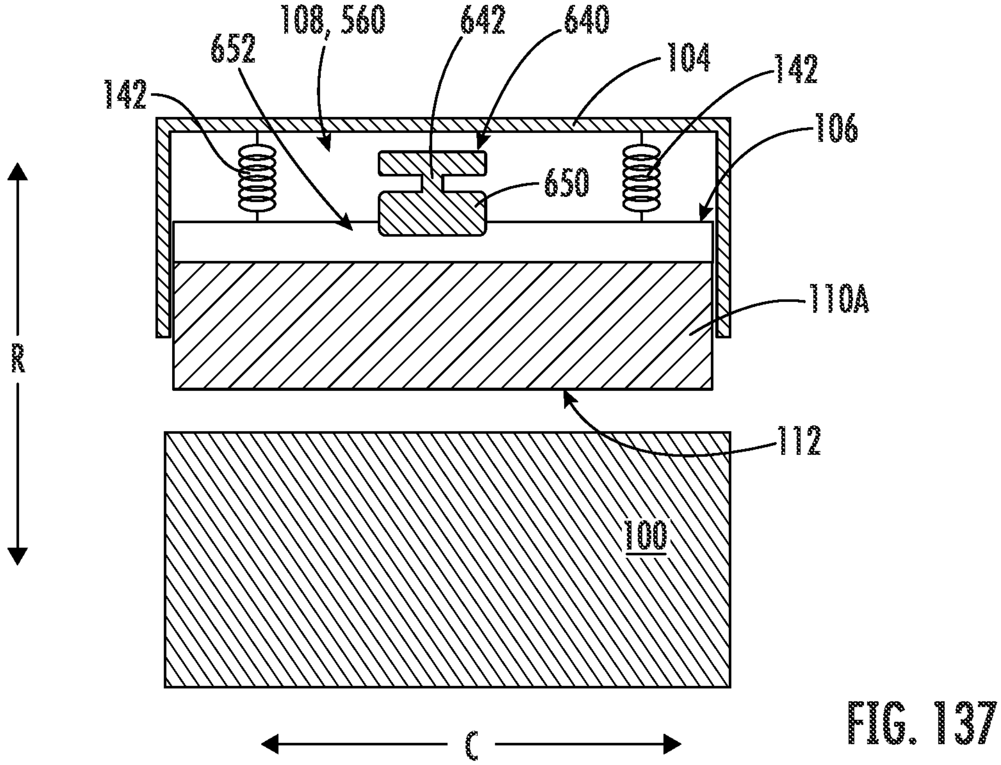

FIG. 137 is a cross-sectional view of the exemplary assembly of FIG. 136 along Line 137-137 in FIG. 136.

Figure 138:
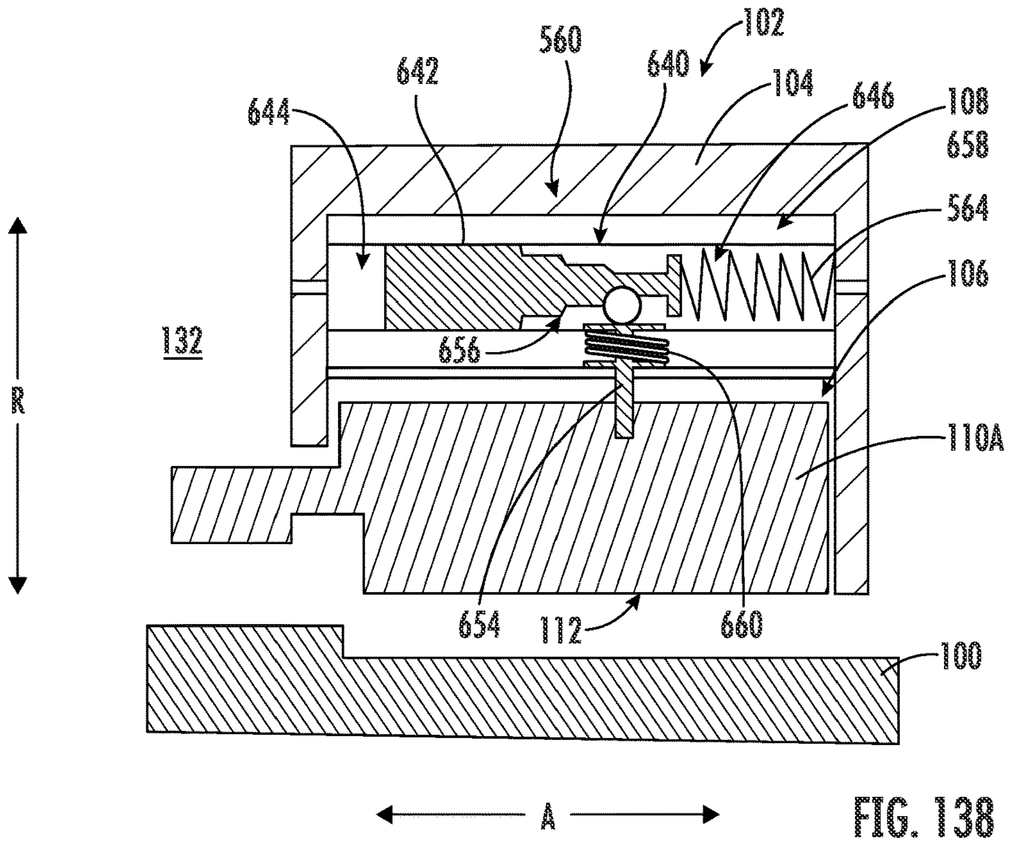

FIG. 138 is a close-up, schematic, cross-sectional view of a rotor, a stator having a carrier, a seal assembly, and a seal support assembly in accordance with another embodiment of the present disclosure in a first position.

Figure 139:
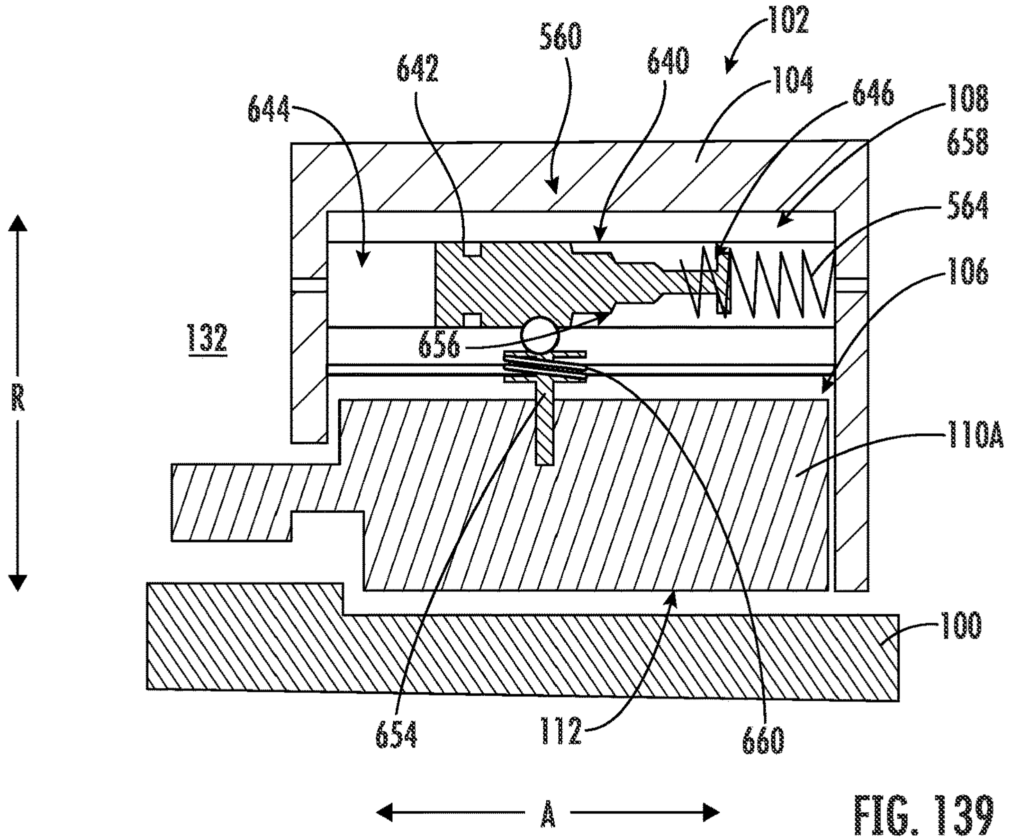

FIG. 139 is a close-up, schematic, cross-sectional view of the embodiment of FIG. 138 in a second position.

Figure 140:
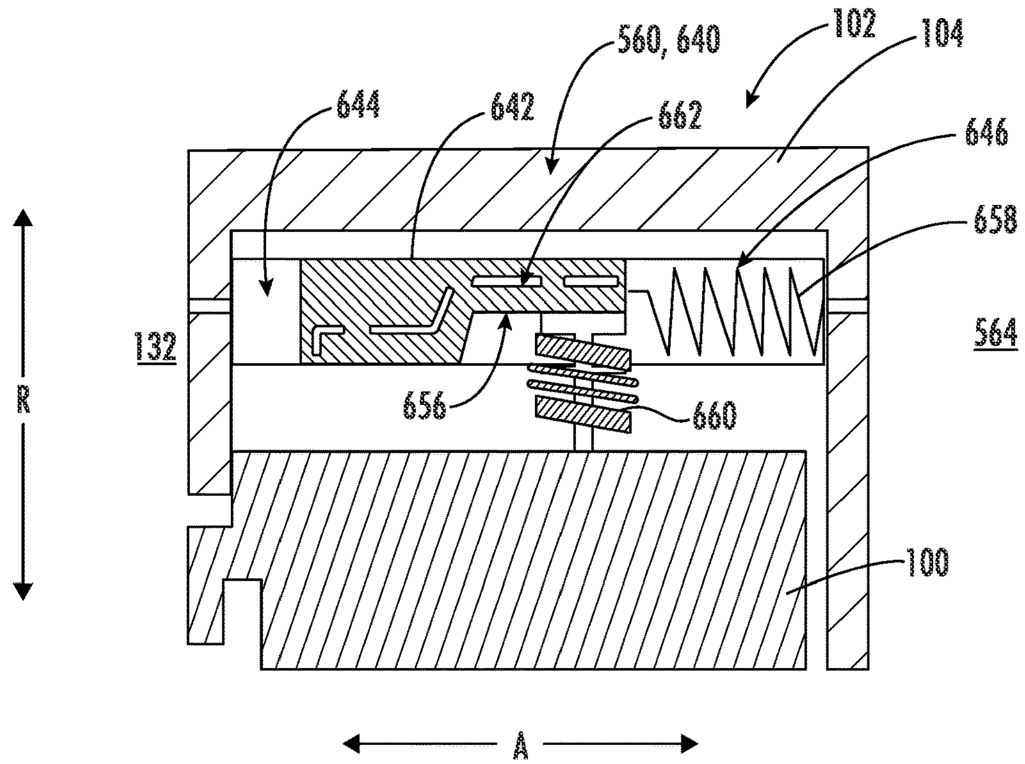

FIG. 140 is a close-up, schematic, cross-sectional view of a rotor, a stator having a carrier, a seal assembly, and a seal support assembly in accordance with another embodiment of the present disclosure in a first position.

Figure 141:
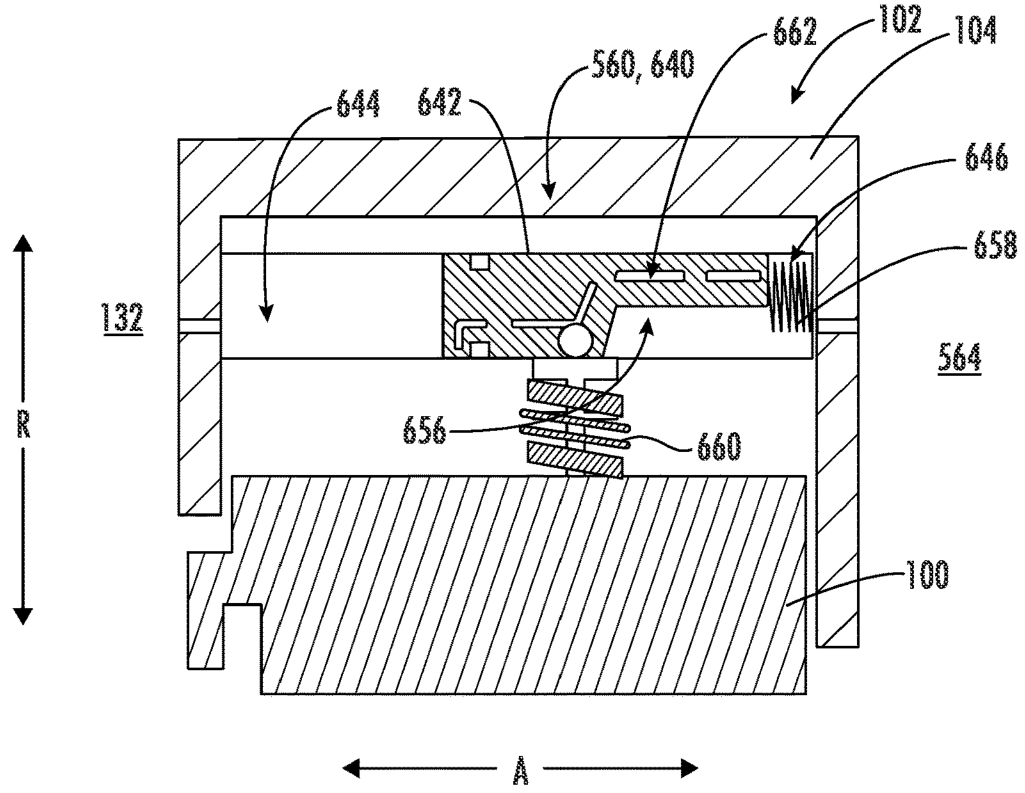

FIG. 141 is a close-up, schematic, cross-sectional view of the embodiment of FIG. 140 in a second position.

Figure 142:
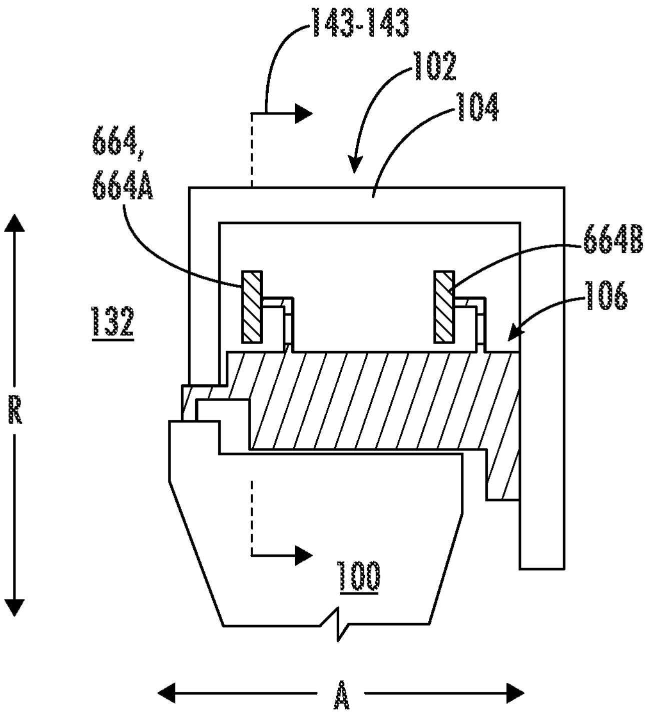

FIG. 142 is a close-up, schematic, cross-sectional view of a rotor, a stator having a carrier, a seal assembly, and a seal support assembly in accordance with another embodiment of the present disclosure.

Figure 143:
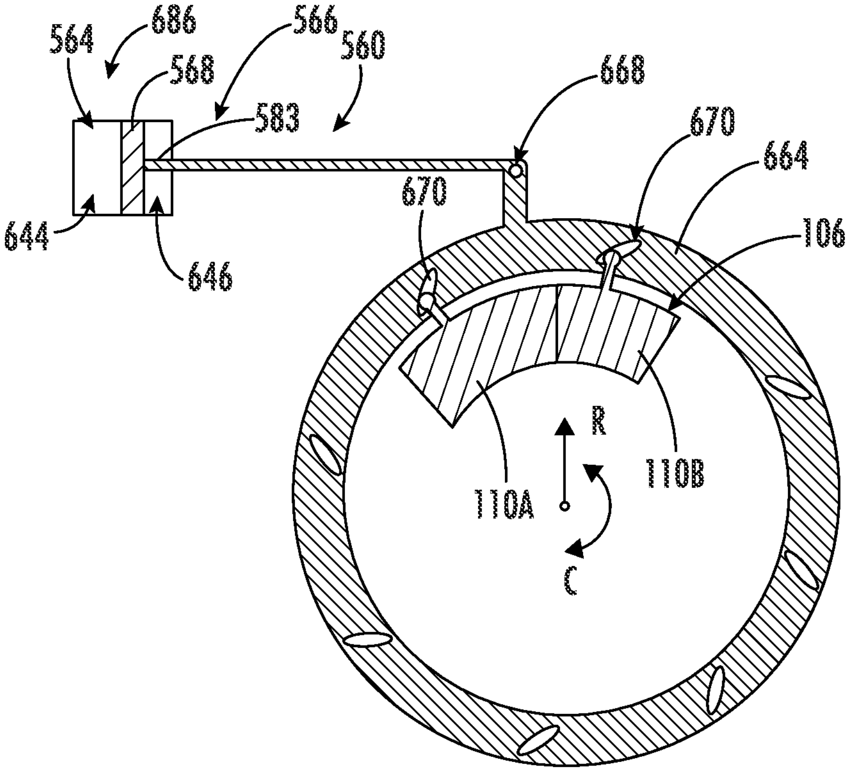

FIG. 143 is a schematic, cross-sectional view of the exemplary assembly of FIG. 142 along Line 143-143 in FIG. 142.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" or "turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "spring extension" refers to an object that is configured to deform elastically and store mechanical energy as a result of such deformation. A spring extension may be configured to deform linearly through extension or compression, which is referred to herein as a "linear spring"; may be configured to deform in a twisting manner through rotation about its axis, which is referred to herein as a "torsional spring extension"; or in any other suitable manner.

The term "proximate" refers to being closer to one end than an opposite end. For example, when used in conjunction with first and second ends; high-pressure and low-pressure sides; or the like, the phrase "proximate the first end," or "proximate the high-pressure side," refers to a location closer to the first end than the second end, or closer to the high-pressure side than the low-pressure side, respectively.

The term "adjacent" with respect to a relative position of two like components refers to there being no other like components positioned therebetween. The term "adjacent" with respect to a relative position of two different components refers to there being no intervening structure separating the two components.

The term "shape memory alloy material" and "shape memory alloy (SMA)" generally refer to a metal alloy that experiences a temperature-related or strain-related, solid-state, micro-structural phase change. An SMA material may change from one physical shape to another physical shape. The temperature at which a phase change occurs generally is called the critical or transition temperature of the SMA. The SMA material may be constructed of a single SMA or of various SMA materials. In an embodiment, high temperature SMA may define transition temperatures ranging between about 20 degrees Celsius and about 1400 degrees Celsius. The transition temperature of the SMA may be tunable to specific applications.

In some embodiments, a component said to be formed of a SMA may include the SMA material as a major constituent, e.g., in an amount greater than 50 weight percent ("wt. %") of the component. In certain embodiments, the component may be essentially composed of the SMA material (e.g., at least 90 wt. %, such as at least 95 wt. %, such as 100 wt. %).

A SMA material is generally an alloy capable of returning to its original shape after being deformed. For instance, SMA materials may define a hysteresis effect where the loading path on a stress-strain graph is distinct from the unloading path on the stress-strain graph. Thus, SMA materials may provide improved hysteresis damping as compared to traditional elastic materials.

A SMA material may also provide varying stiffness, in a pre-determined manner, in response to certain ranges of temperatures. The change in stiffness of the shape memory alloy may be due to a temperature related, solid state micro-structural phase change that enables the alloy to change from one physical shape to another physical shape. The changes in stiffness of the SMA material may be developed by working and annealing a preform of the alloy at or above a temperature at which the solid state micro-structural phase change of the shape memory alloy occurs. Such may allow a component formed of a SMA to act as a spring extension having a desired stiffness profile.

In the manufacture of a component comprising SMA (also referred to as an SMA component) intended to change stiffness during operation of a gas turbine engine, the component may be formed to have one operative stiffness (e.g., a first stiffness) below a transition temperature and have another stiffness (e.g., a second stiffness) at or above the transition temperature.

The term "temperature-dependent shape memory alloy material" refers to a SMA characterized by a temperature-dependent phase change. These phases include a martensite phase and an austenite phase. The martensite phase generally refers to a relatively lower temperature phase. Whereas the austenite phase generally refers to a relatively higher temperature phase. The martensite phase is generally more deformable, while the austenite phase is generally less deformable. When the shape memory alloy is in the martensite phase and is heated to above a certain temperature, the shape memory alloy begins to change into the austenite phase. The temperature at which this phenomenon starts is referred to as the austenite start temperature (As). The temperature at which this phenomenon is completed is called the austenite finish temperature (Af). When the shape memory alloy, which is in the austenite phase, is cooled, it begins to transform into the martensite phase. The temperature at which this transformation starts is referred to as the martensite start temperature (Ms). The temperature at which the transformation to martensite phase is completed is called the martensite finish temperature (Mf). As used herein, the term "transition temperature" without any further qualifiers may refer to any of the martensite transition temperature and austenite transition temperature. Further, "below transition temperature" without the qualifier of "start temperature" or "finish temperature" generally refers to the temperature that is lower than the martensite finish temperature, and the "above transition temperature" without the qualifier of "start temperature" or "finish temperature" generally refers to the temperature that is greater than the austenite finish temperature.

In some embodiments, a SMA component (such as a spring extension formed of an SMA material) may define a first stiffness at a first temperature and define a second stiffness at a second temperature, wherein the second temperature is different from the first temperature. Further, in some embodiments, one of the first temperature or the second temperature is below the transition temperature and the other one may be at or above the transition temperature. Thus, in some embodiments, the first temperature may be below the transition temperature and the second temperature may be at or above the transition temperature. While in some other embodiments, the first temperature may be at or above the transition temperature and the second temperature may be below the transition temperature. Further, various embodiments of SMA components described herein may be configured to have different first stiffnesses and different second stiffnesses at the same first and second temperatures.

The term "strain dependent shape memory alloy material" refers to a SMA characterized by a strain-dependent phase change. These phases similarly include a martensite phase and an austenite phase, which function in a similar manner as with the temperature dependent shape memory alloy materials, but instead of defining a transition temperature, the strain dependent SMAs define a transition strain.

Non-limiting examples of SMAs that may be suitable for forming various embodiments of the SMA components described herein may include nickel-titanium (NiTi) and other nickel-titanium based alloys such as nickel-titanium hydrogen fluoride (NiTiHf) and nickel-titanium palladium (NiTiPd). However, it should be appreciated that other SMA materials may be equally applicable to the current disclosure. For instance, in certain embodiments, the SMA material may include a nickel-aluminum based alloys, copper-aluminum-nickel alloy, or alloys containing zinc, zirconium, copper, gold, platinum, and/or iron. The alloy composition may be selected to provide the desired stiffness effect for the application such as, but not limited to, damping ability, transformation temperature and strain, the strain hysteresis, yield strength (of martensite and austenite phases), resistance to oxidation and hot corrosion, ability to change shape through repeated cycles, capability to exhibit one-way or two-way shape memory effect, and/or a number of other engineering design criteria. Suitable shape memory alloy compositions that may be employed with the embodiments of present disclosure may include, but are not limited to NiTi, NiTiHf, NiTiPt, NiTiPd, NiTiCu, NiTiNb, NiTiVd, TiNb, CuAlBe, CuZnAl and some ferrous based alloys. In some embodiments, NiTi alloys having transition temperatures between 5 degrees C. and 150 degrees C. are used. NiTi alloys may change from austenite to martensite upon cooling.

Moreover, SMA materials may also display superelasticity characteristics. Superelasticity may generally be characterized by recovery of large strains, potentially with some dissipation. For instance, martensite and austenite phases of the SMA material may respond to mechanical stress as well as temperature induced phase transformations. For example, SMAs may be loaded in an austenite phase (e.g. above a certain temperature). As such, the material may begin to transform into the (twinned) martensite phase when a critical stress is reached. Upon continued loading and assuming isothermal conditions, the (twinned) martensite may begin to detwin, allowing the material to undergo plastic deformation. If the unloading happens before plasticity, the martensite may generally transform back to austenite, and the material may recover its original shape by developing a hysteresis.

The term “bimetallic material” refers to a material having a first layer formed of a first material and a second layer formed of a second material, with the first and second materials configured to expand differently in response to temperature, strain, or a combination thereof. For example, the first material may define a first coefficient of thermal expansion and the second material may define a second coefficient of thermal expansion different than the first coefficient of thermal expansion. Additionally or alternatively one of the first material or the second material may be a SMA material configured to expand differently than the other of the first material or the second material in response to operating conditions to which the bimetallic material is expected to be exposed.

The present disclosure is generally related to a seal member support system for a turbomachine of a gas turbine engine. A turbomachine generally includes a compressor section including a low-pressure compressor and a high-pressure compressor, a combustion section, and a turbine section including a high-pressure turbine and a low-pressure turbine arranged in serial-flow order. Each of the low-pressure compressor, the high-pressure compressor, the high-pressure turbine and the low-pressure turbine include sequential rows of stationary or stator vanes axially spaced by sequential rows of rotor blades. The rotor blades are generally coupled to a rotor shaft and the stator vanes are mounted circumferentially in a ring configuration about an outer surface of the rotor shaft. Radial gaps are formed between the outer surface of the rotor shaft and an inner portion of each ring or row of stator vanes.

During operation, it is desirable to control (reduce or prevent) compressed air flow or combustion gas flow leakage through these radial gaps. Ring seals are used to form a film bearing seal to seal these radial gaps. Ring seals generally include a plurality of seal shoe or seal member segments. As pressure builds in the compressor section and/or the turbine section, the seal members are forced radially outwardly and form a bearing seal between the outer surface of the rotor shaft and the respective seal members. To reduce wear on the rotor shaft and/or the seal members, it is desirable to maintain a positive radial clearance between the seal members and the outer surface of the rotor shaft under all operating conditions of the turbomachine. However, at low delta pressure operating conditions and transients like during start-up, stall, rotor vibration events, or during sudden pressure surges within the turbomachine, the film bearing stiffness may be low or suddenly change thus leading to seal member/rotor rubs.

Disclosed herein is a seal member support system to hold the seal members in a retracted position radially away from the rotor shaft during these low delta pressure operating conditions. Various embodiments presented work on a tangential spring-based retraction mechanism. In an assembly or low-pressure condition, the seal members are held in the retracted position, radially outward from the outer surface of the rotor shaft. As a pressure delta across a backside surface of the seal members increases, the seal members/segments move radially inwardly to a desired radial position to seal the respective radial gap (e.g., the seal rides on an air film). As the pressure delta across the seal members decreases, the seal members return to the retracted condition, thus reducing the potential for rotor scrub and damage or excessive wear to the seal members.

Figure 1:
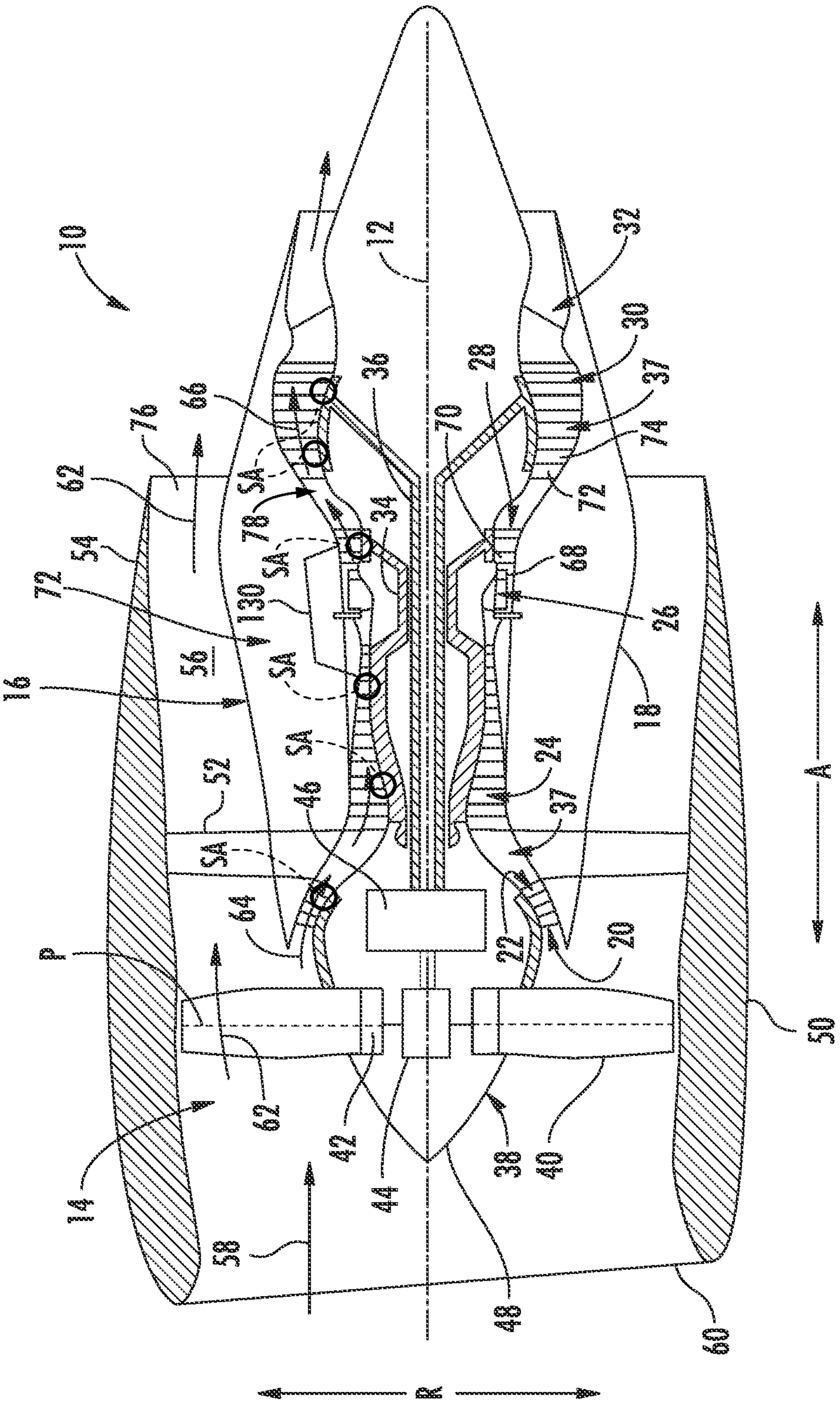
FIG. 1 is a cross-sectional view of a gas turbine engine in accordance with an exemplary aspect of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, sometimes also referred to as a “turbofan engine.” As shown in FIG. 1, the gas turbine engine 10 defines an axial direction A (extending parallel to a longitudinal centerline 12 provided for reference), a radial direction R. and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low-pressure (LP) compressor 22 and a high-pressure (HP) compressor 24; a combustion section 26; a turbine section including a high-pressure (HP) turbine 28 and a low-pressure (LP) turbine 30; and a jet exhaust nozzle section 32. A high-pressure (HP) shaft 34 (which may additionally or alternatively be a spool) drivingly connects the HP turbine 28 to the HP compressor 24. A low-pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by rotatable front hub 48 of the fan section 14 (sometimes also referred to as a “spinner”). The front hub 48 aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the outer nacelle 50 is supported relative to the turbomachine 16 by a plurality of circumferentially-spaced outlet guide vanes 52 in the embodiment depicted. Moreover, a downstream section 54 of the outer nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the outer nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (e.g., including the outer nacelle 50), in other embodiments, the gas turbine engine 10 may be an unducted gas turbine engine (such that the fan 38 is an unducted fan, and the outlet guide vanes 52 are cantilevered from, e.g., the outer casing 18). Additionally, or alternatively, although the gas turbine engine 10 depicted is configured as a geared gas turbine engine (e.g., including the power gear box 46) and a variable pitch gas turbine engine (e.g., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
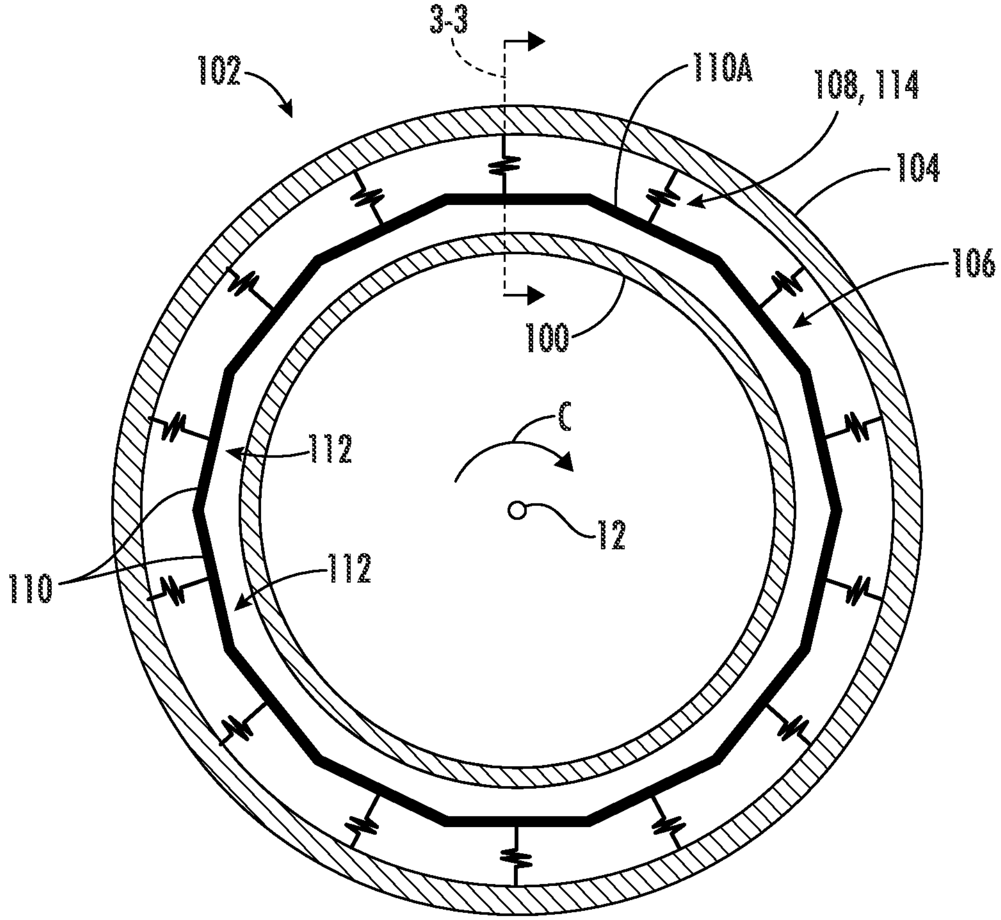
FIG. 2 is a cross sectional, schematic view of a portion of the turbomachine of FIG. 1.

Referring now to FIG. 2, a cross sectional, schematic view of a portion of the turbomachine 16 of FIG. 1 is provided. As will be appreciated, the exemplary turbomachine 16 generally includes a rotor 100, a stator 102 having a carrier 104, a seal assembly 106 disposed between the rotor 100 and the stator 102, and a seal support assembly 108. The rotor 100 may be any rotor of the turbomachine 16, such as the LP shaft 36, the HP shaft 34, etc. By way of example, referring briefly back to FIG. 1, Circles SA have been added to FIG. 1 to provide example locations that the seal assembly 106 and seal support assembly 108 of the present disclosure may be incorporated into a turbomachine of the present disclosure.

Referring still to FIG. 2, and as will be explained in more detail below, the exemplary seal assembly 106 includes a plurality of seal segments 110 arranged along the circumferential direction C. Each seal segment 110 of the plurality of seal segments 110 has a seal face 112 configured to form a fluid bearing with the rotor 100, and more specifically a radial fluid bearing (e.g., configured to constrain the rotor 100 along the radial direction R).

As will also be explained in more detail below, the seal support assembly 108 includes a spring arrangement 114 extending between the carrier 104 and a first seal segment 110A of the plurality of seal segments 110 to support the plurality of seal segments 110 of the seal assembly 106. The seal support assembly 108 may further include similar spring arrangements 114 extending between the carrier 104 and the other seal segments 110 of the plurality of seal segments 110.

Figure 3:
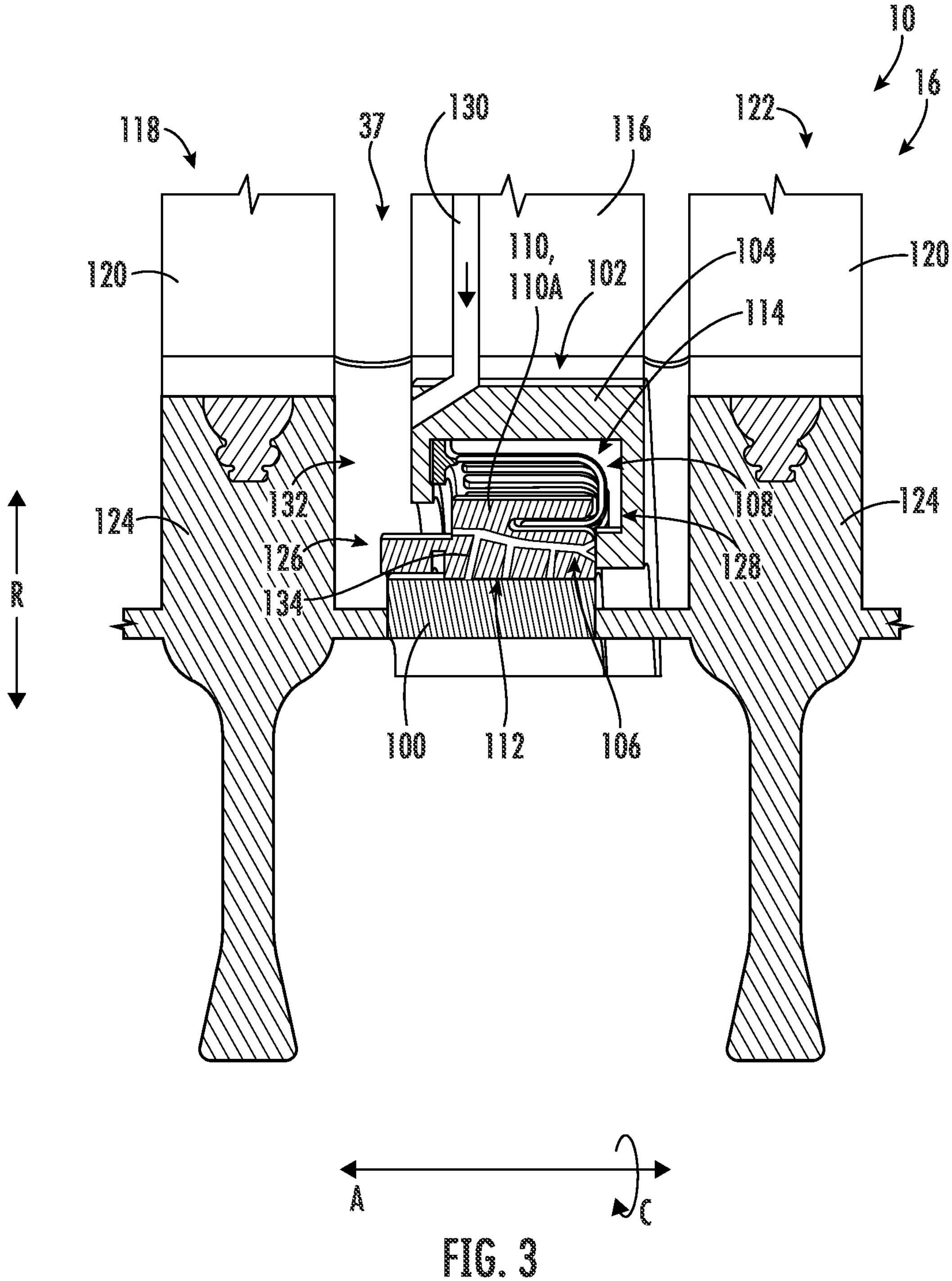
FIG. 3 is a close-up, schematic, cross-sectional view of a portion of the turbomachine of FIG. 2, taken along Line 3-3 and FIG. 2.

Further, referring now to FIG. 3, a close-up, schematic, cross-sectional view is depicted, taken along Line 3-3 and FIG. 2. In particular, FIG. 3 depicts the first seal segment 110A of the plurality of seal segments 110 positioned between the rotor 100 and the carrier 104 of the stator 102.

As will be appreciated, the stator 102 further includes a stator vane 116 and the seal assembly 106 is, in the embodiment depicted, positioned at an inner end of a stator vane 116 along the radial direction R of the turbomachine 16. The turbomachine 16 further includes a first stage 118 of rotor blades 120 and a second stage 122 of rotor blades 120 spaced along the axial direction A of the gas turbine engine 10. The seal assembly 106 is positioned between the first stage 118 of rotor blades 120 and the second stage 122 of rotor blades 120 along the axial direction A.

In the embodiment depicted, the seal assembly 106 is positioned within a turbine section of the gas turbine engine 10, such as within the HP turbine 28 or the LP turbine 30. In such a manner, it will be appreciated that the rotor 100 may be a rotor coupled to the HP turbine 28, such as the HP shaft 34, or a rotor coupled to the LP turbine 30, such as the LP shaft 36. More specifically, still, in the embodiment affected, the rotor 100 is a connector extending between a disk 124 of the first stage 118 of rotor blades 120 and a disk 124 of the second stage of rotor blades 120.

It will further be appreciated that the seal assembly 106 defines a high-pressure side 126 and a low-pressure side 128. The seal assembly 106 is operable to prevent or minimize an airflow from the high-pressure side 126 to the low-pressure side 128 between the rotor 100 and the seal assembly 106. In particular, it will be appreciated that the first seal segment 110A depicted includes the seal face 112 configured to form a fluid bearing with the rotor 100 to support the rotor 100 along the radial direction R and prevent or minimize the airflow from the high-pressure side 126 to the low-pressure side 128 between the rotor 100 and the seal assembly 106.

As will be appreciated, the first seal segment 110A may be in fluid communication with a high-pressure air source to provide a high-pressure fluid flow to the seal face 112 to form the fluid bearing with the rotor 100. In at least certain exemplary aspects, the high-pressure air source may be the working gas flowpath 37 through the gas turbine engine 10 and the seal assembly 106, and more specifically the first seal segment 110A, may be in fluid communication with the high-pressure air source, e.g., at the high-pressure side 126 of the seal assembly 106.

In particular, for the embodiment depicted, referring back briefly also to FIG. 1, the gas turbine engine 10 further includes a high-pressure air duct 130 extending from the high-pressure air source and in fluid communication with seal assembly 106. As noted, the high-pressure air source is the working gas flowpath 37, and more specifically is a portion of the working gas flowpath defined by the HP compressor 24 of the compressor section (see FIG. 1). The high-pressure air duct 130 extends to and through the stator vane 116 and to a high-pressure cavity 132 defined at the high-pressure side 126 of the seal assembly 106 (e.g., between the stator 102 and the rotor 100). A high-pressure airflow from the high-pressure air duct 130 may pressurize the high-pressure cavity 132 to prevent gasses from the working gas flowpath 37 (which may be combustion gasses) from entering the high-pressure cavity 132 and damaging one or more components exposed thereto. The high-pressure airflow may also feed the seal assembly 106. For example, the exemplary first seal segment 110A defines a plurality of air ducts 134 extending therethrough, extending between one or more inlets in airflow communication with the high-pressure cavity 132 and one or more outlets in airflow communication with the seal face 112 to provide a necessary high-pressure airflow to form the fluid bearing with the rotor 100.

It will be appreciated, however, that in other exemplary embodiments, the seal assembly 106 may be integrated into, e.g., a compressor section of the gas turbine engine 10. In such a case, the high-pressure side 126 may be positioned on a downstream side or aft side of seal assembly 106, and the low-pressure side 128 may be positioned on an upstream side forward side of the seal assembly 106.

Figure 4:
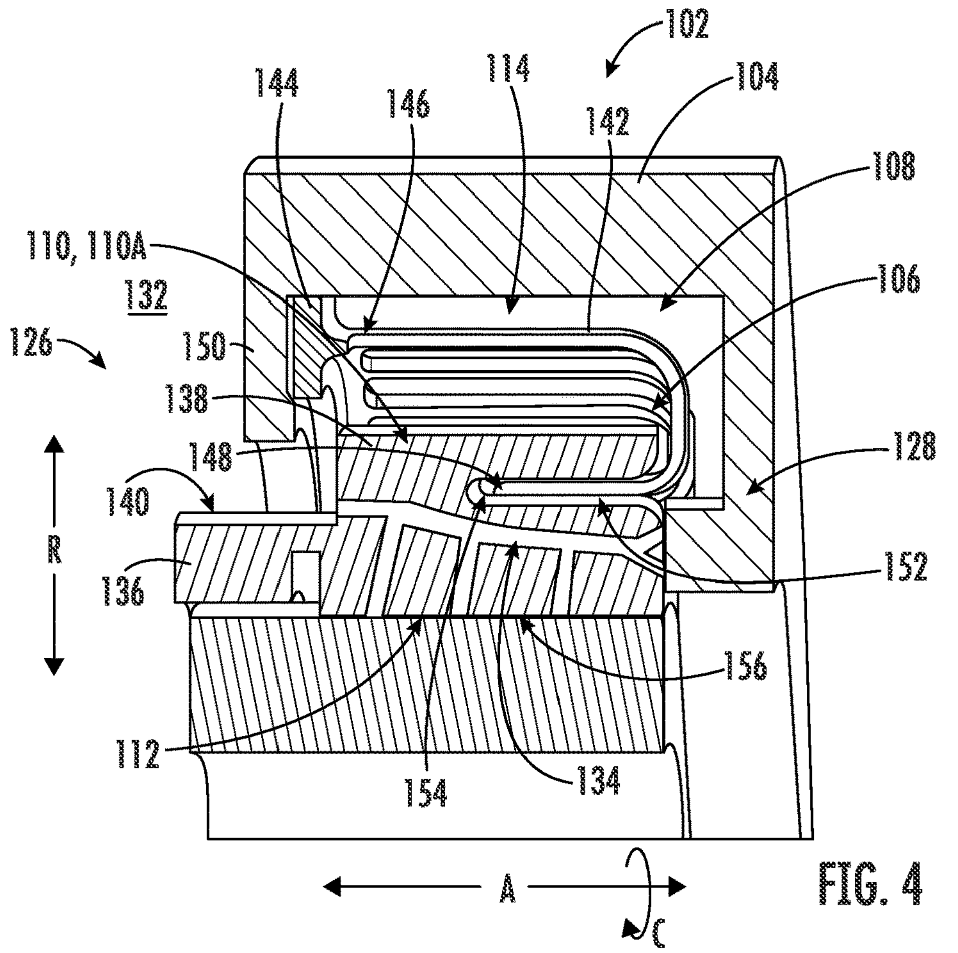
FIG. 4 is a close-up, schematic, cross-sectional view of the rotor, carrier, first seal segment, and seal support assembly of FIG. 3.

Referring now also to FIG. 4, a close-up, schematic, cross-sectional view is provided of the rotor 100, carrier 104, first seal segment 110A, and seal support assembly 108 of FIG. 3. As will be appreciated, the exemplary first seal segment 110A depicted further includes a lip 136 and a body 138. The lip 136 extends from the body 138 along the axial direction A of the gas turbine engine 10 on the high-pressure side 126 of the seal assembly 106. The lip 136 includes an outer pressurization surface 140 along the radial direction R of the gas turbine engine 10. For the embodiment depicted, the outer pressurization surface 140 is in airflow communication with the working gas flowpath 37 of the gas turbine engine 10, and more specifically is exposed to the high-pressure cavity 132 and thus is in fluid communication with the working gas flowpath 37 of the gas turbine engine 10 from the high-pressure side 126 of the seal assembly 106. The outer pressurization surface 140 is a radially outer surface of the lip 136, and as will be appreciated, as a pressure within the high-pressure cavity 132 increases, a radially-inward force exerted on the outer pressurization surface 140 (and the first seal segment 110A) correspondingly increases.

The seal support assembly 108, more specifically, the spring arrangement 114 of the seal support assembly 108, extends between the carrier 104 and the first seal segment 110A to counter a pressure on the outer pressurization surface 140 during operation of the gas turbine engine 10, while allowing for passive control of a radial clearance gap defined between the seal face 112 and the rotor 100 during operation of the turbine engine.

For example, the seal support assembly 108 may generally define a resistance along the radial direction R of the gas turbine engine 10. The gas turbine engine 10 may be operable in a high power operating mode and in a low power operating mode. The high power operating mode may be any operating mode in which a higher amount of thrust is provided from the gas turbine engine 10 as compared to when the gas turbine engine 10 is operated in the low power operating mode. For example, the high power operating mode may be, e.g., a takeoff operating mode, a climb operating mode, a cruise operating mode, or the like. By contrast, the low power operating mode may be, e.g., an idle operating mode, a descent operating mode, or the like.

The gas turbine engine 10 may define a first high-pressure at the high-pressure side 126 of the seal assembly 106 (e.g., within the high-pressure cavity 132) when the gas turbine engine 10 is operated in the high power operating mode, and may further define the second high-pressure at the high-pressure side 126 of the seal assembly 106 (e.g., within the high-pressure cavity 132) when the gas turbine engine 10 is operated in the low power operating mode. The seal support assembly 108 is configured to hold the first seal segment 110A at a radial distance away from the rotor 100 when the gas turbine engine 10 defines the second high-pressure. By contrast, the seal support assembly 108 is configured to move the first seal segment 110A (or rather, allow the first seal segment 110A to move) towards the rotor 100 when the gas turbine engine 10 defines the first high-pressure. In such a manner, the seal support assembly 108 may allow for the first seal segment 110A to be moved closer to the rotor 100 during the high-pressure operating mode as compared to during the low-pressure operating mode.

Such a configuration may allow for a higher radial clearance between the first seal segment 110A and the rotor 100 during low-pressure operating conditions and transients, which may allow for accommodation of, e.g., rotor vibrations with a reduced amount of rub between the rotor 100 and the first seal segment 110A. Such a configuration may also allow for a lower radial clearance between the first seal segment 110A and the rotor 100 during high-pressure operating conditions when, e.g., rotor 100 vibrations may be less severe. As will be appreciated, the first seal segment 110A may be more effective at preventing or minimizing airflow from the high-pressure side 126 to the low-pressure side 128 with a lower radial clearance.

Figure 5:
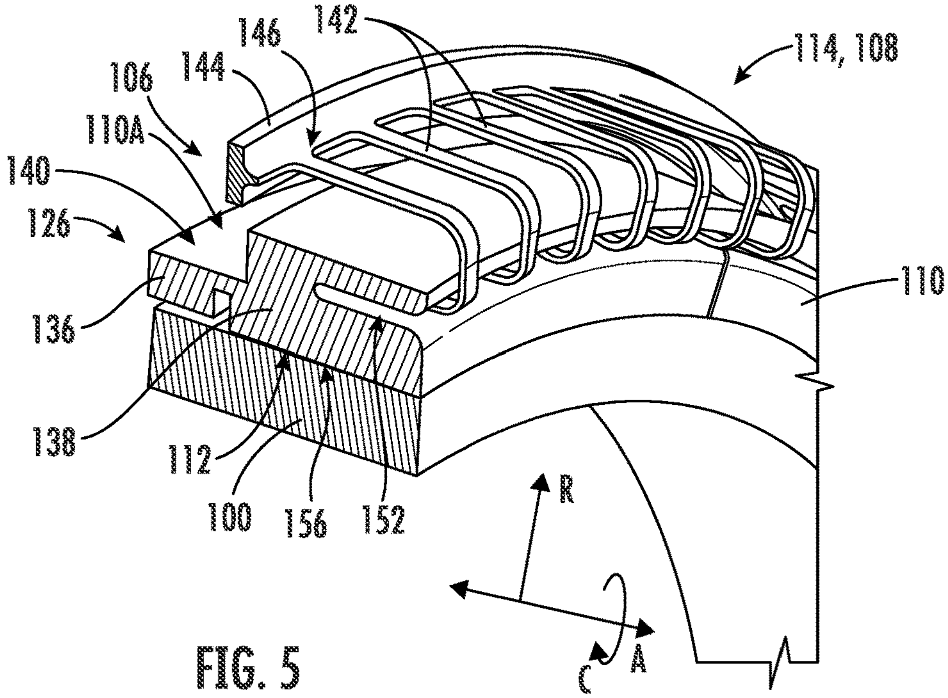
FIG. 5 is a partial, perspective view of the assembly of FIG. 4.

Referring still to FIG. 4, and now also to FIG. 5, providing a partial, perspective view of the assembly of FIG. 4 with the carrier 104 removed for clarity, it will be appreciated that the exemplary spring arrangement 114 of the seal support assembly 108 depicted includes a plurality of spring extensions 142 extending between the carrier 104 and the first seal segment 110A.

More specifically, as is depicted, the spring arrangement 114 further includes a base 144 extending along the circumferential direction C of the gas turbine engine 10, with the plurality of spring extensions 142 coupled to or formed integrally with the base 144 and extending between a proximal end 146 at the base 144 and a distal end 148 (see FIG. 4). The plurality of spring extensions 142 are spaced along the circumferential direction C. In the embodiment shown, the spring arrangement 114 includes at least two spring extensions 142 extending between the base 144 and the first seal segment 110A and up to, e.g., 20 spring extensions 142 extending between the base 144 and the first seal segment 110A. For example, the spring arrangement 114 may include at least three and up to 10 spring extensions 142 extending between the base 144 and the first seal segment 110A.

The base 144 is coupled to or formed integrally with the carrier 104, and more specifically, is coupled to the carrier 104 (see FIG. 4). More specifically, still, it will be appreciated that the carrier 104 includes a radial extension 150 defining a radial face, and the base 144 of the spring arrangement 114 is coupled to the carrier 104 at the radial face of the radial extension 150 (see FIG. 4).

Further, for the embodiment shown, the first seal segment 110A defines a slot 152 in the body 138 of the first seal segment 110A. The slot 152 extends along the axial direction A and the circumferential direction C, and the respective distal ends 148 of the plurality of spring extensions 142 are each positioned in the slot 152 of the first seal segment 110A. Notably, in the embodiment shown, the first seal segment 110A and the respective distal ends 148 of the plurality of spring extensions 142 together define a clearance gap 154 along the axial direction A (see FIG. 4). Such a configuration may allow the first seal segment 110A to move relative to the carrier 104 along the axial direction A.

Further, the base 144 of the spring arrangement 114 is coupled to or formed integrally with the carrier 104 proximate the high-pressure side 126 of the seal assembly 106, while the plurality of spring extensions 142 contact the first seal segment 110A proximate the low-pressure side 128 of the seal assembly 106. Such a configuration may ensure that the plurality of spring extensions 142 provide a desired amount of flexibility during operation of the gas turbine engine 10. Notably, however, each of the plurality of spring extensions 142 define an extended contact surface with the first seal segment 110A within the slot 152 of the first seal segment 110A. The extended contact surface extends, for the embodiment shown, along the axial direction A to an axial halfway point 156 of the seal face 112 of the first seal segment 110A. In such a manner, the spring arrangement 114 may prevent or minimize a twist of the first seal segment 110A relative to the rotor 100 as a result of a force on the outer pressurization surface 140 of the lip 136 of the first seal segment 110A.

Figure 6:
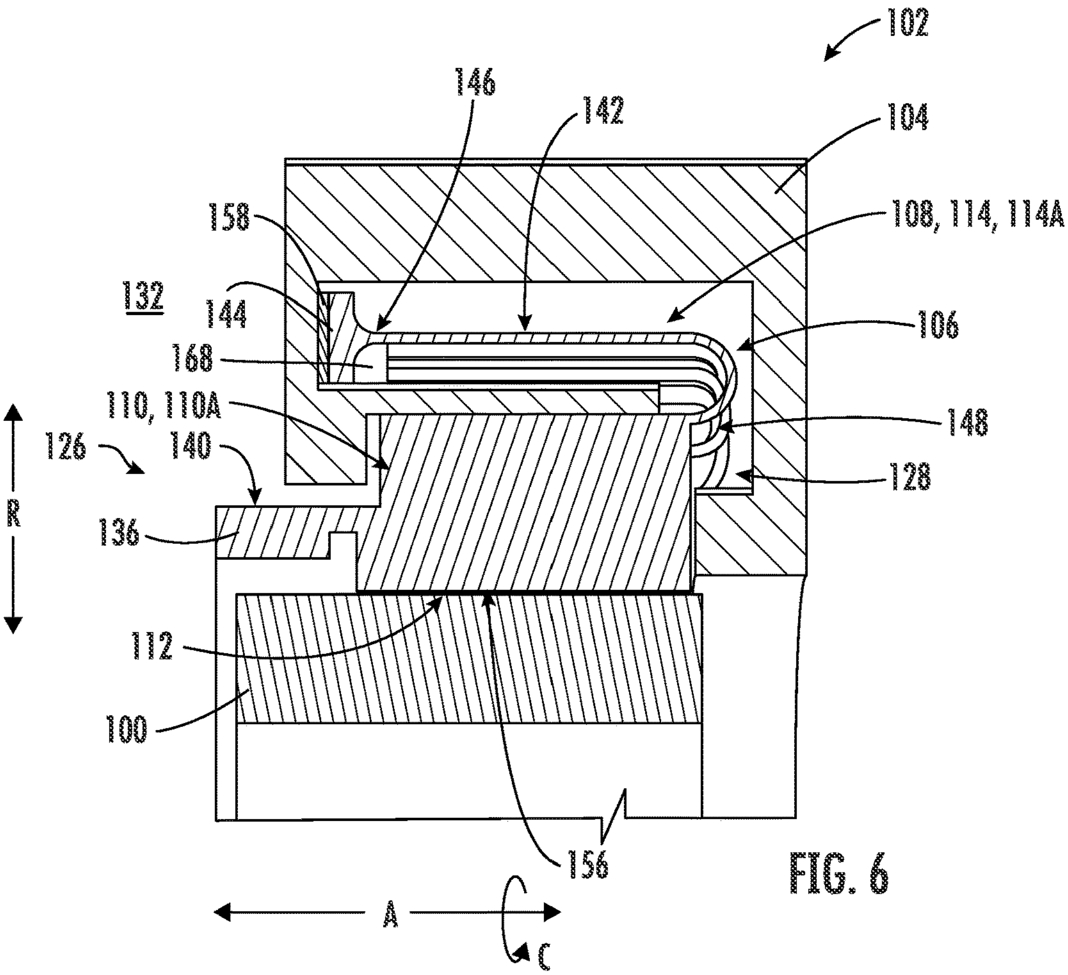
FIG. 6 is a close-up, schematic, cross-sectional view of a rotor, a stator having a carrier, a seal assembly, and a seal support assembly in accordance with another embodiment of the present disclosure.
Figure 7:
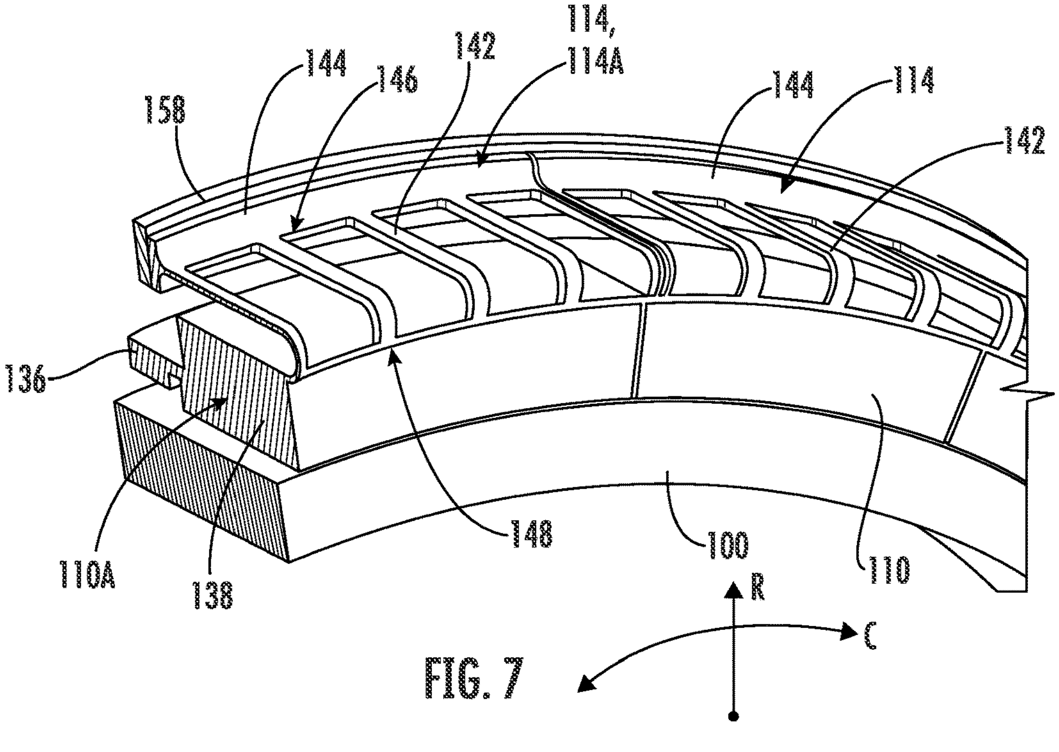
FIG. 7 is a perspective view of the assembly of FIG. 6, with the carrier removed for clarity.

Referring now to FIGS. 6 and 7, an assembly in accordance with another exemplary embodiment of the present disclosure is provided. FIG. 6 provides a close-up, schematic, cross-sectional view of a rotor 100, a stator 102 having a carrier 104, a seal assembly 106 having a first seal segment 110A, and a seal support assembly 108 having a spring arrangement 114. FIG. 7 provides a perspective view of the assembly of FIG. 6, with the carrier 104 removed for clarity. The embodiment of FIGS. 6 and 7 may be configured in a similar manner as the exemplary embodiment described above with reference to, e.g., FIGS. 4 and 5, and the same or similar numbers may refer to the same or similar parts.

For example, for the embodiment of FIGS. 6 and 7, the seal support assembly 108 includes a spring arrangement 114 having a base 144 and a plurality of spring extensions 142 extending from the base 144 from respective proximal ends 146 to respective distal ends 148. The plurality of spring extensions 142 are formed integrally with the base 144 at the respective proximal ends 146.

However, for the embodiment depicted, the plurality of spring extensions 142 are further fixedly coupled to, or formed integrally with, the body 138 of the first seal segment 110A proximate a low-pressure side 128 of the seal assembly 106. More specifically, for the embodiment shown, the plurality of spring extensions 142 are formed integrally with the body 138 of the first seal segment 110A proximate the low-pressure side 128 of the seal assembly 106.

As such, it will further be appreciated that the base 144 of the spring arrangement 114 does not extend continuously between the plurality of seal segments 110 like the embodiment described above with reference to FIGS. 4 and 5. Instead, for the embodiment shown, the spring arrangement 114 is a first spring arrangement 114A for the first seal segment 110A, and the seal support assembly 108 includes a plurality of spring arrangements 114 spaced along the circumferential direction C. Each spring arrangement 114 of the plurality of spring arrangements 114 includes a base 144 coupled to or formed integrally with the carrier 104 and a plurality of spring extensions 142 extending from the base 144 to a respective seal segment 110.

Notably, for the embodiment shown, the seal support assembly 108 further includes an annular flange 158 extending along the circumferential direction C between the base 144 of each one of the plurality of spring arrangements 114 and the carrier 104. The annular flange 158 may extend at least 170 degrees along the circumferential direction C, such as at least 180 degrees along the circumferential direction C, such as at least 300 degrees along the circumferential direction C, such as 360 degrees along the circumferential direction C. In such a manner, the annular flange 158 may maintain relative circumferential positions of the plurality of spring arrangements 114.

Figure 8:
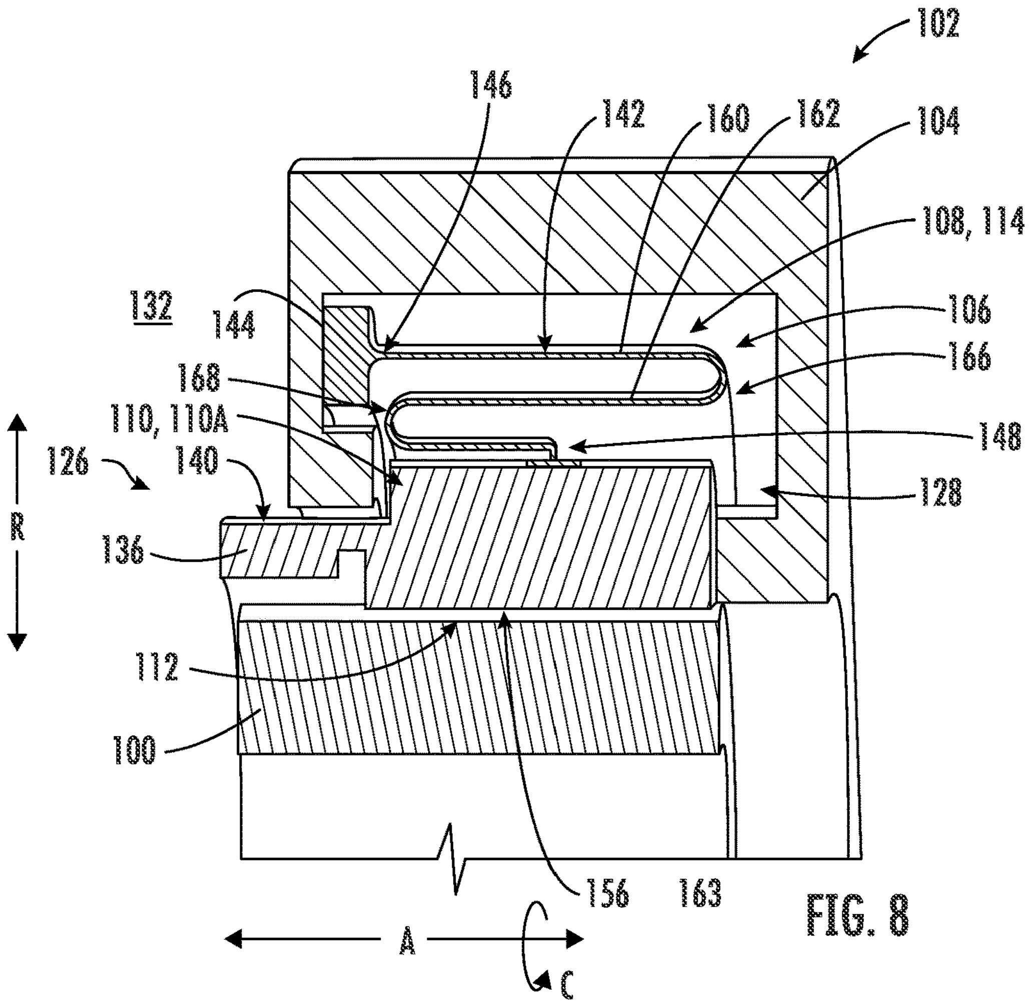
FIG. 8 is a close-up, schematic, cross-sectional view of a rotor, a stator having a carrier, a seal assembly, and a seal support assembly in accordance with yet another embodiment of the present disclosure.
Figure 9:
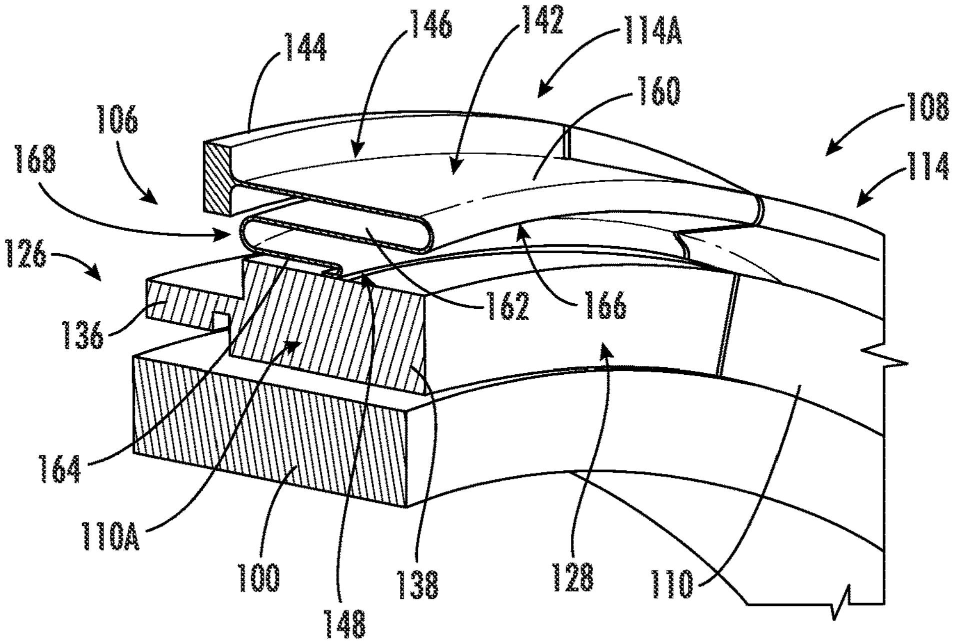
FIG. 9 is a perspective view of the assembly of FIG. 8, with the carrier removed for clarity.

Referring now to FIGS. 8 and 9, an assembly in accordance with another exemplary embodiment of the present disclosure is provided. FIG. 8 provides a close-up, schematic, cross-sectional view of a rotor 100, a stator 102 having a carrier 104, a seal assembly 106 having a first seal segment 110A, and a seal support assembly 108 having a spring arrangement 114. FIG. 9 provides a perspective view of the assembly of FIG. 8, with the carrier 104 removed for clarity. The embodiment of FIGS. 8 and 9 may be configured in a similar manner as the exemplary embodiment described above with reference to, e.g., FIGS. 6 and 7.

For example, the exemplary embodiment of FIGS. 8 and 9 includes the seal support assembly 108 having a spring arrangement 114 extending between the carrier 104 (see FIG. 8) and the first seal segment 110A. However, for the embodiment shown, the spring arrangement 114 includes a base 144 and a single spring extension 142 extending from the base 144 at a proximal end 146 to the first seal segment 110A at a distal end 148.

Notably, as with the embodiment of FIGS. 6 and 7, the embodiment of FIGS. 8 and 9 includes a separate spring arrangement 114 for each seal segment 110 of the seal assembly 106, including a first spring arrangement 114A extending between the carrier 104 and the first seal segment 110A (see, e.g., FIG. 9).

The exemplary spring extension 142 for the embodiment depicted in FIGS. 8 and 9 includes a first segment 160 and a second segment 162. The first and second segments 160, 162 extend parallel to each other, and further extend along the axial direction A. The exemplary spring extension 142 further includes a third segment 164, also extending parallel to the first segment 160 and second segment 162 along the axial direction A. The spring extension 142 includes a first bend 166 between the first segment 160 and the second segment 162 and a second bend 168 between the second segment 162 and the third segment 164. Such a configuration may provide for the radial extension 150 of the first seal segment 110A in response to a pressure on an outer pressurization surface 140 during operation of the gas turbine engine 10.

Further, for the embodiment shown, the distal end 148 of the spring extension 142 contacts the first seal segment 110A at a location aligned along the axial direction A of the gas turbine engine 10 with an axial halfway point 156 of the seal face 112. Such a configuration may prevent or minimize a twisting of the first seal segment 110A during operation.

Notably, the distal end 148 of the spring extension 142 defines an extended contact line with the first seal segment 110A. The extended contact line extends along the circumferential direction C (see FIG. 9) at least half of a circumferential length of a radially outer surface of the first seal segment 110A. In particular, for the embodiment shown, the extended contact line extends along the circumferential direction C at least 75% of the circumferential length of the radially outer surface of the first seal segment 110A, and more specifically extends the entirety of the circumferential length of the radially outer surface of the first seal segment 110A. Such a configuration may prevent or minimize undesired movement of the first seal segment 110A relative to the rotor 100 during operation.

Figure 10:
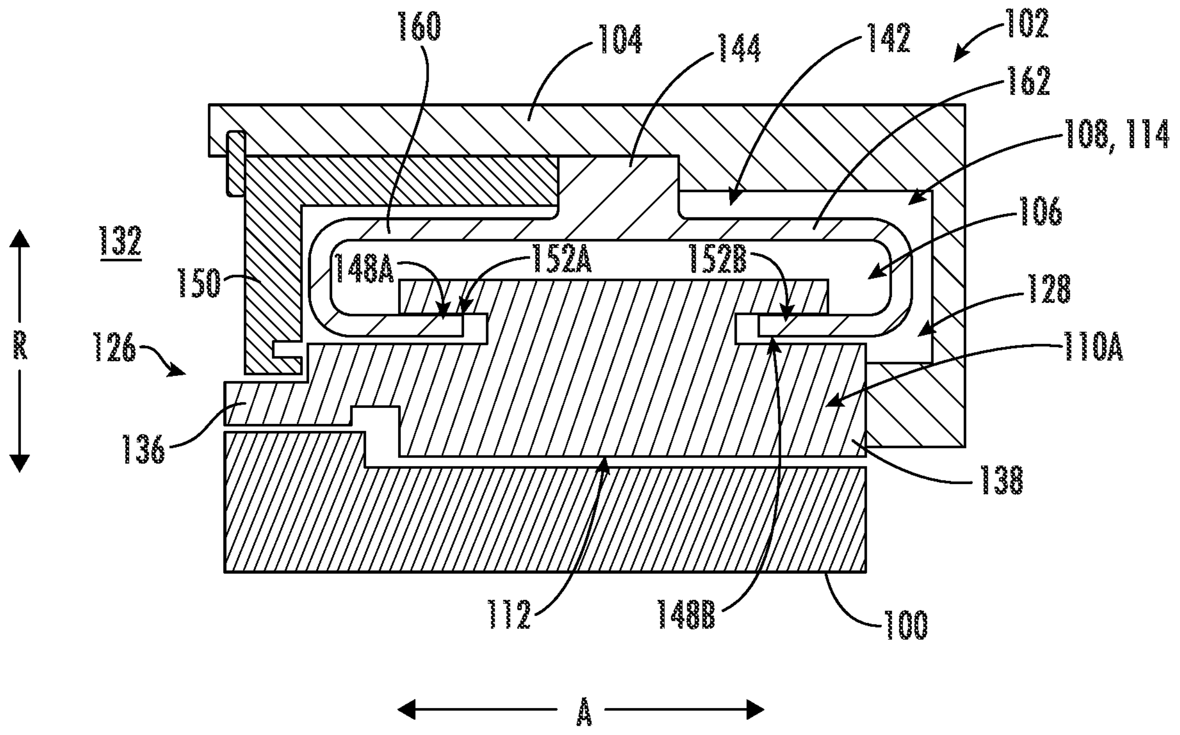
FIG. 10 is a close-up, schematic, cross-sectional view of a rotor, a stator having a carrier, a seal assembly, and a seal support assembly in accordance with still another embodiment of the present disclosure.

Referring now to FIG. 10, an assembly in accordance with yet another exemplary embodiment of the present disclosure is provided. FIG. 10 provides a close-up, schematic, cross-sectional view of a rotor 100, a stator 102 having a carrier 104, a seal assembly 106 having a first seal segment 110A, and a seal support assembly 108 having a spring arrangement 114 in accordance with an exemplary embodiment of the present disclosure. The embodiment of FIG. 10 may be configured in a similar manner as the exemplary embodiment described above with reference to, e.g., FIGS. 8 and 9.

For example, the exemplary spring arrangement 114 of the seal support assembly 108 includes a base 144 and a spring extension 142. The spring extension 142 extends between the base 144 and the first seal segment 110A. The base 144 is coupled to the carrier 104. For the embodiment depicted, the spring extension 142 includes a first segment 160 and a second segment 162. The first segment 160 and the second segment 162 each extend from the base 144 to the first seal segment 110A. Notably, for the embodiment shown, the first segment 160 and the second segment 162 each extend at least partially along the axial direction A of the gas turbine engine 10. That is, the first segment 160 extends forward from the base 144 and the second segment 162 extends aft from the base 144.

More specifically, the first segment 160 of the spring extension 142 contacts the first seal segment 110A proximate a high-pressure side 126 of the seal assembly 106 and the second segment 162 of the spring extension 142 contacts the first seal segment 110A proximate a low-pressure side 128 of the seal assembly 106. More specifically, still, the first seal segment 110A defines a first slot 152A extending along the axial direction A and the circumferential direction C of the gas turbine engine 10 from the high-pressure side 126 of the seal assembly 106. The first seal segment 110A further includes a second slot 152B extending along the axial direction A and the circumferential direction C from the low-pressure side 128 of the seal assembly 106. The first segment 160 includes a first distal end 148A positioned in the first slot 152A and the second segment 162 includes a second distal end 148B positioned in the second slot 152B. Such a configuration may assist with maintaining an orientation of the seal assembly 106 during operation.

Figure 11:
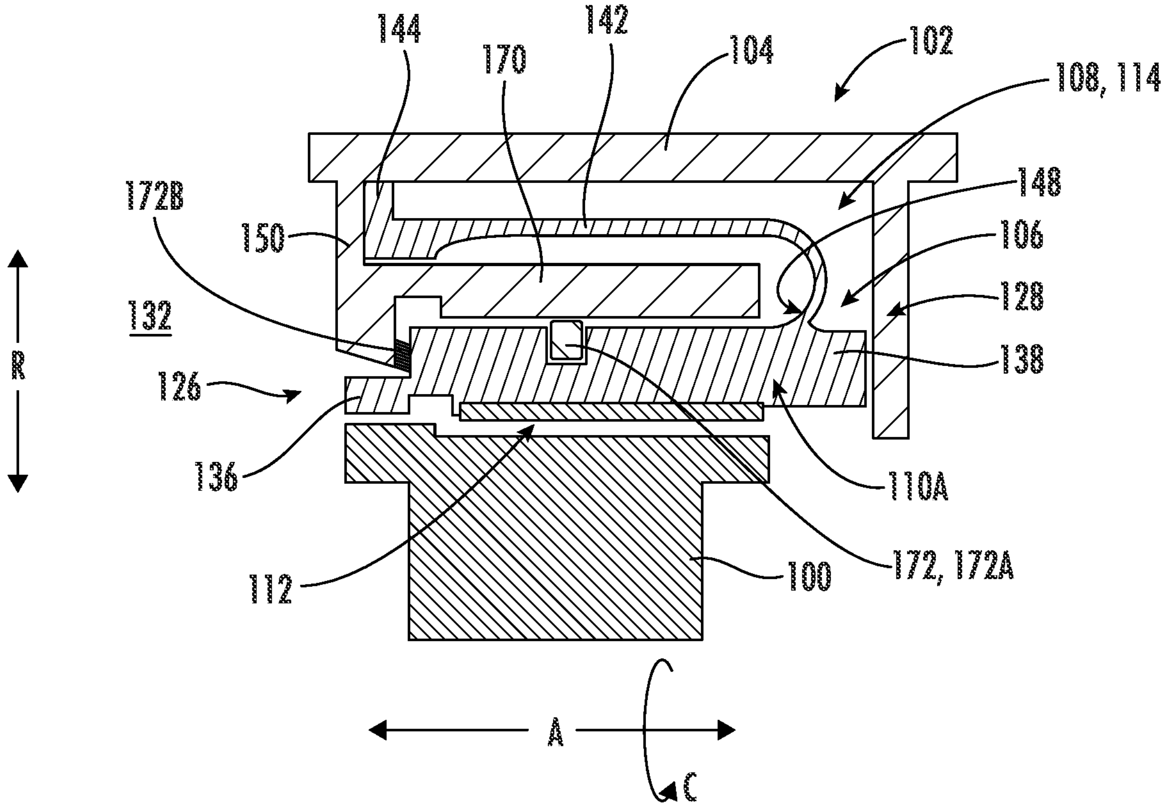
FIG. 11 is a close-up, schematic, cross-sectional view of a rotor, a stator having a carrier, a seal assembly, and a seal support assembly in accordance with yet another embodiment of the present disclosure.

Referring now to FIG. 11, an assembly in accordance with yet another exemplary embodiment of the present disclosure is provided. FIG. 11 provides a close-up, schematic, cross-sectional view of a rotor 100, a stator 102 having a carrier 104, a seal assembly 106 having a first seal segment 110A, and a seal support assembly 108 having a spring arrangement 114 in accordance with another exemplary embodiment of the present disclosure. The embodiment of FIG. 11 may be configured in a similar manner as one or more of the exemplary embodiments described above.

For example, in the embodiment shown, the spring arrangement 114 of the seal support assembly 108 includes a base 144 and a spring extension 142 extending from the base 144 to the first seal segment 110A. The base 144 is coupled to the carrier 104 proximate a high-pressure side 126 of the seal assembly 106. However, for the embodiment shown, the carrier 104 further includes a carrier axial extension 170 position at least partially between the spring extension 142 and the first seal segment 110A.

Additionally, in the embodiment shown the seal assembly 106 includes a circumferential seal 172 positioned between the first seal segment 110A and the carrier axial extension 170 of the carrier 104. In particular, for the embodiment depicted, the circumferential seal 172 is a first circumferential seal 172A and the seal assembly 106 further includes a second circumferential seal 172B. The first circumferential seal 172A is more specifically configured as a piston seal extending along a circumferential direction C positioned between the carrier 104 and each of a plurality of seal segments 110 of the seal assembly 106 (including the first seal segment 110A; see, e.g., FIG. 2). The second circumferential seal 172B is a brush seal positioned between the first seal segment 110A and the carrier 104. The second circumferential seal 172B also extends along the circumferential direction C and more specifically is positioned between a radial extension 150 of the carrier 104 and each of the plurality of seal segments 110 of the seal assembly 106 (including the first seal segment 110A).

It will be appreciated, however, that in other exemplary embodiments, the seal assembly 106 may only include one of the first circumferential seal 172A or the second circumferential seal 172B, and further, that one or both of the first circumferential seal 172A and second circumferential seal 172B may be configured in any other suitable manner.

Inclusion of one or both of the first circumferential seal 172A and the second circumferential seal 172B may minimize a transfer of an airflow from the high-pressure side 126 of the seal assembly 106 (and more specifically from a high-pressure cavity 132) to a low-pressure side 128 of the seal assembly 106.

Figure 12:
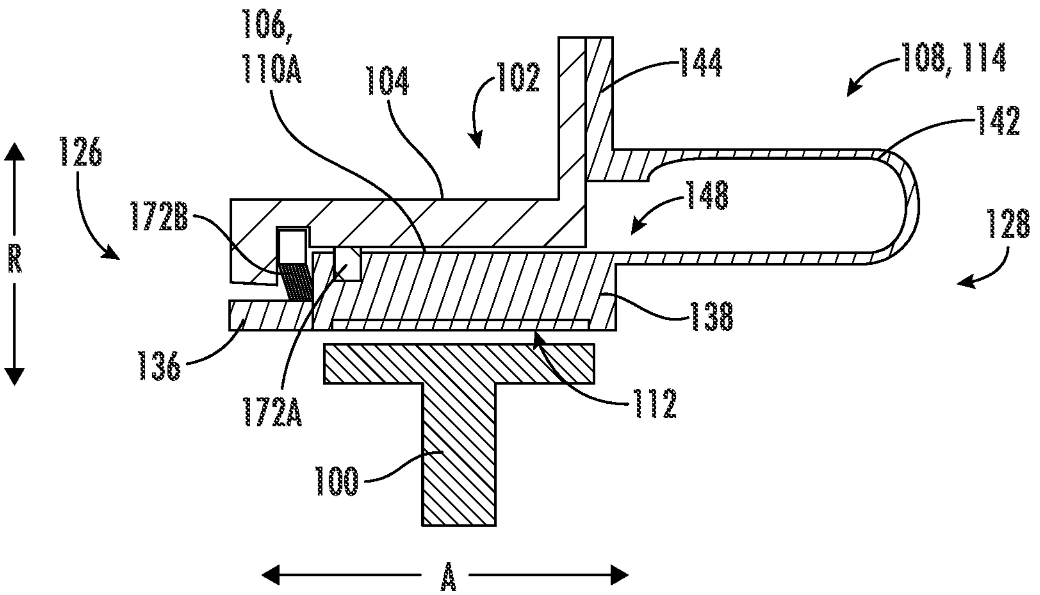
FIG. 12 is a close-up, schematic, cross-sectional view of a rotor, a stator having a carrier, a seal assembly, and a seal support assembly in accordance with still another embodiment of the present disclosure.
Figure 13:
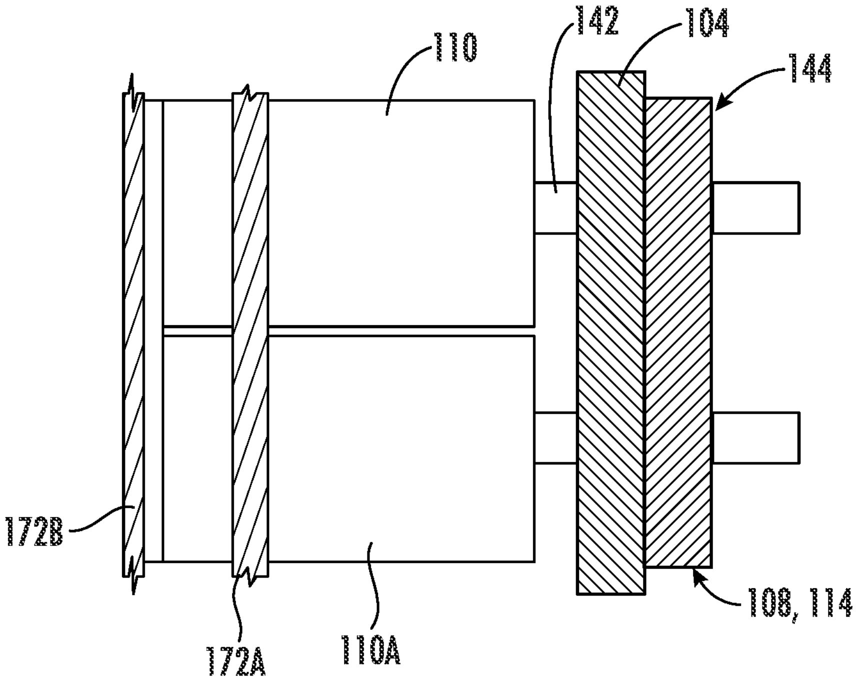
FIG. 13 is a top-looking-down view of the assembly of FIG. 12.
Figure 14A:
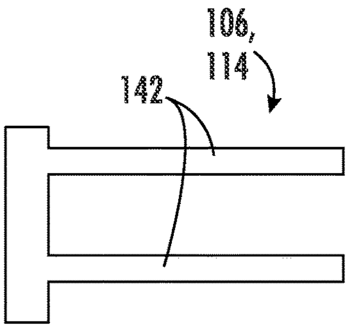
FIGS. 14A through 14H provide various exemplary embodiments of a spring extension in accordance with aspects of the present disclosure.
Figure 14D:
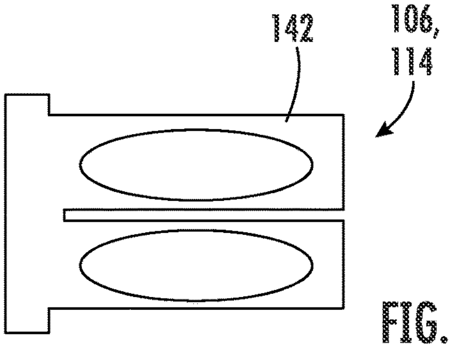
Figure 14B:
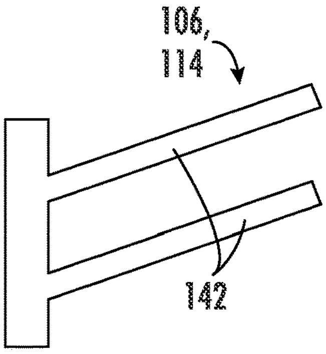
Figure 14E:
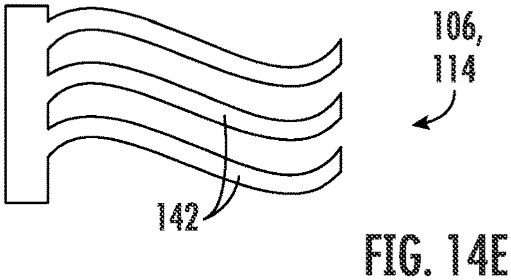
Figure 14C:
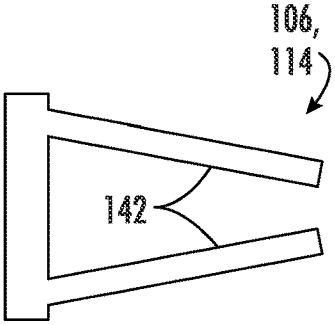
Figure 14F:
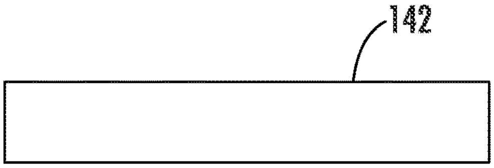
Figure 14G:
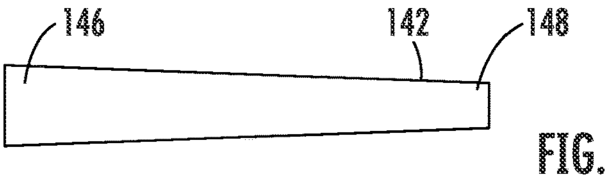
Figure 14H:
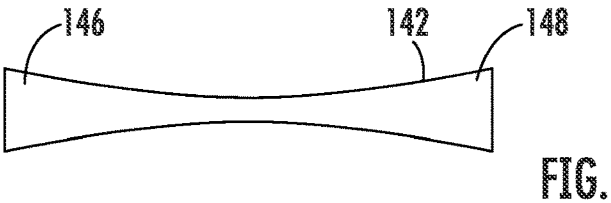

Referring now to FIGS. 12 and 13, an assembly in accordance with yet another exemplary embodiment of the present disclosure is provided. FIG. 12 provides a close-up, schematic, cross-sectional view of a rotor 100, a stator 102 having a carrier 104, a seal assembly 106 having a first seal segment 110A, and a seal support assembly 108 having a spring arrangement 114 in accordance with an exemplary embodiment of the present disclosure. FIG. 13 provides a top-looking-down view of the assembly of FIG. 12.

The exemplary embodiment of FIGS. 12 and 13 may be configured in substantially the same manner as the exemplary embodiment described above with reference to FIG. 11. For example, the exemplary embodiment of FIGS. 12 and 13 includes a first circumferential seal 172A and a second circumferential seal 172B positioned between the carrier 104 and the plurality of seal segments 110 (see, e.g., FIG. 13).

However, for the embodiment shown, a base 144 of the spring arrangement 114 of the seal support assembly 108 is coupled to the carrier 104 proximate a low-pressure side 128 of the seal assembly 106, as opposed to being coupled to the carrier 104 proximate a high-pressure side 126 of the seal assembly 106.

Referring now briefly to FIGS. 14A through 14H, it will be appreciated that a spring extension 142 of a spring arrangement 114 of the present disclosure may have any suitable shape or geometry to provide a desired amount of resistance along a radial direction R for one or more seal segments 110 of a seal assembly 106.

For example, in certain exemplary embodiments, the spring extensions 142 may extend parallel to one another and parallel to an axis of the engine (see, e.g., FIG. 14A); may extend parallel to one another at an angle relative to an axis of the engine (see, e.g., FIG. 14B); may extend in a nonparallel direction to another (see, e.g., FIG. 14C); may include cutouts or other openings (see, e.g., FIG. 14D); may extend in a nonlinear direction relative to an axis of the engine (see, e.g., FIG. 14E); may define a rectangular shape (see, e.g., FIG. 14F); may define a tapered shape between a proximal end 146 and a distal end 148 (see, e.g., FIG. 14G); may define a converging-diverging shape between a proximal end 146 and a distal end 148 (see, e.g., FIG. 14H); or a combination thereof.

Further, it will be appreciated that any one or more features of the seal support assemblies 108 described hereinabove may be combined with any one or more other features of the seal support assemblies 108 described hereinabove.

Figure 15:
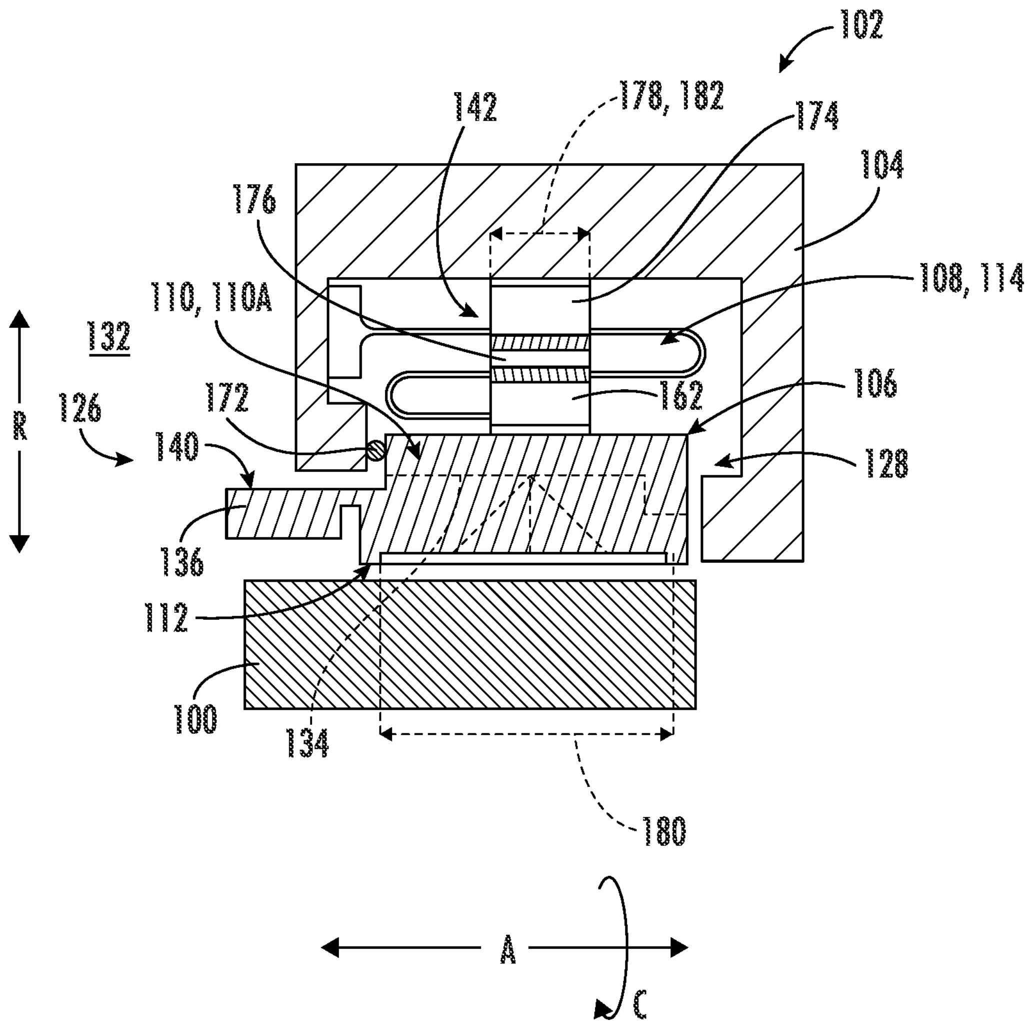
FIG. 15 is a close-up, schematic, cross-sectional view of a rotor, a stator having a carrier, a seal assembly, and a seal support assembly in accordance with another embodiment of the present disclosure.
Figure 16:
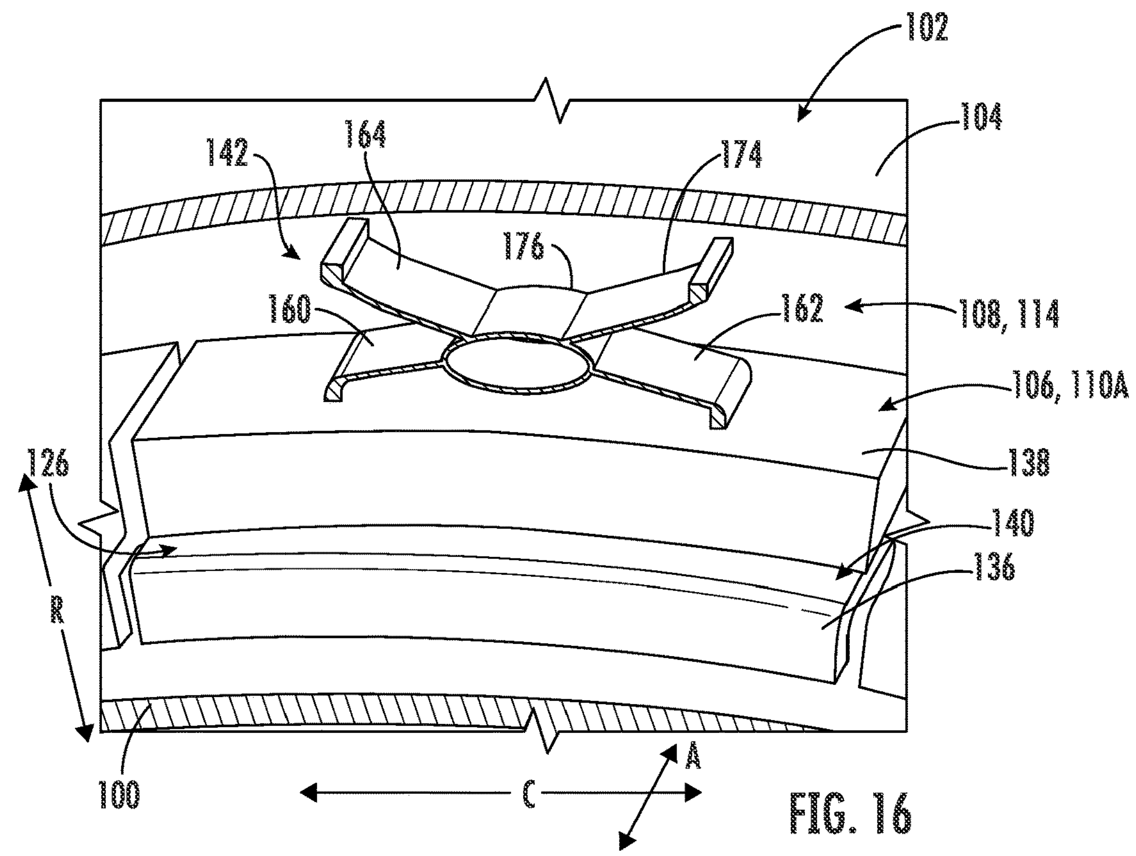
FIG. 16 is a forward-looking-aft, perspective view of the assembly of FIG. 15 with a portion of the carrier cut-away for clarity.

Referring now to FIGS. 15 and 16, an assembly in accordance with another exemplary embodiment of the present disclosure is provided. FIG. 15 provides a schematic, cross-sectional view of a section of a gas turbine engine, and more specifically of a section of a rotor 100, a stator 102 having a carrier 104, a seal assembly 106 positioned between the rotor 100 and the stator 102, and a seal support assembly 108. The view of FIG. 15 is of a reference plane defined by a radial direction R and an axial direction A of the turbine engine. FIG. 16 provides a forward-looking-aft, perspective view of the assembly of FIG. 15 with a portion of the carrier 104 cut-away for clarity. The assembly of FIGS. 15 and 16 may be configured in a similar manner as one or more of the other exemplary assemblies described above.

For example, the seal support assembly 108 includes a spring arrangement 114 having a spring extension 142 extending between the carrier 104 and a first seal segment 110A of the seal assembly 106 to counter a pressure on an outer pressurization surface 140 of a lip 136 of the first seal segment 110A during operation of the turbine engine, while allowing for passive control of a radial clearance gap defined between a seal face 112 and the rotor 100 during operation of the turbine engine. For the embodiment depicted, and as may be most clearly seen in FIG. 16, the spring extension 142 defines at least two points of contacts with the carrier 104, at least two points of contact with the first seal segment 110A, or both.

More specifically, for the embodiment shown the spring extension 142 includes at least two spring segments defining the at least two points of contact with the carrier 104 and further includes at least two spring segments defining the at least two points of contacts with the first seal segment 110A. More specifically, still, in the embodiment shown, the spring extension 142 includes a first segment 160 and a second segment 162 separately extending to the first seal segment 110A and defining in part a first point of contact with the first seal segment 110A and a second point of contact with the first seal segment 110A. Further, the spring extension 142 includes a third segment 164 and a fourth segment 174 separately extending to the carrier 104 and defining in part a third point of contact with the carrier 104 and a fourth point of contact with the carrier 104.

In the embodiment shown, the spring extension 142 further includes a central segment 176, with the first segment 160, the second segment 162, the third segment 164, and the fourth segment 174 each extending from the central segment 176. The central segment 176 is a closed shape (e.g., circular, square, ovular, rectangular, polygonal, etc.) in a cross-sectional direction (e.g., in a plane defined by a circumferential direction C and the radial direction R for the embodiment shown; see FIG. 16), and more specifically is an ovular shape for the embodiment depicted.

Notably, one or more of the segments 160, 162, 164, 174 of the spring extension 142 defines a length along the axial direction A at a respective point of contact with the first seal segment 110A or the carrier 104 which may assist in reducing a twisting of the first seal segment 110A during operation of the gas turbine engine, e.g., in response to receiving an increasing pressure on the outer pressurization surface 140 of the lip 136 of the first seal segment 110A. More specifically, referring particularly to FIG. 15, the first segment 160 and the second segment 162 each define an axial length 178 along the axial direction A between 5% and 100% of an axial length 180 of a seal face 112 of the first seal segment 110A at the first point of contact and at the second point of contact respectively. Similarly, the third segment 164 and the fourth segment 174 each define an axial length 182 along the axial direction A between 5% and 100% of the axial length 180 of the seal face 112 of the first seal segment 110A at the third point of contact and at the fourth point of contact respectively.

Figure 17:
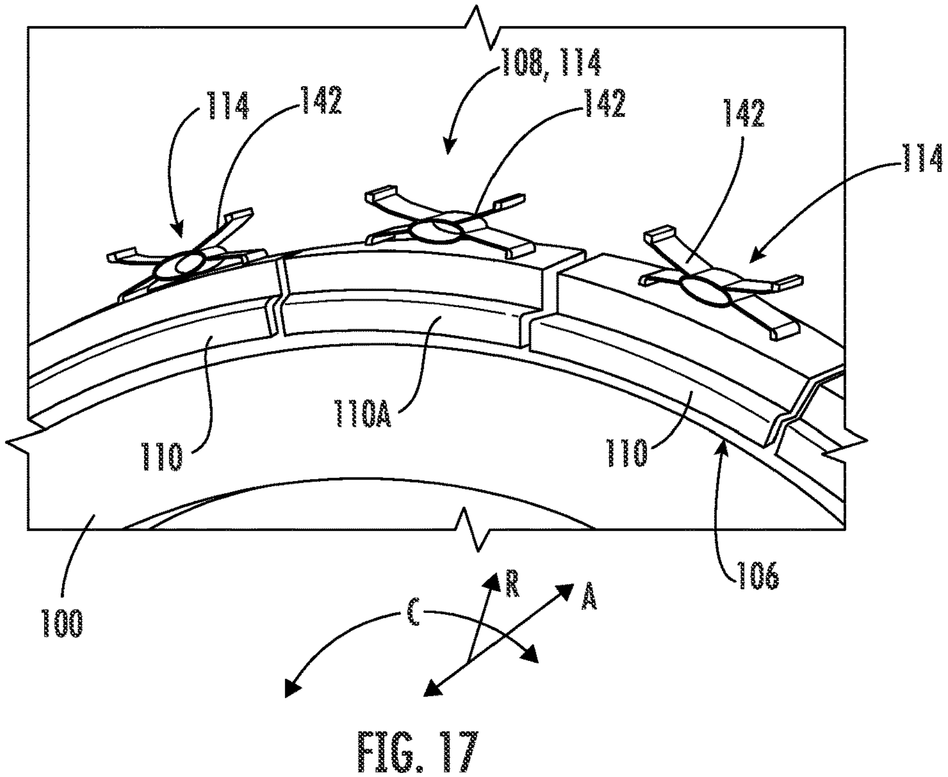
FIG. 17 is a perspective view of the assembly of FIGS. 15 and 16 with the carrier removed for clarity.

Referring briefly to FIG. 17, a perspective view of the assembly of FIGS. 15 and 16 is provided with the carrier 104 removed for clarity. As will be appreciated, the seal assembly 106 includes a plurality of seal segments 110 and the seal support assembly 108 includes a plurality of spring arrangements 114, with each spring arrangement 114 including a spring extension 142 extending between the respective seal segment 110 and the carrier 104. In such a manner, each of the plurality of seal segments 110 may be movable relative to one another and independently movable relative to the carrier 104 (not depicted in FIG. 17; see, e.g., FIG. 16). The spring extensions 142 of each of the plurality of spring arrangements 114 may be configured in a similar manner as described above with reference to FIGS. 15 and 16.

Figure 18:
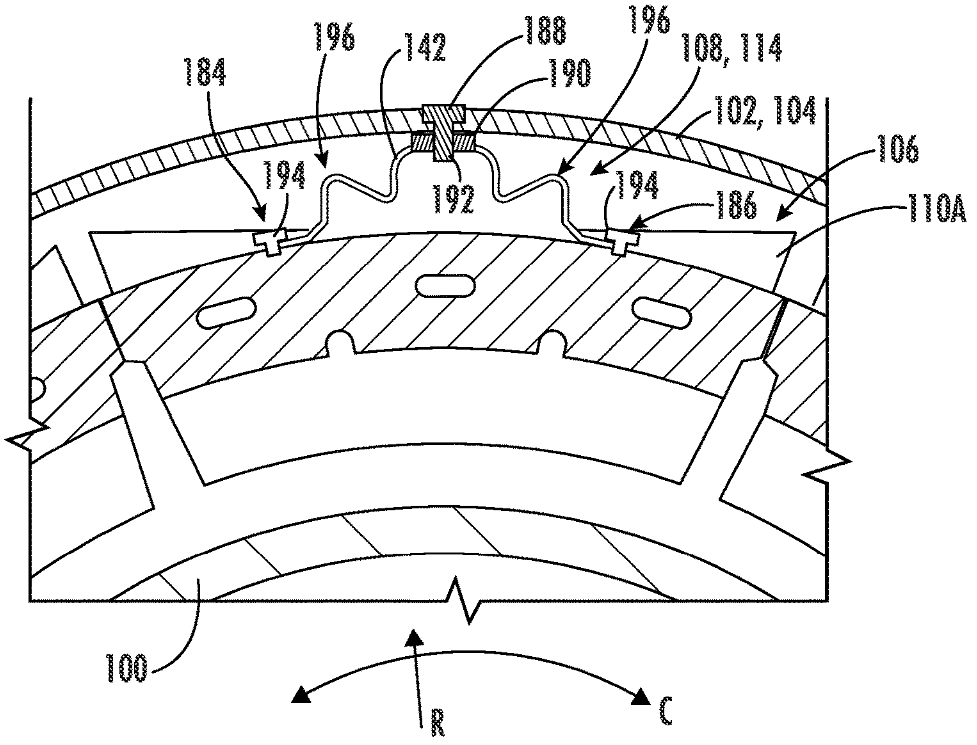
FIG. 18 is a close-up, schematic, cross-sectional view of a rotor, a stator having a carrier, a seal assembly, and a seal support assembly in accordance with another embodiment of the present disclosure.
Figure 19:
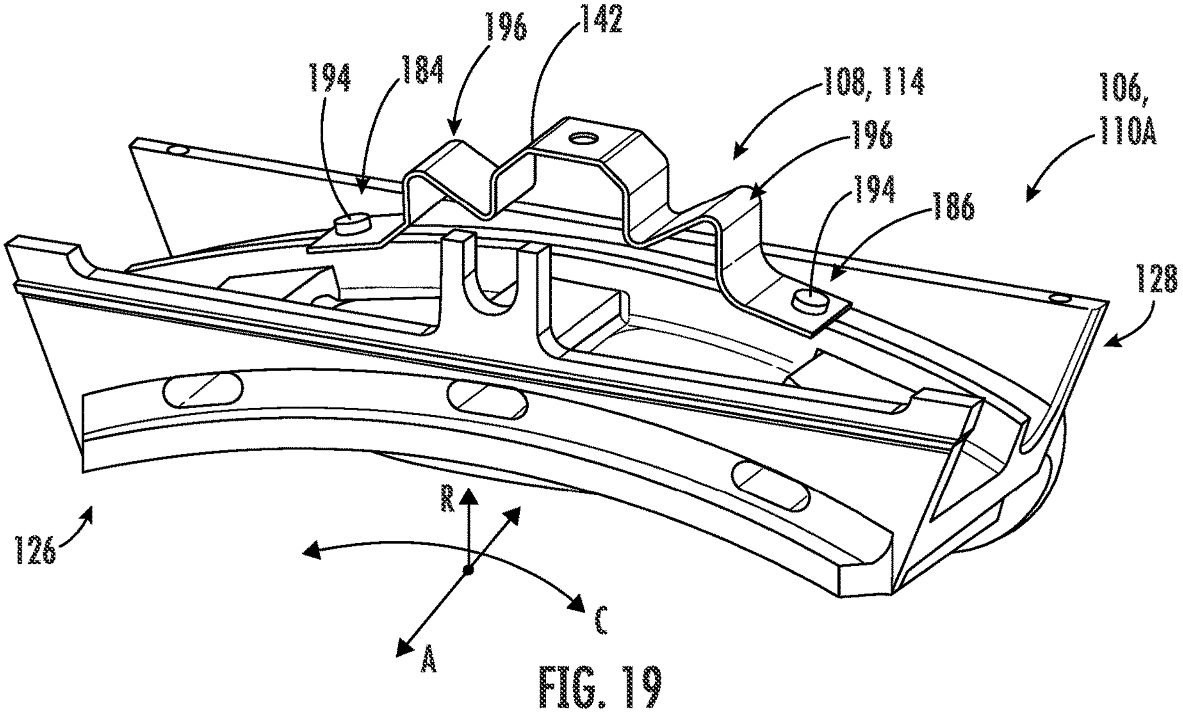
FIG. 19 is a forward-looking-aft, perspective view of the assembly of FIG. 18 without the rotor or stator for clarity.

Referring now to FIGS. 18 and 19 an assembly in accordance with another exemplary embodiment of the present disclosure is provided. FIG. 18 provides a schematic, cross-sectional view of a section of a gas turbine engine, and more specifically of a section of a rotor 100, a stator 102 having a carrier 104, a seal assembly 106 positioned between the rotor 100 and the stator 102, and a seal support assembly 108. The view of FIG. 18 is of a reference plane defined by a radial direction R and a circumferential direction C of the turbine engine. FIG. 19 provides a forward-looking-aft perspective view of the assembly of FIG. 18 without the rotor 100 or stator 102, for clarity. The assembly of FIGS. 18 and 19 may be configured in a similar manner as one or more of the exemplary assemblies described above.

For example, the exemplary seal support assembly 108 depicted includes a spring arrangement 114 extending between the carrier 104 (FIG. 18) and a first seal segment 110A of the seal assembly 106 to counter a pressure on an outer pressurization surface 140 of a lip 136 of the first seal segment 110A during operation of the turbine engine, while allowing for passive control of a radial clearance gap defined between the seal face 112 and the rotor 100 during operation of the turbine engine. The spring arrangement 114 includes a spring extension 142 extending between the carrier 104 and the first seal segment 110A of the seal assembly 106. The spring extension 142 defines at least two points of contact with the carrier 104, at least two points of contact with the first seal segment 110A, or both.

In particular, for the embodiment shown, the spring extension 142 extends between a first end 184 and a second end 186. The first end 184 and second end 186 together define the at least two points of contact with the first seal segment 110A. In the embodiment shown, the spring extension 142 is coupled to the first seal segment 110A using one or more mechanical fasteners 194 at the first end 184 and at the second end 186.

Alternatively, however, the spring extension 142 may be coupled to the first seal segment 110A in any other suitable manner (e.g., brazing).

Further, for the embodiment shown, the spring extension 142 additionally defines a point of contact with the carrier 104 at a location between the first end 184 and the second end 186. The point of contact with the carrier 104 is, for the embodiment depicted, halfway between the first end 184 and the second end 186. In the embodiment shown, the spring arrangement 114 further includes a bolt assembly having a bolt 188, a washer 190, and a nut 192. The bolt assembly may attach the spring extension 142 to the carrier 104, forming at least in part the point of contact with the carrier 104.

As will be appreciated from the view of FIG. 19, the spring extension 142 defines an axial length at the first end 184 and at the second end 186, and more specifically, at the points of contact with the first seal segment 110A. The axial length may be between about 5% and 100% of an axial length of a spring face of the first seal segment 110A at the respective points of contact (see, e.g., axial length 180 depicted in FIG. 15, described above).

The spring extension 142 depicted in FIGS. 18 and 19 includes a plurality of bends 196 between the first end 184 and the point of contact with the carrier 104 and between the second end 186 and the point of contact with the carrier 104. It will further be appreciated that the spring extension 142 is configured as a spring plate having a generally rectangular shape (e.g., a rectangular plate bent to form the shape depicted).

In other embodiments, the spring extension 142 may have any other suitable shape or configuration, such as one or the exemplary configurations depicted in FIGS. 14A through 14H.

Figure 20:
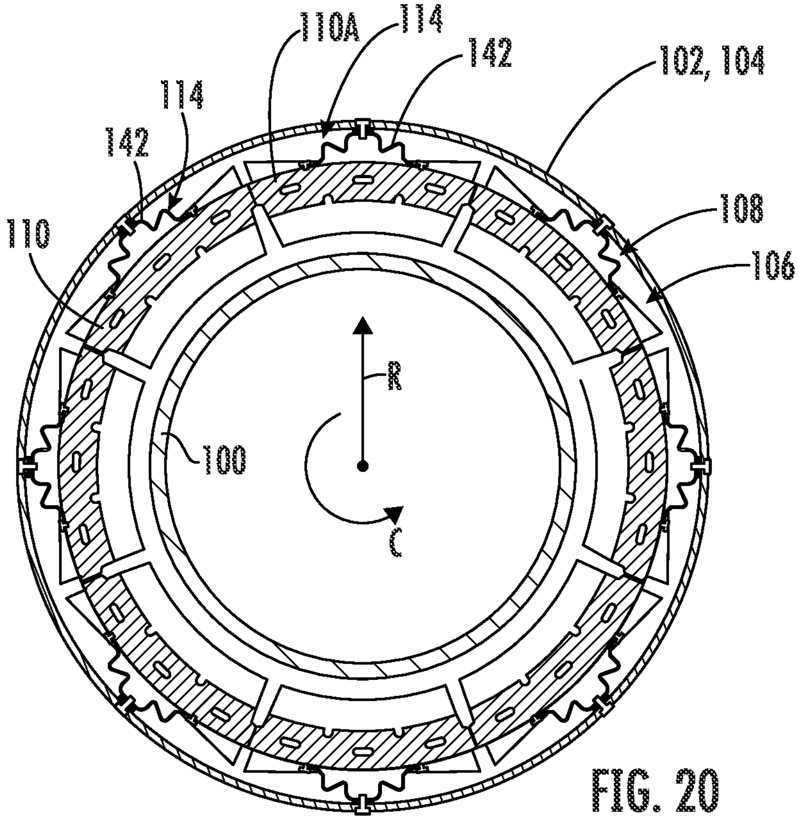
FIG. 20 is cross-sectional view of the assembly of FIGS. 18 and 19.

Referring briefly to FIG. 20, a zoomed out, cross-sectional view is depicted of the seal assembly 106 and seal support assembly 108 of FIGS. 18 and 19. As will be appreciated, the seal assembly 106 includes a plurality of seal segments 110 and the seal support assembly 108 includes a plurality of spring arrangements 114, with each spring arrangement 114 including a spring extension 142 extending between the respective seal segment 110 and the carrier 104. In such a manner, each of the plurality of seal segments 110 may be movable relative to one another and independently movable relative to the carrier 104. The spring extensions 142 of each of the plurality of spring arrangements 114 may be configured in a similar manner as described above with reference to FIGS. 18 and 19.

Figure 21:
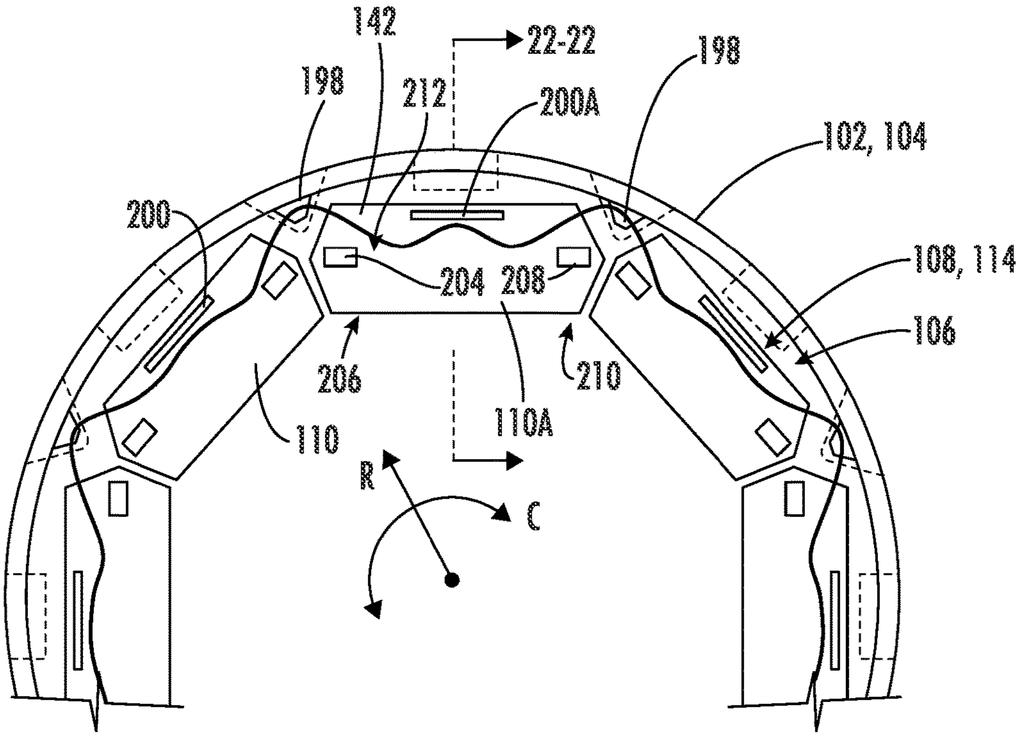
FIG. 21 is a close-up, schematic, cross-sectional view of a rotor, a stator having a carrier, a seal assembly, and a seal support assembly in accordance with another embodiment of the present disclosure.
Figure 22:
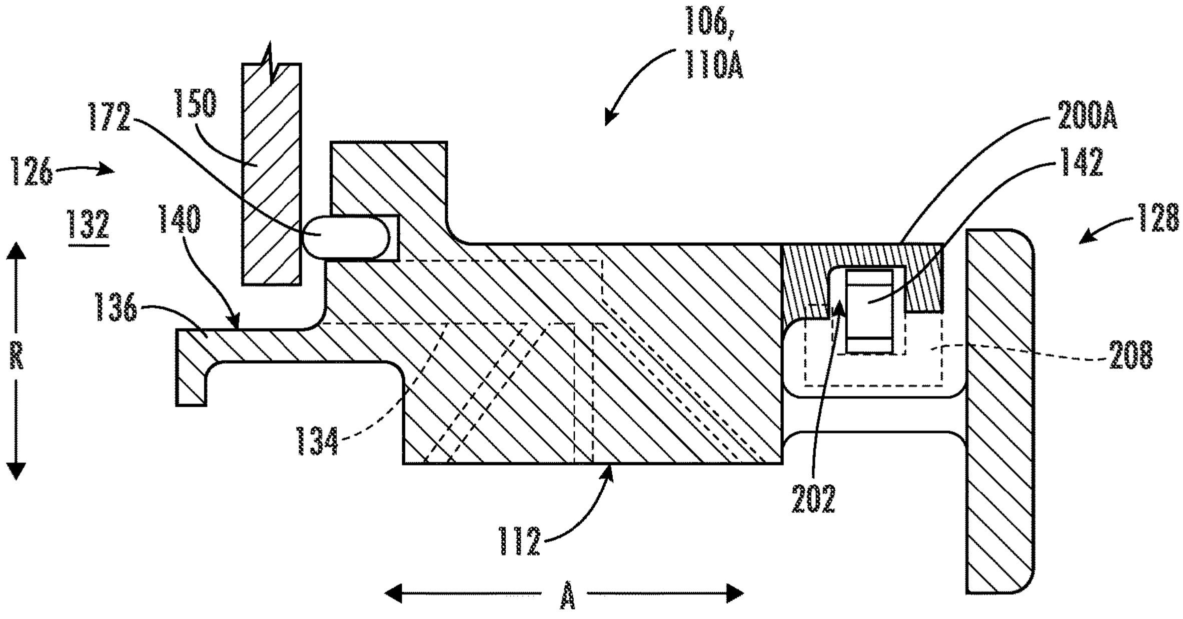
FIG. 22 provides a cross-sectional view of a first seal segment of the seal assembly of the assembly of FIG. 21 along Line 22-22 in FIG. 21.

Referring now to FIGS. 21 and 22, an assembly in accordance with another exemplary embodiment of the present disclosure is provided. FIG. 21 provides an aft-looking-forward view of a stator 102 having a carrier 104, a seal assembly 106, and a seal support assembly 108 in accordance with another exemplary embodiment of the present disclosure, and FIG. 22 provides a cross-sectional view of a first seal segment 110A of the seal assembly 106 along Line 22-22 in FIG. 21. The assembly of FIGS. 21 and 22 may be configured in a similar manner as one or the exemplary assemblies described hereinabove.

For example, in the embodiment depicted, the seal assembly 106 includes a plurality of seal segments 110 (including the first seal segment 110A) arranged along a circumferential direction C of a gas turbine engine for supporting rotation of a rotor 100 (not shown; see above embodiments). In addition, the seal support assembly 108 includes a spring arrangement 114 having a spring extension 142 extending between the carrier 104 and the plurality of seal segments 110 to counter a pressure on an outer pressurization surface 140 of a lip 136 of the first seal segment 110A during operation of the turbine engine, while allowing for passive control of a radial clearance gap defined between the seal face 112 and the rotor 100 during operation of the turbine engine.

However, for the embodiment of FIGS. 21 and 22, the spring extension 142 extends continuously across the plurality of seal segments 110 in the circumferential direction C. For example, the spring extension 142 may extend continually across at least two seal segments 110, and up to all of the plurality of seal segments 110 (e.g., 360 degrees).

As will be appreciated from the embodiment of FIG. 21, the spring extension 142 may be, e.g., a plate spring extension bent to form the shape depicted (e.g., similar to the configurations discussed above with reference to, for example, FIGS. 18 through 20).

Additionally or alternatively, the spring extension 142 may have any suitable shape or configuration, such as one or the exemplary configurations depicted in FIGS. 14A through 14H.

As noted, the spring extension 142 extends between the carrier 104 and the seal segments 110. Referring particularly to FIG. 21, the carrier 104 includes a plurality of carrier tabs 198 spaced along the circumferential direction C, and the spring extension 142 is coupled to the carrier 104 through the plurality of carrier tabs 198. In the embodiment shown, each one of the carrier tabs 198 is generally positioned at a circumferential location between two adjacent seal segments 110. The spring extension 142 may be coupled to the plurality of carrier tabs 198 through one or more mechanical fasteners.

Additionally, or alternatively, the carrier tabs 198 may define a geometry configured to constrain the spring extension 142 along a radial direction R during operation (similar to the seal segment tabs 200 described below).

Further, each of the plurality of seal segments 110, for the embodiment shown, includes one or more seal segment tabs 200 to couple the spring extension 142 to the respective seal segment 110. In particular, referring particularly to the first seal segment 110A, the first seal segment 110A includes a first seal segment tab 200A with the spring extension 142 coupled to the first seal segment 110A at least in part using the first seal segment tab 200A.

More particularly, the first seal segment tab 200A includes an inner side 202 along the radial direction R and the spring extension 142 is positioned adjacent to the inner side 202 of the first seal segment tab 200A. In such a manner, the spring extension 142 may bias the first spring extension 142 against movement inwardly along the radial direction R. The inner side 202, for the embodiment depicted, defines a geometry to constrain the spring extension 142 along the radial direction R, and further along an axial direction A. In particular, the inner side 202 defines a concave shape (e.g., a hook or U-shape geometry) when viewed in the reference plane of FIG. 22 defines by the axial and radial directions A. R.

Further, for the embodiment depicted, the first seal segment 110A includes a second seal segment tab 204 positioned proximate a first circumferential end 206 of the first seal segment 110A and a third seal segment tab 208 positioned proximate a second circumferential end 210 of the first seal segment 110A. The second seal segment tab 204 and third seal segment tab 208 each includes an outer surface 212 along the radial direction R with the spring extension 142 configured to contact the outer surfaces 212 during at least certain operations. In such a manner, the spring extension 142 may bias the first spring extension 142 against movement outwardly along the radial direction R more than a predetermined amount during the at least certain operations.

In such a manner, the spring extension 142 may bias the plurality of seal segments 110 outwardly along the radial direction R when a relatively low-pressure is exerted on an outer pressurization surface 140 of a lip 136 of the respective seal segment 110 (see FIG. 22), and may allow for the plurality of seal segments 110 to move inwardly along the radial direction R when a relatively high-pressure is exerted on the outer pressurization surface 140 of the lip 136 of the respective seal segment 110. Such configuration may allow for the seal assembly 106 (and more particularly a seal face 112 of each of the plurality of seal segments 110) to define desired clearances with the rotor 100 throughout a variety of operating conditions of the gas turbine engine.

Figure 23:
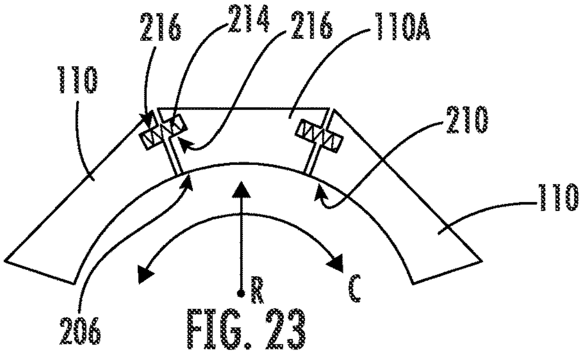
FIG. 23 is a close-up, schematic view of a plurality of seal segments in accordance with an aspect of the present disclosure.

Briefly, referring to FIG. 23, a close-up, schematic view is provided of a plurality of seal segments 110 in accordance with an aspect of the present disclosure. In the embodiment shown, a seal support assembly 108 may include a plurality of tangential spring extensions 214 extending between a channel 216 of one seal segment 110 and a channel 216 of an adjacent seal segment 110 to bias the seal segments 110 away from one another in the circumferential direction C. Such a configuration, when used in conjunction with, e.g., the embodiment of FIGS. 21 and 22, may assist with maintaining alignment of the plurality of seal segments 110.

Figure 24:
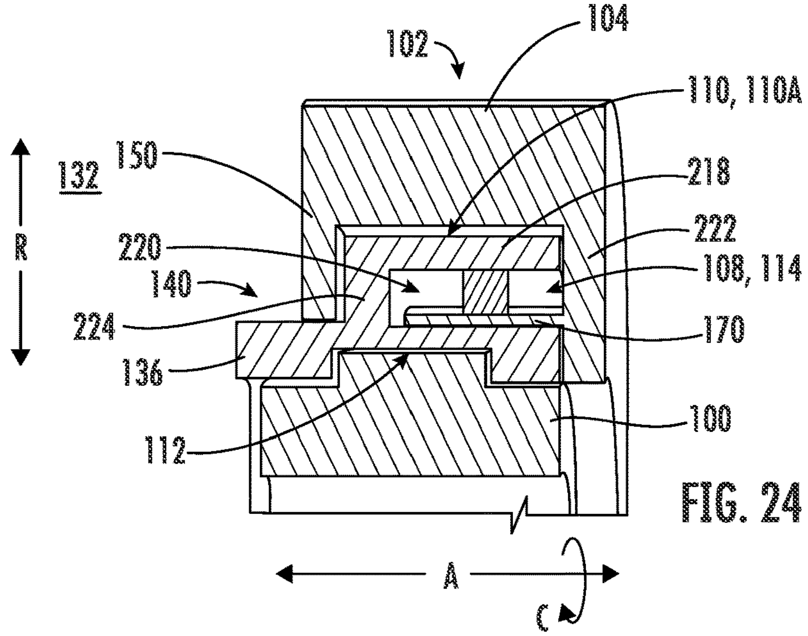
FIG. 24 is a close-up, schematic, cross-sectional view of a rotor, a stator having a carrier, a seal assembly, and a seal support assembly in accordance with another embodiment of the present disclosure.
Figure 25:
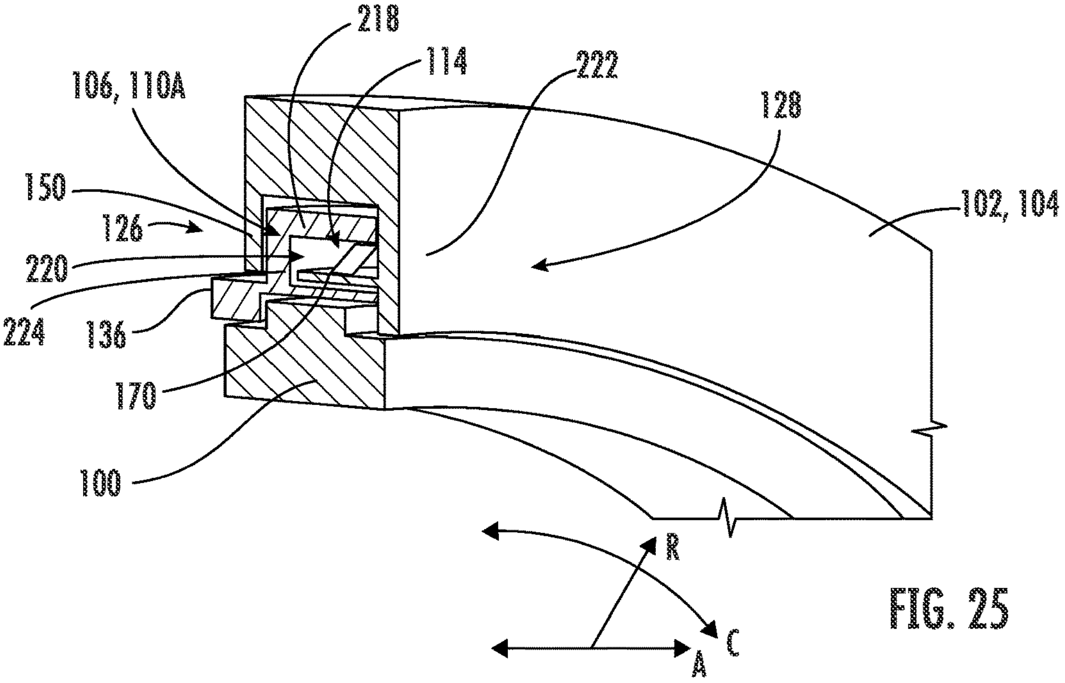
FIG. 25 is an aft-looking-forward, perspective view of the assembly in FIG. 24.

Referring now to FIGS. 24 and 25, an assembly in accordance with another exemplary embodiment of the present disclosure is provided. FIG. 24 provides a cross-sectional view of a stator 102 having a carrier 104, a seal assembly 106, and a seal support assembly 108 in accordance with another exemplary embodiment of the present disclosure. The view of FIG. 24 is in a cross-sectional plane defined by an axial direction A of the turbine engine and a radial direction R of the turbine engine. FIG. 25 is an aft-looking-forward, perspective view of the assembly in FIG. 24. The assembly of FIGS. 24 and 25 may be configured in a similar manner as one or more of the exemplary embodiments described hereinabove.

For example, the seal assembly 106 includes a plurality of seal segments 110 including a first seal segment 110A, and the seal support assembly 108 includes a spring arrangement 114 extending between the carrier 104 and the first seal segment 110A to counter a pressure on an outer pressurization surface 140 of a lip 136 of the first seal segment 110A during operation of the turbine engine, while allowing for passive control of a radial clearance gap defined between the seal face 112 and the rotor 100 during operation of the turbine engine.

For the embodiment shown, the carrier 104 further includes an axial extension, or rather a carrier axial extension 170 extending generally along the axial direction A. Similarly, the first seal segment 110A includes a segment axial extension 218, located outward of the carrier axial extension 170 along the radial direction R of the turbine engine. The spring arrangement 114 is positioned within a gap 220 defined between the carrier axial extension 170 and the segment axial extension 218 along the radial direction R. In such a manner, it will be appreciated that the spring arrangement 114 is compressed with an inward movement of the first seal segment 110A along the radial direction R relative to the carrier 104.

In the embodiment depicted, the carrier axial extension 170 is coupled to, and extends from a radial wall 222 of the carrier 104 positioned proximate a low-pressure side 128 of the seal assembly 106, and the segment axial extension 218 is coupled to, and extends from, a radial wall 224 of the first seal segment 110A positioned proximate a high-pressure side 126 of the seal assembly 106. Notably, the carrier 104 further includes a radial wall, also referred to herein as a radial extension 150, proximate the high-pressure side 126 of the seal assembly 106. Although not depicted, the seal assembly 106 may include a seal between the radial wall of the carrier 104 proximate the high-pressure side 126 and the first seal segment 110A.

Figure 26:
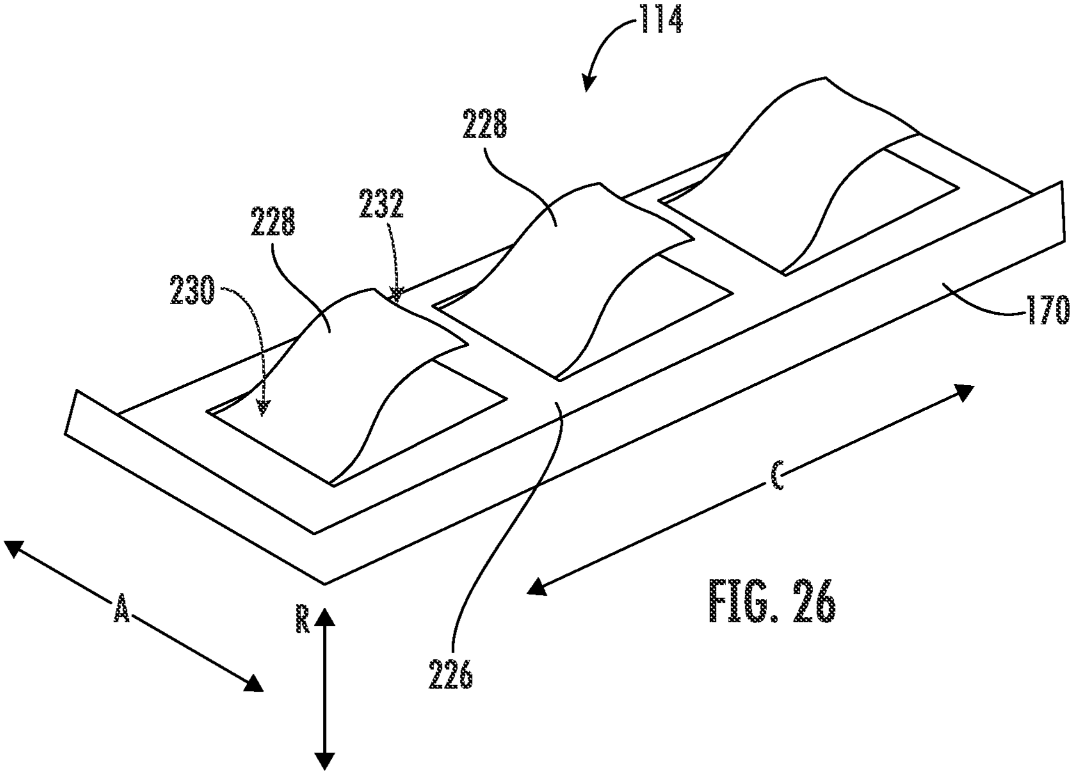
FIG. 26 is a perspective view of a spring arrangement of the seal support assembly depicted in FIGS. 24 and 25.

Referring now briefly to FIG. 26, a perspective view of the spring arrangement 114 depicted in FIGS. 24 and 25 is provided. In the embodiment shown, the spring arrangement 114 is configured as a plate having a support 226 and a plurality of spring segments 228 extending from the support 226. The plurality of spring segments 228 are cantilevered from the support 226 in the embodiment shown. In particular, the plurality of spring segments 228 may be punched, cut, or otherwise extruded from the support 226 and bent to form the plurality of spring segments 228. Each of the plurality of spring segments 228 therefore extends between a proximal end 230 coupled to or formed integrally with the support and a distal end 232. The support 226 may be coupled to the segment axial extension 218 and the distal end 232 may be configured to contact the segment axial extension 218 (see FIGS. 24 and 25) of the first seal segment 110A.

The spring arrangement 114 may be configured to extend between a plurality of seal segments 110 of the seal assembly 106.

Alternatively, the spring arrangement 114 may be a first spring arrangement 114A of a plurality of spring arrangements 114 dedicated to an individual seal segment 110 of the plurality of seal segments 110.

Figure 27:
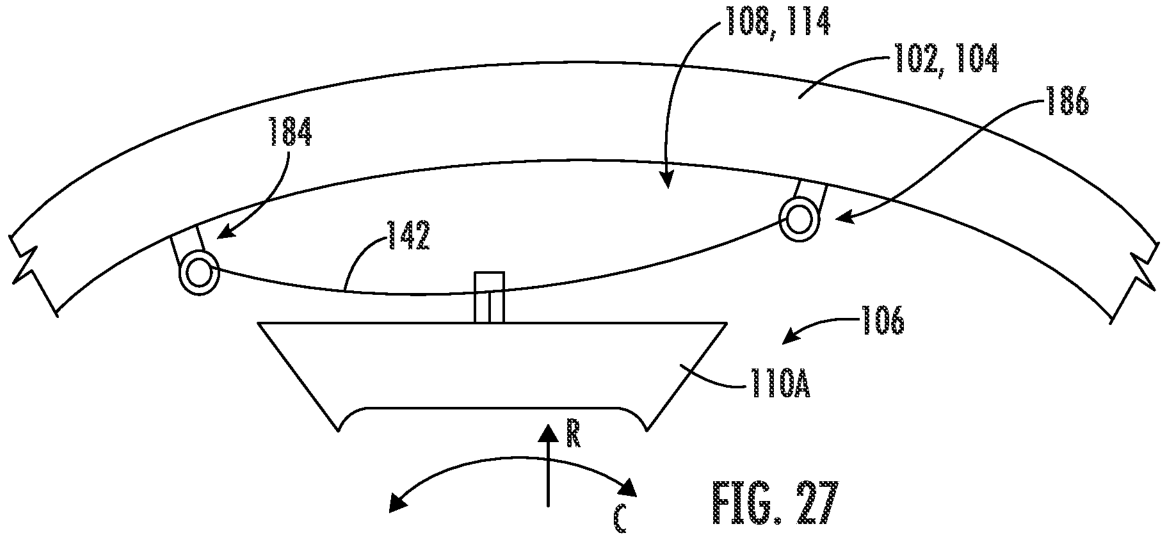
FIG. 27 is a close-up, schematic, cross-sectional view of a rotor, a stator having a carrier, a seal assembly, and a seal support assembly in accordance with another embodiment of the present disclosure.
Figure 28:
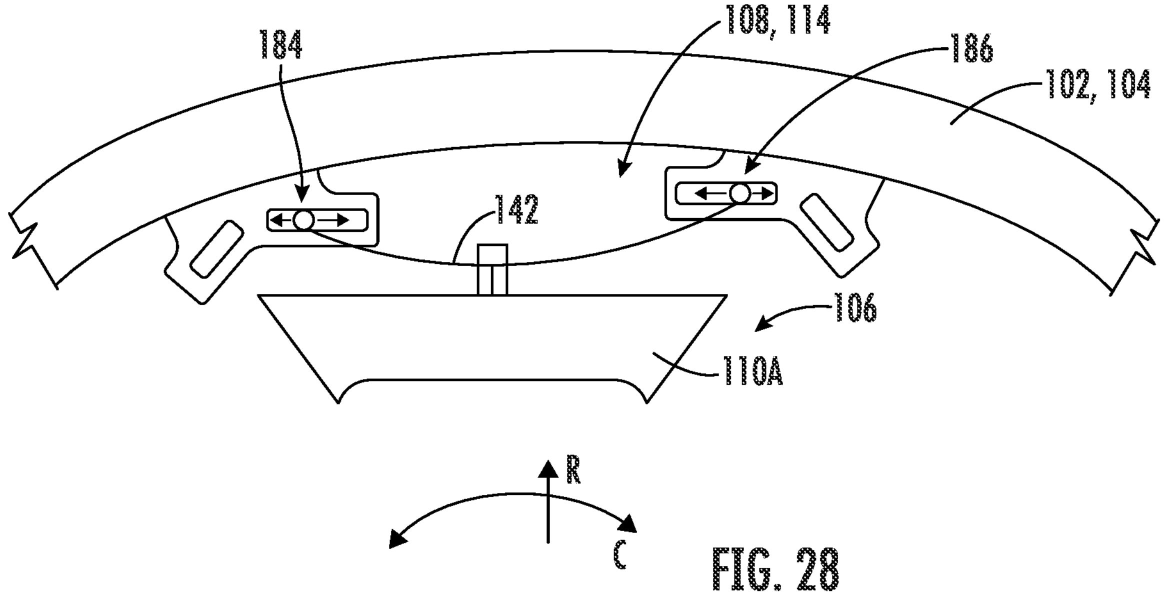
FIG. 28 is a close-up, schematic, cross-sectional view of a rotor, a stator having a carrier, a seal assembly, and a seal support assembly in accordance with another embodiment of the present disclosure.

Referring now to FIGS. 27 and 28, two additional embodiments of an assembly in accordance with exemplary embodiments of the present disclosure are provided. FIGS. 27 and 28 each provide schematic views of the assembly in a reference plane defined by a radial direction R and a circumferential direction C of the gas turbine engine 10.

Referring particularly FIG. 27, the assembly includes a stator 102 having a carrier 104, a seal assembly 106 having a first seal segment 110A, and a seal support assembly 108. The seal support assembly 108 includes a spring arrangement 114 having a spring extension 142 extending between the carrier 104 and the first seal segment 110A. The spring extension 142 defines at least two points of contact with the carrier 104, at least two points of contact with the first seal segment 110A, or both.

More specifically, for the embodiment shown, the spring extension 142 extends between a first end 184 and a second end 186, and the first end 184 and the second end 186 defining the at least two points of contact with the carrier 104. In the embodiment shown the first end 184 and the second end 186 are connected to the carrier 104 through a hinged pin connection (e.g., a connection allowing rotation about an axis), and the spring extension 142 is configured as a leaf spring.

Referring now particular to FIG. 28, the assembly is configured in substantially the same manner as the embodiment of FIG. 27, however for the embodiment of FIG. 28, a first end 184 and a second end 186 of a spring extension 142 are connected to a carrier 104 through a sliding pin connection (e.g., a connection allowing rotation about an axis and movement linearly in a direction perpendicular to the axis).

It will be appreciated that in other example embodiments, the first end 184, the second end 186, or both may be coupled through any other suitable connection, such as a combination of a hinged pin connection and a sliding pin connection.

Figure 29:
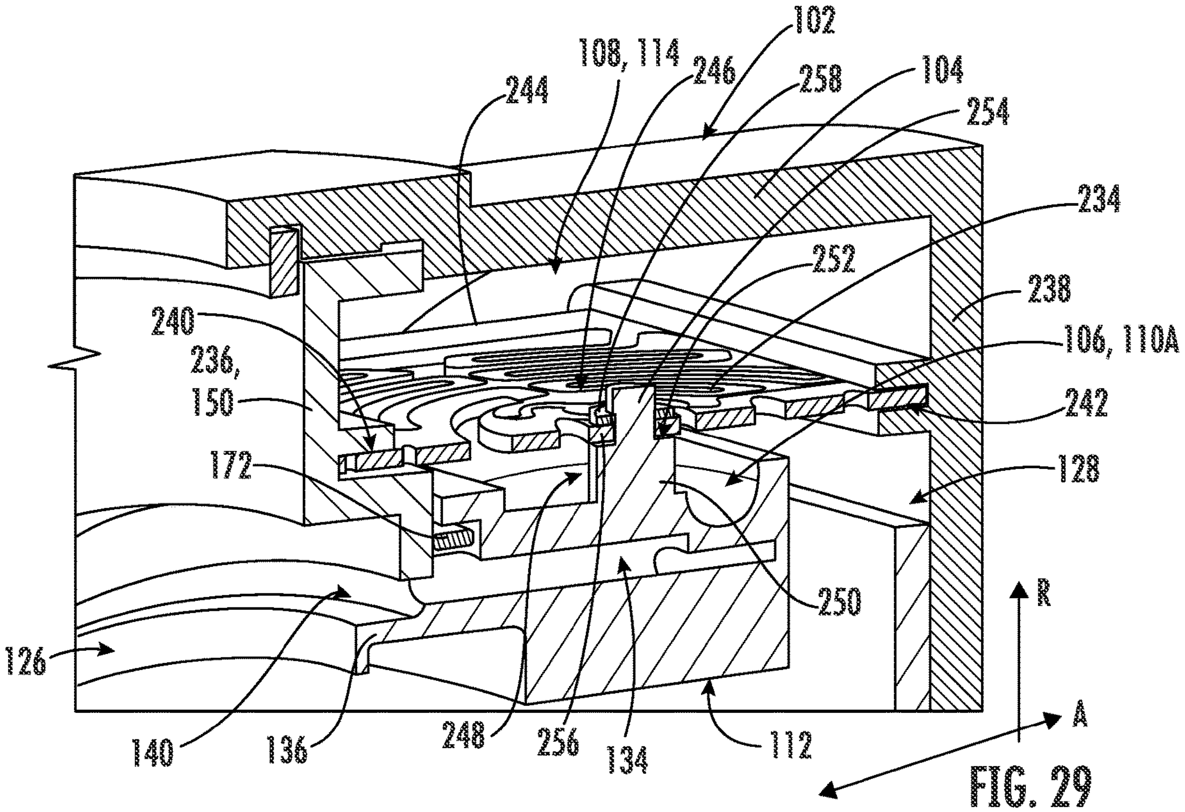
FIG. 29 is a perspective, cross-sectional view of a rotor, a stator having a carrier, a seal assembly, and a seal support assembly in accordance with another embodiment of the present disclosure.
Figure 30:
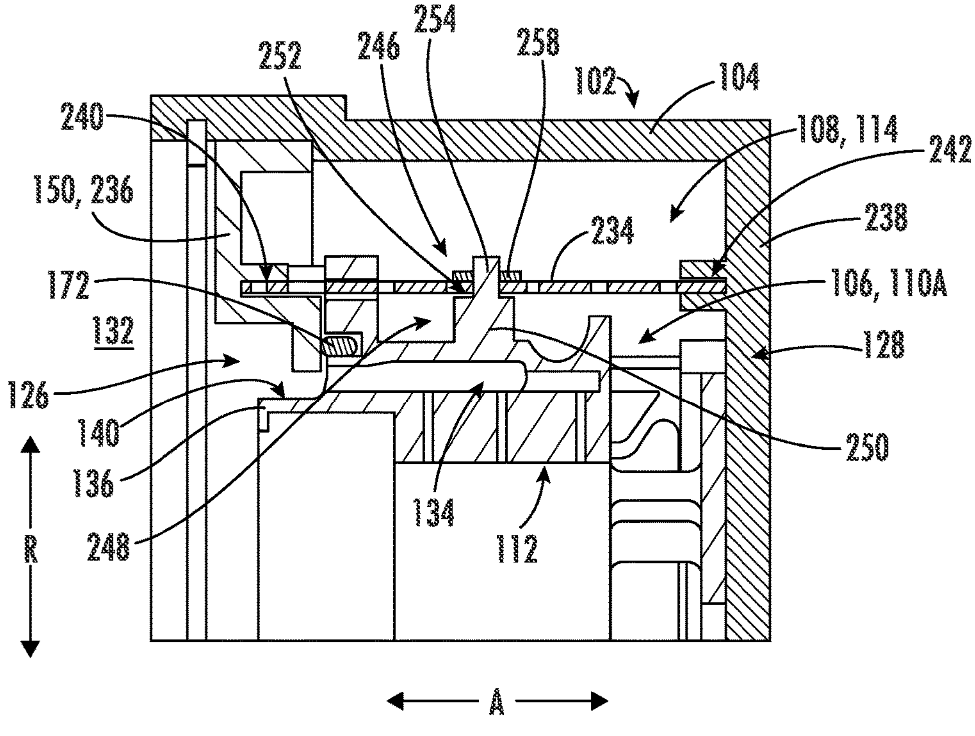
FIG. 30 is a cross-sectional view of the assembly of FIG. 29 in a reference plane defined by a radial direction and an axial direction.

Referring now to FIGS. 29 and 30, an assembly in accordance with another exemplary embodiment of the present disclosure is provided. FIG. 29 provides a perspective, cross-sectional view of a section of a turbine engine, and more specifically of a section of a stator 102 having a carrier 104, a seal assembly 106, and a seal support assembly 108. The seal assembly 106 is configured to be positioned between the carrier 104 and a rotor 100 (not shown; see embodiments described above). FIG. 30 provides a cross-sectional view of the assembly of FIG. 29 in a reference plane defined by a radial direction R and an axial direction A of the turbine engine. The assembly of FIGS. 29 and 30 may be configured in a similar manner as one or more of the exemplary assemblies described above.

For example, the seal support assembly 108 includes a spring arrangement 114 and the seal assembly 106 includes a plurality of seal segments 110. The plurality of seal segments 110 includes a first seal segment 110A. However, in the embodiment of FIGS. 29 and 30, the spring arrangement 114 includes a plate spring 234 coupled to the carrier 104 and to the first seal segment 110A. The plate spring 234 extends within a reference plane perpendicular to the radial direction R of the turbine engine.

For the embodiment shown, the plate spring 234 is coupled to the carrier 104 proximate a high-pressure side 126 of seal assembly 106 and proximate a low-pressure side 128 of the seal assembly 106. More specifically, for the embodiment shown, the carrier 104 includes a forward radial wall 236 (also referred to hereinabove as a radial extension 150) and aft radial wall 238. The forward radial wall 236 defines a first slot 240 extending in a tangential direction (e.g., a direction perpendicular to the radial direction R) and the aft radial wall 238 defines a second slot 242 also extending in the tangential direction. For the embodiment shown, the plate spring 234 is positioned within the first slot 240 and the second slot 242 to couple the plate spring 234 to the carrier 104. More particularly, for the embodiment shown the plate spring 234 is press fit to the carrier 104, and more particularly, still, press fit into the first slot 240 and the second slot 242 of the carrier 104.

It will be appreciated, however, that in other exemplary embodiments, the seal plate may be coupled to the carrier 104 in any other suitable manner. For example, in other embodiments, the seal plate may be coupled to the carrier 104 using one or more mechanical fasteners (e.g., bolts), or coupled to the carrier 104 through a combination of mechanical fasteners, press fit, etc.

In addition, the plate spring 234 is coupled to the first seal segment 110A at a location inward of an outer perimeter 244 of the plate spring 234. In particular, for the embodiment shown, the plate spring 234 defines a center 246 (e.g., a location identified by a middle 25% of a crosswise measure and a middle 25% of a lengthwise measure), and the plate spring 234 is coupled to the first seal segment 110A at the center 246 of the plate spring 234.

In order to attach the first seal segment 110A to the plate spring 234, the first seal segment 110A includes an attachment column 248 extending outward along the radial direction R of the turbine engine. The plate spring 234 is coupled to the attachment column 248. More specifically, the attachment column 248 includes a first section 250, a ledge 252, and a post 254. The ledge 252 extends tangentially from the radial direction R between the first section 250 and the post 254, and the post 254 extends outwardly along the radial direction R from the ledge 252. The post 254 extends through the plate spring 234 and the plate spring 234 is pressed against the ledge 252. In particular, the plate spring 234 includes an attachment ring 256 defining an attachment opening, and the post 254 extends through the attachment opening in the attachment ring 256. The first seal segment 110A further includes a retainer 258 coupled to the post 254 to couple the plate spring 234 to the first seal segment 110A. The retainer 258 may be, e.g., a clip, a nut, a through bolt, or any other suitable mechanical fastener.

In such a manner, the plate spring 234 may provide a biasing force to the first seal segment 110A along the radial direction R.

Figure 31:
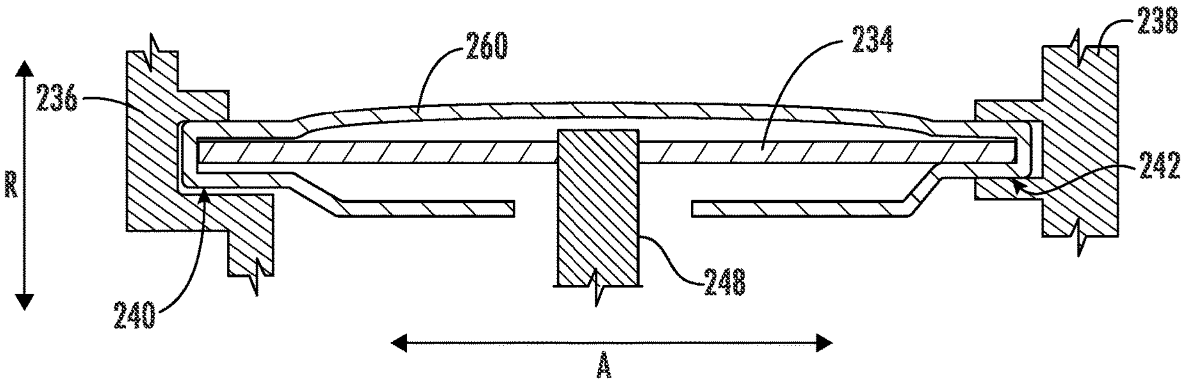
FIG. 31 is a schematic, close-up, cross-sectional view of an alternative embodiment of a spring arrangement of the present disclosure.

Referring briefly to FIG. 31, a close-up, cross-sectional view of an alternative embodiment of the spring arrangement 114 of FIGS. 29 and 30 is provided. For the embodiment of FIG. 31, a spring arrangement 114 is provided, further including a deflection limiter 260 positioned outward of the plate spring 234 along the radial direction R of the turbine engine, inward of the plate spring 234 along the radial direction R of the turbine engine, or both. More specifically, for the embodiment depicted, the deflection limiter 260 is positioned both outward and inward of the plate spring 234 along the radial direction R. The deflection limiter 260 is, in the embodiment shown, coupled to the carrier 104, and more specifically, coupled to the forward radial wall 236 of the carrier 104 and to the aft radial wall 238 of the carrier 104 at common attachment points with the plate spring 234. The deflection limiter 260 may define a stiffness greater than a stiffness of the plate spring 234, and may provide additional resistance to this plate spring 234 to prevent the plate spring 234 and first seal segment 110A from moving more than a desired amount along the radial direction R. Such a configuration may reduce or minimize a chance of rub between the first seal segment 110A and the rotor 100 of the turbine engine during operation of the turbine engine.

Figure 32:
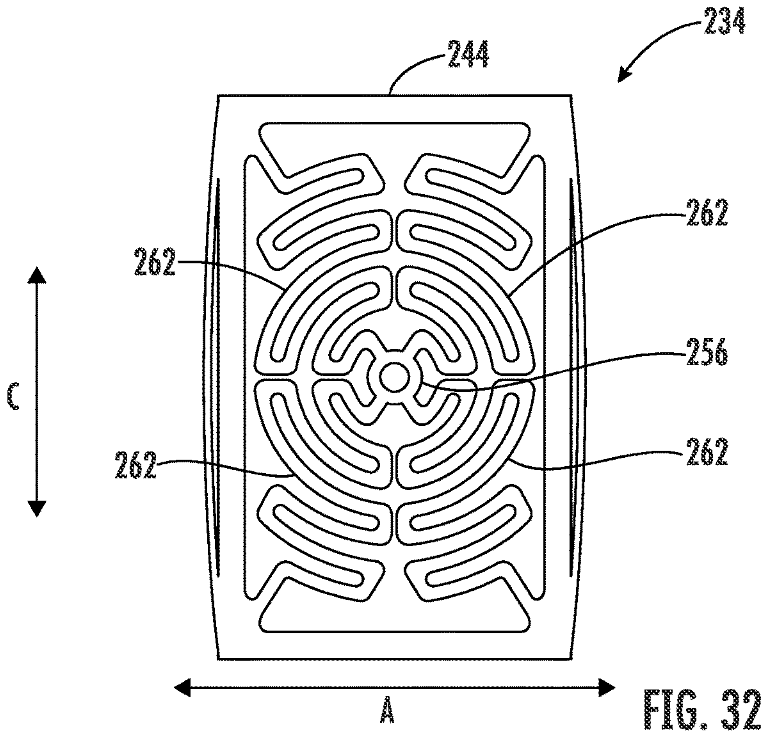
FIG. 32 is a plan view of a plate spring as may be incorporated into one or more of the embodiments of FIGS. 29 through 31.

Referring now to FIG. 32, a plan view of an exemplary plate spring 234 is provided as may be incorporated into one or more of the embodiments of FIGS. 29 through 31. It will be appreciated that the exemplary plate spring 234 depicted includes a plurality of flex members 262, an outer perimeter 244, and an attachment ring 256. The plurality of flex members 262 extend from the outer perimeter 244 to one or more attachment points defined with a first seal segment 110A. In particular, the exemplary plate spring 234 depicted in FIG. 32 is configured to define a single attachment point with the first seal segment 110A at the attachment ring 256. For the embodiment shown, the plate spring 234 includes four flex members 262 extending from the outer perimeter 244 to the attachment ring 256, with each of the plurality of flex member defining a serpentine path between the outer perimeter 244 and the attachment ring 256.

For the embodiment depicted in FIG. 32, the plate spring 234 defines a rectangular shape in the reference plane depicted (e.g., a reference plane perpendicular to the radial direction R). It will be appreciated, however, that in other embodiments, the plate spring 234 may additionally or alternatively define any other suitable shape to provide a desired amount of resistance along the radial direction R, resistance to twisting, etc.

Figure 33A:
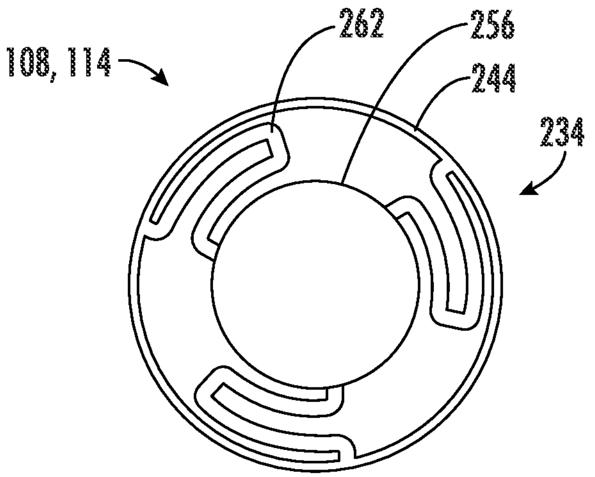
FIGS. 33A through 33C are schematic views of various plate spring in accordance with the present disclosure as may be incorporated into one or more of embodiments of the present disclosure.
Figure 33B:
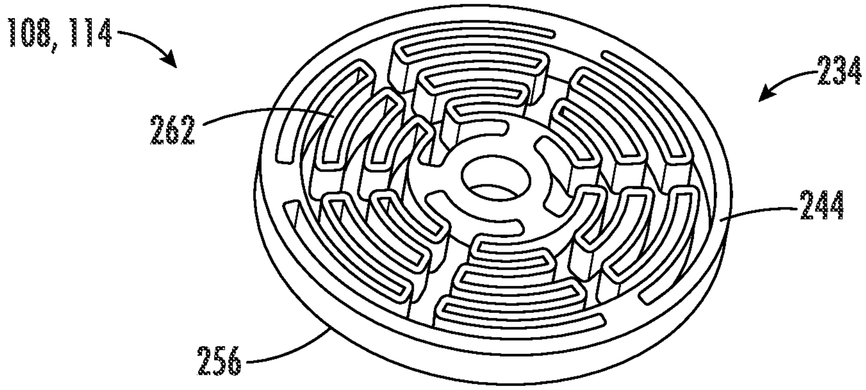
Figure 33C:
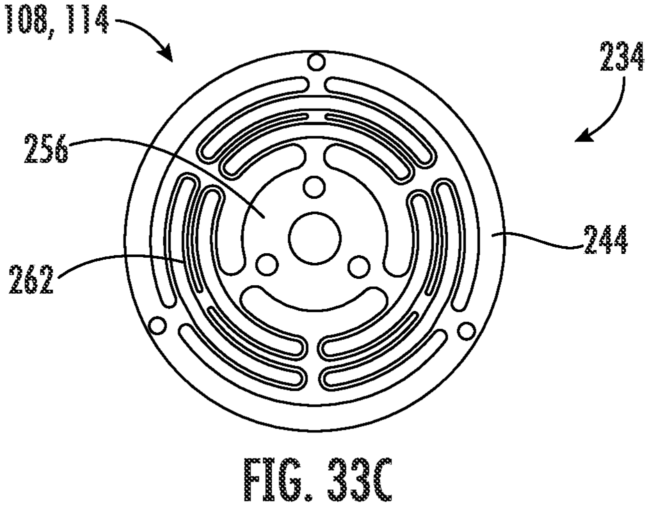

For example, referring now to FIGS. 33A, 33B and 33C, in other exemplary embodiments, a seal support assembly 108 may include a spring arrangement 114 having a plate spring 234 configured in any other suitable manner. For example, the plate spring 234 may define a circular cross-sectional shape. In such a manner, the plate spring 234 may again include a plurality of flex members 262 extending from an outer perimeter 244 to an attachment ring 256, with the plurality of flex members 262 defining a serpentine path from the outer perimeter 244 to the attachment ring 256. With such a configuration, the plate spring 234 may be coupled, e.g., to a carrier 104 having, e.g., a circular opening.

Figure 34:
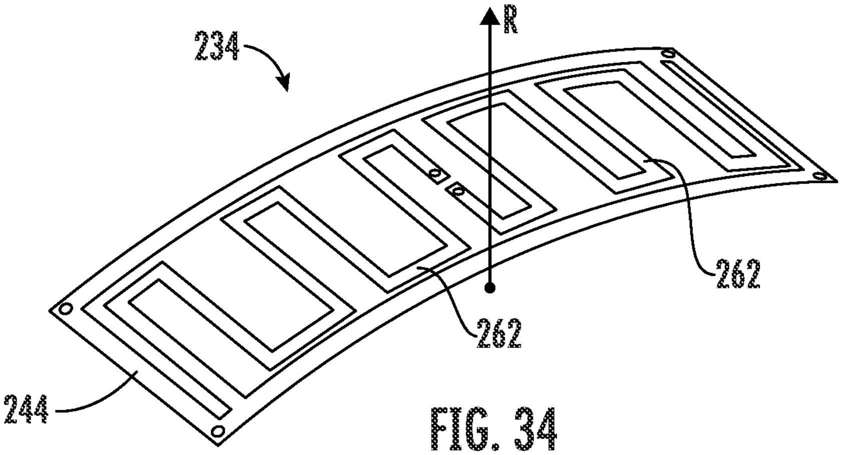
FIG. 34 is a plate spring in accordance with an exemplary embodiment of the present disclosure.

Referring now to FIG. 34, a plate spring 234 in accordance with an exemplary embodiment of the present disclosure is provided. The plate spring 234 may be configured to be incorporated into one or more of the exemplary embodiments described herein.

The plate spring 234 is depicted in a free condition. When in the free condition, the plate spring 234 defines a curvature relative to a reference plane extending perpendicular to a radial direction R of the turbine engine. In particular, it will be appreciated that the plate spring 234 defines a first radius of curvature when in the free condition. In such a manner, when the plate spring 234 is coupled to the carrier 104 and the first seal segment 110A, it may be in a pre-strained condition.

Figure 35:
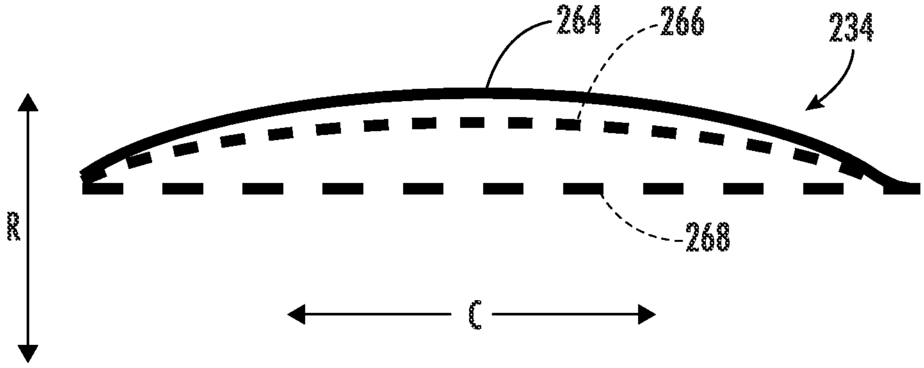
FIG. 35 is a cross-sectional, schematic view of the plate spring of FIG. 34.

In particular, referring now to FIG. 35, a cross-sectional view is depicted of the plate spring 234 of FIG. 34. The view of FIG. 35 may be a forward-looking-aft view along an axial direction A of the turbine engine. The top line 264 shows the plate spring 234 in the free condition. The middle line 266 shows the plate spring 234 installed, e.g., coupled to the carrier 104 and the first seal segment 110A. The bottom line 268 shows the plate spring 234 in an engaged position (e.g., when a pressure on an outer pressurization surface 140 of a lip 136 of a seal segment 110 increases as the turbine engine is moved from, for example, a low-power operating mode to a high-power operating mode; see, e.g., FIG. 29).

As will be appreciated, the plate spring 234 moves towards a more planar geometry when moved from the free condition to the installed condition, and further moves towards a more planar geometry when moved from the installed condition to the engaged position. For example, the plate spring 234 may define a second radius of curvature when in the installed position, with the second radius of curvature being greater than the first radius of curvature. The plate spring 234 may further define a third radius of curvature when in the engaged position, with the third radius of curvature being greater than the second radius of curvature.

Installing the plate spring 234 in a pre-strained condition, may allow for a desired resistance profile for a seal support assembly of the present disclosure. For example, the plate spring 234 may not provide a constant resistance, e.g., along the radial direction R, such that by installing the plate spring 234 in a pre-strained condition allows for use of a smaller or lighter spring to achieve the desired resistance, e.g., along the radial direction R.

Figure 36:
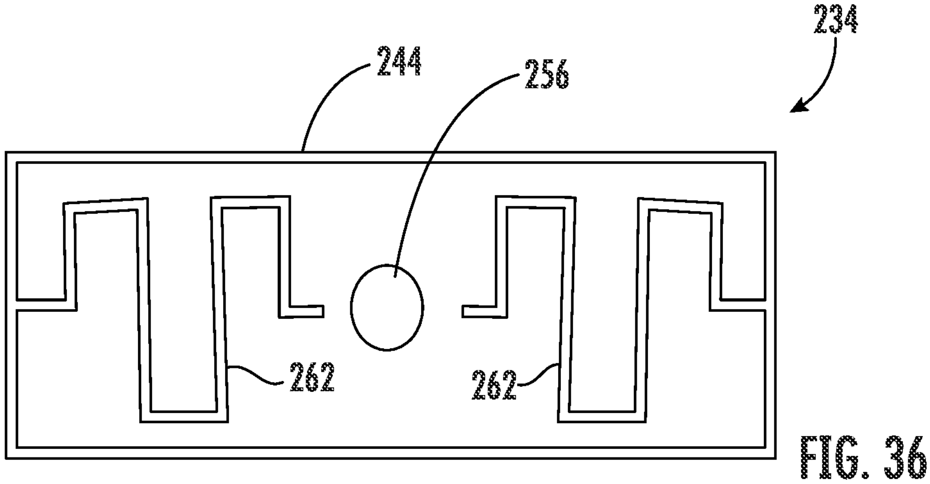
FIG. 36 is a schematic view of a plate spring in accordance with an exemplary embodiment of the present disclosure in a first position.

It will be appreciated, however, that in other exemplary embodiments, the plate spring 234 may be installed in a pre-strained condition in other suitable manners. For example, referring now to FIGS. 36 and 37, a top-down view along a radial direction R is provided of a plate spring 234 in accordance with another exemplary embodiment of the present disclosure. FIG. 36 provides a view of the plate spring 234 in a free condition and FIG. 37 provides a view of the plate spring 234 in an installed position and/or an engaged position.

Figure 37:
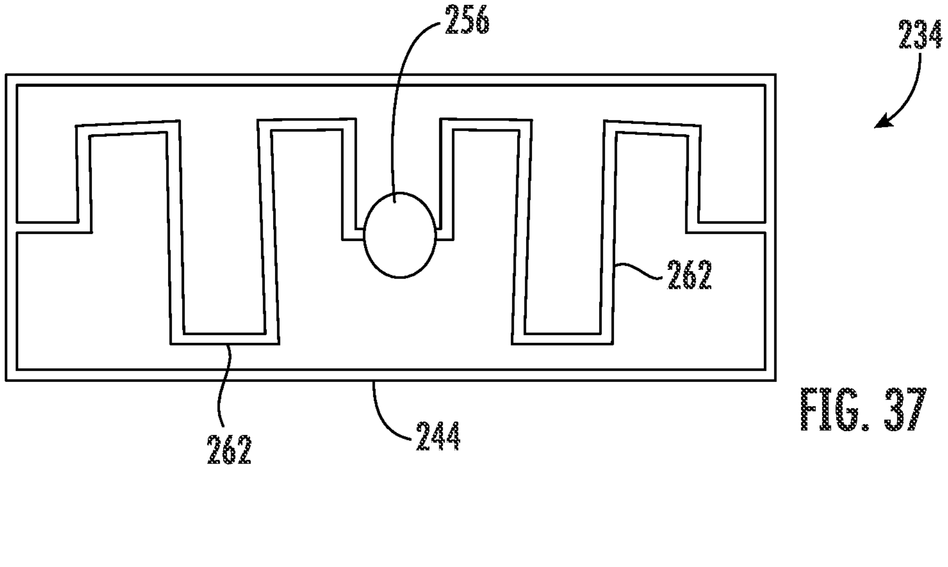
FIG. 37 is a schematic view of the exemplary plate spring of FIG. 36 in a second position.

The plate spring 234 of FIGS. 36 and 37 includes an outer perimeter 244 and a plurality of flex members 262 extending from the outer perimeter 244 towards an attachment ring 256 defining an attachment point defined with a seal segment. As shown, the flex members 262 do not extend all the way to the attachment point when in the free position. The flex members 262 are strained to extend to the attachment ring 256, such that when the plate spring 234 is coupled to the first seal segment 110A the plate spring 234 is in a pre-strained condition.

It will be appreciated that coupling the plate spring 234 to the carrier 104 and the first seal segment 110A in such a manner may provide a more desirable stiffness for the spring arrangement 114 and resistance along a radial direction R to the first seal segment 110A, without requiring thicker and/or heavier plate springs.

Briefly, it will be appreciated that although for the exemplary embodiments described above with terms to FIGS. 29 through 37, the plate springs 234 depicted include a single attachment ring 256 defining a single attachment point with the first seal segment 110A, in other exemplary embodiments, a plate spring 234 may be provided with a plurality of attachment rings 256 defining a plurality of attachment points. For example, referring now briefly to FIG. 38, a plate spring 234 in accordance with another exemplary embodiment of the present disclosure is provided.

The plate spring 234 generally includes an outer perimeter 244 and a plurality of flex members 262 extending from the outer perimeter 244. The plurality of flex members 262 includes a first flex member 262A extending from the outer perimeter 244 to a first attachment ring 256A defining a first attachment point with the first seal segment 110A (not shown) and a second flex member 262B extending from the outer perimeter 244 to a second attachment ring 256B defining a second attachment point with the first seal segment 110A (not shown). The plate spring 234 of FIG. 38 may be coupled to the first seal segment 110A in a similar manner as the plate spring 234 described above with reference to FIGS. 29 and 30 (e.g., the first seal segment 110A may include a separate attachment column 248 for each attachment point).

Figure 38:
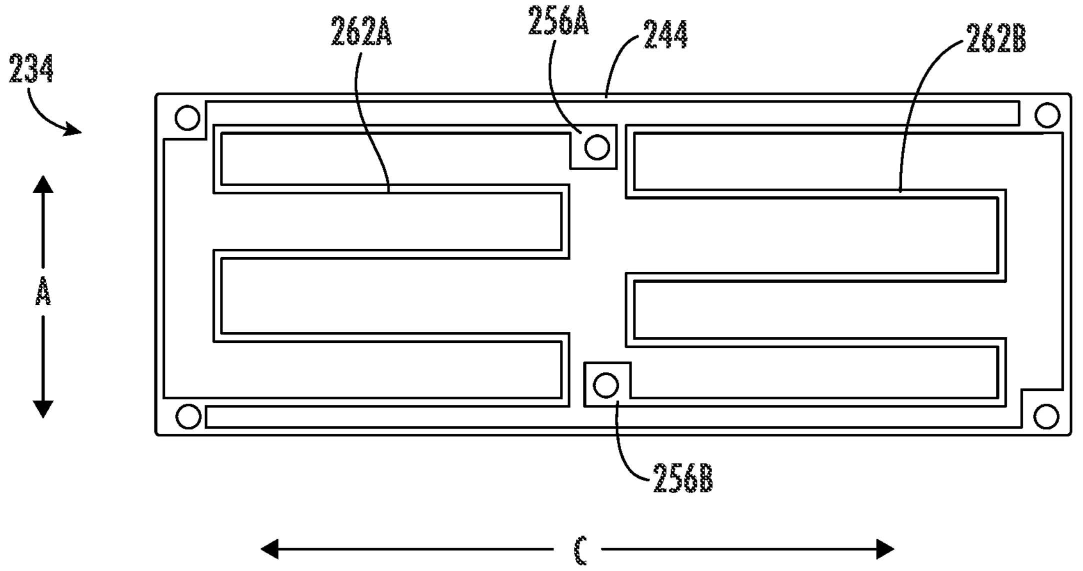
FIG. 38 is a schematic view of a plate spring in accordance with an exemplary embodiment of the present disclosure.

For the embodiment of FIG. 38, the first attachment ring 256A and first attachment point is spaced from the second attachment ring 256B and second attachment point along an axial direction A of the turbine engine. Such may reduce or minimize a twisting of the first seal segment 110A during operating conditions of the turbine engine.

Additionally or alternatively, the first attachment point may be spaced from the second attachment point along the circumferential direction C of the gas turbine engine 10.

Figure 39:
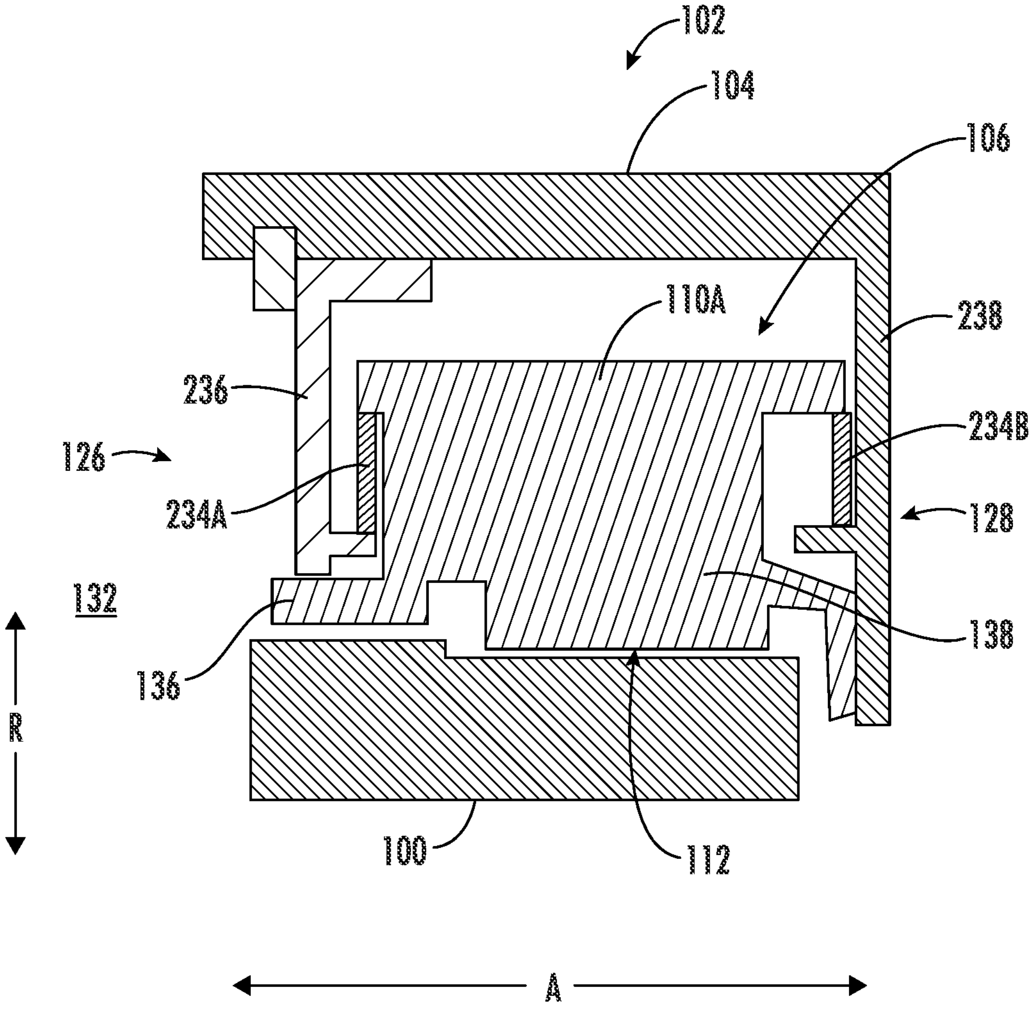
FIG. 39 is a close-up, schematic, cross-sectional view of a rotor, a stator having a carrier, a seal assembly, and a seal support assembly in accordance with another embodiment of the present disclosure.

Referring now to FIG. 39, an assembly in accordance with another exemplary embodiment of the present disclosure is provided. FIG. 39 provides a schematic, cross-sectional view of a section of a turbine engine, and more specifically of a section of a rotor 100, a stator 102 having a carrier 104, a seal assembly 106 positioned between the rotor 100 and the stator 102, and a seal support assembly 108. The view of FIG. 15 is of a reference plane defined by an axial direction A and a radial direction R of the turbine engine. The assembly of FIG. 39 may be configured in a similar manner as one or more of the exemplary assemblies described above.

For example, the seal assembly 106 includes a first seal segment 110A and the seal support assembly 108 includes a spring arrangement 114 extending between the carrier 104 and the first seal segment 110A, with the spring arrangement 114 having a plate spring 234. More specifically, for the embodiment shown, the spring arrangement 114 includes a first plate spring 234A and a second plate spring 234B, each of the first plate spring 234A and second plate spring 234B extending between the carrier 104 and the first seal segment 110A. The first plate spring 234A extends between the carrier 104 and the first seal segment 110A proximate a high-pressure side 126 of the seal assembly 106 and the second plate spring 234B extends between the carrier 104 and the first seal segment 110A proximate a low-pressure side 128 of the seal assembly 106.

The first plate spring 234A and second plate spring 234B may be configured in a similar manner as one or the exemplary plate springs 234 described above with reference to FIGS. 29 through 38. However, for the embodiment of FIG. 39, the first plate spring 234A and the second plate spring 234B extend along the radial direction R. Further, for the embodiment shown, the plate springs 234A, 234B are each coupled to the first seal segment 110A at respective outer perimeters 244 of the respective plate springs 234A, 234B.

Inclusion of the first plate spring 234A and the second plate spring 234B extending along the radial direction R may provide for desired stiffness for the first seal segment 110A along the radial direction R, while also combating undesirable twist of the first seal segment 110A.

Figure 40:
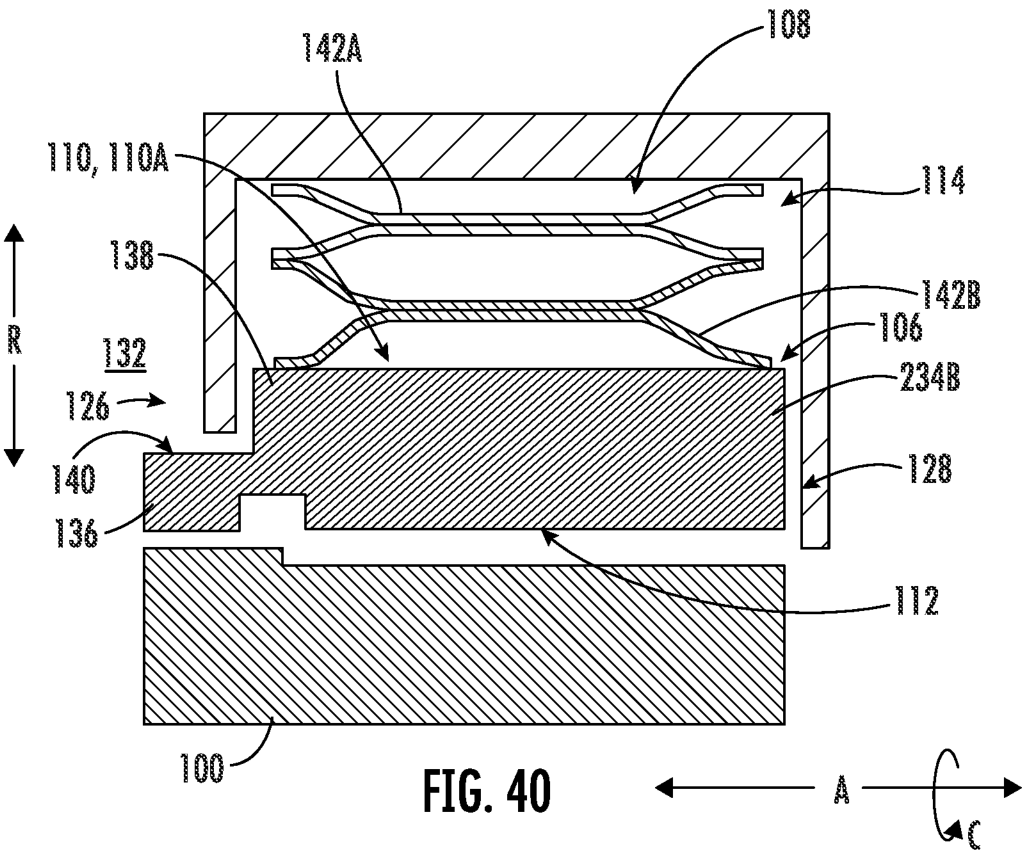
FIG. 40 is a close-up, schematic, cross-sectional view of a rotor, a stator having a carrier, a seal assembly, and a seal support assembly in accordance with another embodiment of the present disclosure.

Referring now to FIG. 40, an assembly in accordance with another exemplary embodiment of the present disclosure is provided. FIG. 40 provides a perspective, cross-sectional view of a section of a turbine engine, and more specifically of a section of a stator 102 having a carrier 104, a rotor 100, a seal assembly 106 positioned between the carrier 104 and the rotor 100, and a seal support assembly 108. FIG. 40 provides a cross-sectional view of the assembly in a reference plane defined by a radial direction R and an axial direction A of the turbine engine. The assembly of FIG. 40 may be configured in a similar manner as one or more of the exemplary assemblies described above.

For example, in the embodiment of FIG. 40, the seal assembly 106 includes a plurality of seal segments 110, with the plurality of seal segments 110 including a first seal segment 110A. Additionally, the seal support assembly 108 includes a spring arrangement 114 extending between the carrier 104 and the first seal segment 110A to counter a pressure on an outer pressurization surface 140 of a lip 136 of the first seal segment 110A during operation of the turbine engine, while allowing for passive control of a radial clearance gap defined between a seal face 112 and the rotor 100 during operation of the turbine engine.

For the embodiment depicted, the spring arrangement 114 includes one or more elements formed of a shape memory alloy material, of a bimetallic material, or both. In particular, for the embodiment of FIG. 40, the spring arrangement 114 includes a first spring extension 142A formed of a shape memory alloy material. In at least one exemplary embodiment, the shape memory alloy material may be a temperature-dependent shape memory alloy material, a strain-dependent shape memory alloy material, or both.

In particular, for the embodiment of FIG. 40, the spring arrangement 114 includes the first spring extension 142A and further includes a second spring extension 142B. The first spring extension 142A and the second spring extension 142B together extend between the carrier 104 and the first seal segment 110A in series.

Figure 41:
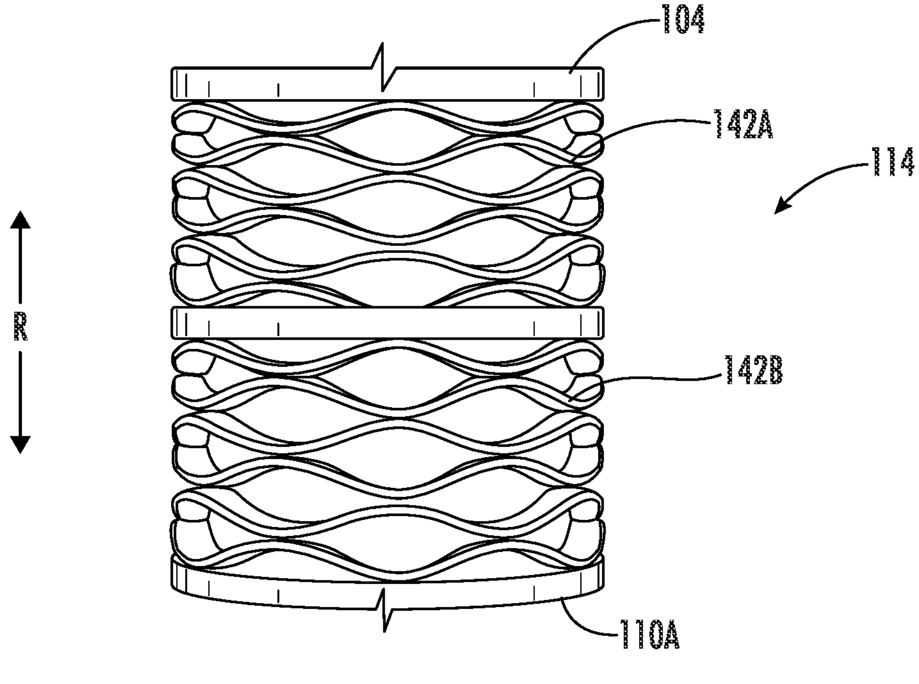
FIG. 41 is a side, close-up view of a spring arrangement of the seal support assembly of FIG. 40.

For example, referring briefly to FIG. 41, a side, close-up view of the spring arrangement 114 of FIG. 40 is depicted. As is shown, the spring arrangement 114 includes the first spring extension 142A and the second spring extension 142B collectively extending between the carrier 104 and the first seal segment 110A in series. For the embodiment shown, the first spring extension 142A includes a plurality of individual leaf springs stacked along the radial direction R. The second spring extension 142B similarly includes a plurality of individual leaf springs stacked along the radial direction R.

In one exemplary embodiment, the first spring extension 142A is formed of a first shape memory alloy material and the second spring extension 142B is formed of a second shape memory alloy material different than the first shape memory alloy material. For example, the first shape memory alloy material may be a temperature-dependent shape memory alloy material or a strain-dependent shape memory alloy material, and the second shape memory alloy material may be the other of the temperature-dependent shape memory alloy material or the strain-dependent shape memory alloy material.

Notably, in at least certain exemplary embodiments, the spring arrangement 114 may be in thermal communication with a working gas flowpath of the turbine engine (see, e.g., the embodiment described above with reference to, for example, FIGS. 1 through 3). In particular, for the embodiment shown, the seal assembly 106 defines a high-pressure side 126 and a low-pressure side 128, and is exposed to a high-pressure cavity 132 at the high-pressure side 126. The high-pressure side 126 is in fluid communication with the working gas flowpath through the high-pressure cavity 132 at a location at least partially upstream of the stator 102 (e.g., a portion of the working gas flowpath defined by a compressor, such as a high-pressure compressor, such as a downstream stage of the high-pressure compressor). In the embodiment shown, the spring arrangement 114 is in thermal communication with the high-pressure cavity 132 (which receives airflow from the working gas flowpath), is in airflow communication with the high-pressure cavity 132 (which receives airflow from the working gas flowpath), or both.

Inclusion of a spring arrangement 114 in accordance with the exemplary embodiment of FIG. 40 may allow for the seal support assembly 108 to position the first seal segment 110A to define a variable radial clearance with the rotor 100 based on an operating condition of the gas turbine engine 10.

Figure 42:
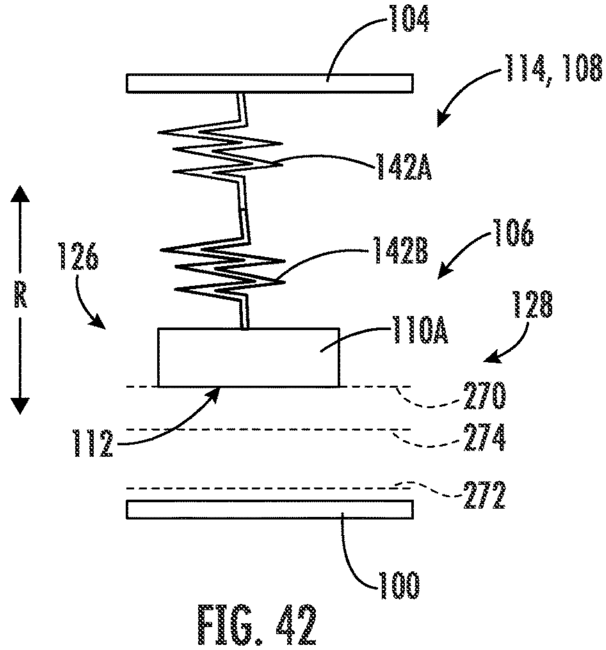
FIG. 42 depicts the assembly of FIG. 41 during a non-operating condition of a turbine engine.
Figure 43:
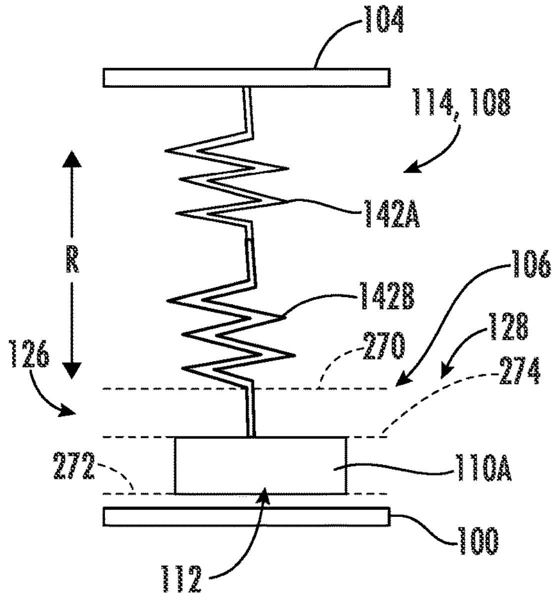
FIG. 43 depicts the assembly of FIG. 41 during a high-power operating condition of the turbine engine.
Figure 44:
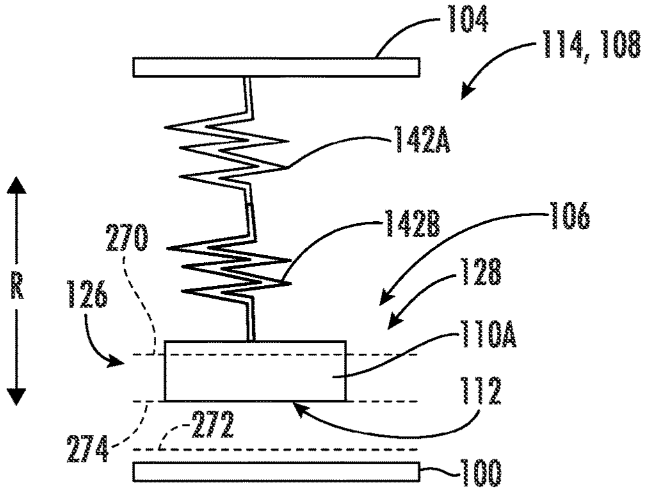
FIG. 44 depicts the assembly of FIG. 41 during a low-power operating condition of the turbine engine.

For example, reference will now be made to FIGS. 42 through 44. FIGS. 42 through 44 provide schematic views of the exemplary assembly of FIG. 40 at three different operating conditions. Notably, for the embodiment depicted, the first spring extension 142A is formed of a temperature-dependent shape memory alloy material and the second spring extension 142B is formed of a strain-dependent shape memory alloy material.

FIG. 42 depicts the assembly during a nonoperating condition, such as a pre-startup operating condition of the turbine engine. During the nonoperating condition, there is little or no pressure change from a high-pressure side 126 to a low-pressure side 128 of the seal assembly 106, and a temperature of the seal support assembly 108 is close to an ambient temperature (e.g., within 50 degrees F. of the ambient temperature). During the nonoperating condition, the first seal segment 110A defines a first radial clearance with the rotor 100, as is indicated by reference line 270.

FIG. 43 depicts the assembly during a high-power operating condition of the turbine engine. During the high-power operating condition, there is a relatively high-pressure change from the high-pressure side 126 to the low-pressure side 128 of the seal assembly 106 and the temperature the seal support assembly 108 is also relatively high (e.g., high relative to a temperature of the seal support assembly 108 during the nonoperating condition and during a low-power operating condition, described below). As noted, the first spring extension 142A is formed of a temperature-dependent shape memory alloy material, such that the relatively high temperature of the spring support assembly will result in a reduction in a stiffness of the first spring extension 142A, allowing for the first seal segment 110A to move inwardly along the radial direction R. Similarly, the second spring extension 142B is formed of a strain-dependent shape memory alloy material, such that the relatively high-pressure change from the high-pressure side 126 to the low-pressure side 128 of the seal assembly 106 (creating an increased pressure on the outer pressurization surface 140 of the lip 136 of the first seal segment 110A; see FIG. 40) may result in a reduction in a stiffness of the second spring extension 142B, further allowing for the first seal segment 110A to move inwardly along the radial direction R. During the high power operating condition, the first seal segment 110A defines a second radial clearance with the rotor 100, as is indicated by reference line 272.

FIG. 44 depicts the assembly during a low-power operating condition of the turbine engine. During the low-power operating condition, there is a relatively low-pressure change from the high-pressure side 126 to the low-pressure side 128 of the seal assembly 106 (more than during the nonoperating condition and less than during the high-power operating condition). Further, during the low-power operating condition, the temperature of the seal support assembly 108 is relatively low (e.g., low relative to the temperature of the seal support assembly 108 during the high-power operating condition, but higher than the temperature of the seal support assembly 108 during the nonoperating condition). Such operating conditions may result in an increase in the stiffness of the first spring extension 142A and further will increase the stiffness of the second spring extension 142B relative to the high power operating condition. Such will cause the first seal segment 110A to move outwardly along the radial direction R relative to the position and FIG. 43. During the low-power operating condition, the first seal segment 110A defines a third radial clearance of the rotor 100, as is indicated by reference line 274.

As will be appreciated, the first radial clearance is greater than the second radial clearance and the third radial clearance; the second radial clearance is less than the first and third radial clearances; and the third radial clearance is less than the first radial clearance but greater than the second radial clearance.

With such a configuration, the first seal segment 110A may define the greatest radial clearance during, e.g., a startup operating mode wherein the rotor 100 is more susceptible to high vibrations. Further, the seal segment 110 may define the least radial clearance during, e.g., a high-power operating mode such as cruise, takeoff, or climb, where the rotor 100 is least susceptible to high vibrations. In such a manner, the seal support assembly 108 may reduce wear on the first seal segment 110A, while also increasing a sealing efficiency of the first seal segment 110A.

It will be appreciated that although the embodiments described above with respect to FIGS. 40 through 44 describe the first spring extension 142A and the second spring extension 142B as each being formed of a shape memory alloy material, in other exemplary embodiments, one or both of the first spring extension 142A or the second spring extension 142B may be formed of a different material, such as a traditional metallic spring material.

Figure 45:
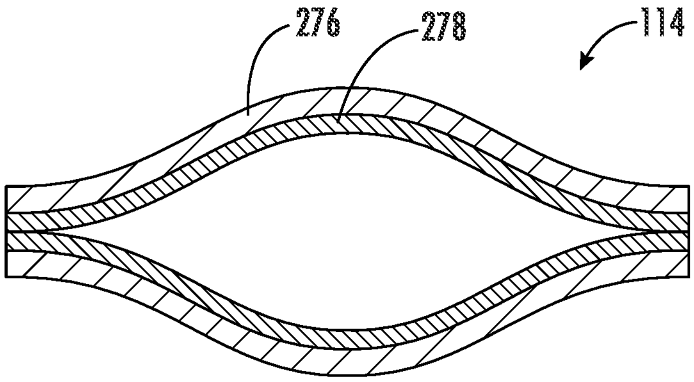
FIG. 45 is a spring arrangement in accordance with an exemplary embodiment.

Further, as briefly mentioned above, in other embodiments the spring arrangement 114 may include a spring extension formed of a bimetallic material. Referring briefly to FIG. 45, a spring arrangement 114 in accordance with another exemplary embodiment is provided having a spring extension 142, with the spring extension 142 formed of a bimetallic material.

As shown, the bimetallic material includes a first layer 276 and a second layer 278. In at least certain exemplary embodiments, the first layer 276 may be a first shape memory alloy material and the second layer 278 may be a second shape memory alloy material. For example, in one embodiment, the first layer 276 may be a strain-dependent shape memory alloy material and the second layer 278 may be a temperature-dependent shape memory alloy material. Additionally, or alternatively, one or both of the first layer 276 or second layer 278 may be formed of a metallic material having a different coefficient of thermal expansion than the other of the first layer 276 or second layer 278.

Figure 46:
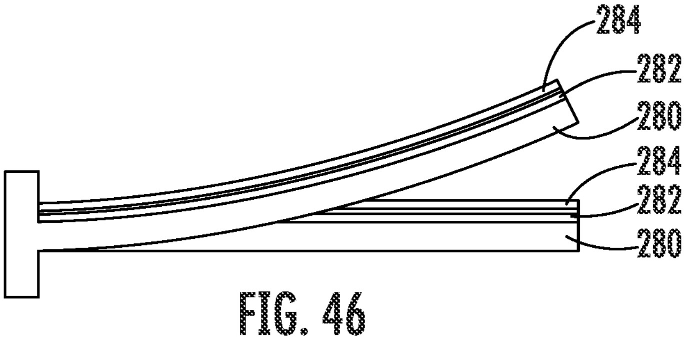
FIG. 46 is a schematic view of a bimetallic material in accordance with an exemplary embodiment.

Further, referring to FIG. 46, the bimetallic material include one or more additional layers. For example, the bimetallic material may include a high temperature substrate 280, a shape memory alloy material layer 282, and optionally a high temperature coating 284. It will be appreciated that the view of FIG. 46 shows the bimetallic material in an assembly position (e.g., the straight orientation) as well as in an operating condition (e.g., the bent orientation).

The bimetallic materials depicted in FIG. 45 and FIG. 46 may be incorporated into one or more of the spring extensions 142 described hereinabove.

Figure 47:
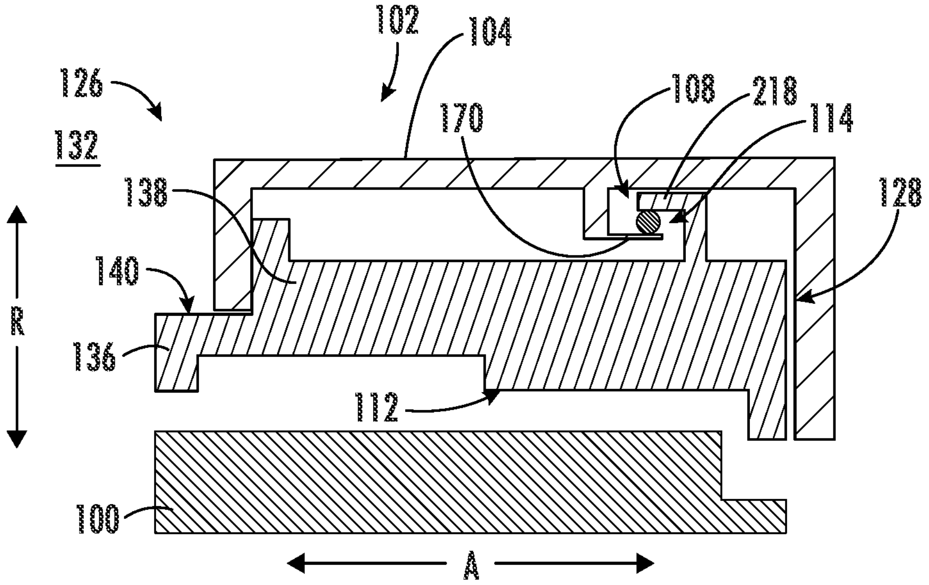
FIG. 47 is a close-up, schematic, cross-sectional view of a rotor, a stator having a carrier, a seal assembly, and a seal support assembly in accordance with another embodiment of the present disclosure in a first position.
Figure 48:
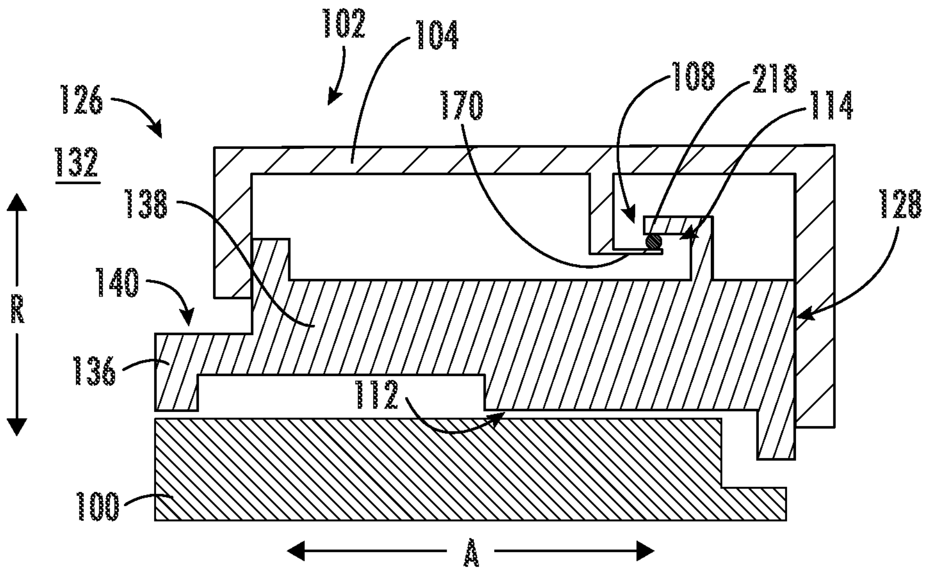
FIG. 48 is a close-up, schematic, cross-sectional view of the embodiment of FIG. 47 in a second position.

Referring now to FIGS. 47 and 48, an assembly in accordance with another exemplary embodiment of the present disclosure is provided. FIG. 47 provides a schematic, cross-sectional view of a section of a turbine engine, and more specifically of a section of a stator 102 having a carrier 104, a rotor 100, a seal assembly 106 positioned between the carrier 104 and the rotor 100, and a seal support assembly 108. FIG. 47 provides a view of the assembly in a first position, and FIG. 48 provides a view of the assembly and a second position. The assembly of FIGS. 47 and 48 may be configured in a similar manner as one or more of the exemplary assemblies described above.

For example, the seal assembly 106 includes a first seal segment 110A and the seal support assembly 108 includes a spring arrangement 114 extending between the carrier 104 and the first seal segment 110A to counter a pressure on an outer pressurization surface 140 of a lip 136 of the first seal segment 110A during operation of the turbine engine, while allowing for passive control of a radial clearance gap defined between a seal face 112 and the rotor 100 during operation of the turbine engine.

In particular, the carrier 104 includes a carrier axial extension 170 and the first seal segment 110A similarly includes a segment axial extension 218 located outward of the carrier axial extension 170. The spring arrangement 114 extends between the carrier 104 and the first seal segment 110A, and more specifically between the carrier axial extension 170 and the segment axial extension 218. Accordingly, increasing a radial height of the spring arrangement 114 moves the first seal segment 110A farther away from the rotor 100 along the radial direction R and conversely, decreasing a radial height of the spring arrangement 114 moves the first seal segment 110A closer to the rotor 100 along the radial direction R. The configuration of FIG. 47 depicts the assembly at a low-power operating condition of the turbine engine and FIG. 48 depicts the assembly at a high-power operating condition of the turbine engine. As will be appreciated, an increased pressure at the outer pressurization surface 140 of the lip 136 of the first seal segment 110A may move the first seal segment 110A from the position shown in FIG. 47 to the position shown in FIG. 48.

Figure 49:
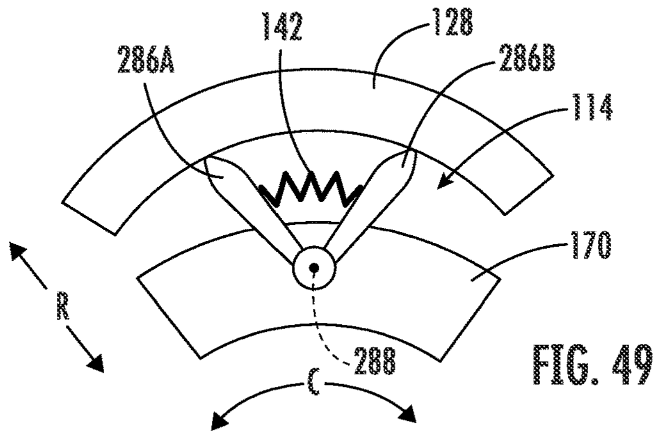
FIGS. 49 and 50 provide a schematic view of a seal support assembly of the present disclosure in a first position and in a second position, respectively.
Figure 50:
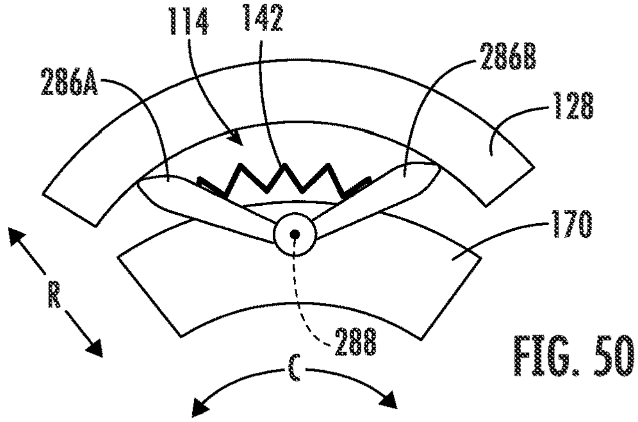

Referring now to FIGS. 49 and 50, a first embodiment of the spring arrangement 114 described with reference to FIGS. 47 and 48 is provided. For the embodiment shown, the spring arrangement 114 includes a first cam 286A and a second cam 286B. The first cam 286A and the second cam 286B are rotatable about a common rotational axis 288. The spring arrangement 114 includes a spring extension 142 extending between the first cam 286A in the second cam 286B.

The first cam 286A and the second cam 286B are rotatably coupled to one of the first seal segment 110A or the carrier 104, and the first cam 286A and the second cam 286B extend to and engage with a surface of the other of the first seal segment 110A or the carrier 104. In particular, for the embodiment depicted the first cam 286A and the second cam 286B are rotatably coupled to the carrier axial extension 170 of the carrier 104, and extend to and engage with a surface of the segment axial extension 218 of the first seal segment 110A.

Notably, the spring extension 142 is configured to bias the first cam 286A towards the second cam 286B, decreasing an angle therebetween. Accordingly, for the embodiment of FIG. 49, the turbine engine may be in a low power operating condition, and for the embodiment of FIG. 50, the turbine engine may be in a high-power operating condition.

Figure 51:
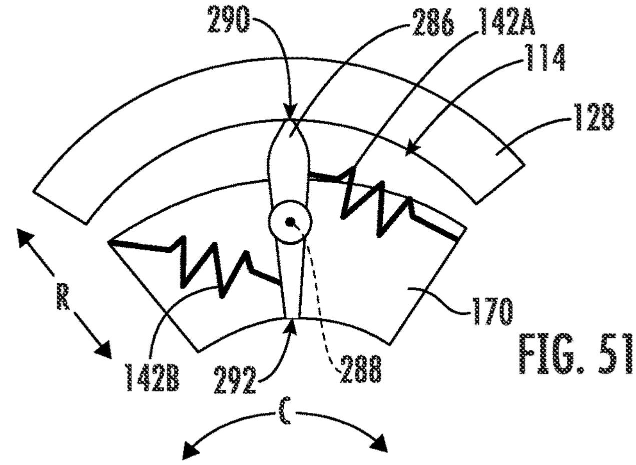
FIGS. 51 and 52 provide a schematic view of another seal support assembly of the present disclosure in a first position and in a second position, respectively.
Figure 52:
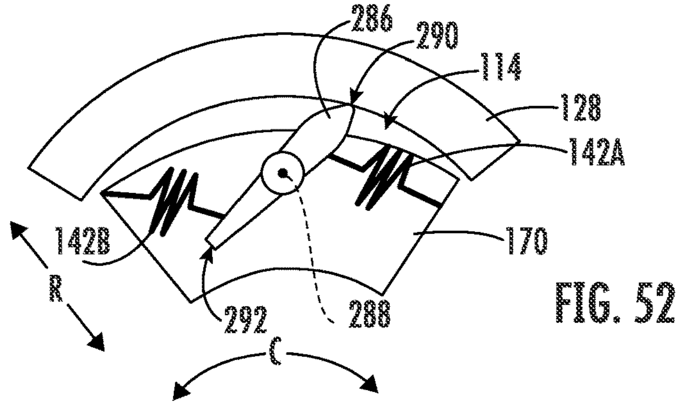

Referring now to FIGS. 51 and 52, another embodiment of the spring arrangement 114 described above with reference to FIGS. 47 and 48 is provided. For the embodiment of FIGS. 51 and 52, the spring arrangement 114 includes a cam 286 extending between a first end 290 and a second end 292. The cam 286 defines the rotational axis 288 and the spring arrangement 114 includes a first spring extension 142A and a second spring extension 142B. The first spring extension 142A extends from the cam 286 at the first end 290 of the cam 286 or between the first end 290 of the cam 286 and the rotational axis 288 of the cam 286. The second spring extension 142B extends from the cam 286 at the second end 292 of the cam 286 or between the second end 292 of the cam 286 and the rotational axis 288. The first spring extension 142A and the second spring extension 142B are further coupled to one of the carrier 104 or the first seal segment 110A. In the embodiment shown, the first spring extension 142A and the second spring extension 142B are each further coupled to the carrier 104.

Notably, the first spring extension 142A and the second spring extension 142B are configured to bias the cam 286 towards a radial orientation, pushing the first seal segment 110A outward along the radial direction (see, e.g., FIGS. 47 and 48). Accordingly, for the embodiment of FIG. 51, the turbine engine may be in a low power operating condition, and for the embodiment of FIG. 52, the turbine engine may be in a high-power operating condition.

Figure 53:
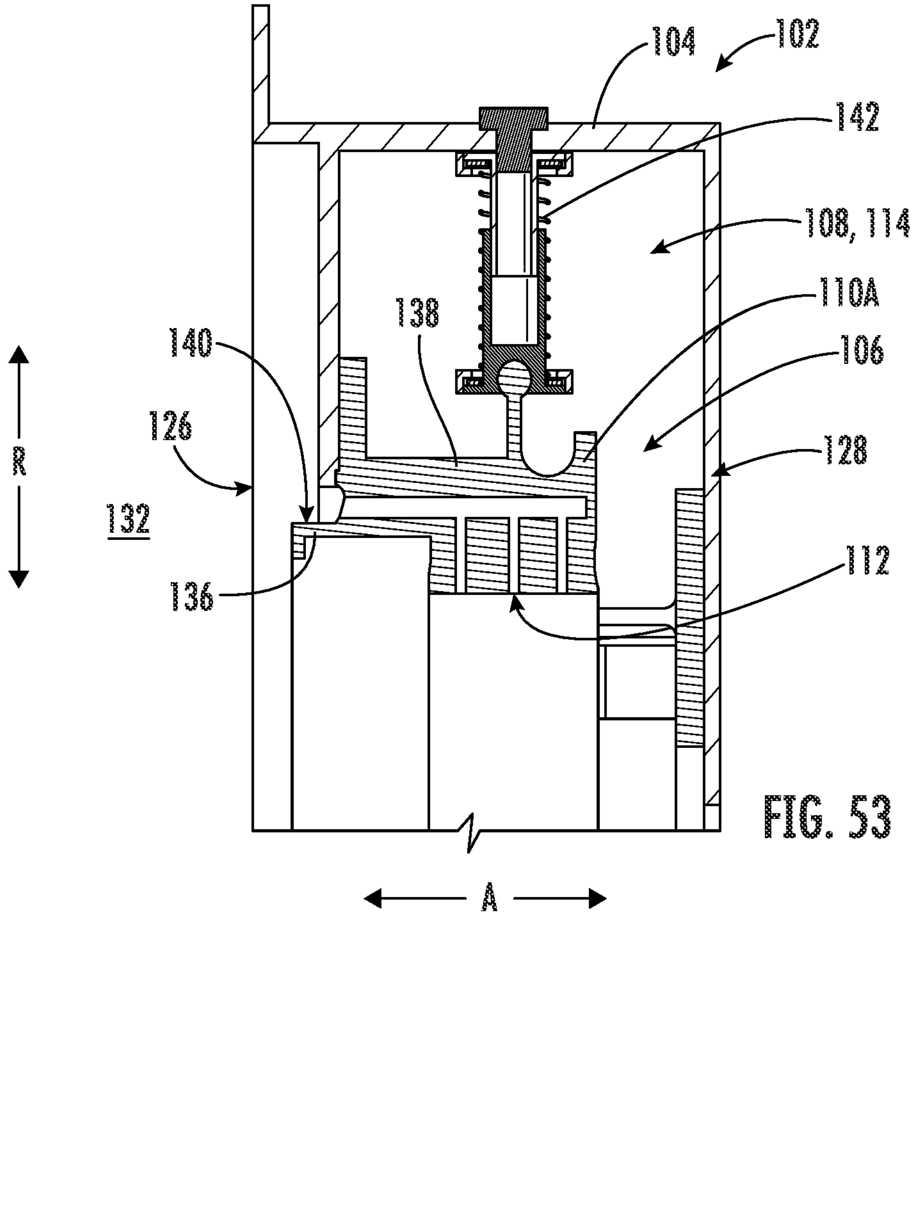
FIG. 53 is a close-up, schematic, cross-sectional view of a rotor, a stator having a carrier, a seal assembly, and a seal support assembly in accordance with another embodiment of the present disclosure.

Referring now to FIG. 53, an assembly in accordance with another exemplary embodiment of the present disclosure is provided. FIG. 53 provides a schematic, cross-sectional view of a section of a turbine engine, and more specifically of a section of a stator 102 having a carrier 104, a seal assembly 106 configured to be positioned between the carrier 104 and a rotor 100 (not shown, and a seal support assembly 108. The assembly of FIG. 53 may be configured in a similar manner as one or more of the exemplary assemblies described above.

For example, the seal assembly 106 includes a first seal segment 110A and the seal support assembly 108 includes a spring arrangement 114 extending between the carrier 104 and the first seal segment 110A to counter a pressure on an outer pressurization surface 140 of a lip 136 of the first seal segment 110A during operation of the turbine engine, while allowing for passive control of a radial clearance gap defined between the seal face 112 and the rotor 100 (not depicted) during operation of the turbine engine.

In particular, for the embodiment depicted, the spring arrangement 114 includes a spring extension 142 arranged in tension, such that a lengthening of the spring extension 142 results in movement of the first seal segment 110A inwardly along the radial direction R and closer to the rotor 100.

Figure 54:
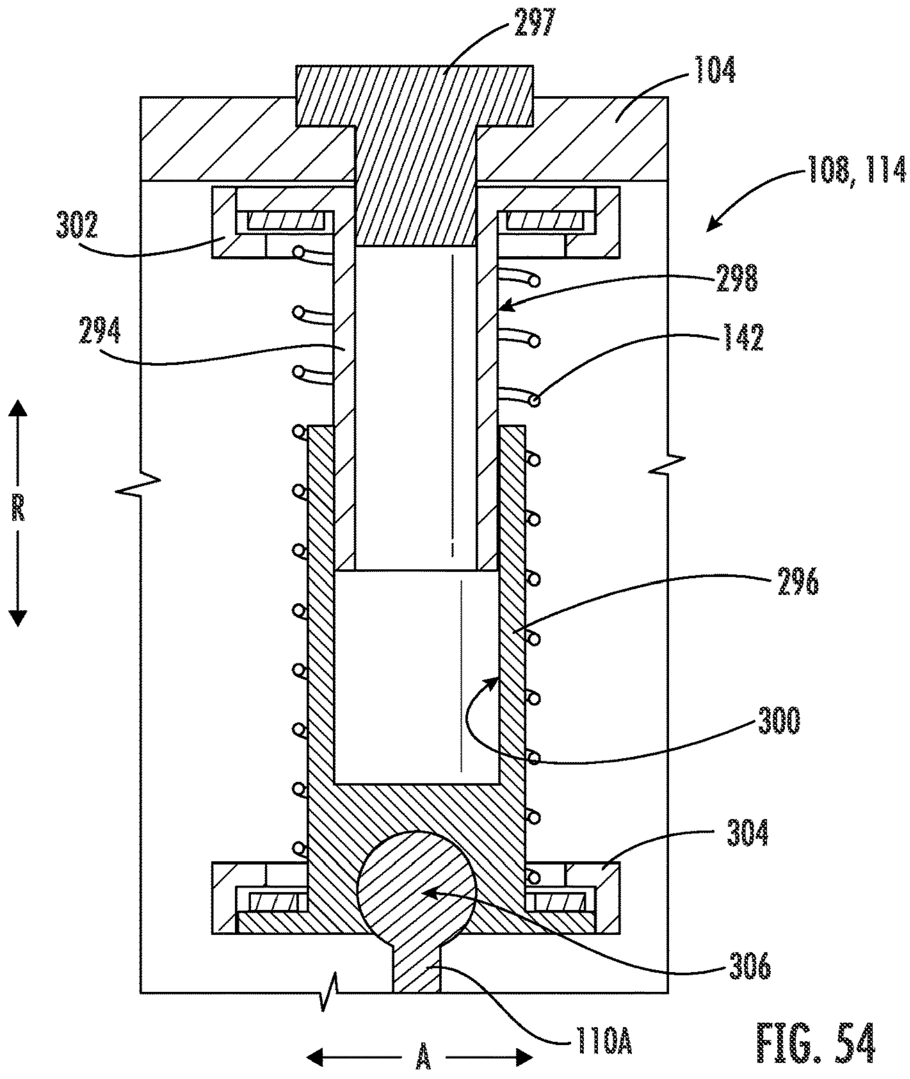
FIG. 54 is a close-up view of a spring arrangement of the seal support assembly of FIG. 53.

Referring now to FIG. 54, a close-up view of the spring arrangement 114 of FIG. 53 is provided. The exemplary spring arrangement 114 of FIG. 54 generally includes a first body extension 294 fixed along the radial direction R relative to the carrier 104 and a second body extension 296 fixed along the radial direction R relative to the first seal segment 110A. In particular, for the embodiment depicted, the first body extension 294 is coupled to the carrier 104 and the second body extension 296 is coupled to the first seal segment 110A. The first body extension 294 is coupled to the carrier 104 through one or more mechanical fasteners 297, which may be, e.g., a bolt.

In the embodiment shown, the first body extension 294 defines a complementary geometry to the second body extension 296, such that the first body extension 294 is slidable relative to the second body extension 296. For example, the first body extension 294 may define a cylindrical external surface 298 and the second body extension 296 may have a cylindrical internal surface 300, with the cylindrical external surface 298 having an outer diameter slightly less than an inner diameter of the cylindrical internal surface 300.

Further, for the embodiment shown, the spring extension 142 is a helical spring arranged coaxially with the first body extension 294 and the second body extension 296. Additionally, the spring arrangement 114 includes a first spring retention member 302 at one end and a second spring retention member 304 at an opposite end. The first spring retention member 302 may be coupled to the carrier 104, the first body extension 294, or both. The second spring retention member 304 may be coupled to the first seal segment 110A, the second body extension 296, or both.

Further, it will be appreciated that for the embodiment depicted, the spring arrangement 114 defines a movable attachment point with the first seal segment 110A. In particular, the spring arrangement 114 forms a spherical joint 306 with the first seal segment 110A for connecting the spring arrangement 114 to the first seal segment 110A.

Although the spring extension 142 is depicted as a uniform helical spring in the embodiment of FIGS. 53 and 54, in other embodiments, the spring extension 142 may have any other suitable shape. For example, in other embodiments the spring extension 142 may be configured as a bellows, is a compound spring, as a nonlinear spring, etc.

Figure 55:
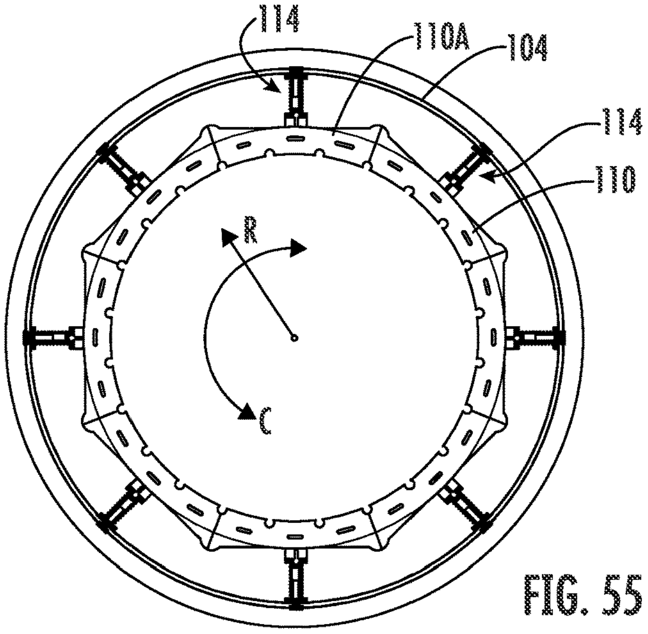
FIG. 55 is a schematic, cross-sectional view of a section of a turbine engine including the assembly of FIG. 53.

Referring now briefly to FIG. 55, a cross-sectional view of the seal assembly 106 and seal support assembly 108 of FIGS. 53 and 54 is provided. As will be appreciated, for the embodiment depicted the seal assembly 106 includes a plurality of seal segment 110 spaced along the circumferential direction C and the seal support assembly 108 includes a plurality of spring arrangements 114, each spring arrangement 114 extending between a respective one of the plurality of seal segments 110 and the carrier 104 for supporting the respective one of the plurality of seal segments 110 along the radial direction R.

Figure 56A:
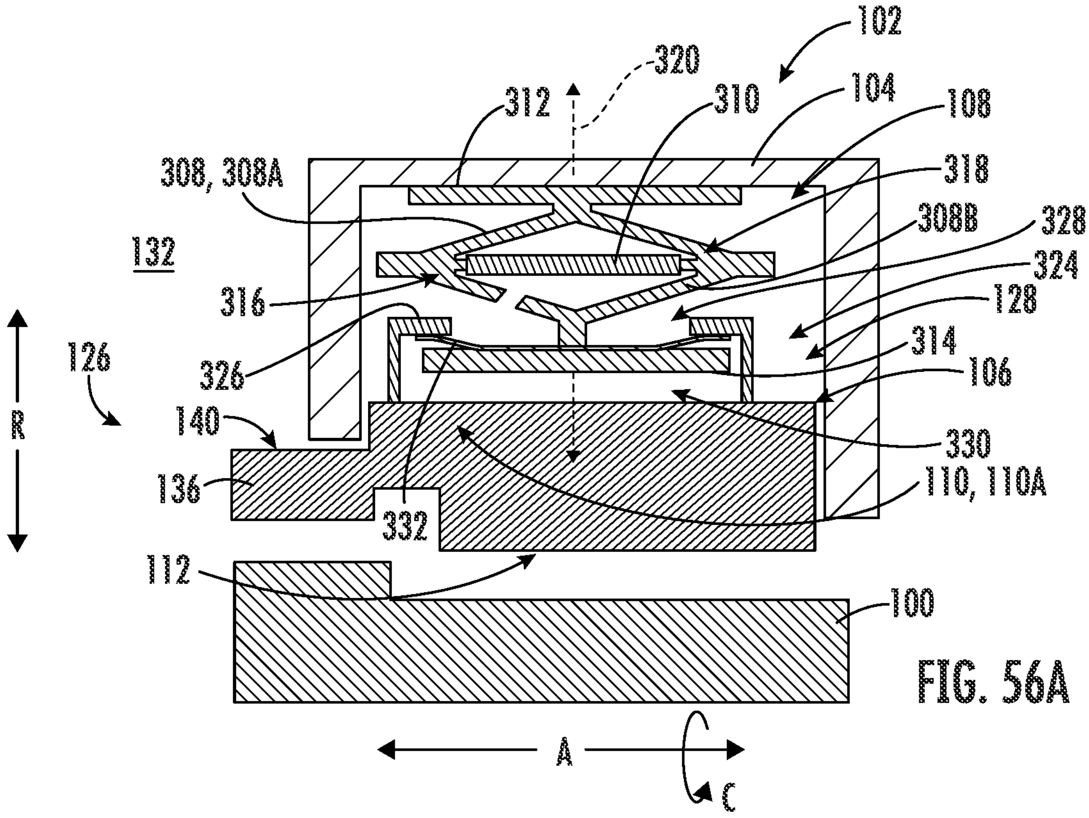
FIG. 56A is a close-up, schematic, cross-sectional view of a rotor, a stator having a carrier, a seal assembly, and a seal support assembly in accordance with another embodiment of the present disclosure in a first position.
Figure 56B:
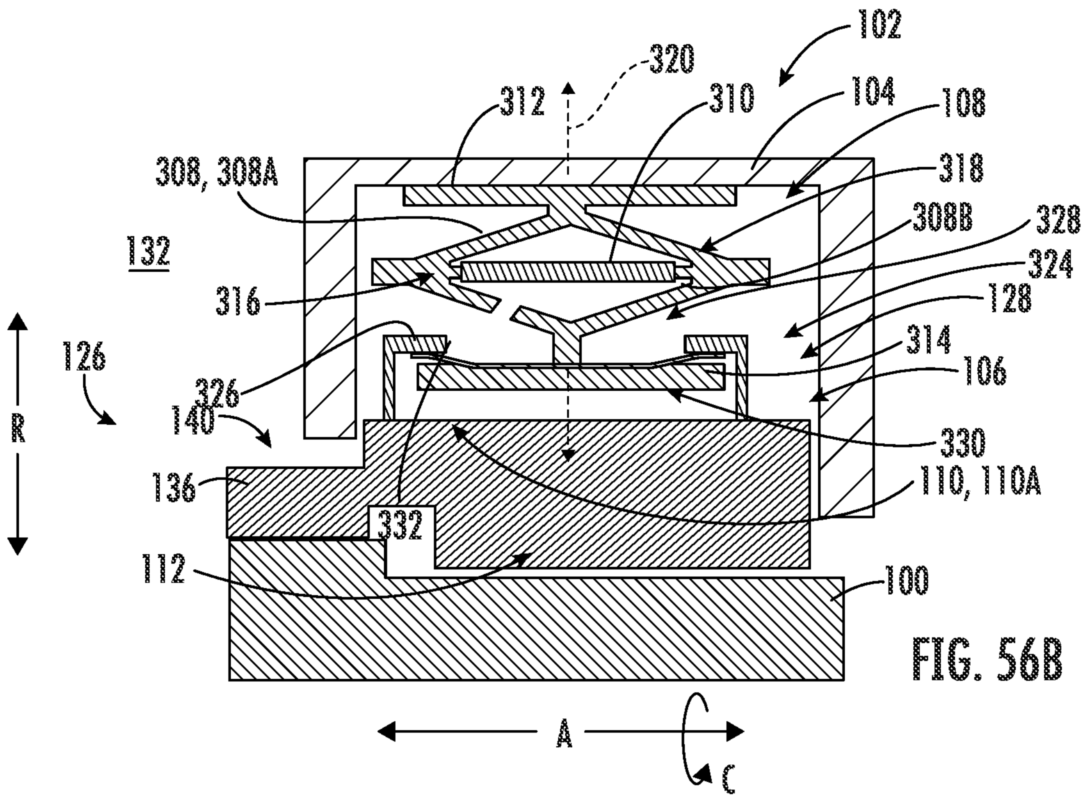
FIG. 56B is a close-up, schematic, cross-sectional view of the embodiment of FIG. 56A in a second position.

Referring now to FIGS. 56A and 56B, an assembly in accordance with another exemplary embodiment of the present disclosure is provided. FIG. 56A provides a schematic, cross-sectional view of a section of a turbine engine, and more specifically of a section of a stator 102 having a carrier 104, a rotor 100, a seal assembly 106 positioned between the carrier 104 and the rotor 100, and a seal support assembly 108. FIG. 56A provides a view of the assembly in a first position, and FIG. 56B provides a view of the assembly and a second position. The assembly of FIGS. 56A and 56B may be configured in a similar manner as one or more of the exemplary assemblies described above.

For example, the seal assembly 106 includes a first seal segment 110A, the first seal segment 110A including a seal face 112 configured to form a fluid bearing with the rotor 100. Additionally, the seal support assembly 108 extends between the carrier 104 and the first seal segment 110A to counter a pressure on an outer pressurization surface 140 of a lip 136 of the first seal segment 110A during operation of the turbine engine, while allowing for passive control of a radial clearance gap defined between the seal face 112 and the rotor 100 during operation of the turbine engine.

For the embodiment of FIGS. 56A and 56B, the seal support assembly 108 includes a flexible extension 308 and a driver extension 310. The driver extension 310 is coupled to and extends from the flexible extension 308. The driver extension 310 is formed of a first material, the first material being: (a) a material defining a different coefficient of thermal expansion than the material forming the driver extension 310; (b) a shape memory alloy material; (c) a bimetallic material; or (d) a combination thereof. The driver extension 310 is positioned to move the flexible extension 308 during an operation of the turbine engine. More specifically, as will be explained in more detail below, the driver extension 310 is positioned to move the flexible extension 308 to correspondingly move the first seal segment 110A during operation of the turbine engine based on, e.g., an operating condition of the turbine engine (e.g., a temperature or a pressure change across the seal assembly 106).

More specifically, for the embodiment depicted, the flexible extension 308 is a first flexible extension 308A and the seal support assembly 108 further includes a second flexible extension 308B. The driver extension 310 extends between the first flexible extension 308A and the second flexible extension 308B.

More specifically, still, the seal support assembly 108 further includes an outer support section 312 along the radial direction R of the turbine engine and an inner support section 314 along the radial direction R of the turbine engine. The outer support section 312 is coupled to or formed integrally with the carrier 104 and the inner support section 314 is coupled to or formed integrally with the first seal segment 110A, as will be explained in more detail below. The driver extension 310 extends between a first connection point 316 with the first flexible extension 308A and a second connection point 318 with the second flexible extension 308B. The seal support assembly 108 defines an extension axis 320 along the radial direction R. The extension axis 320 indicates a direction of travel along the radial direction R of the first seal segment 110A provided by the seal support assembly 108. The first flexible extension 308A and the second flexible extension 308B are coupled to the outer support section 312 at one or more locations closer to the extension axis 320 than the first connection point 316 and the second connection point 318.

Referring still to the embodiment FIGS. 56A and 56B, the first material defines a coefficient of thermal expansion less than a coefficient of thermal expansion of the material forming the first flexible extension 308A and the second flexible extension 308B. For example, in certain exemplary embodiments, the first material may be a shape memory alloy material or metal or metal alloy having a coefficient of thermal expansion less than the coefficient of thermal expansion of the material forming the first flexible extension 308A and the second flexible extension 308B.

Notably, in at least certain exemplary embodiments, the seal support assembly 108 may be in thermal communication with a working gas flowpath of the turbine engine (see, e.g., the embodiment described above with reference to, e.g., FIGS. 1 through 3). In particular, for the embodiment shown, the seal assembly 106 defines a high-pressure side 126 and a low-pressure side 128, and is exposed to a high-pressure cavity 132 at the high-pressure side 126. The high-pressure side 126 is in fluid communication with the working gas flowpath through the high-pressure cavity 132 at a location at least partially upstream of the stator 102 (e.g., a portion of the working gas flowpath defined by a compressor, such as a high-pressure compressor, such as a downstream stage of the high-pressure compressor). In the embodiment shown, the seal support assembly 108 is in thermal communication with the high-pressure cavity 132 (which receives airflow from the working gas flowpath), is in airflow communication with the high-pressure cavity 132 (which receives airflow from the working gas flowpath), or both. In such a manner, it will be appreciated that the configuration of FIGS. 56A and 56B allows for movement of the first seal segment 110A relative to the rotor 100 along the radial direction R to be controlled passively based on an operating temperature of the turbine engine.

For example, referring particularly to FIG. 56A, the assembly is depicted during, e.g., a low-power operating condition of the gas turbine engine 10. During this operating condition, a temperature of a working gas through the working gas flowpath through which the stator 102 is positioned may be relatively low, allowing for the first seal segment 110A to be held at a radially outer position relative to the rotor 100, such that the seal face 112 of the first seal segment 110A defines a relatively large radial clearance with the rotor 100.

By contrast, referring particularly to FIG. 56B, the assembly is depicted during, e.g., a high-power operating condition. During this operating condition, the temperature of the working gas through the working gas flowpath through which the stator 102 is positioned may be relatively high. With the increase in temperature, in combination with the lower coefficient of thermal expansion of the driver extension 310 relative to the first flexible extension 308A and second flexible extension 308B in the configuration depicted and described above, the first seal segment 110A is moved inwardly along the radial direction R to reduce the radial clearance between the seal face 112 of the first seal segment 110A and the rotor 100.

In such a manner, the assembly depicted in FIGS. 56A and 56B may provide for a passive control of the radial clearance between the seal face 112 of the first seal segment 110A and the rotor 100 based on a temperature of a working gas through a working gas flowpath of the engine.

Briefly, referring still to FIGS. 56A and 56B, as noted above, the seal support assembly 108 is coupled to the first seal segment 110A. In particular, the seal support assembly 108 includes an inner support section 314 coupled to the first seal segment 110A through a hanger attachment. In particular, the first seal segment 110A includes a hanger 324 having an axial ledge 326 spaced from a body 138 of the first seal segment 110A and defining an opening 328. The hanger 324 further defines a cavity 330 between the axial ledge 326 in the body 138 of the first seal segment 110A. The inner support section 314 of the seal support assembly 108 is positioned within the cavity 330 and defines a length in the axial direction A wider than a length of the opening 328. In such a manner, the inner support section 314 of the seal support assembly 108 may be coupled to the first seal segment 110A, which may allow for the seal support assembly to maintain a radial position of the first seal segment 110A.

Notably, for the embodiment depicted, the seal support assembly 108 includes a leaf spring support 332 positioned between the axial ledge 326 and the inner support section 314. In such a manner, the leaf spring support 332 may couple the inner support section 314 (and, e.g., the first flexible extension 308A, the second flexible extension 308B, and the driver extension 310) to the first seal segment 110A. The leaf spring support 332 may allow for some movement of the first seal segment 110A along the radial direction R as a result of, e.g., a pressure change from a high-pressure side 126 of the seal assembly 106 to a low-pressure side 128 of the seal assembly 106. In such manner, the leaf spring support 332 may allow for a tighter radial clearance during the high-pressure operation of the turbine engine.

It will be appreciated, however, that in other exemplary embodiments, the seal support assembly 108 may be configured in other suitable manners. For example, referring now to FIG. 57, a seal support assembly 108 in accordance with another exemplary embodiment of the present disclosure is provided. The seal support assembly 108 of FIG. 57 may be configured in a similar manner as exemplary seal support assembly 108 described above with reference to FIGS. 56A and 56B.

Figure 57:
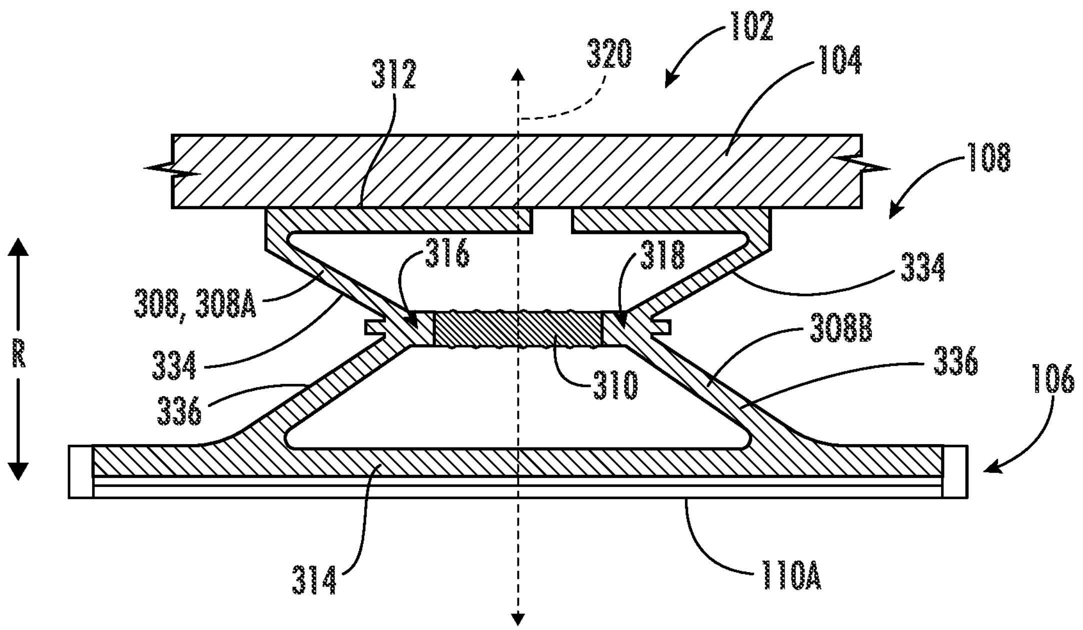
FIG. 57 is a close-up, schematic, cross-sectional view of a rotor, a stator having a carrier, a seal assembly, and a seal support assembly in accordance with another embodiment of the present disclosure.

However, for the embodiment of FIG. 57, a first flexible extension 308A and a second flexible extension 308B are coupled to an outer support section 312 at one or more locations farther from an extension axis 320 than a first connection point 316 and a second connection point 318 of the driver extension 310. For example, for the embodiment of FIG. 57, the first flexible extension 308A and the second flexible extension 308B each includes a converging section 334 and a diverging section 336, each with respect to the extension axis 320. The driver extension 310 is coupled to the first flexible extension 308A at a location between the converging section 334 and the diverging section 336 of the first flexible extension 308A. The driver extension 310 is further coupled to the second flexible extension 308B at a location between the converging section 334 and the diverging section 336 of the second flexible extension 308B.

In such a manner, it will be appreciated that a first material forming the driver extension 310 defines a coefficient of thermal expansion greater than a coefficient of thermal expansion of a material forming the first flexible extension 308A and the second flexible extension 308B. Accordingly, an increase in a temperature of, e.g., a working gas through a working gas flowpath through which the stator 102 is positioned will create an inward movement of the first seal segment 110A in a manner similar to as described above with reference to FIGS. 56A and 56B.

It will be appreciated, however, that in other exemplary embodiments, the seal support assembly 108 may be configured in still other suitable manners. For example, referring generally to FIGS. 58 through 61 and 64 through 69, various alternative exemplary embodiments of a seal support assembly 108 in accordance with exemplary aspects of the present disclosure are provided. Each of these exemplary embodiments may be configured in a similar manner as the exemplary seal support assembly 108 described above with terms to, e.g., FIGS. 56A through 57.

Figure 58:
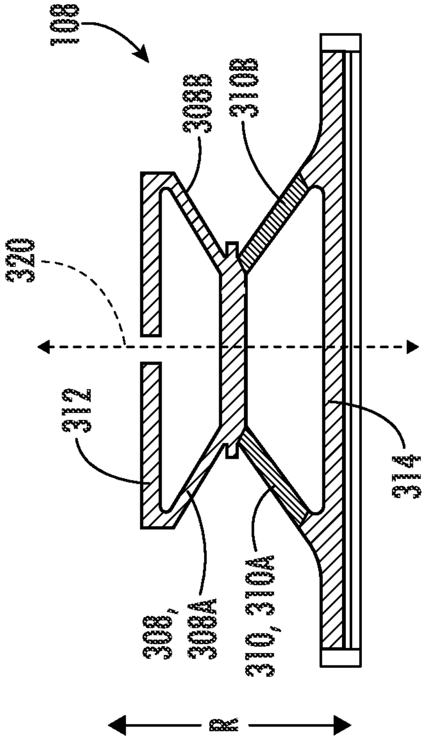
FIG. 58 is a close-up, schematic, cross-sectional view of a rotor, a stator having a carrier, a seal assembly, and a seal support assembly in accordance with another embodiment of the present disclosure in a first position.
Figure 59:
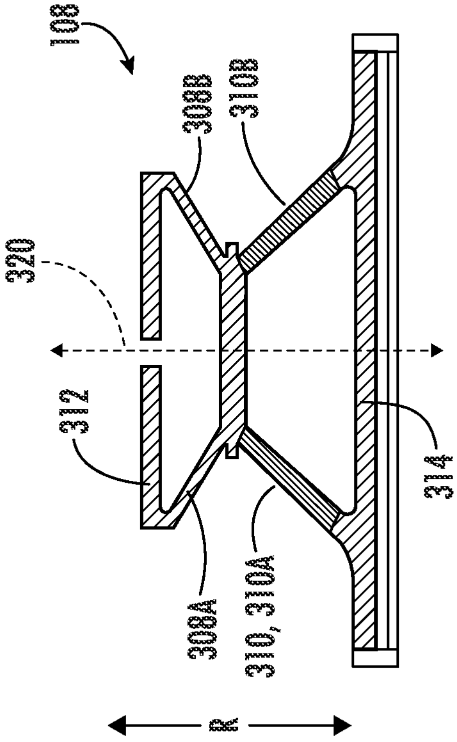
FIG. 59 is a close-up, schematic, cross-sectional view of the embodiment of FIG. 58 in a second position.

For example, with reference to FIGS. 58 and 59, a seal support assembly 108 is depicted in a first, low power operating edition (FIG. 58) and a second, high-power operating condition (FIG. 59). For the embodiment of FIGS. 58 and 59, a driver extension 310 of the seal support assembly 108 is arranged in series with a flexible extension 308. More specifically, the seal support assembly 108 includes a first driver extension 310A and a first flexible extension 308A arranged in series, as well as a second driver extension 310B and a second flexible extension 308B also arranged in series.

Figure 60:
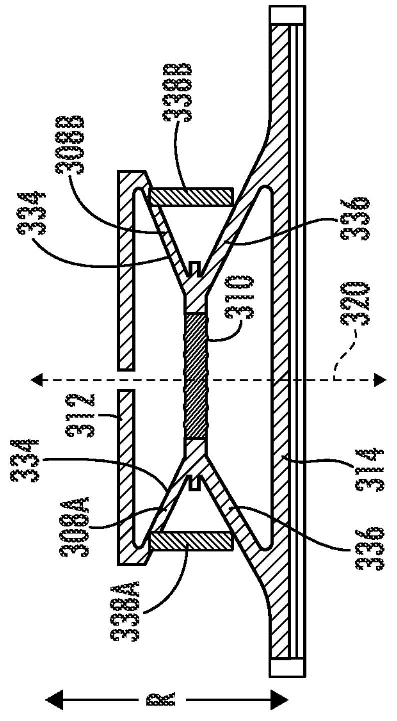
FIG. 60 is a close-up, schematic, cross-sectional view of a rotor, a stator having a carrier, a seal assembly, and a seal support assembly in accordance with another embodiment of the present disclosure in a first position.
Figure 61:
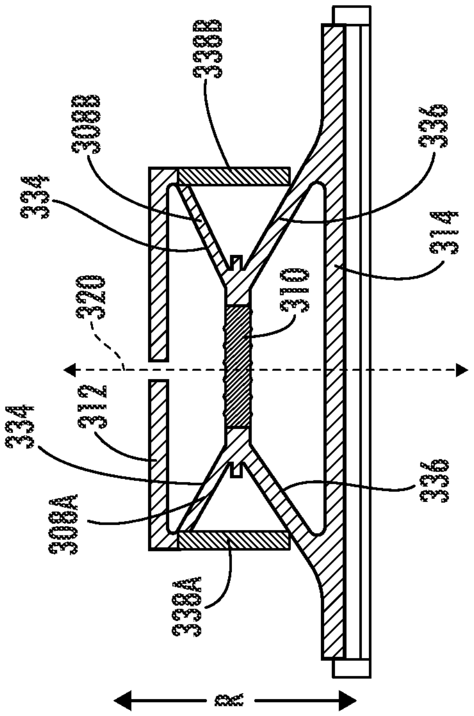
FIG. 61 is a close-up, schematic, cross-sectional view of the embodiment of FIG. 60 in a second position.

With reference to FIGS. 60 and 61, a seal support assembly 108 is again depicted in a first, low power operating condition (FIG. 60) and a second, high-power operating condition (FIG. 61). The embodiment of FIGS. 60 and 61 includes a first flexible extension 308A having a converging section 334 and a diverging section 336, and similarly, a second flexible extension 308B includes a converging section 334 and a diverging section 336. For the exemplary seal support assembly 108 depicted, the seal support assembly 108 further includes a first support member 338A extending between the converging section 334 and diverging section 336 of the first flexible extension 308A as well as a second support member 338B extending between the converging section 334 and diverging section 336 of the second flexible extension 308B.

Figure 62:
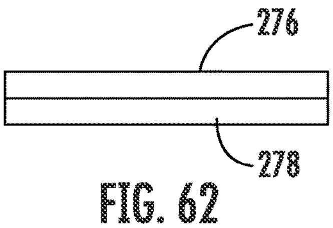
FIGS. 62 and 63 provide schematic views of a bimetallic member in accordance with an exemplary aspect of the present disclosure in a first position and in a second position, respectively.
Figure 63:
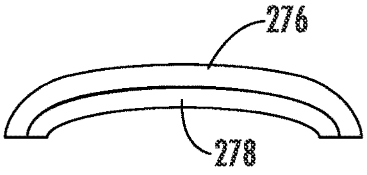

In at least certain exemplary embodiments, the first support member 338A, the second support member 338B, or both may be configured as a bimetallic member. For example, referring to FIGS. 62 and 63, a bimetallic member in accordance with an exemplary aspect of the present disclosure is depicted. The bimetallic member includes a first layer 276 and a second layer 278. The first layer 276 is formed of a first material having a coefficient of thermal expansion greater than a material forming the second layer 278. In such manner, when a temperature of the bimetallic member is increased (see FIG. 63) a length of the bimetallic member may be affected. In certain embodiments, the length of the bimetallic member may be increased, and in another exemplary embodiment, the length of the bimetallic member may be decreased, as a result of being exposed to an increase in temperature.

Figure 64:
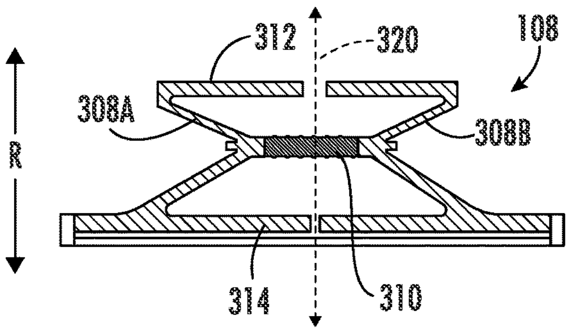
FIG. 64 is a close-up, schematic, cross-sectional view of a rotor, a stator having a carrier, a seal assembly, and a seal support assembly in accordance with another embodiment of the present disclosure in a first position.
Figure 65:
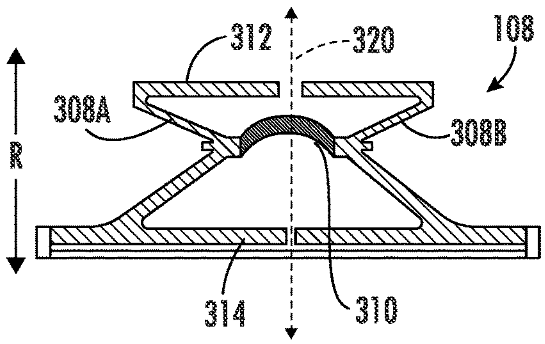
FIG. 65 is a close-up, schematic, cross-sectional view of the embodiment of FIG. 64 in a second position.

Referring now to FIGS. 64 and 65, a seal support assembly 108 is again depicted in a first, low power operating condition (FIG. 64) and a second, high-power operating condition (FIG. 65). The embodiment of FIGS. 64 and 65 may be configured in substantially the same manner as the embodiment described above with reference to FIG. 57. However, for the embodiment of FIGS. 64 and 65, the driver extension 310 of the seal support assembly 108 extending between a first flexible extension 308A and a second flexible extension 308B is formed of a bimetallic member. For the embodiment depicted, the bimetallic number may be configured to expand in length when exposed to elevated temperatures relative to the first flexible extension 308A and the second flexible extension 308B (see FIG. 68 relative to FIG. 64).

Figure 66:
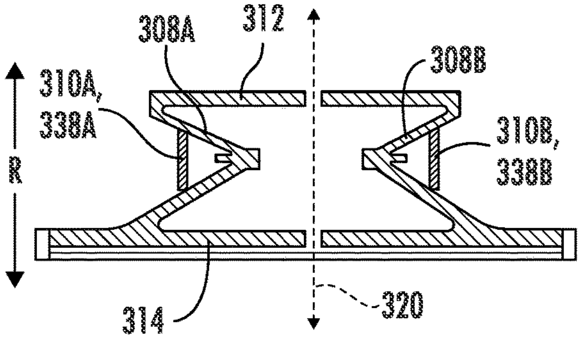
FIG. 66 is a close-up, schematic, cross-sectional view of a rotor, a stator having a carrier, a seal assembly, and a seal support assembly in accordance with another embodiment of the present disclosure in a first position.
Figure 67:
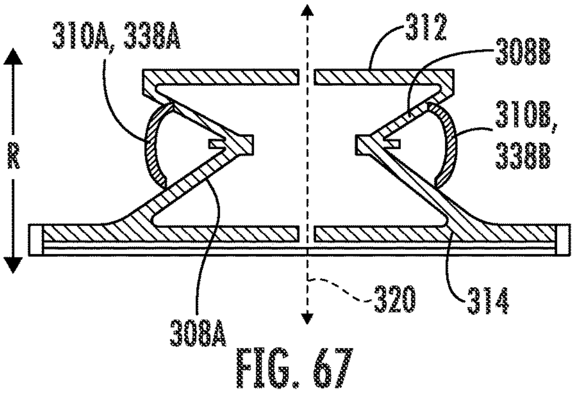
FIG. 67 is a close-up, schematic, cross-sectional view of the embodiment of FIG. 66 in a second position.

Referring now to FIGS. 66 and 67, yet another exemplary embodiment of a seal support assembly 108 is provided in accordance with an exemplary aspect of the present disclosure. The exemplary embodiment of FIGS. 66 and 67 may be configured in substantially the same manner as the exemplary embodiment described above with reference to FIGS. 60 and 61. For the embodiment of FIGS. 66 and 67, the first support member 338A and second support member 338B are each configured as bimetallic members. Further, for the embodiment depicted, the first support member 338A and the second support member 338B are further configured as a first driver extension 310A and a second driver extension 310B.

Figure 68:
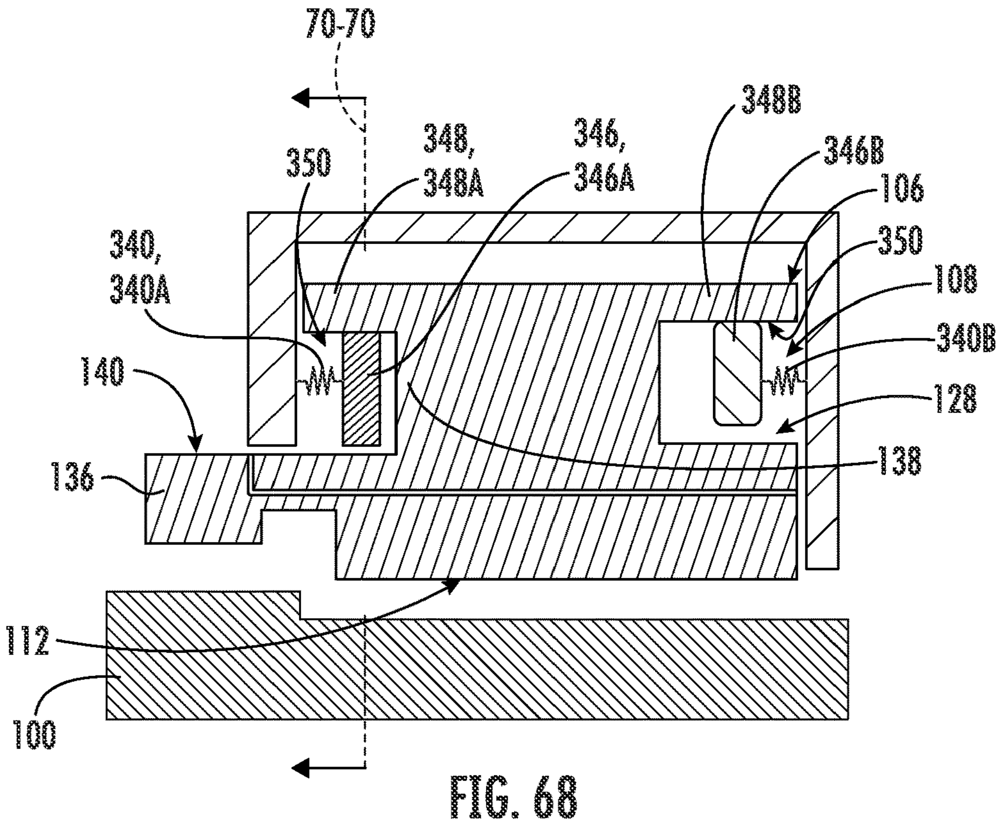
FIG. 68 is a close-up, schematic, cross-sectional view of a rotor, a stator having a carrier, a seal assembly, and a seal support assembly in accordance with another embodiment of the present disclosure in a first position.

Referring now to FIG. 68, an assembly in accordance with another exemplary embodiment of the present disclosure is provided. FIG. 68 provides a schematic, cross-sectional view of a section of a turbine engine, and more specifically of a section of a stator 102 having a carrier 104, a rotor 100, a seal assembly 106 positioned between the carrier 104 and the rotor 100, and a seal support assembly 108. The assembly of FIG. 68 may be configured in a similar manner as one or more of the exemplary assemblies described above.

For example, the seal assembly 106 of the exemplary embodiment of FIG. 68 includes a first seal segment 110A, the first seal segment 110A having a seal face 112 configured to form a fluid bearing with the rotor 100. In at least certain exemplary embodiments, the first seal segment 110A may be one of a plurality of seal segments 110 of the seal assembly 106 arranged, e.g., along the circumferential direction C of the turbine engine.

However, the seal support assembly 108 for the embodiment shown includes a torsional spring extension 340 extending from the carrier 104, from the first seal segment 110A, or both to bias the first seal segment 110A along the radial direction R. More specifically, it will be appreciated that the seal assembly 106 defines a high-pressure side 126 and a low-pressure side 128. Additionally, the first seal segment 110A includes a body 138 and a lip 136 extending from the body 138 along an axial direction A of the turbine engine on the high-pressure side 126 of the seal assembly 106. The lip 136 includes an outer pressurization surface 140 along the radial direction R of the turbine engine. The torsional spring extension 340 of the seal support assembly 108 is provided to at least partially counter a pressure on the outer pressurization surface 140 during operation of the turbine engine, while allowing for passive control of a radial clearance gap defined between the seal face 112 and the rotor 100 during operation of the turbine engine.

Figure 69:
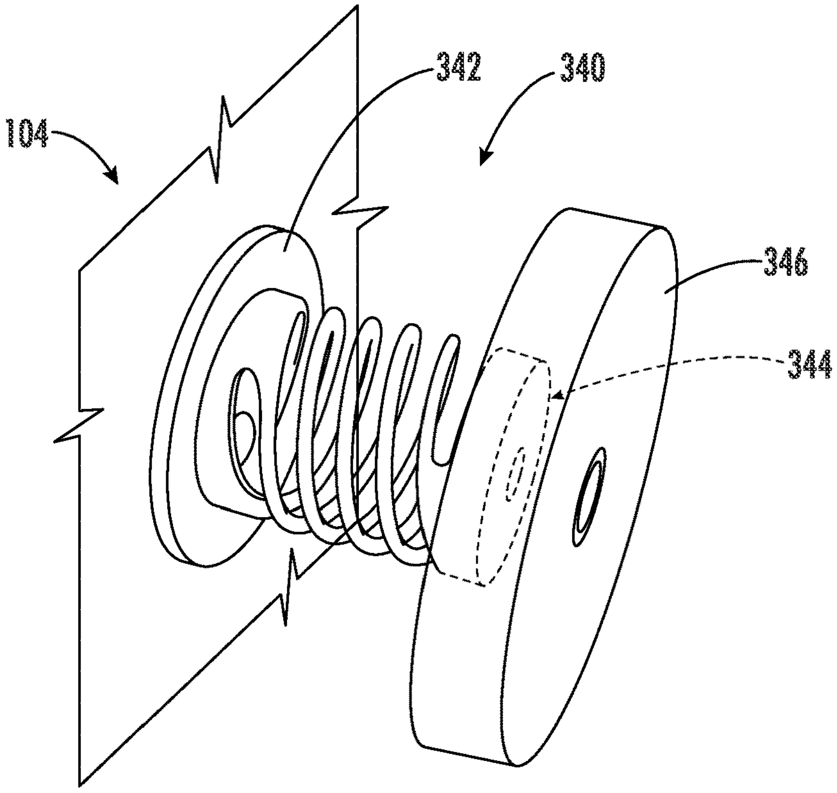
FIG. 69 is a perspective view of a torsional spring and cam of the exemplary seal support assembly of FIG. 68.

More specifically, referring particularly to FIG. 69, a perspective view of a portion of the seal support assembly 108 of FIG. 68 is provided. As noted, the seal support assembly 108 includes the torsional spring extension 340 extending from the carrier 104, from the first seal segment 110A, or both. In particular, for the embodiment shown, the torsional spring extension 340 extends between a base 342 and a distal end 344. The base 342 of the torsional spring extension 340 is coupled to the carrier 104. For the embodiment shown, the seal support assembly 108 further includes a cam 346 coupled to the distal end 344 of the torsional spring extension 340.

More specifically, referring back to FIG. 68, it will be appreciated that the first seal segment 110A includes a support extension 348 extending at least partially along the axial direction A of the turbine engine. The support extension 348 defines an inner support surface 350 along the radial direction R, and the cam 346 is positioned to engage the inner support surface 350.

More specifically, for the embodiment of FIG. 68, it will be appreciated that the torsional spring extension 340 is a first torsional spring extension 340A positioned at the high-pressure side 126 of the seal assembly 106, and that the seal support assembly 108 further includes a second torsional spring extension 340B positioned at the low-pressure side 128. Further, the cam 346 is a first cam 346A coupled to the distal end 344 of the first torsional spring extension 340A (see, e.g., FIG. 69), and the seal support assembly 108 further includes a second cam 346B coupled to a distal end 344 of the second torsional spring extension 340B (see, e.g., FIG. 69). The second torsional spring extension 340B is coupled at a base 342 to the carrier 104 (see, e.g., FIG. 69).

Additionally, the support extension 348 is a first support extension 348A positioned at the high-pressure side 126 of the seal assembly 106, and the first seal segment 110A further includes a second support extension 348B positioned at the low-pressure side 128 of the seal assembly 106. The second support extension 348B similarly includes an inner support surface 350. The first cam 346A is positioned to engage the inner support surface 350 of the first support extension 348A and the second cam 346B is positioned to engage the inner support surface 350 of the second support extension 348B.

Such a configuration may prevent or minimize a twisting of the first seal segment 110A during operation of the turbine engine.

Figure 70:
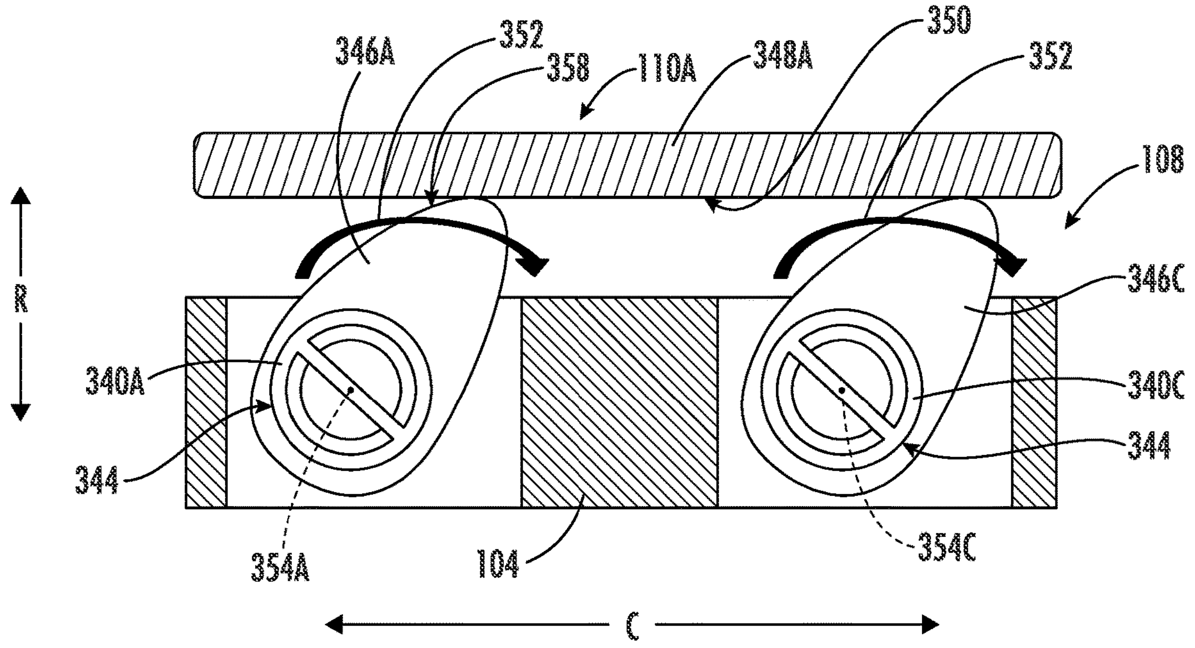
FIG. 70 is an aft-looking-forward, schematic view of a portion of the seal support assembly of FIG. 68, as viewed along Line 70-70 in FIG. 68, in the first position.

Referring now to FIG. 70, an aft-looking-forward, schematic view of a portion of the seal support assembly 108 of FIG. 68 is provided along Line 70-70.

As will be appreciated from the view of FIG. 70, the seal support assembly 108 further includes a third torsional spring extension 340C spaced from the first torsional spring extension 340A along the circumferential direction C of the turbine engine. The seal support assembly 108 includes a third cam 346C coupled to the third torsional spring extension 340C. The third cam 346C is positioned to engage the inner support surface 350 of the support extension 348 of the first seal segment 110A.

As will be appreciated from the arrows 352 in FIG. 70, the first cam 346A and the third cam 346C are each configured to rotate in a common circumferential direction C in the aft-looking-forward view of FIG. 70. More specifically, the first torsional spring extension 340A defines a first extension axis 354A and the third torsional spring extension 340C defines a third extension axis 354C. The first cam 346A is configured to rotate about the first extension axis 354A and the third cam 346C is configured to rotate about the third extension axis 354C, each in a clockwise direction in response to an increase in downward force by the first seal segment 110A in the aft-looking-forward view of FIG. 70.

Briefly referring back to FIG. 68, it will be appreciated that the seal support assembly 108 may further include a fourth torsional spring extension and a forth cam (not shown) spaced from the second torsional spring extension 340B and second cam 346B along the circumferential direction C, arranged in a similar manner as the first torsional spring extension 340A and third torsional spring extension 340C described above with reference to FIG. 70.

As will be appreciated, the seal support assembly 108 may be configured to passively control a radial gap defined between the seal face 112 of the first seal segment 110A and the rotor 100 during operation of the turbine engine based on, e.g., an operating condition of the turbine engine. More specifically, for the embodiment of FIGS. 68 through 70, the seal support assembly 108 is configured to passively control the radial gap based on a pressure on the outer pressurization surface 140 of the lip 136 of the first seal segment 110A, which may create a higher amount of inward force along the radial direction R on the first seal segment 110A.

As will be appreciated, during a first operating condition, such as a pre-startup operating condition, a pressure may be relatively low or zero. During a second operating condition, such as a low-power operating condition, the pressure may be higher than during the first operating condition. Further, during a third operating condition, such as a high-power operating condition, the pressure may be higher than during the first operating condition and the second operating condition.

The view depicted in FIGS. 68 and 70 may be representative of a position of the first seal segment 110A and seal support assembly 108 during the first operating condition. In this configuration, the radial clearance gap between the rotor 100 and the seal face 112 may be relatively large to, e.g., accommodate anticipated vibrations, rotor bow, etc.

Figure 71:
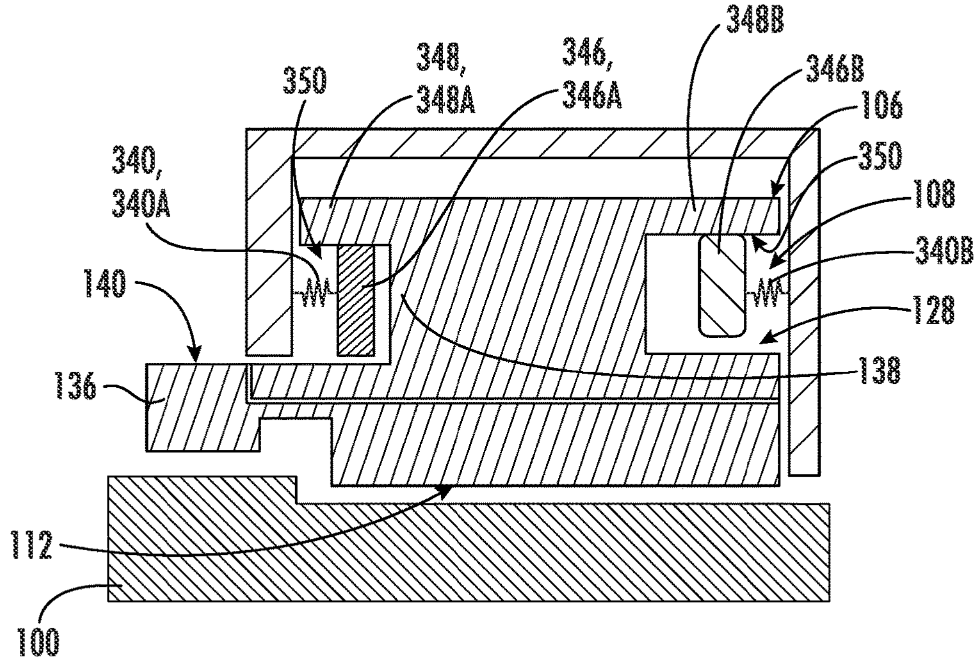
FIG. 71 is a close-up, schematic, cross-sectional view of the embodiment of FIG. 68 in a second position.
Figure 72:
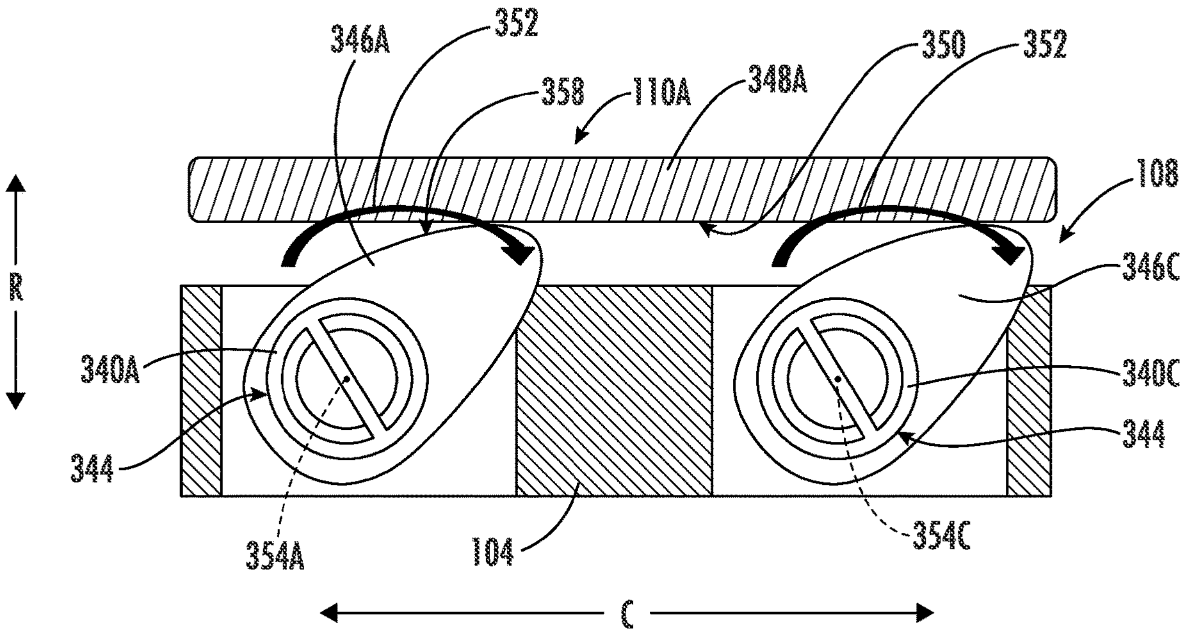
FIG. 72 is a close-up, schematic, cross-sectional view of the exemplary seal support assembly of FIG. 70 in the second position.

Referring to FIGS. 71 and 72, the above embodiment is depicted in a position representative of the first seal segment 110A and the seal support assembly 108 during the second operating condition. In this configuration, the radial clearance gap may be less than shown in FIG. 68, but still large enough to accommodate anticipated vibrations at the low-power operating condition without creating a rub between the first seal segment 110A and the rotor 100.

Figure 73:
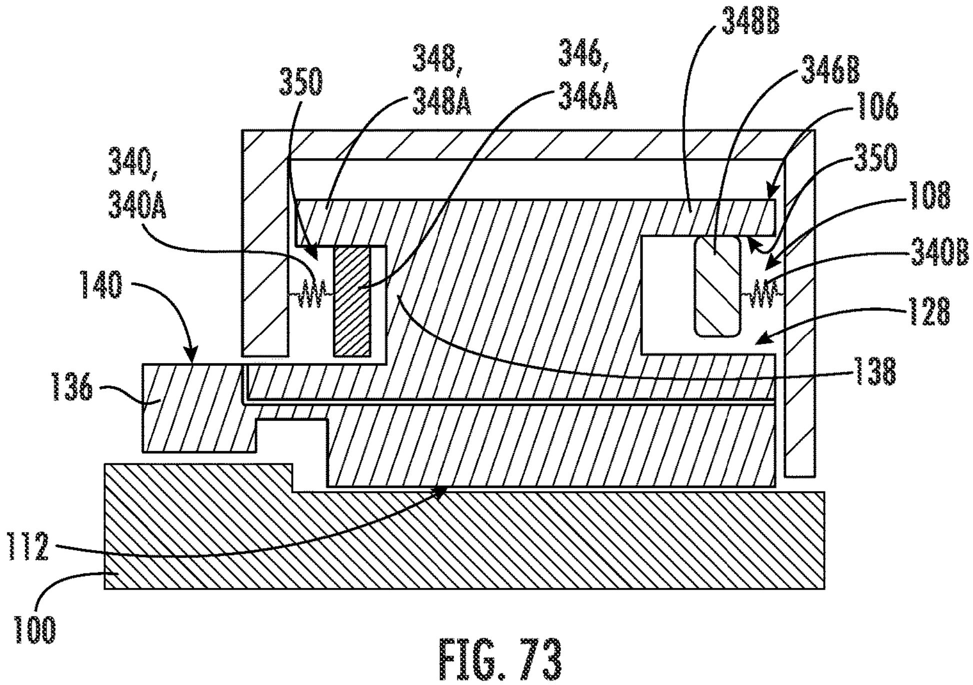
FIG. 73 is a close-up, schematic, cross-sectional view of the embodiment of FIG. 68 in a third position.

Referring to FIG. 73, the above embodiment is depicted in a position representative of the first seal segment 110A and the seal support assembly 108 during the third operating condition. In this configuration, the radial clearance gap may be less than the radial clearance gap shown in FIG. 71, such that the turbine engine may operate at an increased efficiency during this operating condition where a relatively low amount of vibration is expected.

It will be appreciated, however, that the embodiment described above with reference to FIGS. 68 through 73 is provided by way of example only. In other exemplary embodiments, the assembly may have any other suitable configuration.

Figure 74:
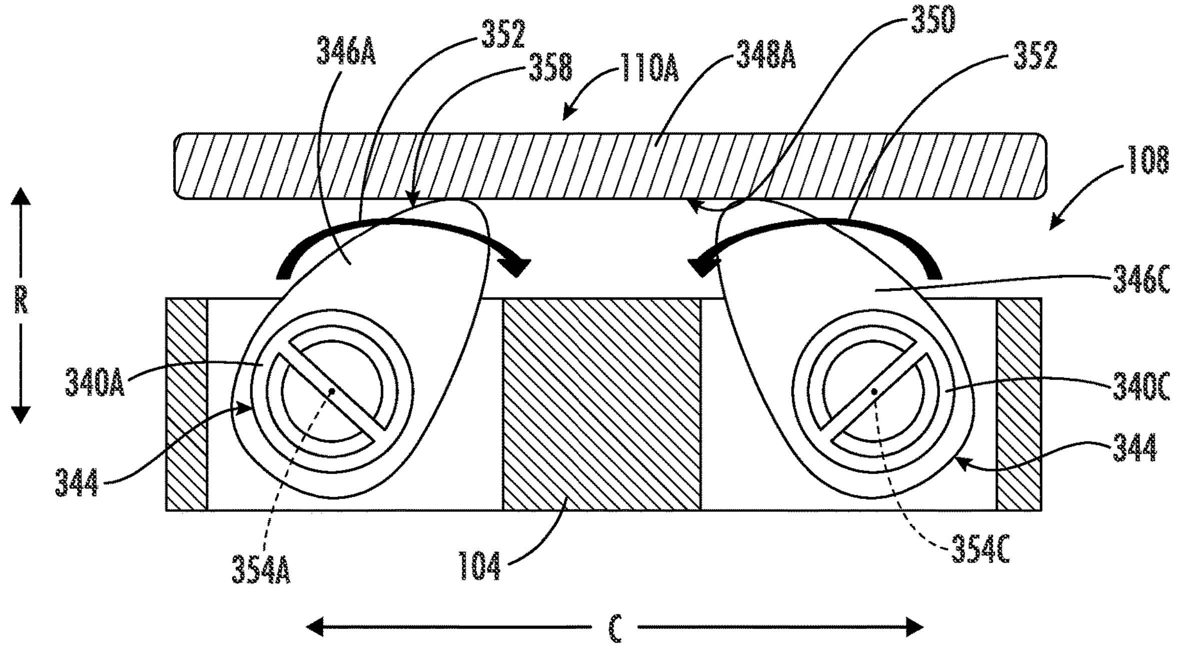
FIG. 74 is a seal support assembly in accordance with another exemplary embodiment of the present disclosure.
Figure 75:
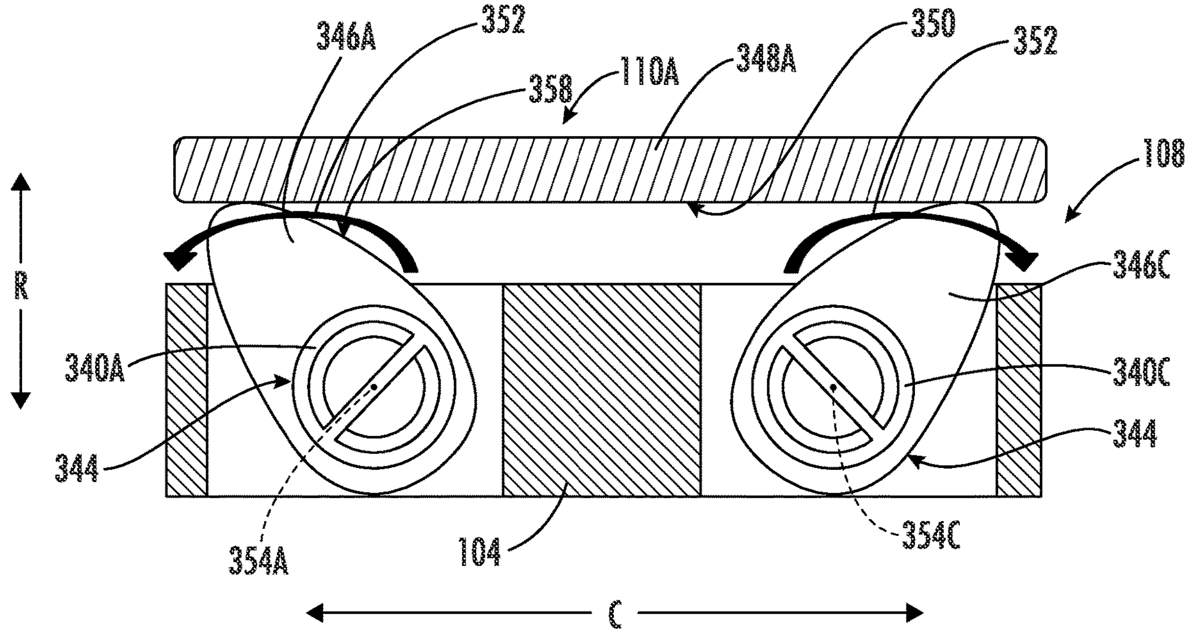
FIG. 75 is a seal support assembly in accordance with another exemplary embodiment of the present disclosure.

For example, referring to FIGS. 74 and 75, two additional embodiments of a seal support assembly 108 of the present disclosure are provided. Each of the seal support assemblies 108 in FIGS. 74 and 75 may generally include a first torsional spring extension 340A and a first cam 346A coupled to the first torsional spring extension 340A, as well as a third torsional spring extension 340C and a third cam 346C coupled to the third torsional spring extension 340C. However, for the embodiments shown, and as is indicated by the directional arrows 352, the first cam 346A and third cam 346C are configured to rotate in opposite circumferential directions in the aft-looking-forward views depicted.

In particular, with reference to FIG. 74, the first cam 346A and third cam 346C are configured to rotate in circumferential directions toward one another, and referring to FIG. 75, the first cam 346A and third cam 346C are configured to rotate in circumferential directions away from one another.

Moreover, it will be appreciated that in the embodiments described above, each cam 346, such as the first cam 346A, generally defines an outer engagement surface 358 (see, e.g., FIG. 70). In the embodiments described above, the outer engagement surface 358 has a pear shape.

However, in other example embodiments, the seal support assembly 108 may be configured in any other suitable manner. For example, referring to FIGS. 76 through 78, a seal support assembly 108 in accordance with another exemplary embodiment is depicted. The seal support assembly 108 generally includes a torsional spring extension 340 extending from the carrier 104 and a cam 346 coupled to the torsional spring extension 340. The cam 346 is positioned to engage in inner support surface 350 of a support extension 348 of a first seal segment 110A.

Figure 76:
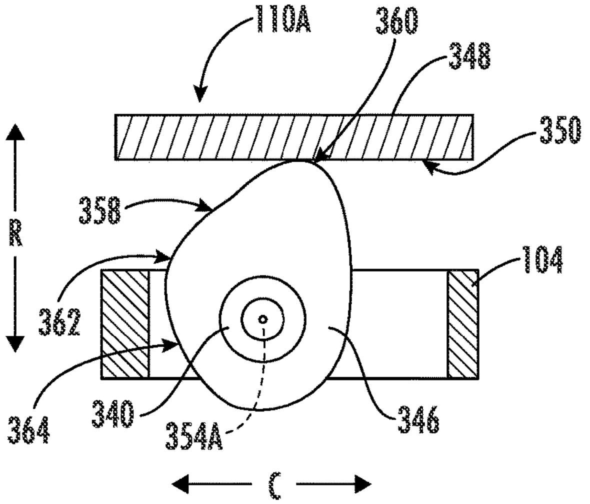
FIG. 76 is a schematic view of a cam in accordance with the present disclosure in a first position.
Figure 77:
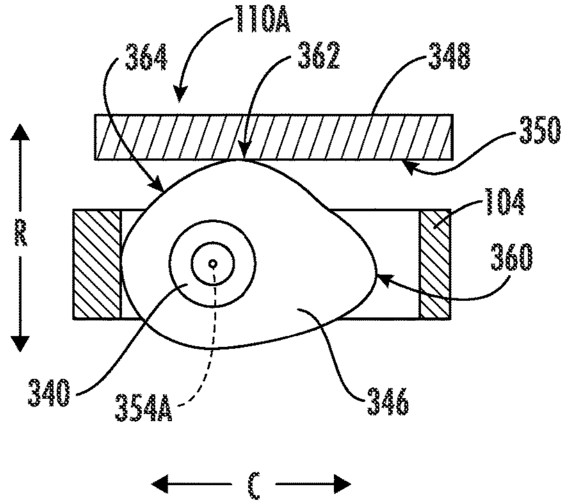
FIG. 77 is a schematic view of a cam in accordance with the present disclosure in a second position.
Figure 78:
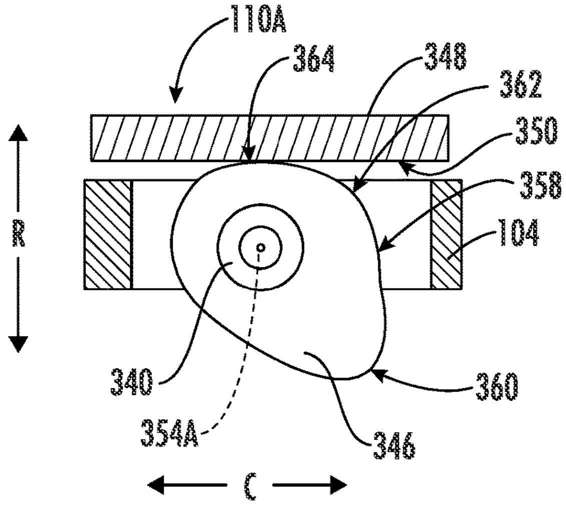
FIG. 78 is a schematic view of a cam in accordance with the present disclosure in a third position.

In the embodiment of FIGS. 76 through 78, the cam 346 defines an outer engagement surface 358, with the outer engagement surface 358 having a non-pear shape. In particular, the engagement surface includes a first bump 360, a second bump 362, and a flat 364. FIG. 76 depicts the first bump 360 of the engagement surface contacting the inner support surface 350 of the support extension 348, FIG. 77 depicts the second bump 362 of the engagement surface contacting the inner support surface 350 of the support extension 348, and FIG. 78 depicts the flat 364 of the engagement surface contacting the inner support surface 350 of the support extension 348.

Inclusion of the outer engagement surface 358 having a nonuniform transition across a length of the outer engagement surface 358 may allow for the seal support assembly 108 to provide a various amount of resistance along the radial direction R based on a relative radial position of the first seal segment 110A to the carrier 104. In such a manner, the seal support assembly 108 may bias the first seal segment 110A towards one or more predetermined positions along the radial direction during operation of the turbine engine (e.g., corresponding to three separate operating conditions of the turbine engine).

Figure 79:
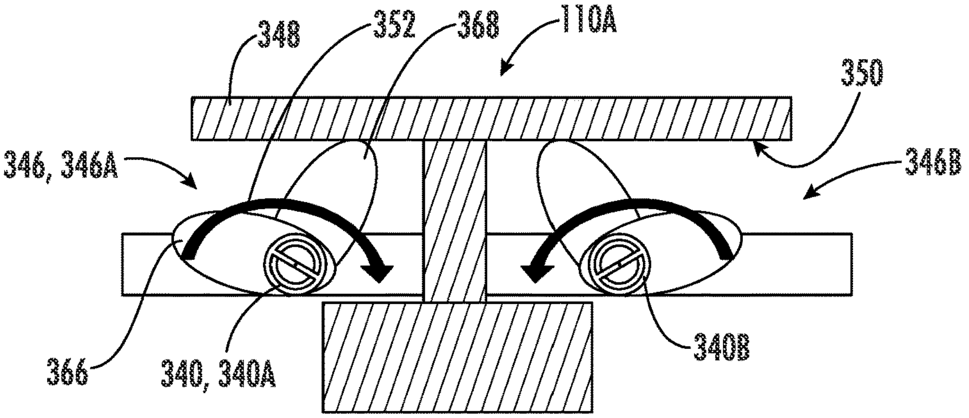
FIG. 79 depicts a conjugate cam in accordance with an aspect of the present disclosure in a first position.
Figure 80:
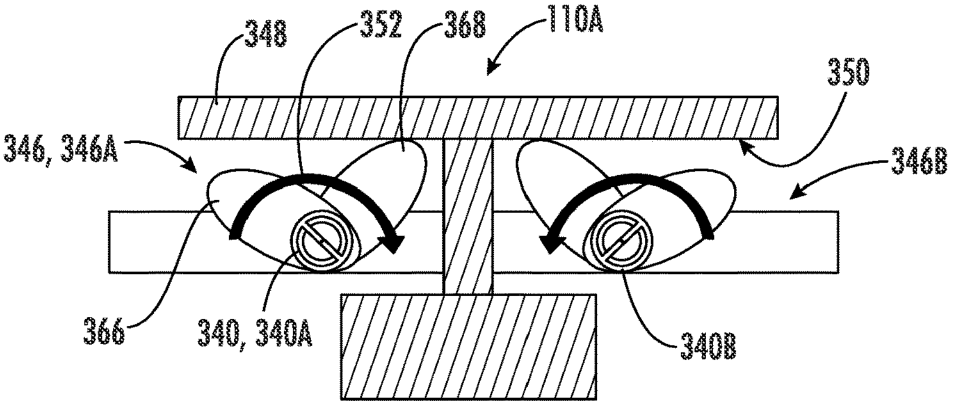
FIG. 80 depicts the exemplary conjugate cam of FIG. 78 in a second position.
Figure 81:
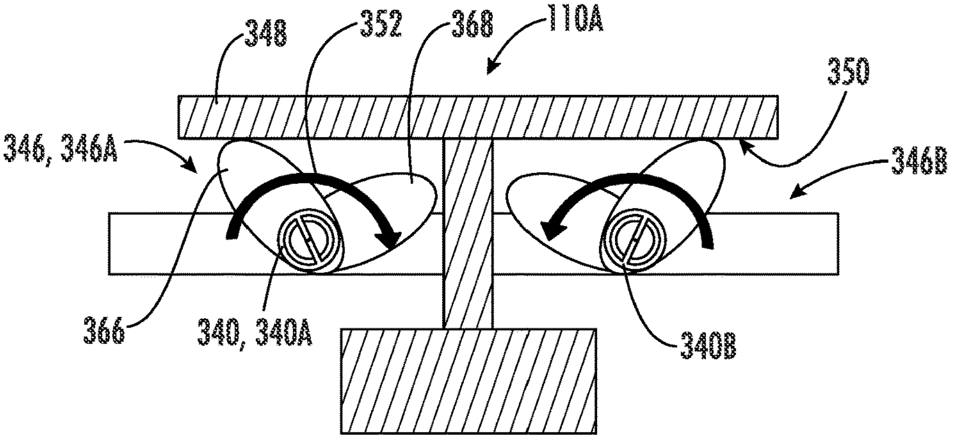
FIG. 81 depicts the exemplary conjugate cam of FIG. 78 in a third position.

Further, in still other exemplary embodiments, the seal support assembly 108 may include in the other suitable configuration to provide a desired resistance along the radial direction R. For example, referring now to FIGS. 79 through 81, a seal support assembly 108 in accordance with another exemplary embodiment of the present disclosure is provided having a torsional spring extension 340 and a cam 346 coupled to a distal end 344 of the torsional spring extension 340. However, for the embodiment of FIGS. 79 through 80, the cam 346 is a conjugate cam. The conjugate cam includes a first cam member 366 and a second cam member 368, with the first cam member 366 and second cam member 368 defining different shapes, different orientations, or both. FIG. 79 depicts the conjugate cam in a first position, FIG. 86 the conjugate cam in a second position, and FIG. 81 depicts the conjugate cam in a third position. The conjugate cam may similarly allow for the seal support assembly 108 to provide a various amount of resistance along the radial direction R based on a radial position of the first seal segment 110A relative to the carrier 104. In such a manner, the seal support assembly 108 may bias the first seal segment 110A towards one or more predetermined radial positions during operation of the turbine engine.

Moreover, in still other exemplary embodiments, the seal support assembly 108 may include other suitable configurations to provide a desired resistance along the radial direction R. For example, referring briefly to FIG. 82, a seal support assembly 108 in accordance with another exemplary embodiment of the present disclosure is provided.

Figure 82:
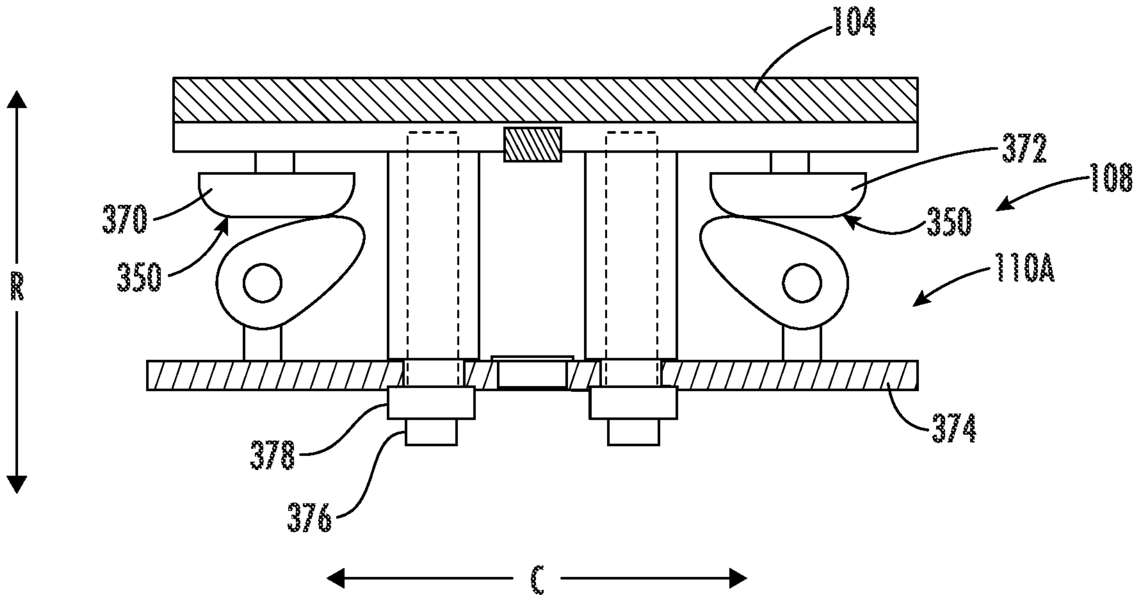
FIG. 82 is a close-up, schematic, cross-sectional view of a stator having a carrier, a seal assembly, and a seal support assembly in accordance with another embodiment of the present disclosure.

For the embodiment of FIG. 82, the seal support assembly 108 includes a first torsional spring extension 340A and a first cam 346A coupled to a distal end of the first torsional spring extension 340A, and a second torsional spring extension 340B and a second cam 346B coupled to a distal end 344 of the second torsional spring extension 340B. Moreover, for the embodiment depicted, a first seal segment 110A of the seal assembly 106 includes a first pad 370 defining an inner support surface 350 along the radial direction R and a second pad 372 also defining an inner support surface 350 along the radial direction R. The first cam 346A is positioned to engage with the inner support surface 350 of the first pad 370 and the second cam 346B is positioned to engage with the inner support surface 350 of the second pad 372. Notably, the inner support surface 350 of the first pad 370 and the inner support surface 350 of the second pad 372 are nonlinear, and instead defined a curve. Such a configuration may further provide for nonlinear force based on a radial displacement of the first seal segment 110A.

Moreover, for the embodiment of FIG. 82, it will be appreciated that the seal support assembly 108 is mounted in a prestressed condition (e.g., a spring extension is mounted such that at a neutral state of the seal support assembly 108, the spring extension is in a stressed state, such as compressed, tensioned, torqued, etc.). More specifically, the seal support assembly 108 includes a compression plate 374 configured to pre-compress the first torsional spring extension 340A and the second torsional spring extension 340B. A plurality of mounting bolts 376 and fasteners 378 are provided to maintain the seal support assembly 108 in the prestressed condition. The compression plate 374 may be a similar manner as the compression plate described below.

Figure 83:
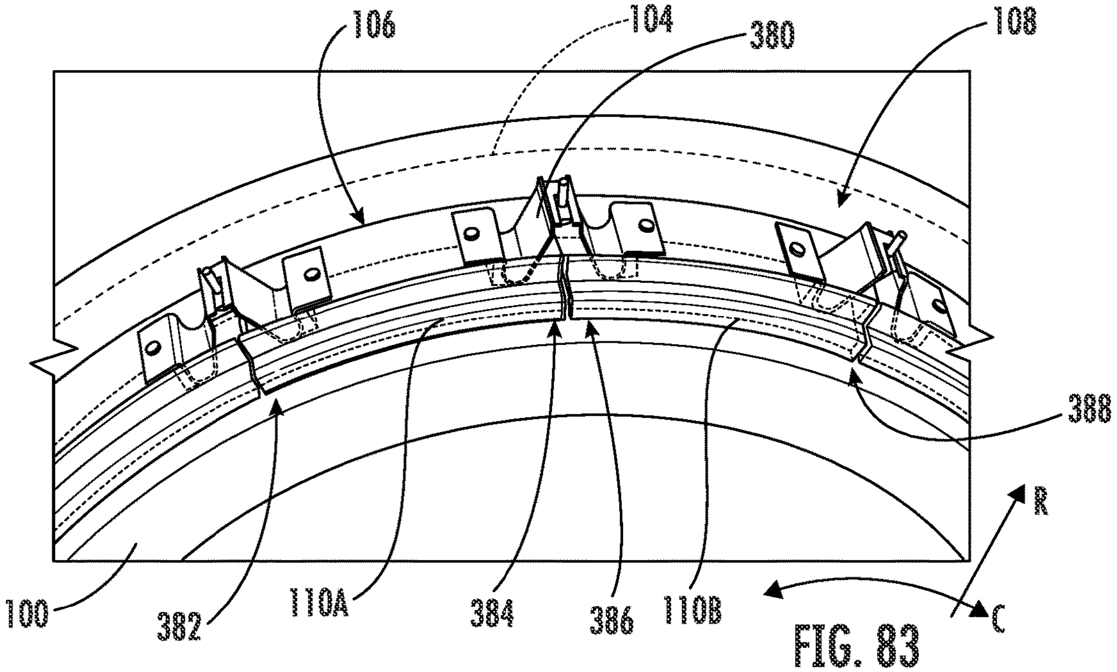
FIG. 83 provides a forward-looking-aft, perspective view of a stator having a carrier, a seal assembly, and a seal support assembly in accordance with another embodiment of the present disclosure.
Figure 84:
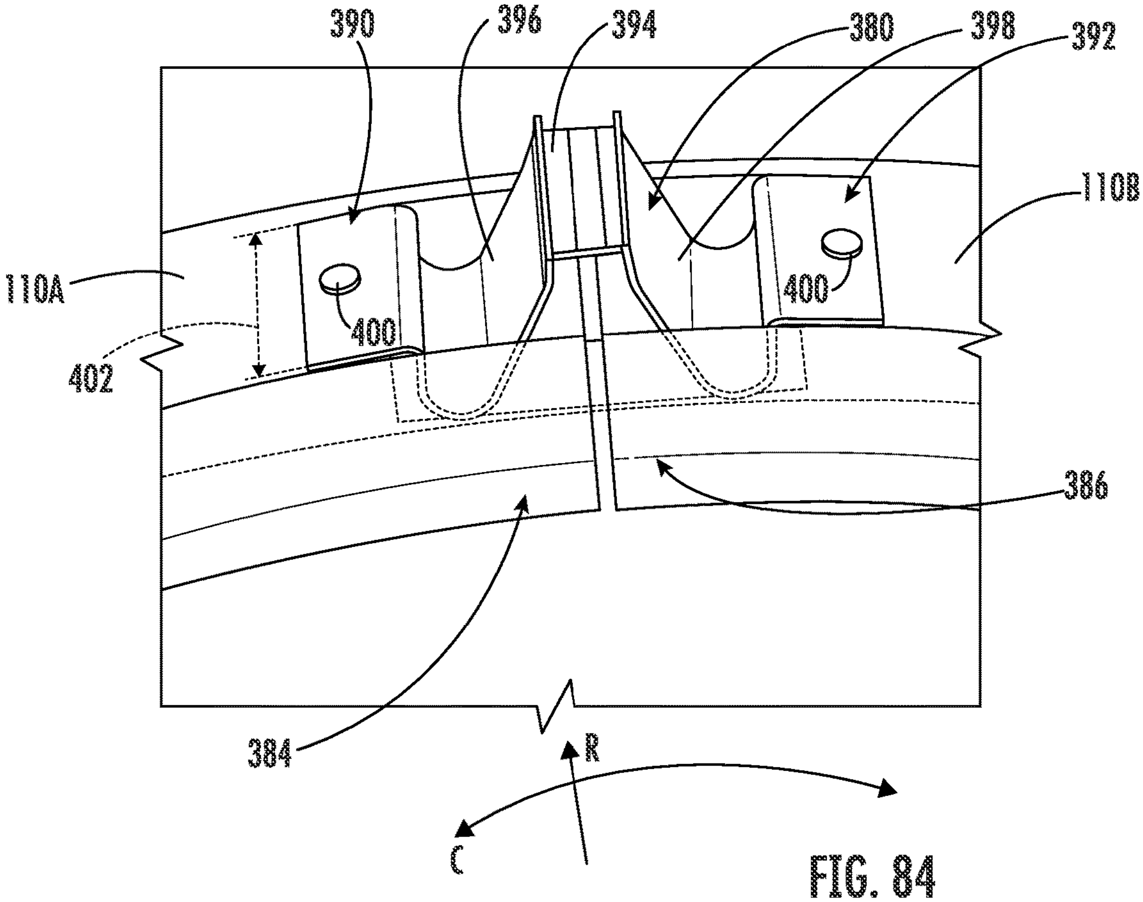
FIG. 84 provides a close-up view of a portion of the seal support assembly of FIG. 83.

Referring now to FIGS. 83 and 84, an assembly in accordance with another exemplary embodiment of the present disclosure is provided. FIG. 83 provides a forward-looking-aft, perspective view of a section of a turbine engine, and more specifically of a section of a stator 102 having a carrier 104, a rotor 100, a seal assembly 106 positioned between the carrier 104 and the rotor 100, and a seal support assembly 108. FIG. 84 provides a close-up of a portion of the assembly of FIG. 83. The assembly of FIGS. 83 and 84 may be configured in a similar manner as one or more of the exemplary assemblies described above.

For example, the seal assembly 106 includes a plurality of seal segments 110 supported at least in part by the carrier 104. The plurality of seal segments 110 includes a first seal segment 110A and a second seal segment 110B, each of the first seal segment 110A and the second seal segment 110B having a seal face 112 (not visible in the views of FIGS. 83 and 84) configured to form a fluid bearing with the rotor 100.

The seal support assembly 108 includes, for the embodiment shown, a tangential spring extension 380 extending between the first seal segment 110A and the second seal segment 110B for biasing the first seal segment 110A away from the second seal segment 110B in a circumferential direction C of the turbine engine.

In particular, referring particularly to FIG. 83, it will be appreciated that the first seal segment 110A extends between a first circumferential end 382 and a second circumferential end 384, and the second seal segment 110B similarly extends between a first circumferential end 386 and a second circumferential end 388. The tangential spring extension 380 is coupled to the first seal segment 110A proximate a second circumferential end 384 and to the second seal segment 110B proximate the first circumferential end 386.

More particularly, referring particularly to FIG. 84, it will be appreciated that the tangential spring extension 380 is configured as a bent plate spring. The bent plate spring extends between a first end 390 and a second end 392, and includes a middle section 394, a first segment 396 extending between the middle section 394 in the first end 390 and a second segment 398 extending between the middle section 394 and the second end 392. The tangential spring extension 380 is fixedly coupled to the first seal segment 110A at the first end 390 and to the second seal segment 110B at the second end 392 using mechanical fasteners 400. Each mechanical fastener 400 may be one or more of a pin, a screw, a bolt, a rivet, or the like.

Further still, it will be appreciated that for the embodiment depicted, the tangential spring extension 380 defines in part a first point of contact with the first seal segment 110A and a second point of contact with the second seal segment 110B. The tangential spring extension 380 defines an axial length 402 along an axial direction A at the first point of contact and at the second point of contact to prevent or minimize a twisting of the first seal segment 110A in the second seal segment 110B during operation of the turbine engine. For example, as will be appreciated from the description herein above, the seal face 112 of the first seal segment 110A further defines an axial length (see, e.g., axial length 180 depicted in FIG. 15). The axial length 402 of the tangential spring extension 380 at the first point of contact and at the second point of contact is between 5% and 100% of the axial length of the seal face 112 of the first seal segment 110A.

Figure 85:
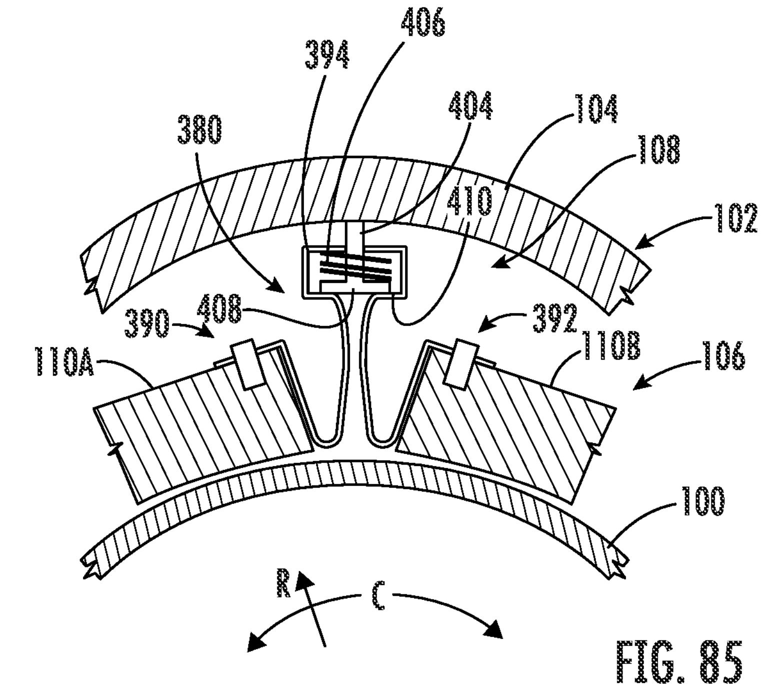
FIG. 85 is a close-up, schematic, cross-sectional view of a stator having a carrier, a seal assembly, and a seal support assembly in accordance with another embodiment of the present disclosure.

Referring now also to FIG. 85, a schematic, forward-looking-aft view of the assembly in FIG. 84 is provided. As will further be appreciated from the view of FIG. 85, the tangential spring extension 380 is further engaged with the carrier 104 to support the seal assembly 106, and more specifically to support the first seal segment 110A and the second seal segment 110B along the radial direction R. In the embodiment shown, the tangential spring extension 380 further includes a pin 404 fixedly or slidably coupled to the carrier 104 and the tangential spring extension 380 is engaged with the pin 404. In particular, for the embodiment of FIG. 85, the seal support assembly 108 includes a radial spring 406 and the tangential spring extension 380 is engaged with the pin 404 through the radial spring 406. For example, for the embodiment depicted, the pin 404 is fixedly coupled to the carrier 104 and includes a pinhead 408 spaced from the carrier 104. The middle section 394 of the tangential spring extension 380 is positioned outward of the pinhead 408 along the radial direction R, and the radial spring 406 extends between the middle section 394 of the tangential spring extension 380 and the pinhead 408 to bias the tangential spring extension 380 outwardly along the radial direction R. In such a manner, it will be appreciated that the radial spring 406 is positioned inward of the carrier 104 along the radial direction R for the embodiment shown.

Further, for the embodiment shown, the middle section 394 includes a ledge 410 positioned inward of the pinhead 408 of the pin 404 along the radial direction R, to act as a deflection limiter to limit a radially outward movement of the first segment 396 and the second segment 398 during operation of the turbine engine.

It will be appreciated that the seal support assembly 108 may be configured to maintain a circumferential spacing of the plurality of seal segments 110 of the seal assembly 106 during operation of the turbine engine. Further, the seal support assembly 108 may counter a pressure on an outer pressurization surface 140 of the seal segments 110 during operation of the turbine engine, while allowing for passive control of a radial clearance gap defined between the seal face 112 and the rotor 100 during operation of the turbine engine (see, e.g., FIG. 4).

It will be appreciated, however, that in other exemplary embodiments, the seal support assembly 108 may have any other suitable configuration.

Figure 86:
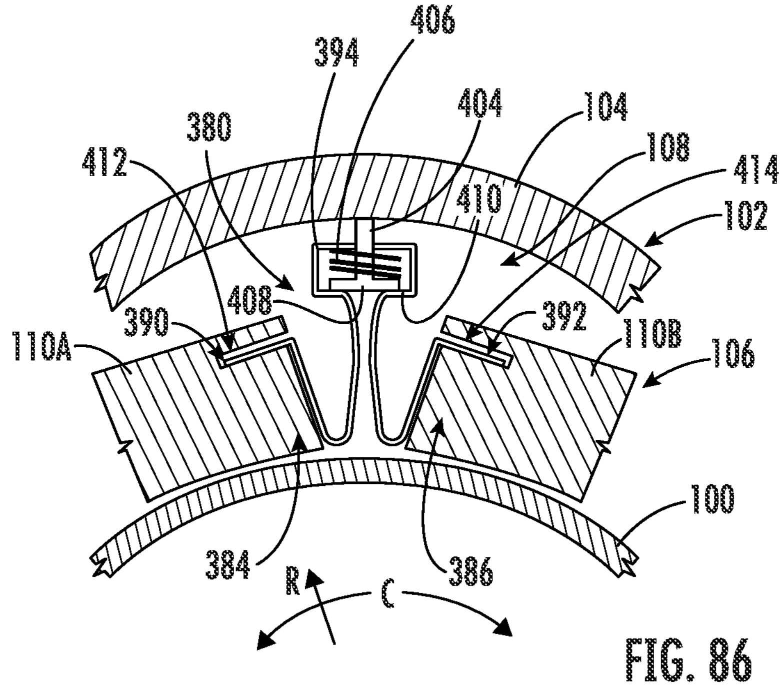
FIG. 86 is a close-up, schematic, cross-sectional view of a stator having a carrier, a seal assembly, and a seal support assembly in accordance with another embodiment of the present disclosure.

For example, referring briefly to FIG. 86, a schematic, forward-looking-aft view of an assembly in accordance with another exemplary embodiment of the present disclosure is provided. The assembly of FIG. 86 may be configured in substantially the same manner as the assembly of FIG. 85, described above. However, for the embodiment of FIG. 86, a first end 390 of a tangential spring extension 380 provided may not be fixedly coupled to a second circumferential end 384 of a first seal segment 110A and similarly a second end 392 of the tangential spring extension 380 may not be fixedly coupled to a first circumferential end 386 of a second seal segment 110B. Instead, for the embodiment of FIG. 86, the first seal segment 110A defines a tangential slot 412 at the second circumferential end 384 adjacent to the second seal segment 110B, and the second seal segment 110B defines a tangential slot 414 at the first circumferential end 386 adjacent to the first seal segment 110A. The first end 390 of the exemplary tangential spring extension 380 depicted is positioned in the tangential slot 412 of the first seal segment 110A, and the second end 392 of the tangential spring extension 380 is positioned in the tangential slot 414 of the second seal segment 110B. In such a manner, the tangential spring extension 380 may be slidably coupled to the first seal segment 110A and to the second seal segment 110B.

Figure 87:
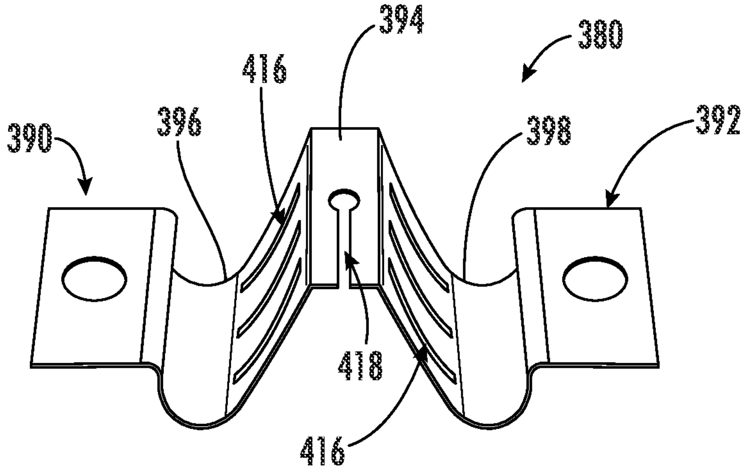
FIG. 87 a tangential spring extension in accordance with an exemplary embodiment of the present disclosure is provided.

Furthermore, referring briefly to FIG. 87, a tangential spring extension 380 in accordance with another exemplary embodiment of the present disclosure is provided. The exemplary tangential spring extension 380 of FIG. 87 may be configured in substantially the same manner as the exemplary tangential spring extension 380 described above. However, for the embodiment depicted, a first segment 396, a second segment 398 or both of the tangential spring extension 380 defines one or more stiffness modifiers 416. The stiffness modifier 416 refers to any feature operable to modify a stiffness of the first segment 396, the second segment 398, or both relative to a constant-thickness, solid plate spring design. For example, in the embodiment of FIG. 87, the one or more of stiffness modifiers 416 includes a plurality of openings defined in the first segment 396 and a plurality of openings defined in the second segment 398. However, in other example embodiments, the one or more stiffness modifiers 416 may be, e.g., a single opening, one or more ridges formed of the same or different material, one or more sections of increased thickness, etc.

As will further be appreciated from the view of FIG. 87, the middle section 394 may define a slot 418 to receive a pin configured to mount the tangential spring extension 380 to a carrier 104.

Moreover, in other exemplary embodiments, the tangential spring extension 380 may have still other suitable configurations. For example, referring to FIGS. 88 and 89, two additional exemplary tangential spring extensions 142 are depicted in accordance with one or more aspects of the present disclosure.

Figure 88:
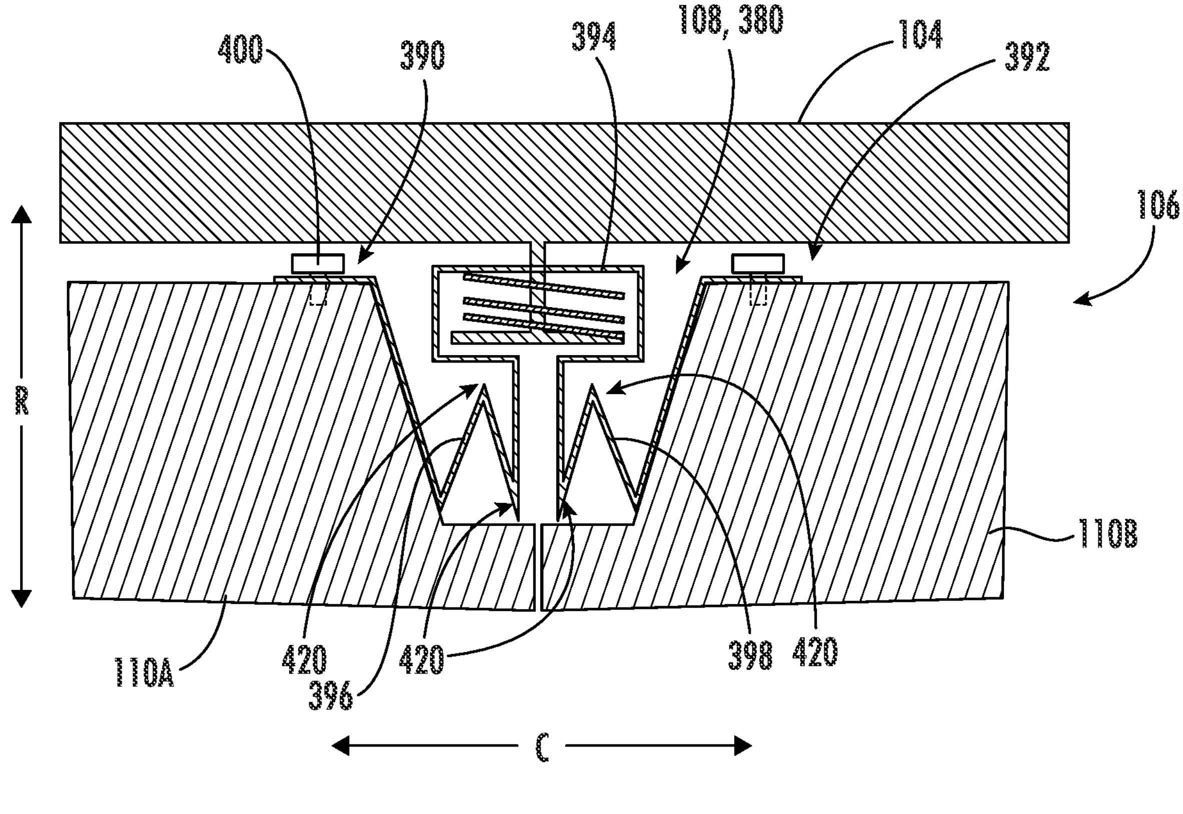
FIG. 88 is a close-up, schematic, cross-sectional view of a stator having a carrier, a seal assembly, and a seal support assembly in accordance with another embodiment of the present disclosure.

Referring particularly to FIG. 88, a first segment 396 of the tangential spring extension 380 depicted and a second segment 398 of the tangential spring extension 380 depicted each include a plurality of bends 420 to provide additional stiffness and/or flexibility in the circumferential direction C.

Figure 89:
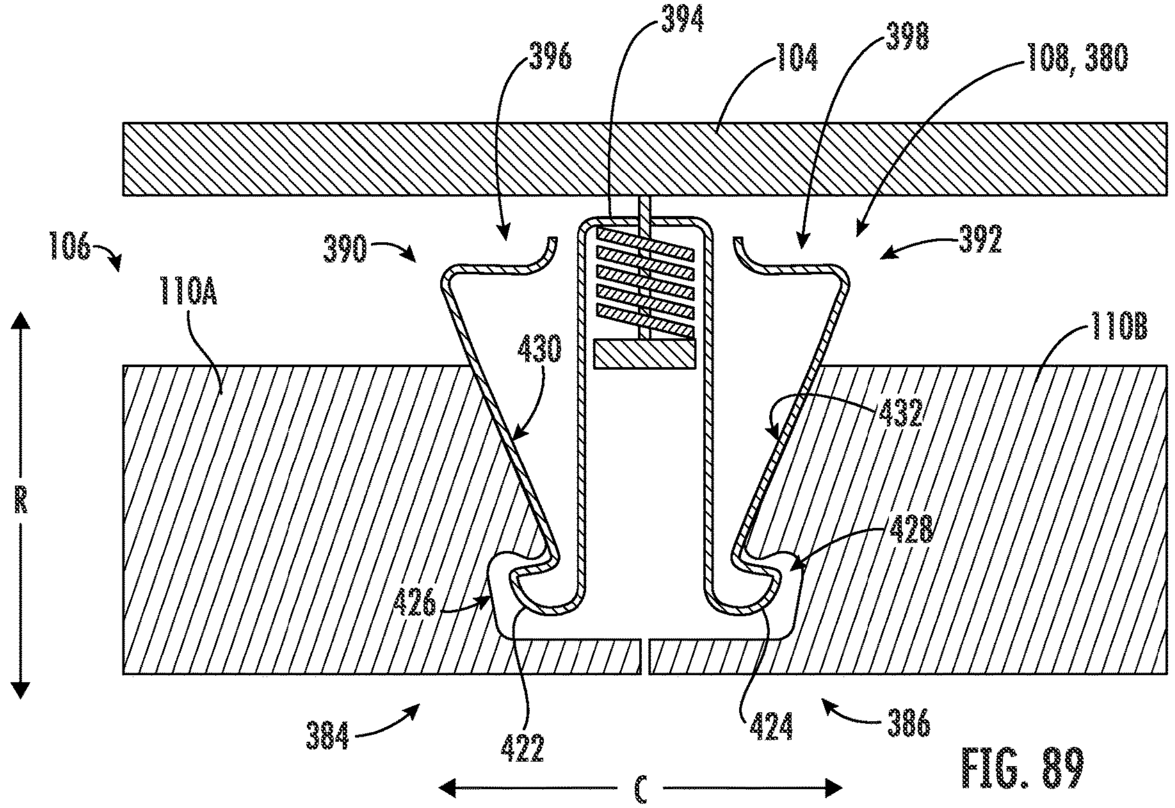
FIG. 89 is a close-up, schematic, cross-sectional view of a stator having a carrier, a seal assembly, and a seal support assembly in accordance with another embodiment of the present disclosure.

Referring particularly FIG. 89, a first segment 396 of the tangential spring extension 380 depicted and a second segment 398 of the tangential spring extension 380 depicted include a first projection 422 in between the middle section 394 and a first end 390 and a second projection 424 in between the middle section 394 and a second end 392. For the embodiment of FIG. 89, a first seal segment 110A includes a first slot 426 at a second circumferential end 384 with the first projection 422 of the first seal segment 110A positioned therein, and a second seal segment 110B includes a second slot 428 at a first circumferential end 386 with the second projection 424 of the second seal segment 110B positioned therein.

In addition, the first seal segment 110A includes a contact section 430 between the first end 390 and the first projection 422 configured to contact the second circumferential end 384 of the first seal segment 110A to provide a circumferential and a radial biasing force to the first seal segment 110A. Similarly, the second segment 398 includes a contact section 432 between the second end 392 and the second projection 424 to provide a circumferential and a radial biasing force to the second seal segment 110B. The contact sections 430, 432 are generally linear surfaces of the respective first and second seal segments 110A, 110B defining an angle with a radial direction R such that they slope towards the adjacent seal segment 110 as it moves inwardly along the radial direction R.

Accordingly, it will be appreciated that for the exemplary embodiment of FIG. 89, the tangential spring extension 380 is engaged with a circumferential end of the first seal segment 110A and a circumferential end of the second seal segment 110B.

Figure 90:
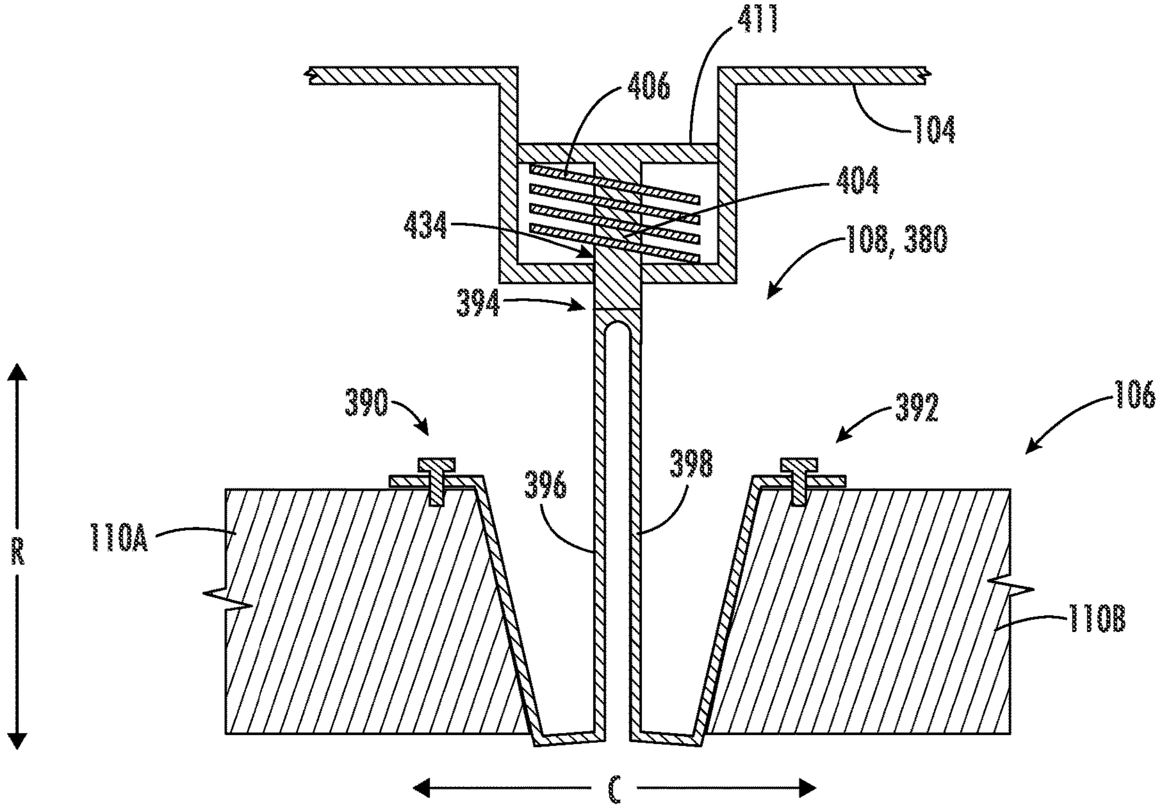
FIG. 90 is a close-up, schematic, cross-sectional view of a stator having a carrier, a seal assembly, and a seal support assembly in accordance with another embodiment of the present disclosure.

Further, still, in other exemplary embodiments, the tangential spring extension 380 may be supported relative to the carrier 104 in any other suitable manner. For example, referring now to FIG. 90, a radial spring 406 of the seal support assembly 108 is positioned at least partially outward of a carrier 104 along a radial direction R of the turbine engine. In particular, for the embodiment of FIG. 90, the tangential spring extension 380 is coupled to a pin 404 extending through an opening 434 in the carrier 104. The pin 404 includes a pinhead 411, and the radial spring 406 extends between the carrier 104 and the pinhead 411 to bias the tangential spring extension 380 outwardly along the radial direction R.

Figure 91:
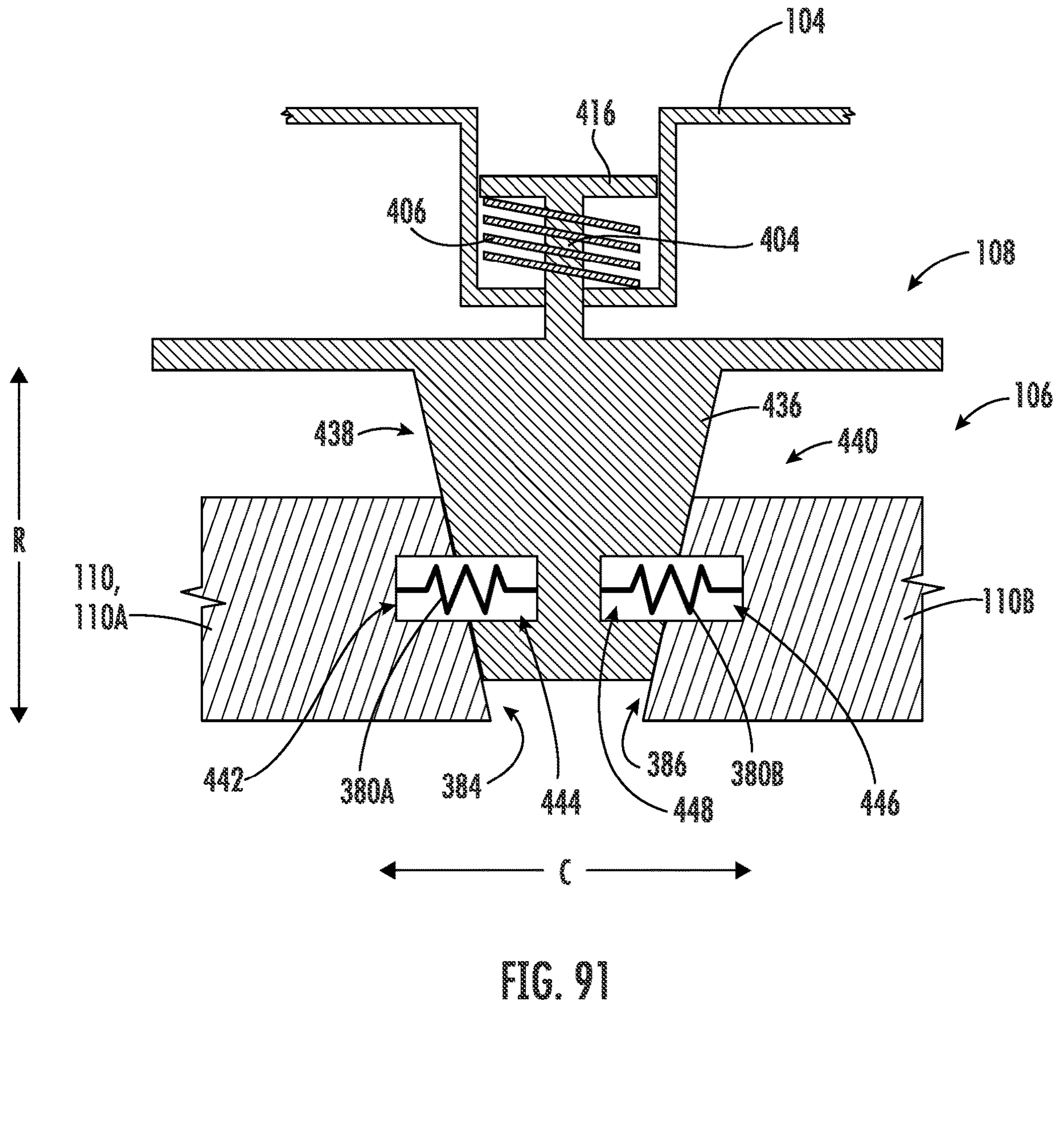
FIG. 91 is a close-up, schematic, cross-sectional view of a stator having a carrier, a seal assembly, and a seal support assembly in accordance with another embodiment of the present disclosure.

Further, referring now to FIG. 91, another exemplary embodiment of the present disclosure is provided. For the embodiment shown, a seal support assembly 108 is provided having a wedge body 436 position at least partially between a first seal segment 110A and a second seal segment 110B of a seal assembly 106. The seal support assembly 108 further includes a tangential spring extension 380, and more specifically, includes a tangential spring extension 380A and a second tangential spring extension 380B. The first tangential spring extension 380A is positioned on a first side 438 of the wedge body 436 and is engaged with the first seal segment 110A. The second tangential spring extension 380B is positioned on a second side 440 of the wedge body 436 and is engaged with the second seal segment 110B.

In particular, for the embodiment shown, a second circumferential end 384 of the first seal segment 110A defines a recess 442, and the first side 438 of the wedge body 436 similarly defines a recess 444. The first tangential spring extension 380A is positioned within the recess 442 of the first seal segment 110A and the recess 444 at the first side 438 of wedge body 436. Further, a first circumferential end 386 of the second seal segment 110B defines a recess 446 and the second side 440 of the wedge body 436 also defines a recess 448. The second tangential spring extension 380B is positioned within the recess 446 of the second seal segment 110B and the recess 448 at the second side 440 of the wedge body 436.

Figure 92:
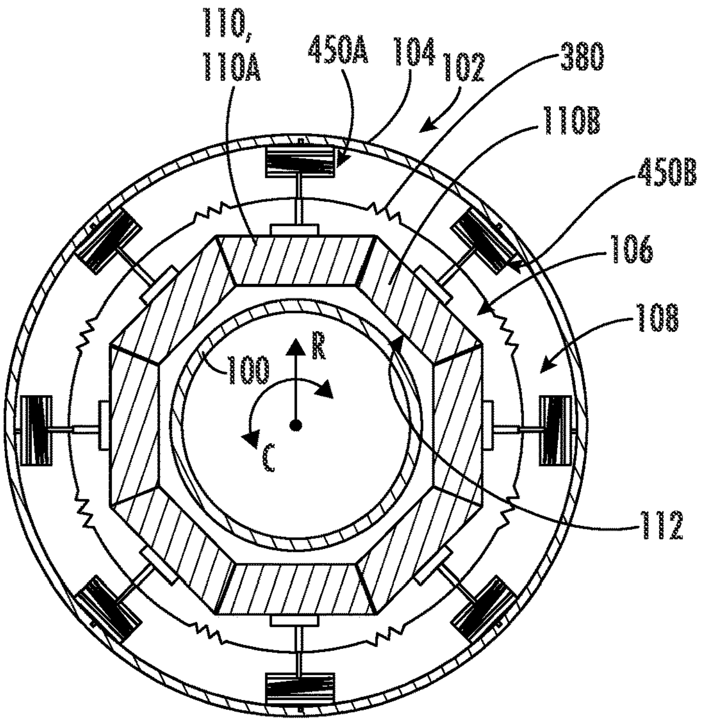
FIG. 92 is a schematic, forward-looking-aft view of an assembly in accordance with the present disclosure
Figure 93:
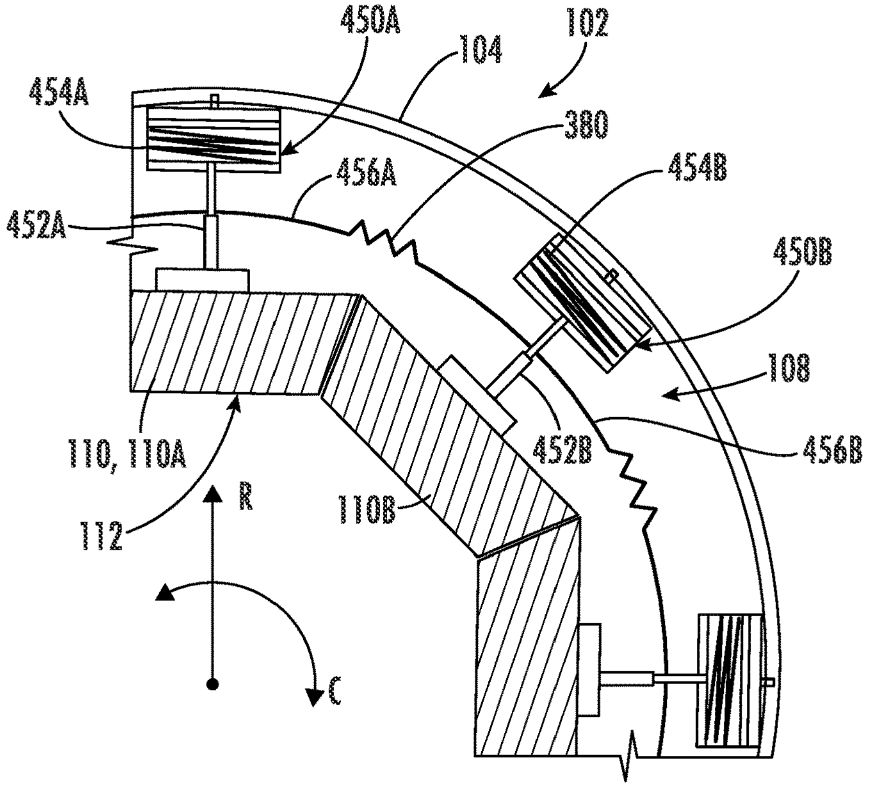
FIG. 93 is a close-up view of a portion of the assembly of FIG. 92.

Referring now to FIGS. 92 and 93, another exemplary embodiment of the present disclosure is provided. FIG. 92 provides a schematic, forward-looking-aft view of an assembly in accordance with the present disclosure, and FIG. 93 provides a close-up view of a portion of the assembly of FIG. 92. The exemplary embodiment of FIGS. 92 and 93 may be configured in a similar manner as one or the exemplary embodiments described herein.

For example, for the embodiment shown, the assembly includes a rotor 100, a stator 102 having a carrier 104, a seal assembly 106 positioned between the rotor 100 and the stator 102, and a seal support assembly 108. The seal assembly 106 includes a plurality of seal segments 110 supported at least in part by the carrier 104, with the plurality of seal segments 110 including a first seal segment 110A and a second seal segment 110B. Each of the first seal segment 110A and the second seal segment 110B includes a seal face 112 configured to form a fluid bearing with the rotor 100.

For the embodiment depicted, the seal support assembly 108 includes a first engagement assembly 450A extending between the first seal segment 110A and the carrier 104 operable to bias the first seal segment 110A along the radial direction R. The seal support assembly 108 further includes a second engagement assembly 450B extending between the first seal segment 110A and the carrier 104 operable to bias the second seal segment 110B along the radial direction R. Moreover, the seal support assembly 108 includes a tangential spring extension 380 extending between the first engagement assembly 450A and the second engagement assembly 450B for biasing the first seal segment 110A relative to the second seal segment 110B in a circumferential direction C of the turbine engine.

More specifically, referring particularly to FIG. 93, the first engagement assembly 450A includes a first radial extension 452A and the second engagement assembly 450B includes a second radial extension 452B. More specifically, the first engagement assembly 450A includes a first spring extension 454A configured to bias the first radial extension 452A along the radial direction R, and thus configured to bias the first seal segment 110A along the radial direction R. Similarly, the second engagement assembly 450B includes a second spring extension 454B configured to bias the second radial extension 452B along the radial direction R, and thus configured to bias the second seal segment 110B along the radial direction R. The first spring extension 454A, the second spring extension 454B, or both may be configured in a similar manner as one or more of the exemplary spring extensions described hereinabove.

The tangential spring extension 380 in the embodiment of FIG. 93 extends between the first radial extension 452A and the second radial extension 452B.

More specifically, still, for the embodiment depicted, the seal support assembly 108 further includes a first ring member 456A coupled to the first engagement assembly 450A and a second ring member 456B coupled to the second engagement assembly 450B. In particular, for the embodiment shown, the first ring member 456A is coupled to the first radial extension 452A and the second ring member 456B is coupled to the second radial extension 452B. The tangential spring extension 380 extends between the first ring member 456A and the second ring member 456B.

In such a manner, the seal support assembly 108 may maintain a circumferential alignment of the plurality of seal segments 110. Further, the seal support assembly 108 may allow for the seal assembly 106 to operate in the event of a failure of one of the seal segments 110, in the event of a failure of one of the spring extensions 142, etc.

Figure 94:
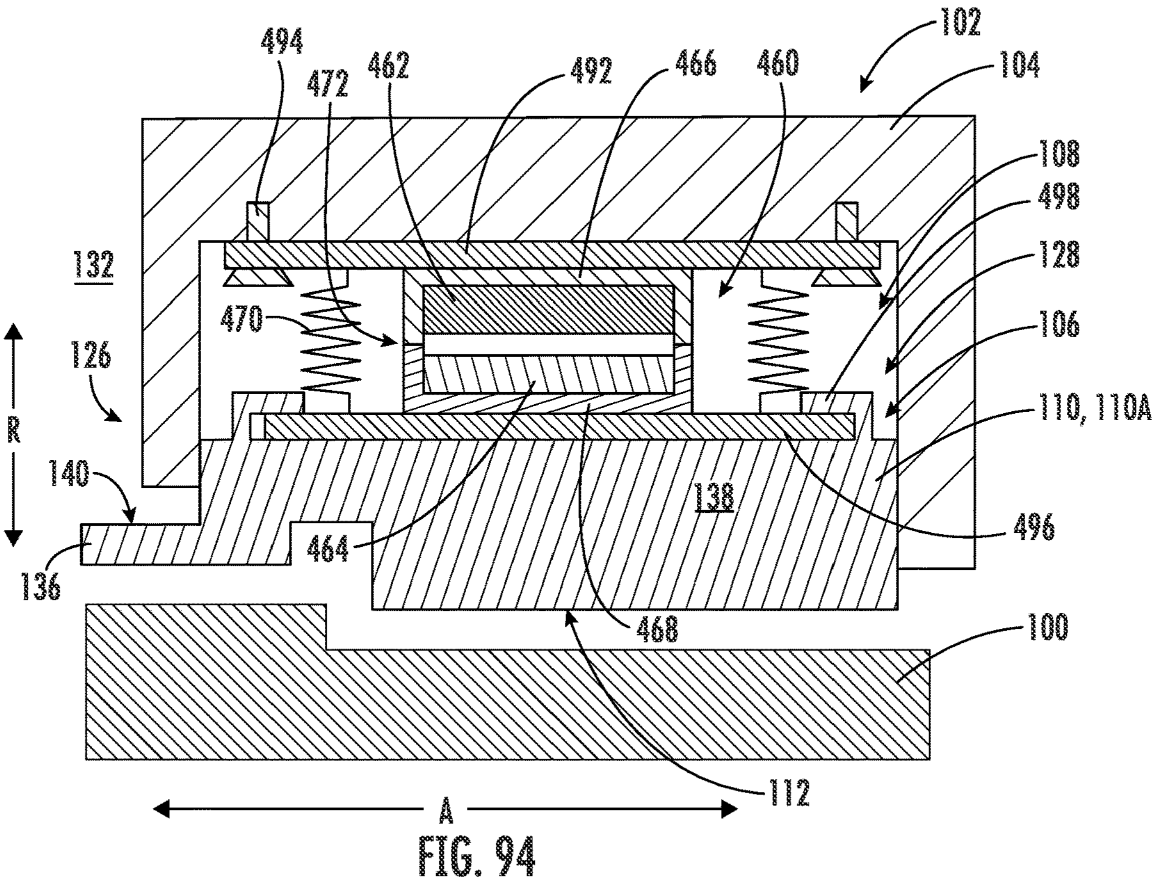
FIG. 94 is a close-up, schematic, cross-sectional view of a rotor, a stator having a carrier, a seal assembly, and a seal support assembly in accordance with another embodiment of the present disclosure in a first position.
Figure 95:
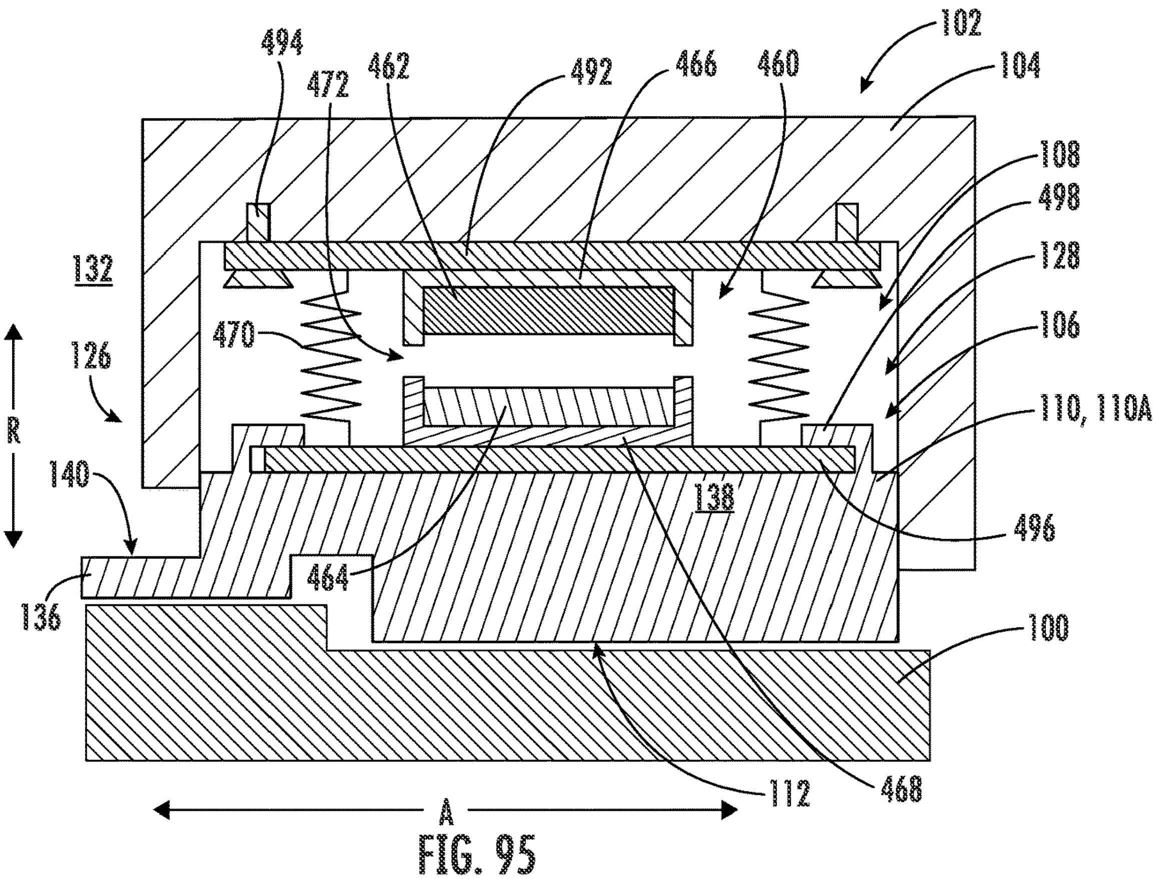
FIG. 95 is a close-up, schematic, cross-sectional view of the embodiment of FIG. 94 in a second position.

Referring now to FIGS. 94 and 95, an assembly in accordance with another exemplary embodiment of the present disclosure is provided. FIG. 94 provides a schematic, cross-sectional view of a section of a turbine engine, and more specifically of a section of a stator 102 having a carrier 104, a rotor 100, a seal assembly 106 positioned between the carrier 104 and the rotor 100, and a seal support assembly 108. FIG. 94 provides a view of the assembly in a first position, and FIG. 95 provides a view of the assembly and a second position. The view of FIGS. 94 and 95 is of a reference plane defined by an axial direction A and a radial direction R of the turbine engine. The assembly of FIGS. 94 and 95 may be configured in a similar manner as one or more of the exemplary assemblies described above.

For example, the seal assembly 106 includes a first seal segment 110A, with the first seal segment 110A having a seal face 112 configured to form a fluid bearing with the rotor 100.

However, for the embodiment shown, the seal support assembly 108 includes a magnet assembly 460 having a magnet coupled to the carrier 104 or the first seal segment 110A for biasing the first seal segment 110A along the radial direction R relative to the carrier 104. More specifically, for the embodiment shown, the magnet is a first magnet 462 coupled to the carrier 104 and the magnet assembly 460 further includes a second magnet 464 coupled to the first seal segment 110A. The first magnet 462 defines a magnetic field and the second magnet 464 is positioned within the magnetic field of the first magnet 462. In particular, for the configuration depicted in FIGS. 94 and 95, the first magnet 462 and second magnet 464 together form a magnetic attraction force to bias the first seal segment 110A outwardly along the radial direction R towards the carrier 104.

Referring still to FIGS. 94 and 95, the seal support assembly 108 further includes a first magnet base 466 and a second magnet base 468. The first magnet 462 is coupled to and positioned at least partially within the first magnet base 466, and similarly the second magnet 464 is coupled to and positioned at least partially within the second magnet base 468. The first magnet base 466 and second magnet base 468 are each formed of a nonferromagnetic material. For example, the first magnet base 466 and second magnet base 468 may be formed of a ceramic material.

More specifically, still, the first magnet base 466 is coupled to the carrier 104 and the second magnet base 468 is coupled to the first seal segment 110A. The magnetic attraction force formed by the first magnet 462 and the second magnet 464 may be transferred to the carrier 104 and to the first seal segment 110A through the first magnet base 466 and the second magnet base 468.

The seal support assembly 108 further includes a particle shield 470 surrounding at least in part the magnet assembly 460. Specifically, for the embodiment shown, the particle shield 470 is a bellows assembly extending along the radial direction R and coupled to the carrier 104 and the first seal segment 110A. The bellows assembly extends completely around the magnet assembly 460. In such a manner, the particle shield 470 may prevent or minimize any metallic/ferromagnetic particles within an airflow surrounding the magnet assembly 460 from attaching to the first magnet 462, the second magnet 464, or both.

For the embodiment shown, the first magnet 462 and the second magnet 464 are each configured as permanent magnets. Depending on the location of the seal support assembly 108, the permanent magnet may define a sufficiently high Curie temperature such that the permanent magnet may withstand anticipated operating conditions. For example, in certain exemplary embodiments, the permanent magnet may define a Curie temperature of at least 1200 degrees Celsius (C), such as at least 1300 degrees C., such as at least 1400 degrees C., such as up to 2000 degrees C. For example, in one or more exemplary embodiments, the permanent magnet may be formed of Alnico alloys, RECOMA HT520™, a rare earth material, or any other suitable material.

Notably, in at least certain exemplary aspects, the Curie temperature defined by the permanent magnet may be at least 15% higher than anticipated maximum operating temperature of the magnet assembly 460. For example, in certain exemplary embodiments, the Curie temperature defined by the permanent magnet may be at least 25% higher than the anticipated maximum operating temperature of the magnet assembly 460.

The first seal segment 110A further includes a body 138 and a lip 136 extending from the body 138 along the axial direction A. The lip 136 includes an outer pressurization surface 140, and a pressure on the outer pressurization surface 140 may generally increase at higher power operating conditions of the turbine engine. FIG. 94 depicts the first seal segment 110A at a position indicative of the turbine engine being at a relatively low power operating condition, and FIG. 95 depicts the first seal segment 110A at a position indicative of the turbine engine being at a relatively high power operating condition. The magnetic attraction force generated between the first magnet 462 and the second magnet 464 may allow for the first seal segment 110A to define a relatively high radial clearance with the rotor 100 (e.g., a distance between the seal face 112 and the rotor 100) during the relatively low power operating condition, and may further allow for the first seal segment 110A to define a relatively low radial clearance with the rotor 100 during the relatively high power operating condition.

Notably, to ensure the first seal segment 110A may be moved along the radial direction inward as a power of the turbine engine is increased, the magnet assembly 460 is configured such that the first magnet 462 and second magnet 464 do not contact one another. More specifically, the first magnet base 466 and the second magnet base 468 together form a bumper 472 to prevent the first magnet 462 from contacting the second magnet 464.

Figure 96:
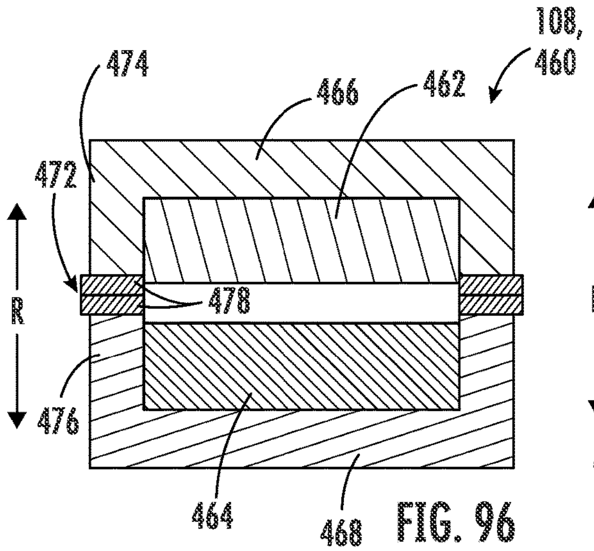
FIGS. 96 and 97 provide schematic views of a magnet assembly of the seal support assembly of FIGS. 94 and 95 in a first position and in a second position, respectively.
Figure 97:
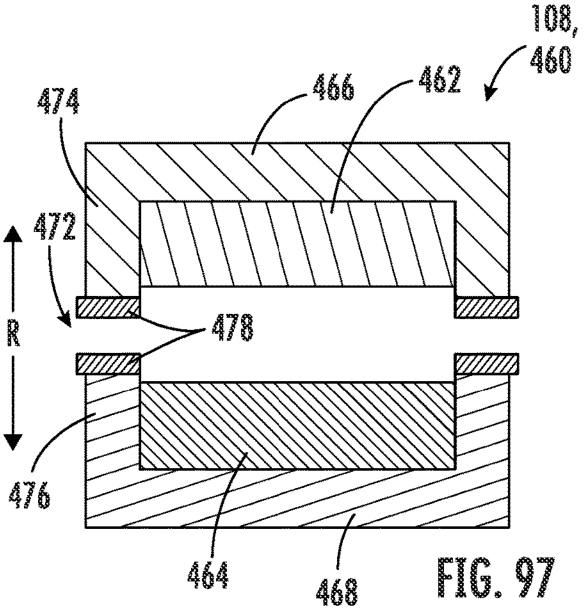

In particular, referring to FIGS. 96 and 97, schematic views are provided of a portion of the seal support assembly 108 of FIGS. 94 and 95. The position depicted in FIG. 96 corresponds to the position depicted in FIG. 94 and the positioning FIG. 97 corresponds to the position FIG. 95.

As is depicted, the first magnet base 466 includes one or more radial walls 474 extending further inwardly along the radial direction R than the first magnet 462. Similarly, the second magnet base 468 includes one or more radial walls 476 extending farther outwardly along the radial direction R than the second magnet 464. In such a manner, when the turbine engine is in the relatively low power operating condition, the magnetic attraction force may be prevented from moving the first magnet 462 into contact with the second magnet 464 as the one or more radial walls of the first magnet base 466 may contact the one or more radial walls of the second magnet base 468 before the first magnet 462 and the second magnet 464 make contact (see, specifically, FIG. 96). Notably, for the embodiment depicted, the one or more radial walls of the first magnet base 466 and the second magnet base 468 each includes a bumper 478 to minimize any damage resulting from such contact.

Figure 98:
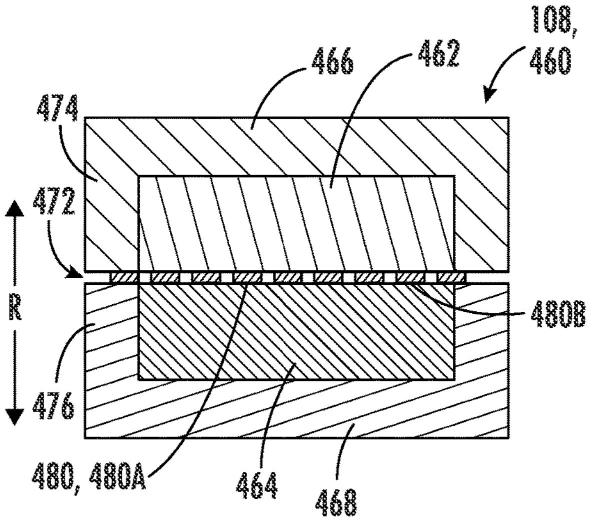
FIGS. 98 and 99 provide schematic views of a magnet assembly of a seal support assembly in accordance with another exemplary aspect of the present disclosure in a first position and in a second position, respectively.
Figure 99:
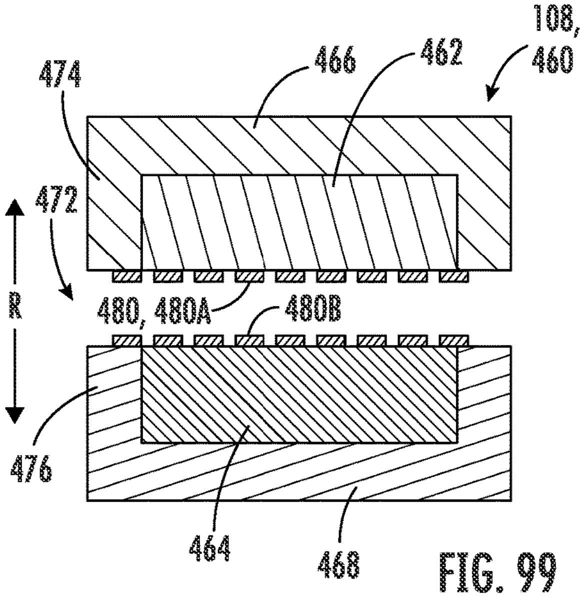

It will be appreciated, however, that in other exemplary embodiments, the seal support assembly 108 may have any other suitable configuration. For example, referring to FIGS. 98 and 99, an assembly in accordance with another example embodiment of the present disclosure is provided. The assembly of FIGS. 98 and 99 may be configured in substantially the same manner as exemplary embodiment described above with reference to FIGS. 96 and 97. However, for the embodiment of FIGS. 98 and 99, a first magnet 462 is prevented from contacting a second magnet 464 through use of a nonferromagnetic plate 480. More specifically, a magnet assembly 460 of the seal support assembly 108 depicted includes a nonferromagnetic plate 480 positioned between the first magnet 462 and the second magnet 464. More specifically, still, for the embodiment depicted, the nonferromagnetic plate 480 is a first nonferromagnetic plate 480A coupled to a first magnet base 466 over a surface of the first magnet 462 facing the second magnet 464. The magnet assembly 460 further includes a second nonferromagnetic plate 480B coupled to a second magnet base 468 over a surface of the second magnet 464 facing the first magnet 462. In such a manner the first nonferromagnetic plate 480A and the second nonferromagnetic plate 480B may prevent contact between the first magnet 462 and the second magnet 464 during, e.g., a low power operating condition. In such a manner, the plates 480A, 480B may make it easier for the magnets 462, 464 to be moved away from one another.

Figure 100:
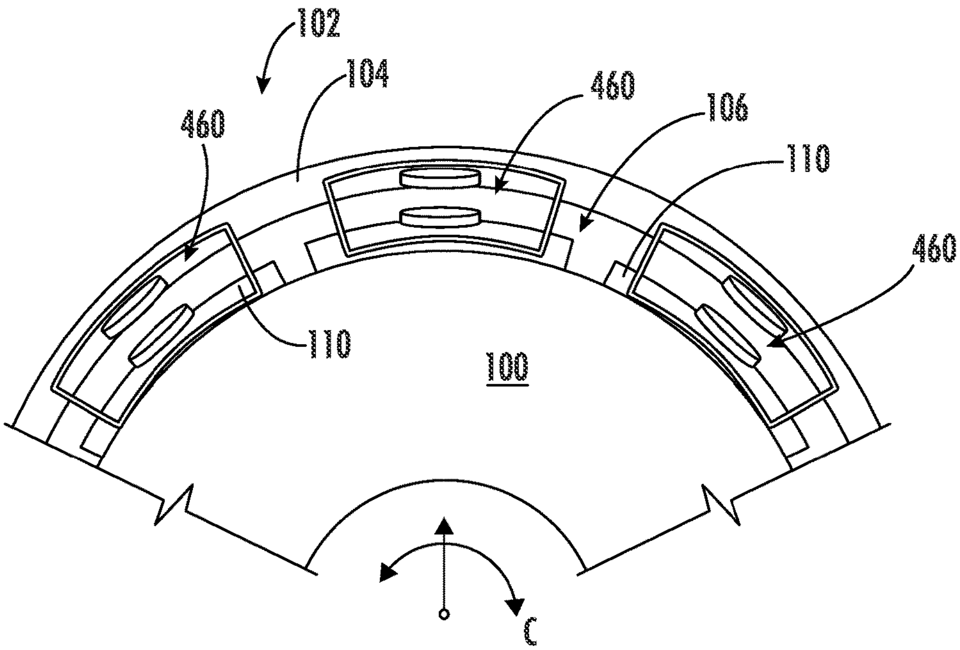
FIG. 100 is a schematic, forward-looking-aft view of an assembly in accordance with the present disclosure

Referring briefly to FIG. 100, it will be appreciated that in at least certain exemplary embodiments, the seal support assembly 108 may include a plurality of magnet assemblies 460, with each magnet assembly 460 dedicated to a respective seal segment 110 of the plurality of seal segments 110 of the seal assembly 106.

Alternatively, although not depicted, a magnet assembly 460 of the seal support assembly 108 of the present disclosure may support two or more seal segments 110.

Figure 101:
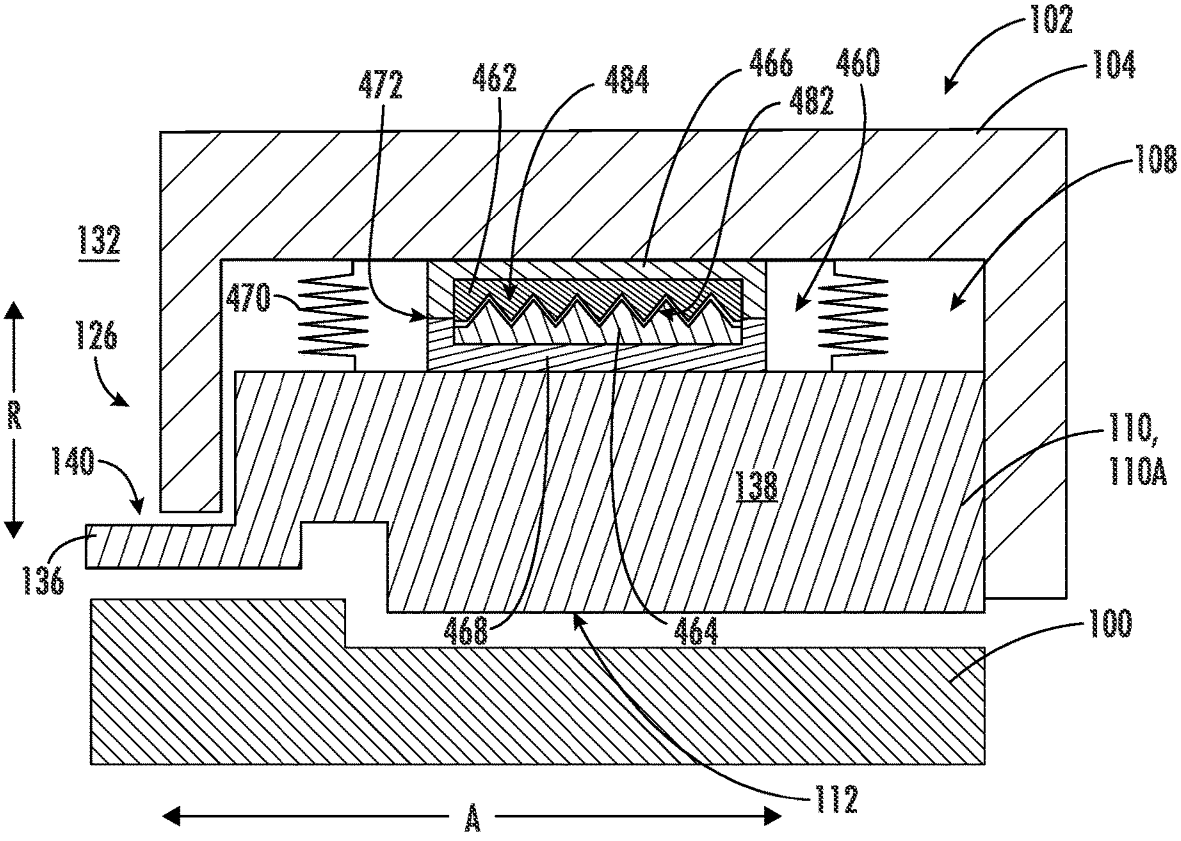
FIG. 101 is a close-up, schematic, cross-sectional view of a rotor, a stator having a carrier, a seal assembly, and a seal support assembly in accordance with another embodiment of the present disclosure.

Referring now to FIG. 101, an assembly in accordance with another example embodiment of the presence closure is provided. The exemplary embodiment of FIG. 101 may be configured in a similar manner as one or the exemplary embodiments described above. For example, a seal support assembly 108 is provided having a magnet assembly 460, with the magnet assembly 460 including a first magnet 462 and a second magnet 464. In the embodiment shown, the first magnet 462 includes a first surface 482 facing the second magnet 464 and the second magnet 464 includes a second surface 484 facing the first magnet 462. However, for the embodiment depicted, the first surface 482 has a nonplanar geometry and the second surface 484 similarly has a nonplanar geometry. Further, in the embodiment shown, the first surface 482 is complementary to the second surface 484. In such a manner, nonplanar features of the first surface 482 fit into correspondingly-shaped nonplanar features of the second surface 484.

Figure 102:
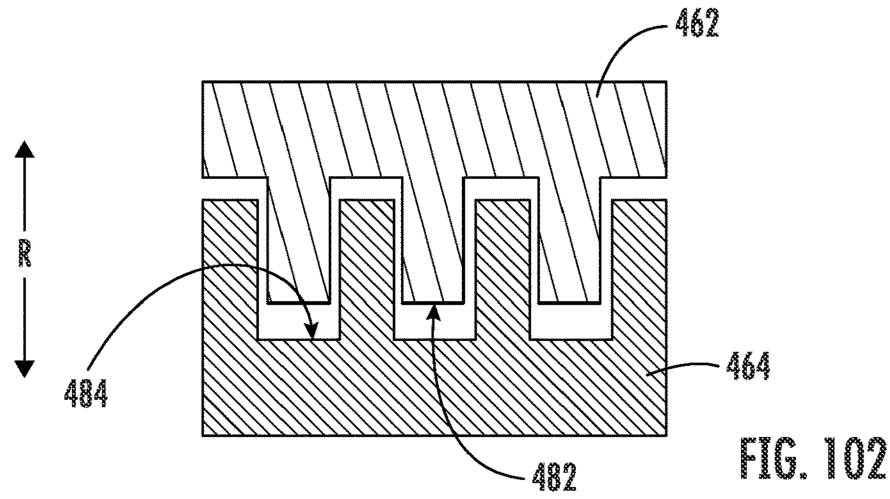
FIG. 102 is a schematic view of a magnet assembly of a seal support assembly in accordance with another exemplary aspect of the present disclosure.
Figure 103:
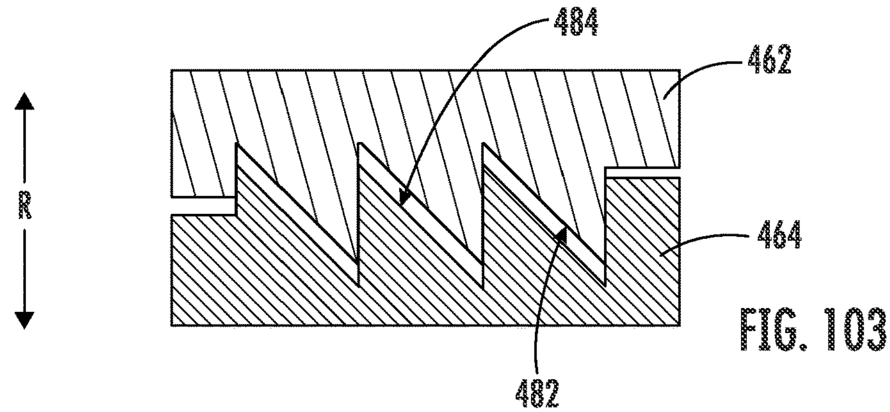
FIG. 103 is a schematic view of a magnet assembly of a seal support assembly in accordance with another exemplary aspect of the present disclosure.
Figure 104:
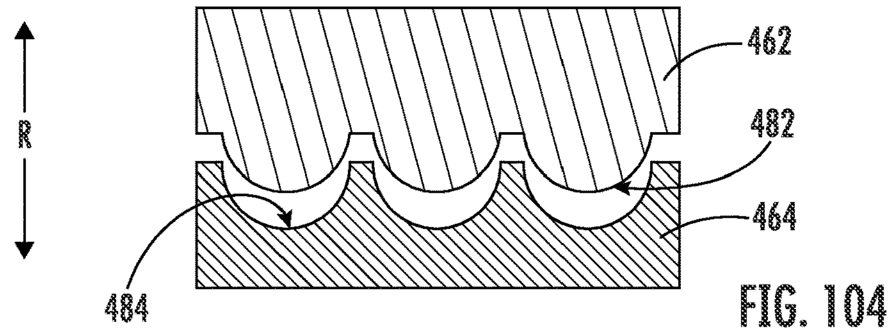
FIG. 104 is a schematic view of a magnet assembly of a seal support assembly in accordance with another exemplary aspect of the present disclosure.

Further, referring briefly to FIGS. 102 through 104, the first surface 482, the second surface 484, or both may have any other suitable configuration. For example, the first surface 482, the second surface 484, or both may define corresponding shaped rectangles, corresponding state triangles, corresponding the shaped semicircles, etc.

Figure 105:
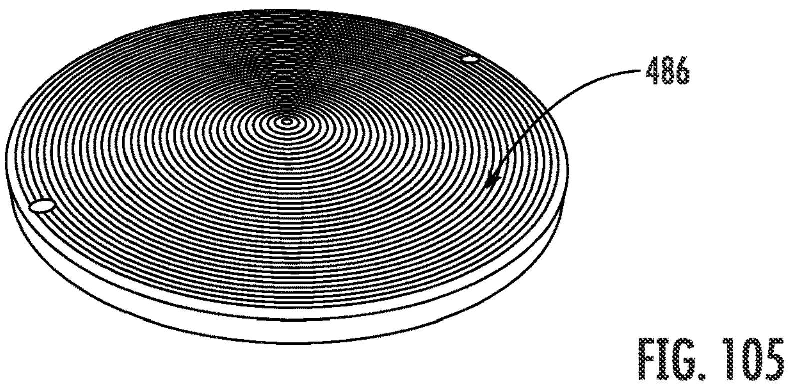
FIG. 105 is a schematic view of a magnet of a magnet assembly of a seal support assembly in accordance with another exemplary aspect of the present disclosure.

Further, referring to FIG. 105, a magnet in accordance with one or the exemplary embodiments described herein is provided. In the embodiment shown, the magnet defines a circular shape having concentric circular grooves 486 defined in a surface. The surface depicted in FIG. 105 may be a first surface 482 of a first magnet 462 or a second surface 484 of a second magnet 464. The magnet of FIG. 105 may be incorporated in a magnet assembly 460 with another magnet having a correspondingly-shaped and/or a complementary-shaped surface.

It will be appreciated that in other exemplary embodiments, a surface of a magnet of the present disclosure may have any other suitable shape or arrangement.

Further, in still other exemplary embodiments, still other suitable configurations may be provided. For example, referring now to FIGS. 106 and 107, an embodiment is provided having a seal assembly 106 with a first seal segment 110A, a carrier 104 at least partially outward of the first seal segment 110A in a radial direction R, and a rotor 100 positioned at least partially inward of the first seal segment 110A along the radial direction R. A seal support assembly 108 is further provided, the seal support assembly 108 including a magnet assembly 460 with a first magnet 462 and a second magnet 464.

Figure 106:
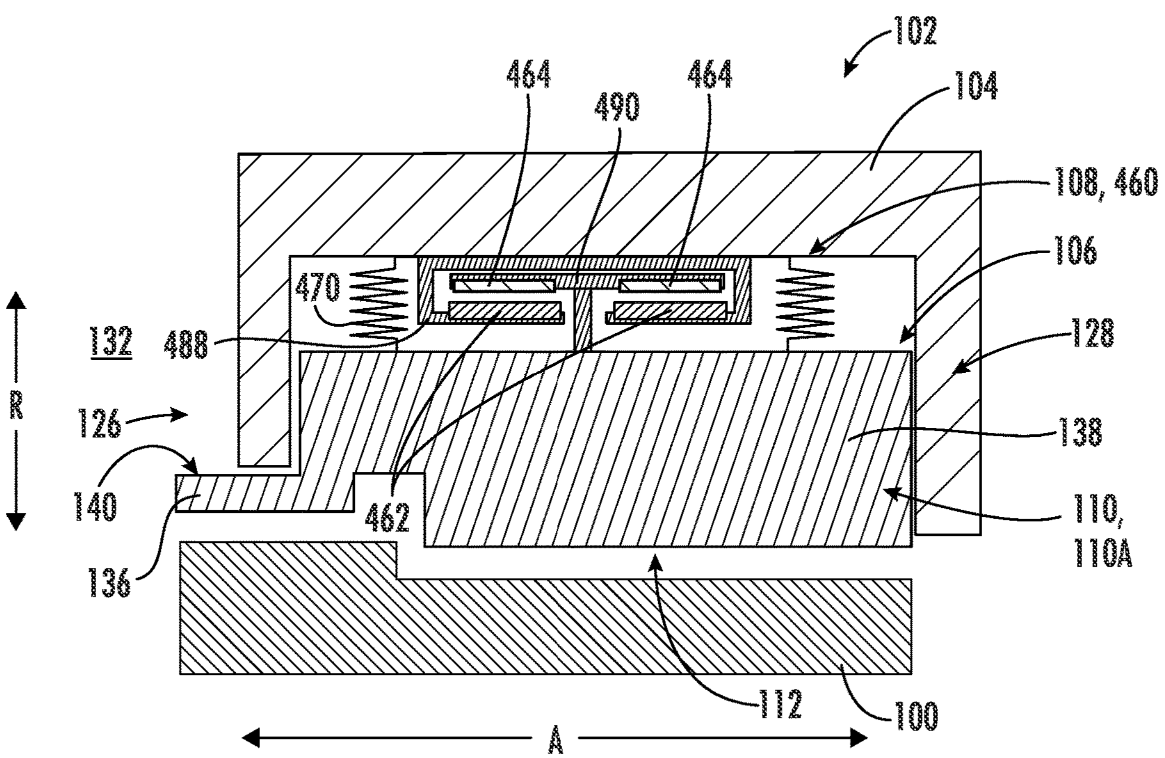
FIG. 106 is a close-up, schematic, cross-sectional view of a rotor, a stator having a carrier, a seal assembly, and a seal support assembly in accordance with another embodiment of the present disclosure in a first position.
Figure 107:
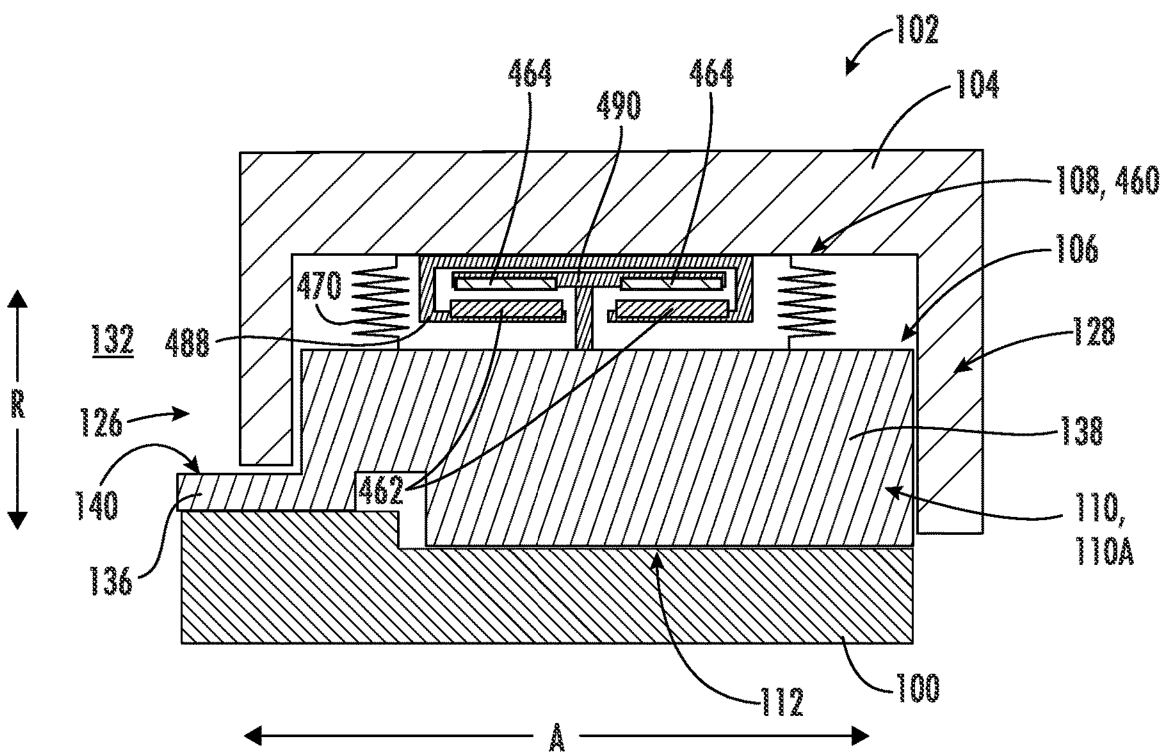
FIG. 107 is a close-up, schematic, cross-sectional view of the embodiment of FIG. 106 in a second position.

However, for the embodiment of FIGS. 106 and 107, the first magnet 462 and the second magnet 464 form a magnet repelling force. In particular, for the embodiment depicted, the carrier 104 includes a carrier axial extension 488 and the first seal segment 110A includes a segment axial extension 490 located outward of the carrier axial extension 488 along the radial direction R. The first magnet 462 is coupled to the carrier 104 through the carrier axial extension 488, and the second magnet 464 is coupled to the first seal segment 110A through the segment axial extension 490.

With such a configuration, the magnetic repelling force formed by the first magnet 462 and the second magnet 464 may maintain the first seal segment 110A at a radially outer position during, e.g., a low power operating mode of the turbine engine (see, e.g., FIG. 106), and may allow the first seal segment 110A to move to a radially inner position during, e.g., a high power operating mode of the turbine engine (see, e.g., FIG. 107).

Further, it will be appreciated that in the least certain exemplary aspects of the present disclosure a magnet assembly 460 may be coupled to a carrier 104 and/or a first seal segment 110A and the suitable manner. For example, referring briefly back to FIGS. 94 and 95, the seal support assembly 108 may include an outer plate 492 coupled to the first magnet base 466, with the outer plate 492 coupled to the carrier 104 through one or more mechanical fasteners 494, such as one or more bolts, screws, rivets, etc. Similarly, the seal support assembly 108 may include an inner plate 496 coupled to second magnet base 468. The inner plate 496 may, in turn, be coupled to the first seal segment 110A through a first seal segment hanger 498 (e.g., hooks or ledges that extend over an edge of the inner plate 496).

Figure 108:
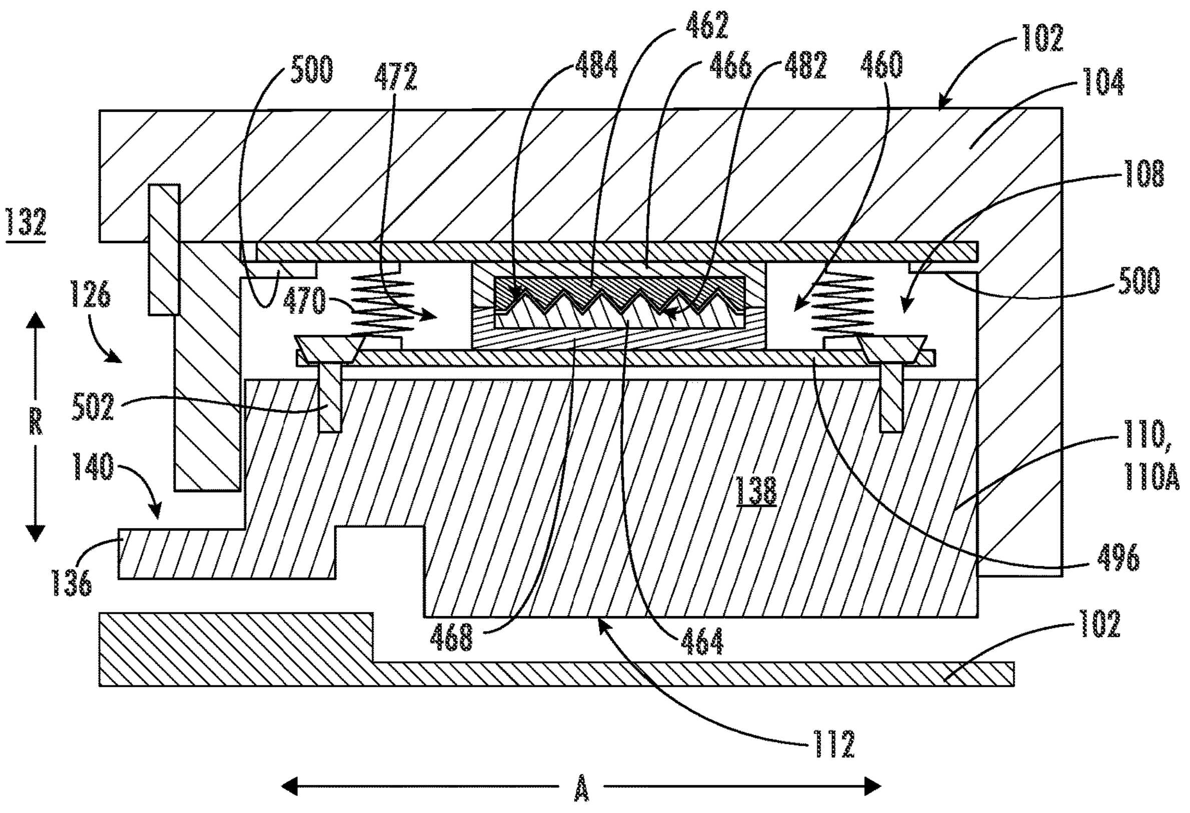
FIG. 108 is a close-up, schematic, cross-sectional view of a rotor, a stator having a carrier, a seal assembly, and a seal support assembly in accordance with another embodiment of the present disclosure.

Additionally, or alternatively, in other exemplary embodiments, the seal support assembly 108 may be coupled to the carrier 104 and the first seal segment 110A in any other suitable manner. For example, referring briefly to FIG. 108, in another example embodiment, an outer plate 492 may be coupled to the carrier 104 through a carrier hanger 500 and an inner plate may be coupled to the first seal segment 110A through one or more mechanical fasteners 502.

In still other example embodiments, any other suitable combination of the above mechanisms, or any other suitable mechanisms may be provided.

Figure 109:
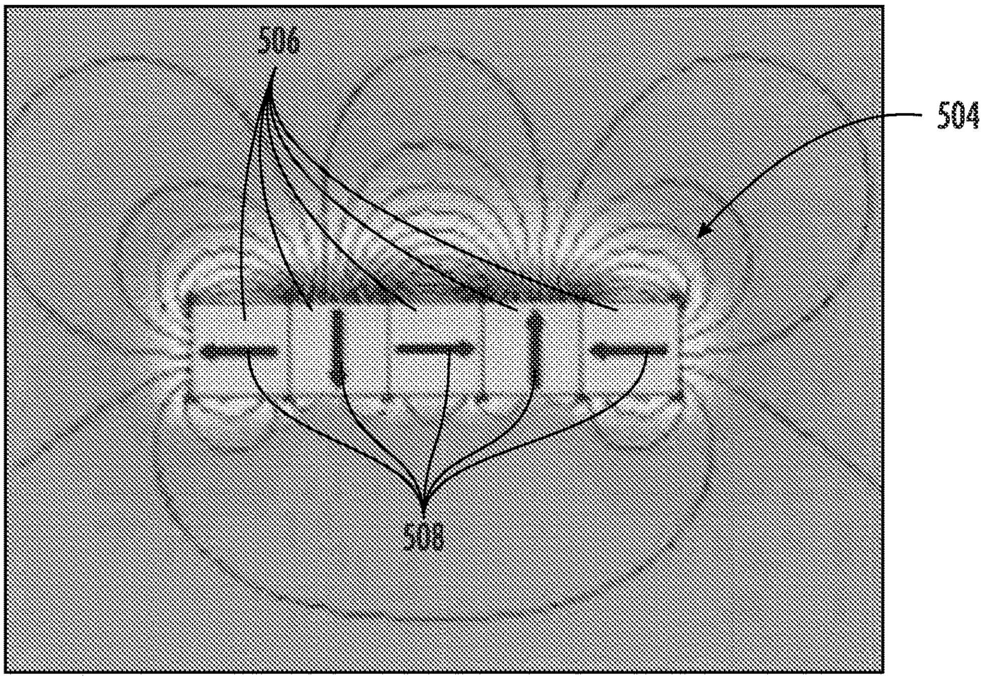
FIG. 109 is a schematic view of a magnet of a magnet assembly of a seal support assembly in accordance with another exemplary aspect of the present disclosure.

Moreover, one or more of the exemplary magnets above may be formed of a plurality of individual magnets, or magnet sections, arranged in a suitable manner to form a desired magnetic field. For example, referring briefly to FIG. 109, a magnet 504 that may be incorporated into one or the exemplary embodiments described above, e.g., as a first magnet 462 or a second magnet 464, is depicted. In the embodiment of FIG. 109, the magnet 504 includes a plurality of sections 506 arranged linearly. For example, the plurality of sections 506 may be arranged in a tangential direction (e.g., a direction perpendicular to a radial direction R of a turbine engine). Each of the individual sections 506 of the magnet 504 defines a north pole, or rather, a north pole direction indicated by the arrows 508 in FIG. 109. Each section 506 defines the north pole direction facing in a unique direction relative to one both adjacent sections 506 of the magnet 504.

Inclusion of a magnet in accordance with the embodiment of FIG. 109, may allow for concentration of a magnetic field and more specifically, of the magnetic forces (e.g., attraction or repelling). This may allow for the magnet assembly 460 incorporating such a magnet to function in a desired manner, while minimizing or reducing magnetic particles from being attached to the magnets from outside directions.

Figure 110:
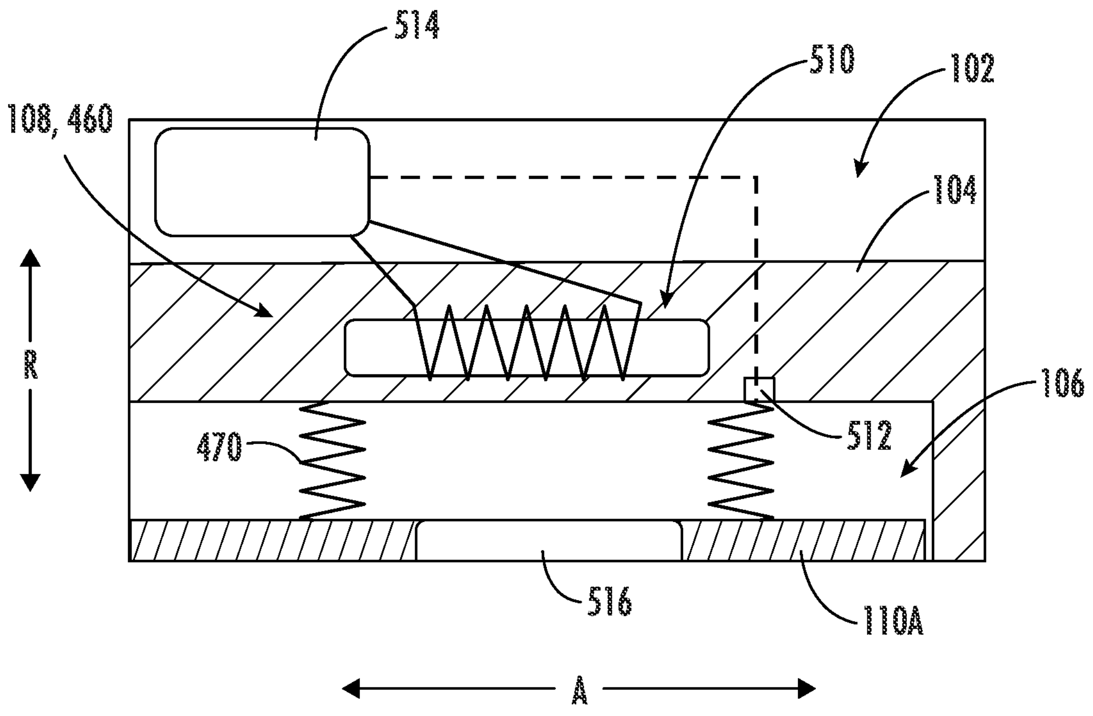
FIG. 110 is a close-up, schematic, cross-sectional view of a rotor, a stator having a carrier, a seal assembly, and a seal support assembly in accordance with another embodiment of the present disclosure.

Referring briefly to FIG. 110, an embodiment in accordance with another example embodiment is provided. The embodiment of FIG. 110 is configured in a similar manner as the exemplary embodiments discussed above. However, for the embodiment of FIG. 110, a magnet assembly 460 of the seal support assembly 108 utilizes an electro-magnet 510. The magnet assembly 460 additionally includes a sensor 512 configured to sense data indicative of a position of a first seal segment 110A relative to a carrier 104, a controller 514 electrically coupled to the electro-magnet 510 and the sensor 512, a permanent magnet 516, and a particle shield 470.

The controller 514 may provide power to the electro-magnet 510 to alter a magnetic attraction force with the permanent magnet 516 (or a magnetic repelling force depending on the configuration), e.g., in response to receiving data from the sensor 512 indicative of the position of the first seal segment 110A relative to the carrier 104. In such a manner, the seal support assembly of FIG. 110 may actively control a radial position of the first seal segment 110A, and thus of a radial clearance defined between a first seal segment 110A and a rotor 100.

It will be appreciated, that in other exemplary embodiments, the magnet assembly 460 may have still other suitable configurations.

Figure 111:
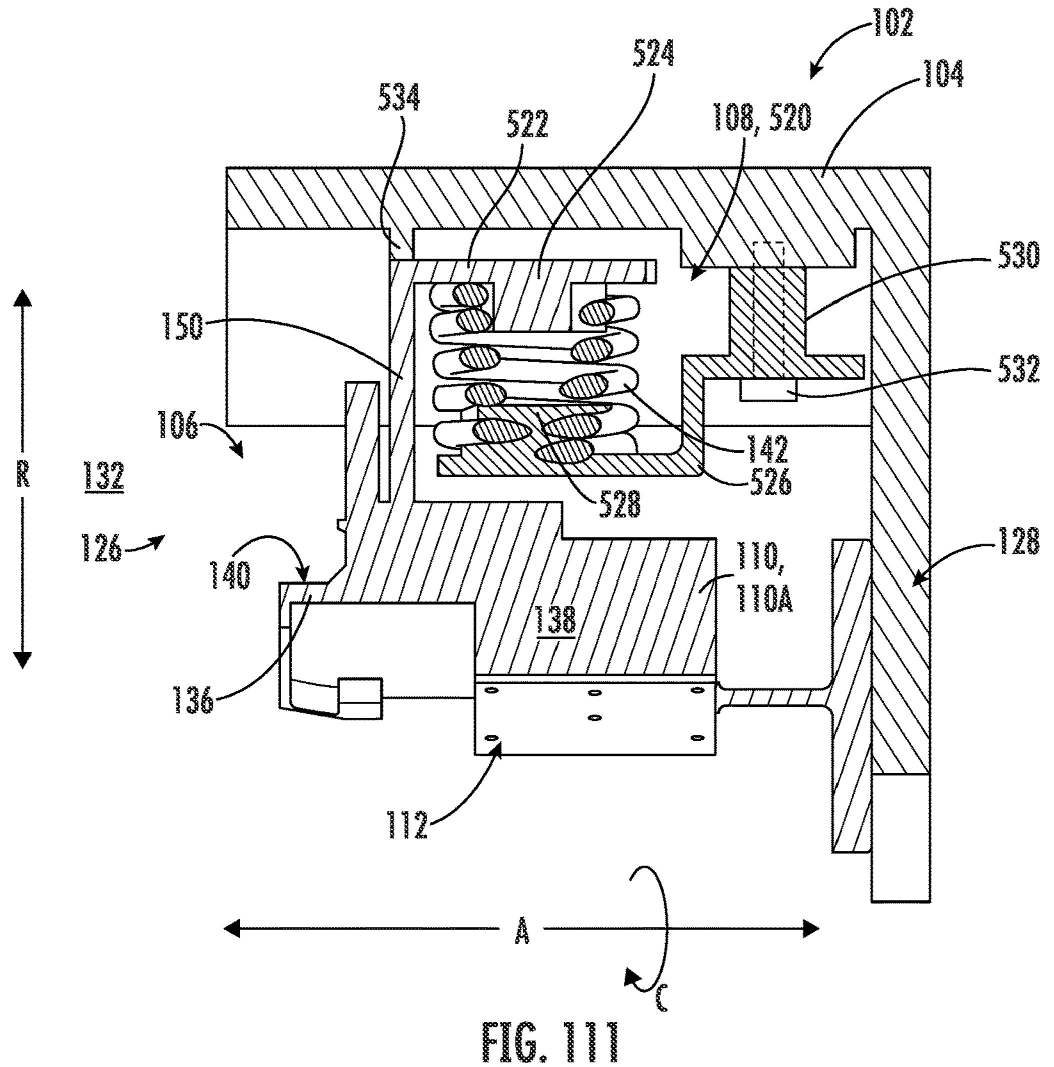
FIG. 111 is a close-up, schematic, cross-sectional view of a rotor, a stator having a carrier, a seal assembly, and a seal support assembly in accordance with another embodiment of the present disclosure.
Figure 112:
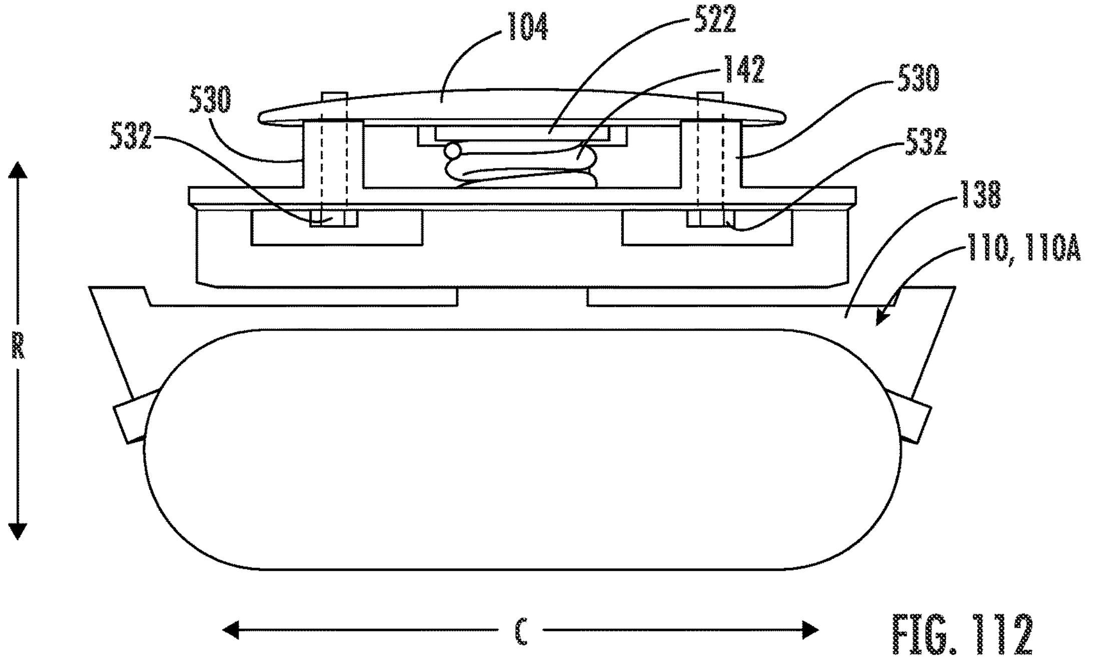
FIG. 112 is an aft-looking-forward view of the exemplary assembly of FIG. 111.

Referring now to FIGS. 111 and 112, another exemplary embodiment of the present disclosure is provided. FIG. 111 provides a cross-sectional view of an assembly in accordance with the present disclosure in a plane defined by a radial direction R and an axial direction A of the turbine engine, and FIG. 112 provides an aft-looking-forward view of the assembly of FIG. 111. The exemplary embodiment of FIGS. 111 and 112 may be configured in a similar manner as one or the exemplary embodiments described herein.

For example, the embodiment depicted includes a stator 102 having a carrier 104, a seal assembly 106, and a seal support assembly 108. The seal assembly 106 is configured to be positioned at least partially inward of the stator 102 and outward of a rotor 100 (not shown). The seal assembly 106 includes a first seal segment 110A having a seal face 112 configured form of fluid bearing with the rotor 100.

The seal support assembly 108 includes a prestressed spring assembly 520 extending from the first seal segment 110A for biasing the first seal segment 110A along the radial direction R. In particular, for the embodiment shown, the prestressed spring assembly 520 extends between the first seal segment 110A and the carrier 104 to counter a pressure on an outer pressurization surface 140 of a lip 136 of the first seal segment 110A during operation of the turbine engine, while allowing for passive control of a radial clearance gap defined between the seal face 112 and the rotor 100 during operation of the turbine engine.

Referring particularly to FIG. 111, for the embodiment depicted, the first seal segment 110A includes a support extension 522, with the support extension 522 including a seal segment spring seat 524. In the embodiment depicted, the first seal segment 110A further includes a body 138 and a radial extension 150 extending from the body 138 to the support extension 522. It will therefore be appreciated that for the embodiment depicted, the support extension 522 is spaced outwardly from the body 138 along the radial direction R.

Further, the prestressed spring assembly 520 generally includes a spring extension 142 and a compression plate 526. The compression plate 526 includes a compression spring seat 528, and the spring extension 142 extends between the compression spring seat 528 and the seal segment spring seat 524. The prestressed spring assembly 520 further includes one or more housings 530 extending outwardly from the compression plate 526 along the radial direction R to the carrier 104, and a corresponding one or more attachment mechanisms 532 for attaching the one or more housings 530 to the carrier 104. Accordingly, the compression plate 526 is fixed to the carrier 104.

In particular, for the embodiment depicted the one or more housings 530 includes two housings 530 spaced along the circumferential direction C (see, e.g., FIG. 112). The two housings 530 are each hollow and the one or more attachment mechanisms 532 includes two attachment mechanisms 532, each extending through a respective one of the two housings 530. The attachment mechanisms 532 maintain the compression plate 526 pressed against the carrier 104 to maintain the spring extension 142 in a pre-stressed state. In such a manner, it will be appreciated that the spring extension 142 may be referred to as a prestressed spring extension.

Such a configuration may provide a desired resistance along the radial direction R for the seal segment 110. In particular, installing the spring extension 142 in a pre-stressed condition (also referred to herein as a pre-strained condition), may allow for a desired resistance profile for a seal support assembly 108 of the present disclosure. For example, the spring extension 142 may not provide a constant resistance, e.g., along the radial direction R, such that by installing the spring extension 142 in a prestressed condition allows for use of a smaller or lighter spring to achieve the desired resistance, e.g., along the radial direction R.

Notably, the carrier 104 further includes a bump stop 534 (FIG. 111) to maintain the prestressed spring assembly 520 in the prestressed condition and prevent movement of the first seal segment 110A outwardly along the radial direction R more than a predetermined amount. In particular, for the embodiment depicted the bump stop 534 is configured to contact the support extension 522, the radial extension 150, or both.

Figure 113:
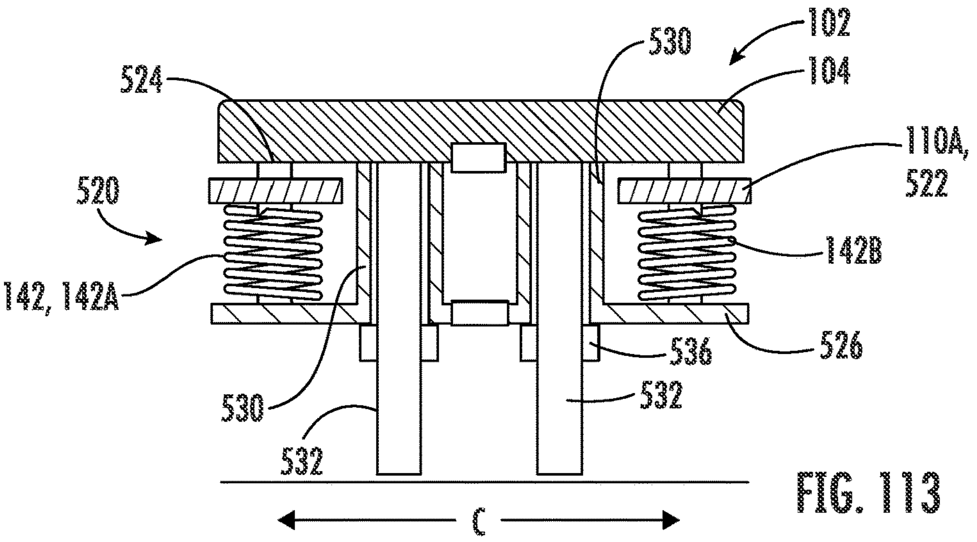
FIG. 113 provides a schematic view of a prestressed spring assembly of a seal support assembly of the present disclosure installed with a carrier of a stator in a reference plane defined by a radial direction and a circumferential direction of a turbine engine.
Figure 114:
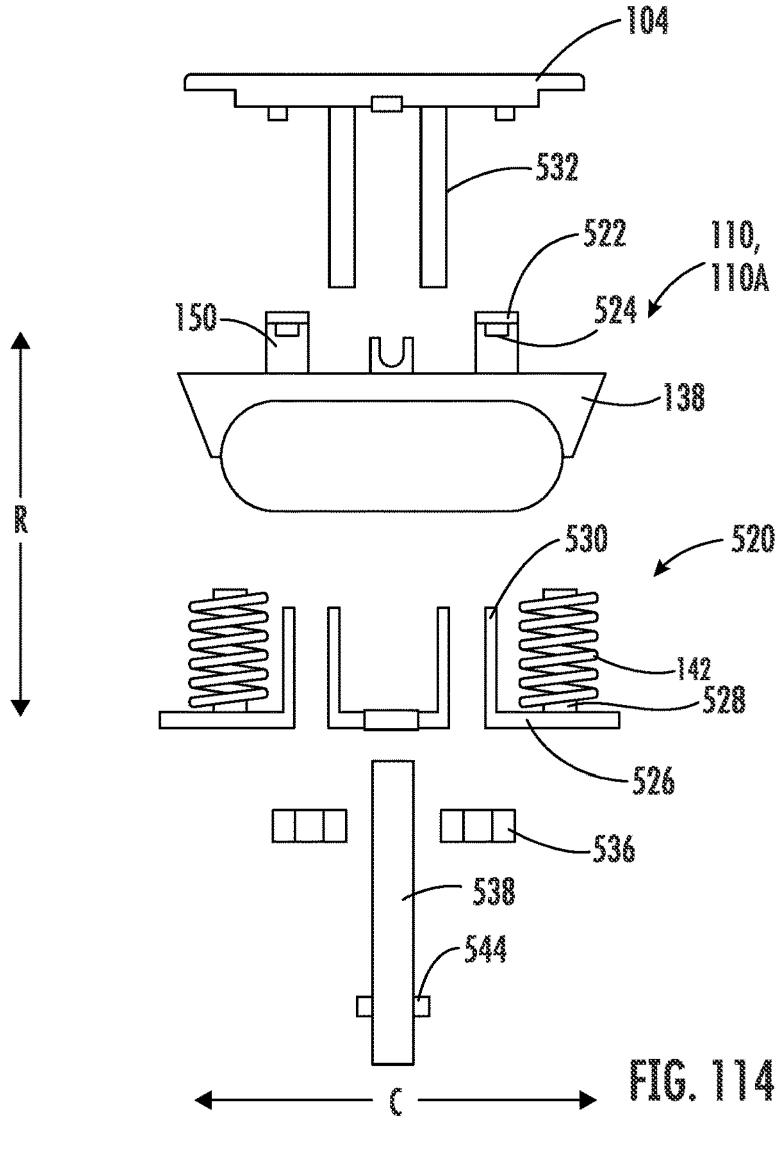
FIG. 114 provides an exploded view of the prestressed spring assembly of FIG. 113.

Referring now to FIGS. 113 and 114, a prestressed spring assembly 520 in accordance with another exemplary embodiment of the present disclosure is provided. FIG. 113 provides a schematic view of the prestressed spring assembly 520 installed with a carrier 104 of a stator 102 in a reference plane defined by a radial direction R and a circumferential direction C of the turbine engine. FIG. 114 provides an exploded view of the prestressed spring assembly 520 of FIG. 113. Notably, a majority of the first seal segment 110A is removed and the view of FIG. 113 for clarity, and a size of the first seal segment 110A is reduced in FIG. 114 for clarity.

The exemplary embodiment of FIGS. 113 and 114 may be configured in a similar manner as exemplary embodiment of FIGS. 111 and 112. For example, the prestressed spring assembly 520 generally includes a compression plate 526 and one or more housings 530 extending from the compression plate 526 along the radial direction R to a carrier 104, along with a respective one more attachment mechanisms 532 extending through the one more housings 530 and coupling the compression plate 526 to the carrier 104. In the embodiment depicted, the one or more attachment mechanisms 532 are configured as attachment studs attached to or formed integrally with the carrier 104 and extending along the radial direction R.

In particular, the one or more housings 530 of the prestressed spring assembly 520 are positioned over the respective one or more attachment mechanisms 532, and the prestressed spring assembly 520 includes a respective one more mechanical fasteners 536 engaged with the one or more attachment mechanisms 532 to fix the compression plate 526 and housings 530 to the one or more attachment mechanisms 532 at a certain position along the radial direction R relative to the carrier 104.

Notably, for the embodiment depicted, the spring extension 142 is a first spring extension 142A, and the prestressed spring assembly 520 further includes a second spring extension 142B, each extending between the compression plate 526 and the first seal segment 110A. The mechanical fasteners 536 coupled to the attachment mechanisms 532 maintain the first spring extension 142A and the second spring extension 142B in the prestressed condition.

Figure 115:
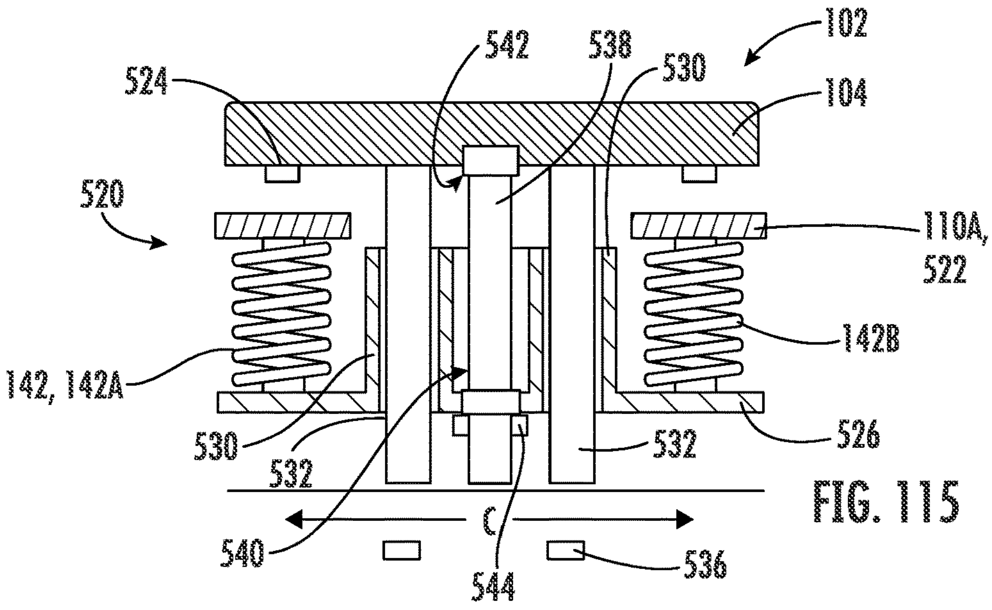
FIG. 115 provides a view of the assembly of FIGS. 113 and 114 during an assembly phase.

For example, referring also to FIG. 115, providing a view of the assembly of FIGS. 113 and 114 during an assembly phase, it will be appreciated that the prestressed spring assembly 520 includes a compression screw 538 operable with the carrier 104 and the compression plate 526 to move the compression plate 526 towards the carrier 104 along the radial direction R during assembly. In particular, the compression plate 526 defines an assembly opening 540 and the carrier 104 defines a threaded opening 542 aligned with the assembly opening 540 to facilitate assembly of the prestressed spring assembly 520. The compression screw 538 may be inserted through the assembly opening 540 and into the threaded opening 542 of the carrier 104. The compression screw 538 includes a lip 544 wider than the assembly opening 540. Accordingly, rotation of the compression screw 538 may move the lip 544 and therefore the compression plate 526 towards the carrier 104. In such a manner, the compression screw 538 may be utilized to move the compression plate 526 towards the carrier 104, such that one or more housings 530 contact the carrier 104, with the attachment mechanisms 532 extending through the housings 530. In particular, with the compression screw 538 in place, the one or more mechanical fasteners 536 may be affixed to the attachment mechanisms 532 (e.g., mounting studs) to fix the compression plate 526 in position relative to the carrier 104. Once the mechanical fasteners 536 are in position, the compression screw 538 may be removed and the mechanical fasteners 536 and attachment mechanisms 532 may maintain the compression plate 526 in position and first spring extension 142A and second spring extension 142B in a prestressed condition.

It will be appreciated that using the above structures may allow for incorporation of a spring extension 142 that defines an unloaded length along the radial direction R. The term "unloaded length" refers to a length of the spring extension 142 with no compressive or tension forces acting thereon (e.g., the length of the spring extension 142 prior to the spring extension 142 being installed in the prestressed spring assembly 520; see FIG. 115). The spring extension 142 may further define an assembly length. The term "assembly length" refers to a length of the spring extension 142 once installed in the prestressed spring assembly 520 with the turbine engine in a pre-operation mode (e.g., an operating condition which substantially no pressure is being exerted on the first seal segment 110A along the radial direction R by a pressurized air flow; see FIG. 113).

Referring now to FIG. 16, a view of the assembly of FIGS. 113 through 115 is provided with the turbine engine in a high-power operating condition. In the high-power operating condition the first seal segment 110A, through the support extension 522, may press down along the radial direction R against the first spring extension 142A and the second spring extension 142B to move the first seal segment 110A closer to the rotor 100 along the radial direction R. The compression plate 526 may be maintained at a fixed position relative to the carrier 104 through this operation through the attachment mechanisms 532, the housings 530, and the mechanical fasteners 536.

Figure 116:
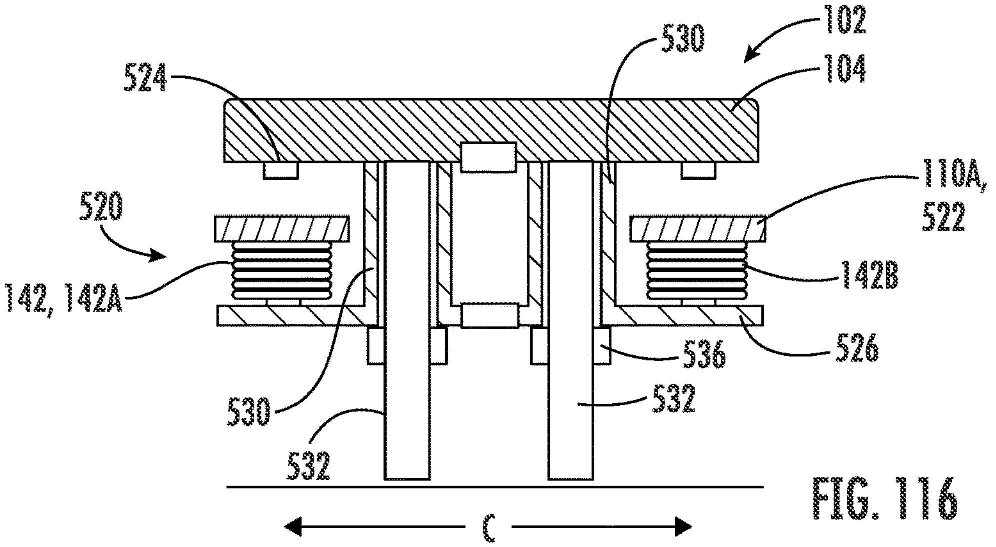
FIG. 116 provides a view of the assembly of FIGS. 113 and 114 during an operating condition of the turbine engine.

As briefly mentioned above, the views of FIGS. 113, 115, and 116 include a majority of the first seal segment 110A removed for clarity. However, these views include the support extension 522 having a seal segment spring seat 524. The structure coupling to the support extension 522 to the first seal segment 110A may be similar to the structure described above with reference to FIGS., e.g., FIGS. 111 and 112.

Figure 117A:
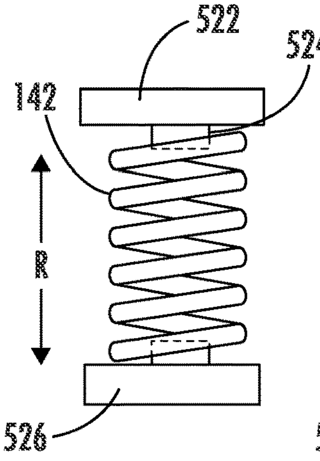
FIG. 117A provides a schematic view of a spring extension in accordance with an exemplary aspect of the present disclosure.

It will be appreciated that for the embodiments described above, the spring extension 142 is depicted as a helical spring. FIG. 117A provides a close-up view of a helical spring as may be incorporated as a spring extension 142 in one or more of the above embodiments.

Figure 117B:
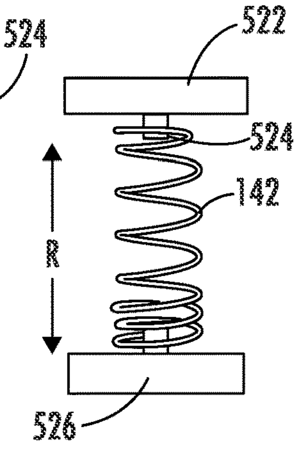
FIG. 117B provides a schematic view of a spring extension in accordance with an exemplary aspect of the present disclosure.
Figure 118A:
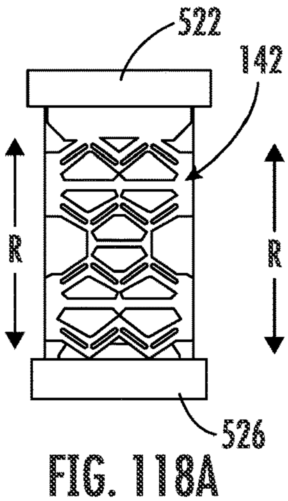
FIG. 118A provides a schematic view of a spring extension in accordance with an exemplary aspect of the present disclosure.
Figure 118B:
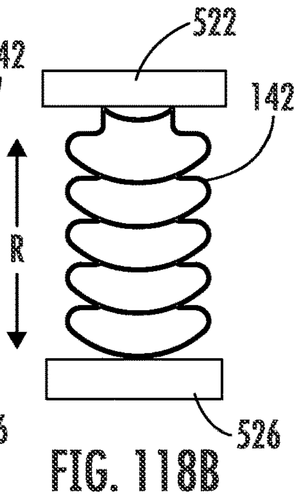
FIG. 118B provides a schematic view of a spring extension in accordance with an exemplary aspect of the present disclosure.

It will be appreciated, however, that in other exemplary embodiments, the spring extension 142, which may be a prestressed spring extension as noted above, may have any other suitable configuration. For example, in other exemplary embodiments, one or more of the above assemblies may include a spring extension 142 configured as a progressive helical spring (see, e.g., FIG. 117B), a bellows assembly (see, e.g., FIG. 118B), a conical spring, and optimized super elastic spring block (see, e.g., FIG. 118A), or an optimized metal foam structure.

Further, it will be appreciated that in other exemplary embodiments, the prestressed spring assembly 520 may have still other suitable configurations. For example, referring now to FIGS. 119 and 120, views of an assembly in accordance with another exemplary embodiment of the present disclosure is provided. The assembly of FIGS. 119 and 120 may be configured in a similar manner as one or more of the exemplary embodiments described above. For example, the embodiment of FIGS. 119 and 120 includes a stator 102 having a carrier 104 and a seal assembly 106 having a plurality of seal segments 110 spaced along the circumferential direction C of the turbine engine. The plurality of seal segment 110 includes a first seal segment 110A.

Figure 119:
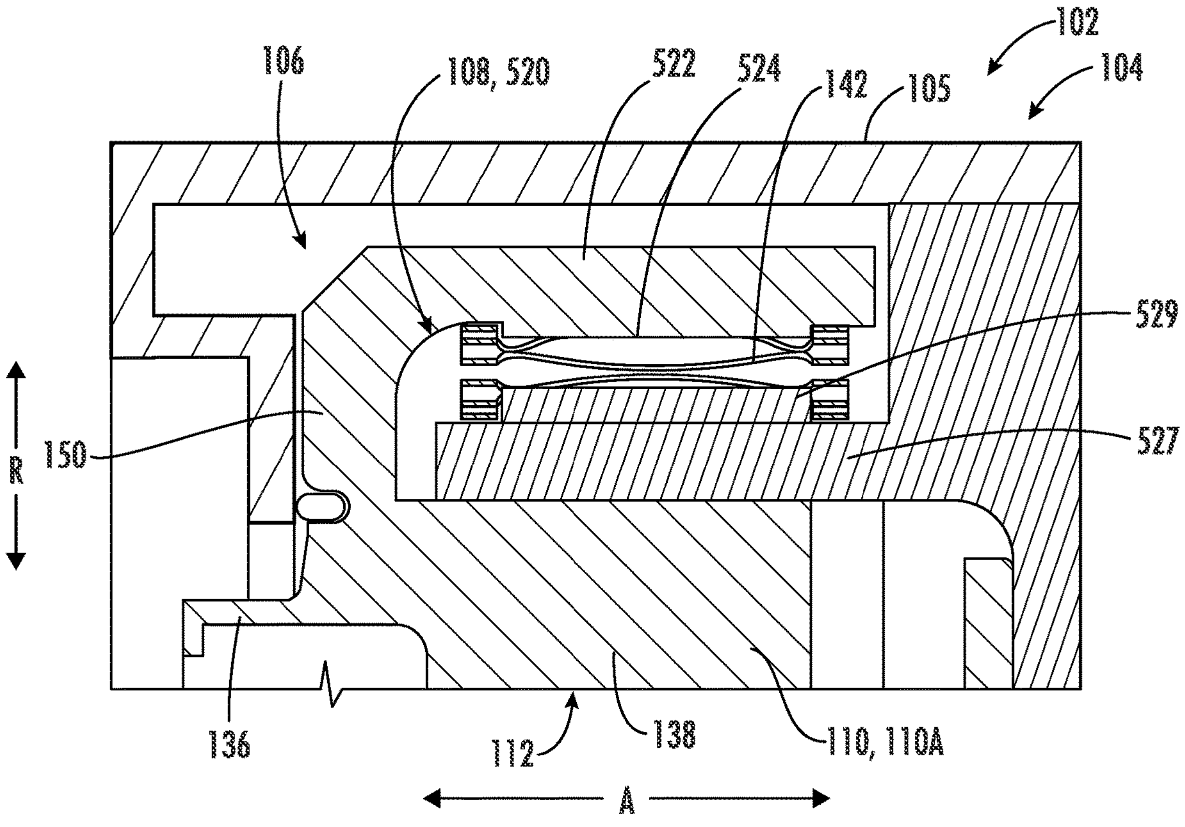
FIG. 119 is a close-up, schematic, cross-sectional view of a stator having a carrier, a seal assembly, and a seal support assembly in accordance with another embodiment of the present disclosure.

Referring particularly to FIG. 119, the embodiment depicted includes a seal support assembly 108, with the seal support assembly 108 including a prestressed spring assembly 520 extending from the first seal segment 110A for biasing the first seal segment 110A along the radial direction R. More specifically, for the embodiment depicted, the first seal segment 110A includes a support extension 522, with the support extension 522 including a seal segment spring seat 524. In the embodiment depicted, the first seal segment 110A further includes a body 138 and a radial extension 150 extending from the body 138 to the support extension 522. It will therefore be appreciated that for the embodiment depicted, the support extension 522 is spaced outwardly from the body 138 along the radial direction R.

Further, the carrier 104 includes an axial extension 527 positioned inward of the support extension 522 of the first seal segment 110A along the radial direction R. Additionally, as noted above, the prestressed spring assembly 520 generally includes the spring extension 142. The spring extension 142 extends between the axial extension 527 of the carrier and the support extension 522 of the first seal segment 110A. In particular, the support extension 522 includes a seal segment spring seat 524 and the axial extension 527 includes an extension spring seat 529.

Notably, for the embodiment depicted, the body 138 of the first seal segment 110A may act as a bump stop to prevent outward movement of the first seal segment 110A past a preset amount, and to maintain the spring extension 142 in the pre-stressed state.

Such a configuration may provide a desired resistance along the radial direction R for the seal segment 110. In particular, installing the spring extension 142 in a prestressed condition (also referred to herein as a pre-strained condition), may allow for a desired resistance profile for a seal support assembly 108 of the present disclosure.

Figure 120:
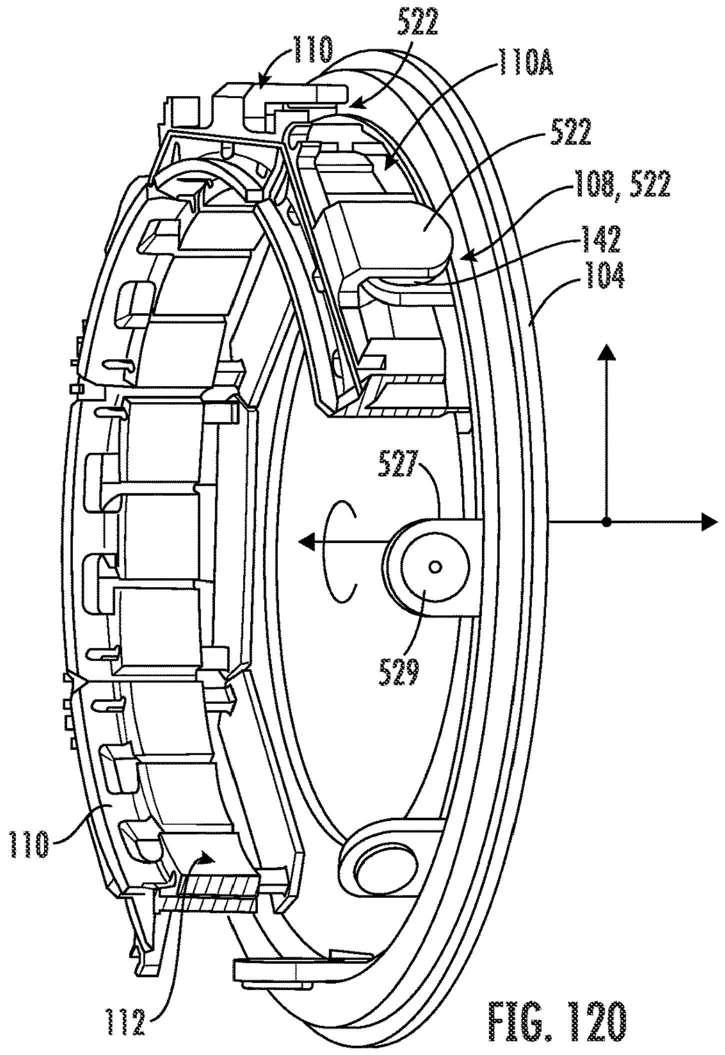
FIG. 120 is a perspective view of the seal assembly and carrier of FIG. 120.

Referring briefly also to FIG. 120, it will be appreciated that each seal segment may include a dedicated prestressed spring assembly 520. Further, it will be appreciated that the carrier 104 includes an outer cover 105 (see FIG. 119; removed in FIG. 120 for clarity). The outer cover 105 may not be present during assembly, to allow for installation of the individual seal segments 110 and prestressed spring assemblies 520 (see, e.g., FIG. 120; depicting the assembly during a mid-assembly stage).

Further, it will be appreciated that in still other exemplary embodiments, the prestressed spring assembly 520 may have still other suitable configurations. For example, referring now to FIG. 121, a view of an assembly in accordance with another exemplary embodiment of the present disclosure is provided. The assembly of FIG. 121 may be configured in a similar manner as one or more of the exemplary embodiments described above. For example, the embodiment of FIG. 121 includes a seal assembly 106 having a plurality of seal segments 110 spaced along the circumferential direction C of the turbine engine. The plurality of seal segment 110 includes a first seal segment 110A.

Figure 121:
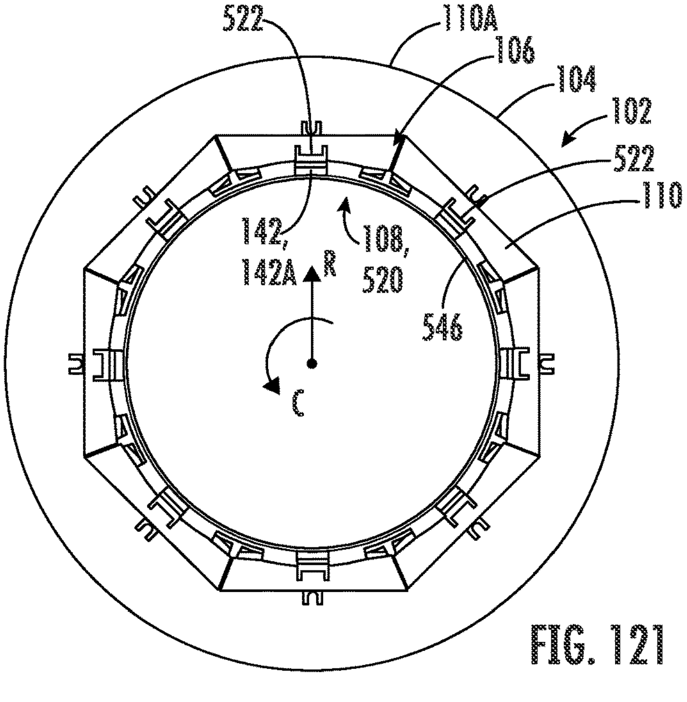
FIG. 121 is a view of a rotor, a stator having a carrier, a seal assembly, and a seal support assembly in accordance with another embodiment of the present disclosure.

Further, still, the embodiment of FIG. 121 includes a seal support assembly 108, with the seal support assembly 108 including a prestressed spring assembly 520 extending from the first seal segment 110A for biasing the first seal segment 110A along the radial direction R. More specifically, as will be explained in more detail below, the prestressed spring assembly 520 includes a spring extension 142 extending from the first seal segment 110A along the radial direction R.

Figure 122:
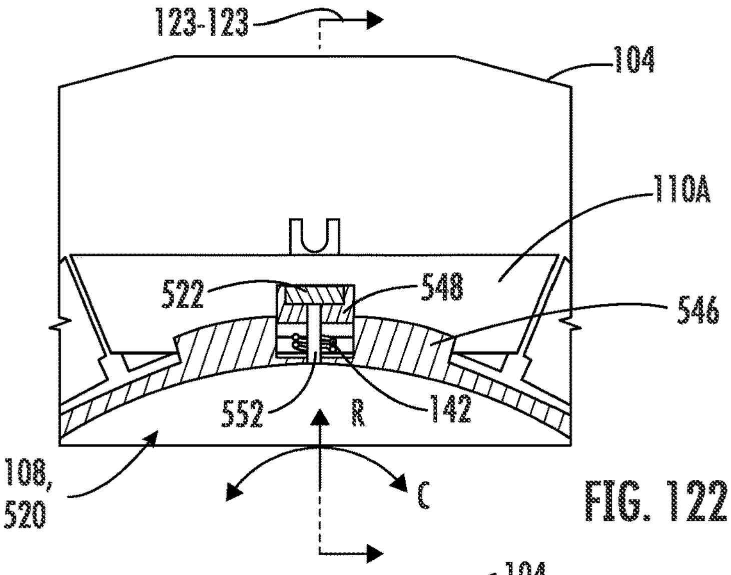
FIG. 122 is a close-up view of a section of the exemplary assembly of FIG. 121.
Figure 123:
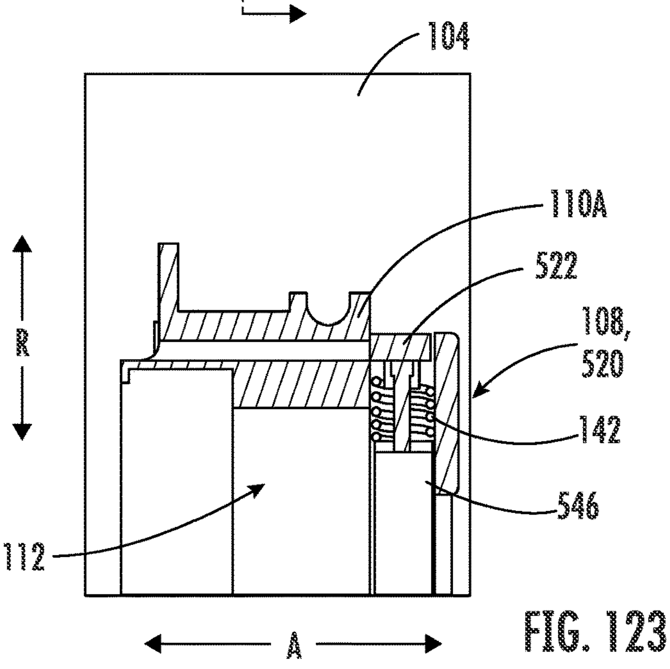
FIG. 123 is a close-up, cross-sectional view of a section of the assembly in FIG. 122, as viewed along line 123-123 in FIG. 122.

Referring now to FIGS. 122 and 123, FIG. 122 provides a close-up view of the first seal segment 110A and the prestressed spring assembly 520 of FIG. 121, and FIG. 123 provides a cross-sectional view of the prestressed spring assembly 520 along Line 123-123 and FIG. 122. As will be appreciated, the first seal segment 110A includes a support extension 522. The support extension 522 extends generally along the axial direction A (see FIG. 123). The prestressed spring assembly 520 includes a support ring 546 positioned inward of the support extension 522 along the radial direction R and the prestressed spring assembly 520 includes the spring extension 142 extending between the support extension 522 of the first seal segment 110A and the support ring 546.

Figure 124:
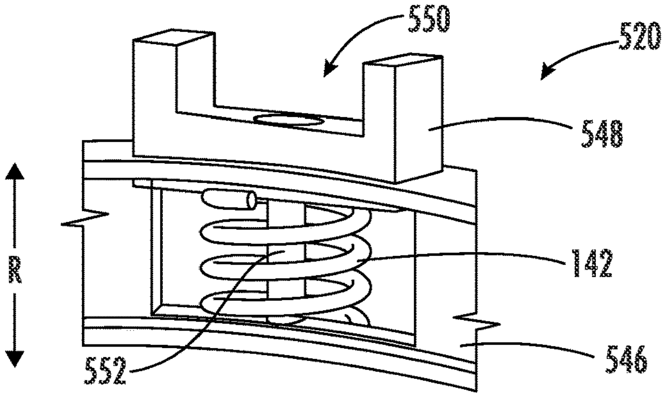

In particular, referring also to FIG. 124, it will be appreciated that the prestressed spring assembly 520 includes an attachment block 548 configured to couple to the support extension 522. The attachment block 548 may have a substantially U-shaped, defining an opening 550. The attachment block 548 may be configured to fit over the support extension 522 of the first seal segment 110A, such that the support extension 522 is positioned within the opening 550 of the attachment block 548.

The prestressed spring assembly 520 further includes a pin 552 extending from the attachment block 548 to the support ring 546. The pin 552 may be slidably coupled to the support ring 546 such that the attachment block 548 and first seal segment 110A may be moved inwardly along the radial direction R relative to the support ring 546.

When the prestressed spring assembly 520 is installed with the plurality of seal segments 110 of the seal assembly 106, the attachment block 548 may be moved towards the support ring 546 to prestressed the spring extension 142. During operation, as a pressure or force on the first seal segment 110A inwardly along the radial direction R increases, the spring extension 142 may compress (and the pin 552 may slide inwardly through the support ring 546) to allow the seal segment 110A to move inwardly along the radial direction R to reduce a radial clearance gap defined between the seal face 112 (see FIG. 123) of the first seal segment 110A and a rotor 100 (not depicted).

Briefly, referring back to FIG. 121, it will be appreciated that the spring extension 142 is a first spring extension 142A and the prestressed spring assembly 520 further includes a plurality of spring extensions 142. Each of the plurality of spring extensions 142 extends from a seal segment 110 of the plurality of seal segments 110 to the support ring 546, and more specifically, extends from a support extension 522 of each of the respective seal segments 110 to the support ring 546. In such a manner, it will be appreciated that the support ring 546 extends 360 degrees in the circumferential direction C at a location inward of the support extensions 522 of the plurality of seal segments 110. The continuous 360 degree structure of the support ring 546 may allow for the support ring 546 to support the seal assembly 106 along the radial direction R without a separate coupling between the support ring 546 and the carrier 104.

It will be appreciated that in at least certain exemplary embodiments, the present disclosure may provide for a method for assembling a seal segment for a turbine engine of the present disclosure. The method may include: (1) moving a compression plate of a seal support assembly over an attachment mechanism of a carrier, the attachment mechanism of the carrier extending along a radial direction of the turbine engine, the seal support assembly including a spring extension extending between the compression plate and the carrier; and (2) inserting a tightening rod through a tightening rod opening defined in the compression plate and into an engagement opening in the carrier.

The method may further include (3) moving the tightening rod through the engagement opening in the carrier, wherein moving the tightening rod through the engagement opening in the carrier comprises contacting the compression plate with a ledge of the tightening rod to move the compression plate closer to the carrier. In at least certain exemplary aspects, moving the tightening rod through the engagement opening in the carrier at (3) may include (4) compressing the spring extension to an assembly length from an unloaded length. The assembly length may be less than or equal to 90% of the unloaded length of the spring extension.

The method may further include (5) affixing a mechanical fastener to the attachment mechanism to maintain a maximum distance between the compression plate and the carrier. In at least certain exemplary aspects, the mechanical fastener may define a threaded opening. With such an exemplary aspect, affixing the mechanical fastener to the attachment mechanism at (5) may include (6) rotating the mechanical fastener about the attachment mechanism to engage the threaded opening with threads of the attachment mechanism.

Further, in certain exemplary aspects, the method may further include (7) removing the tightening rod from the engagement opening and from the tightening rod opening after affixing the mechanical fastener to the attachment mechanism Such an exemplary aspect may provide for a seal assembly having a prestressed seal support, which may provide for various benefits as discussed hereinabove.

Figure 125:
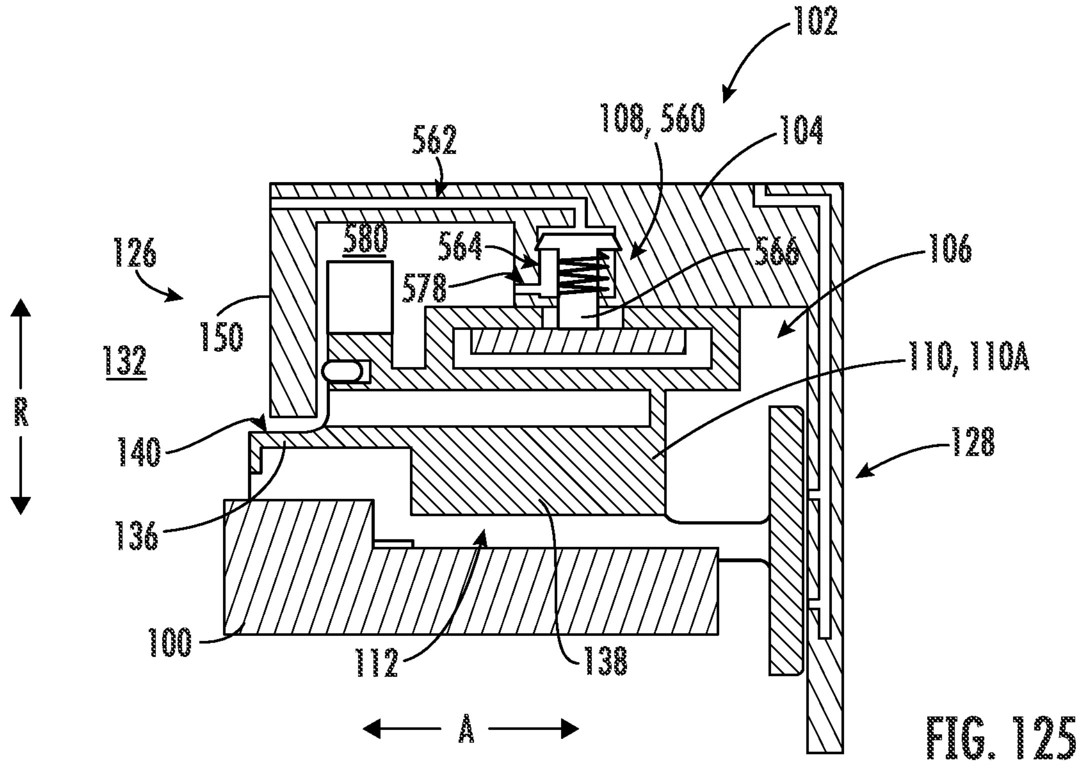
Figure 126:
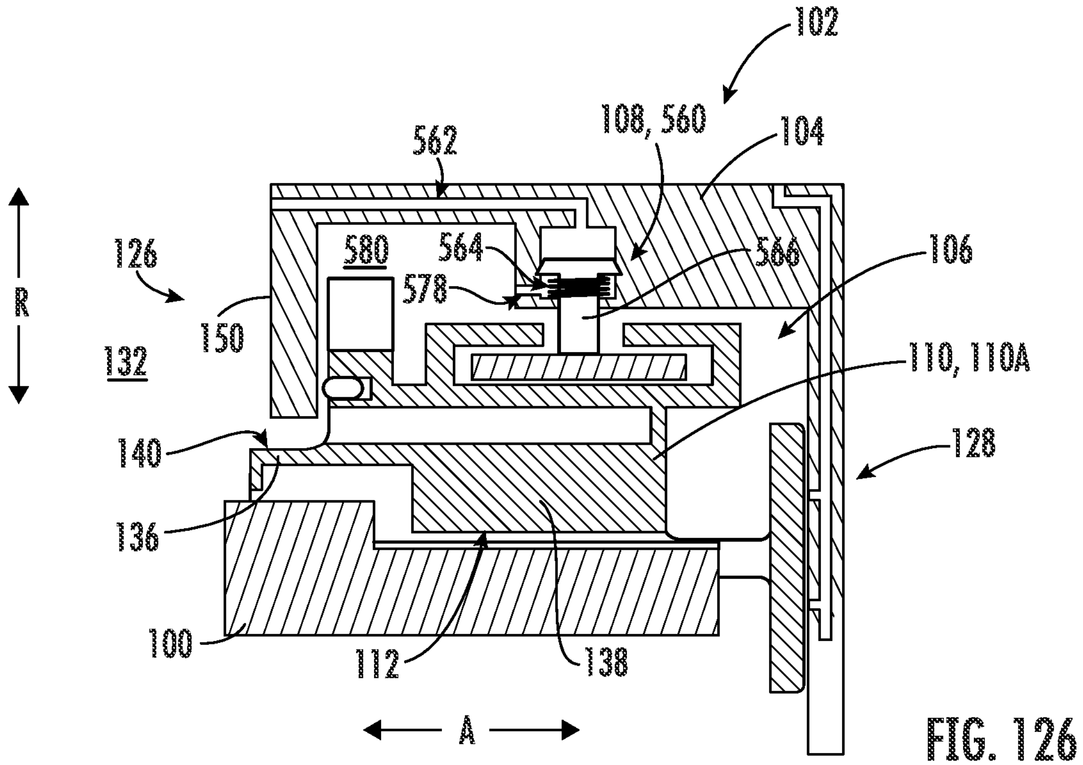

Referring now to FIGS. 125 and 126, another exemplary embodiment of the present disclosure is provided. FIG. 125 provides a schematic, cross-sectional view of a section of a turbine engine, and more specifically of a section of a stator 102 having a carrier 104, a rotor 100, a seal assembly 106 positioned between the carrier 104 and the rotor 100, and a seal support assembly 108. The view of FIG. 125 is in a plane defined by a radial direction R and an axial direction A of a turbine engine. FIG. 125 provides a view of the assembly in a first position, and FIG. 126 provides a view of the assembly in a second position. The exemplary embodiment of FIGS. 125 and 126 may be configured in a similar manner as one or the exemplary embodiments described hereinabove.

For example, the seal assembly 106 includes a plurality of seal segments 110, the plurality of seal segments 110 having a first seal segment 110A having a seal face 112 configured form of fluid bearing with the rotor 100. The first seal segment 110A includes a lip 136 and a body 138, with the lip 136 extending away from the body 138 along the axial direction A of the turbine engine and defining an outer pressurization surface 140. The outer pressurization surface 140 is exposed to a high-pressure cavity 132 on a high-pressure side 126 of the seal assembly 106. During operation of the turbine engine, the high-pressure cavity 132 may exert a force on the outer pressurization surface 140 inwardly along the radial direction R.

The seal support assembly 108 includes a pneumatic engagement assembly 560 operable to bias the first seal segment 110A along the radial direction R during operation of the turbine engine. In particular, as will be explained in more detail below, the pneumatic engagement assembly 560 extends between the carrier 104 and the first seal segment 110A to counter the pressure on the outer pressurization surface 140 during operation of the turbine engine. The pneumatic engagement assembly 560 may additionally provide such functionality while allowing for passive control of a radial clearance gap defined between the seal face 112 and the rotor 100 during operation of the turbine engine.

As is depicted, the pneumatic engagement assembly 560 is, for the embodiment shown, in fluid communication with a high-pressure air supply. More specifically, for the embodiment shown, the high-pressure air supply is the high-pressure cavity 132 positioned at the high-pressure side 126 of the seal assembly 106. The high-pressure cavity 132 is in fluid communication with a working gas flowpath defined by the turbine engine, at a high-pressure location of the turbine engine (e.g., a high-pressure compressor or a high-pressure turbine; see, e.g., FIG. 3). More specifically, in the embodiment shown, the pneumatic engagement assembly 560 includes a high-pressure air duct 562 extending to the high-pressure side 126 of the seal assembly 106 and in fluid communication with the high-pressure cavity 132. During operation, a high-pressure air flow may be provided through the high-pressure air duct 562 of the pneumatic engagement assembly 560.

It will be appreciated, however, that in other exemplary embodiments, the pneumatic engagement assembly 560 may instead be in fluid communication with any other suitable high-pressure air source.

More specifically, it will be appreciated that the pneumatic engagement assembly 560 defines a pressure chamber 564 and includes an extension member 566. The extension member 566 is coupled to the first seal segment 110A and is movable along the radial direction R. Moreover, the extension member 566 is positioned at least partially within the pressure chamber 564.

Figure 127:
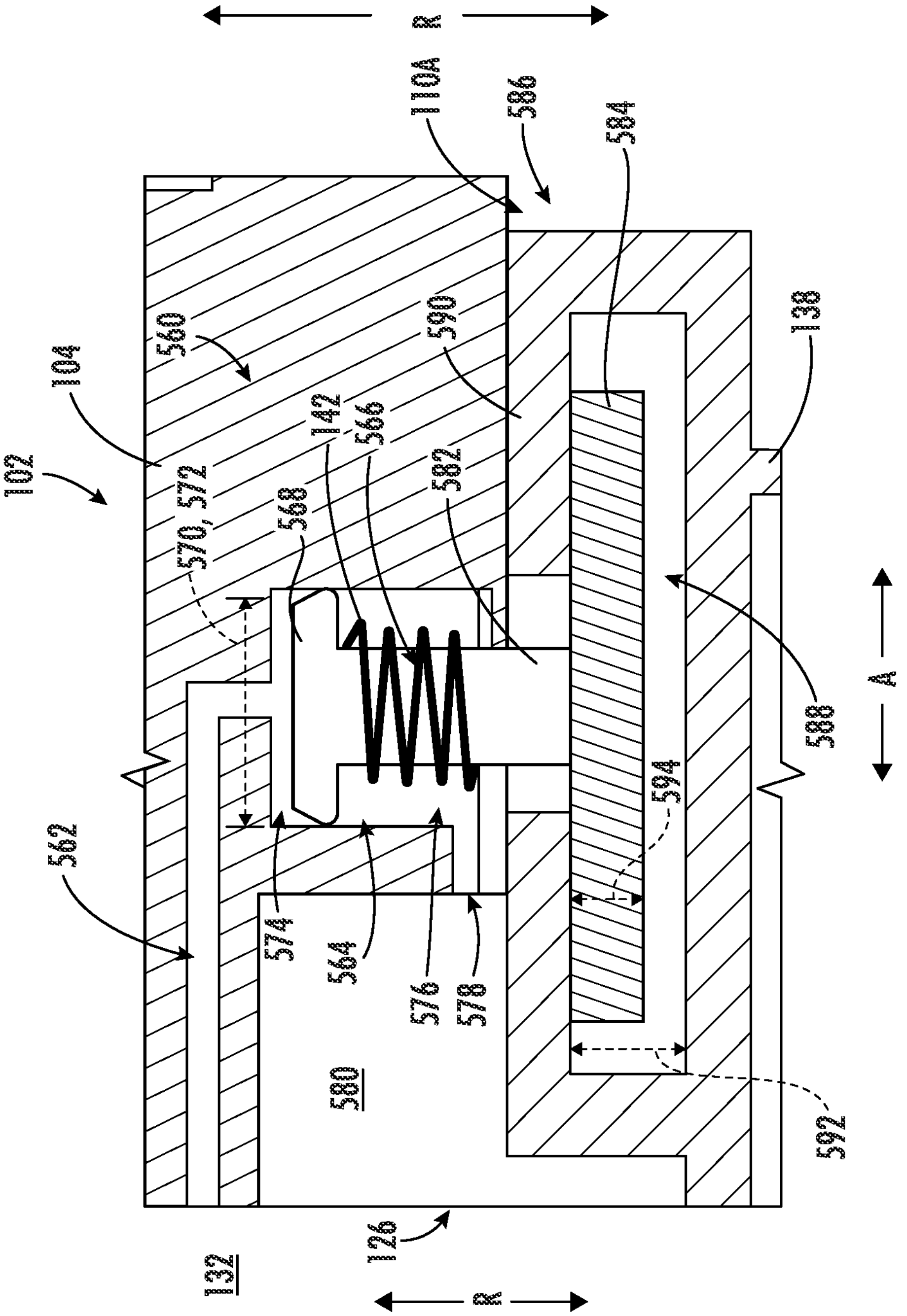

Referring briefly also to FIG. 127, providing a close-up view of the pneumatic engagement assembly 560 of FIGS. 125 and 126 (in the position depicted in FIG. 125), the pressure chamber 564 and extension member 566 generally form a piston arrangement. In particular, the extension member 566 includes a pressure head 568 having a pressure surface positioned within the pressure chamber 564. The pressure head 568 defines a head crosswise measure 570 and the pressure chamber 564 defines a chamber crosswise measure 572. The head crosswise measure 570 is within 5% of the chamber crosswise measure 572 (e.g., the head crosswise measure 570 equals chamber crosswise measure 572 plus or minus chamber crosswise measure 572 times 0.05). In such a manner, it will be appreciated that the pressure head 568 may generally form a seal with a wall of the pressure chamber 564.

The pressure chamber 564 generally includes a high-pressure side 574 and a low-pressure side 576, separated by the pressure head 568. The high-pressure side 574 is in fluid communication with the high-pressure air duct 562 for receiving the high-pressure airflow during operation the turbine engine. The pneumatic engagement assembly 560 further defines a low-pressure air duct 578. The low-pressure air duct 578 is in fluid communication with the low-pressure side 576 of the pressure chamber 564. In the embodiment shown, the low-pressure air duct 578 is in fluid communication with a low-pressure cavity 580 located outward of the first seal segment 110A and inward of the carrier 104. As explained in more detail above, the first seal segment 110A forms a seal with a radial extension 150 of the carrier 104 to eliminate or reduce a high-pressure airflow from the high-pressure cavity 132 to the low-pressure cavity 580 (see the circumferential seal 172 in FIGS. 125 and 126).

Further, the extension member 566 generally includes rod 582 extending from the pressure head 568 towards the first seal segment 110A. The pneumatic engagement assembly 560 includes a spring extension 142 positioned within the pressure chamber 564 to bias the pressure head 568 outward along the radial direction R. During operation of the turbine engine a pressure difference between the high-pressure side 574 of the pressure chamber 564 and the low-pressure side 576 of the pressure chamber 564 may generate a downward force along the radial direction R that may overcome the outward force exerted on the pressure head 568 by the spring extension 142 (see, e.g., FIG. 126).

Referring still to FIG. 127, the extension member 566 is coupled to the first seal segment 110A, such that movement of the pressure head 568 and extension member 566 along the radial direction R within the pressure chamber 564 may correspondingly move the first seal segment 110A along the radial direction R.

In particular, for the embodiment depicted, the extension member 566 includes an engagement guide 584 positioned at an end of the rod 582, more specifically, positioned at an inner end of the rod 582 along the radial direction R. The first seal segment 110A includes a hanger 586, with the hanger 586 defining a cavity 588. More specifically, the hanger 586 includes a tangential extension 590 spaced from the body 138 of the first seal segment 110A along the radial direction R. The separation of the tangential extension 590 from the body 138 forms the cavity 588, such that the cavity 588 is defined between the tangential extension 590 and the body 138. The engagement guide 584 of the extension member 566 is positioned within the cavity 588 of the hanger 586.

As will be appreciated, for the embodiment shown, the cavity 588 defines a height 592 along the radial direction R. Similarly, the engagement guide 584 defines the thickness 594 along the radial direction R. The height 592 of the cavity 588 is greater than the thickness 594 of the engagement guide 584 along the radial direction R. Such a configuration may allow for the first seal segment 110A to form a hydrodynamic fluid bearing with the rotor 100 during operation of the turbine engine, e.g., at a high-power operating condition (see, e.g., FIG. 126). For example, the first seal segment 110A may move slightly along the radial direction R relative to the extension member 566 during such an operating condition (see, e.g., FIG. 126).

In at least certain exemplary embodiments, such as the embodiment of FIGS. 125 through 127, the engagement guide 584 may be a circular member (e.g., as viewed along the radial direction R) and the cavity 588 may similarly be a circular cavity (e.g., as viewed along the radial direction R).

It will be appreciated, however, that another exemplary embodiments, the pneumatic engagement assembly 560 may have any other suitable configuration.

Figure 128:
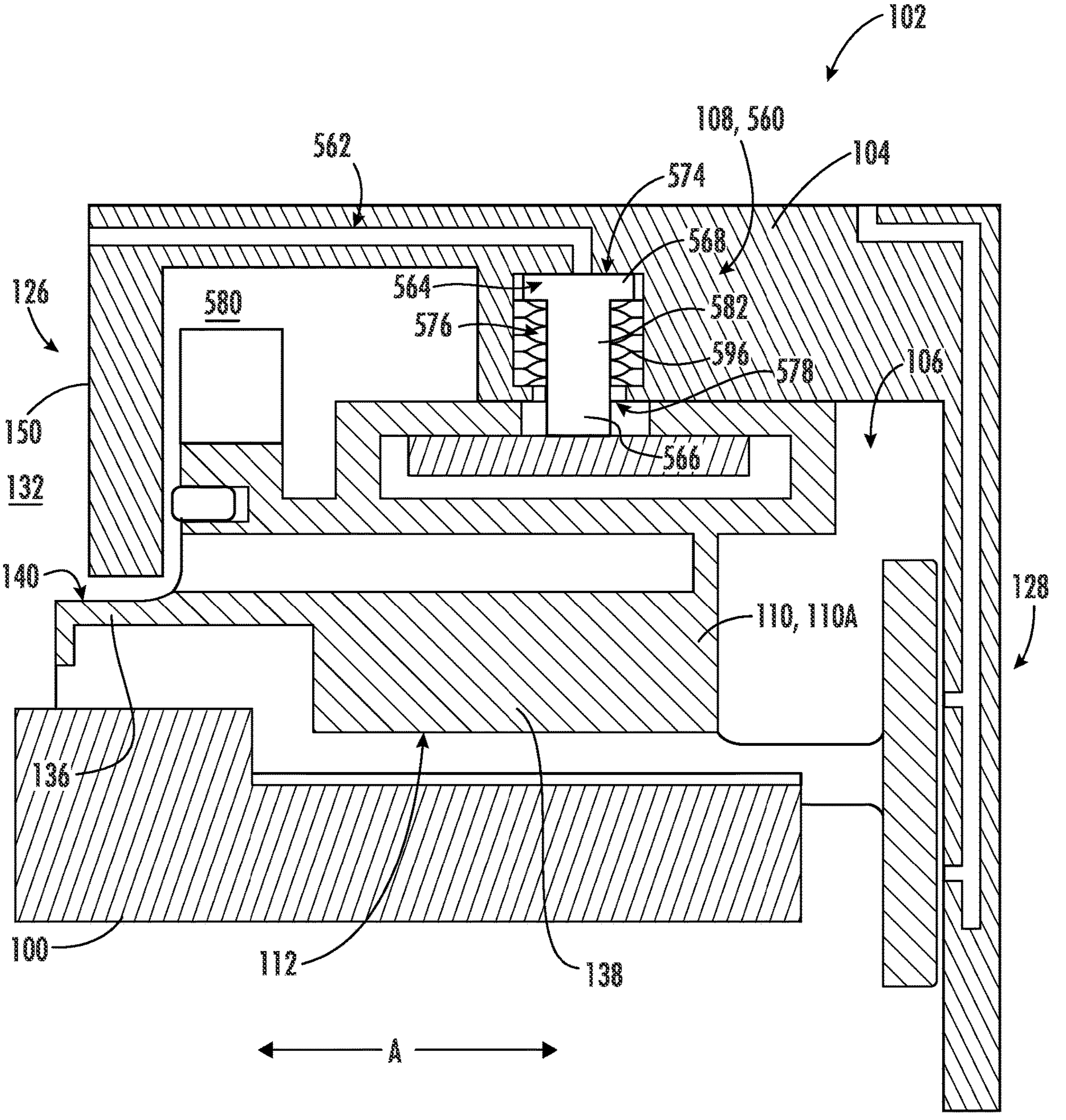

For example, referring now briefly to FIG. 128, pneumatic engagement assembly 560 in accordance with another example embodiment of the present disclosure is provided. The pneumatic engagement simile of FIG. 128 may be configured in a similar manner as exemplary pneumatic engagement assembly 560 of FIGS. 125 and 126. However, for the embodiment of FIG. 128, the pneumatic engagement assembly 560 does not include a spring extension 142 extending from a pressure head 568. Instead, pneumatic engagement assembly 560 includes a bellows 596 extending from the pressure head 568 and positioned around a rod 582 of the extension member 566 within the pressure chamber 564. With such a configuration, the pressure head 568 may not form a seal with a wall of the pressure chamber 564. Further, with such configuration, a high-pressure side 574 of the pressure chamber 564 may be a portion of the pressure chamber 564 located outward of the pressure head 568 along the radial direction R and outside of the bellows 596. The low-pressure side 576 of the pressure chamber 564 may be located inward of the bellows 596, between the bellows 596 and the rod 582. Notably, the pneumatic engagement assembly 560 includes one or more openings to the pressure chamber 564 to provide a low-pressure airflow to the low-pressure side 576 of the pressure chamber 564. More specifically, for the embodiment depicted, the one or more openings are defined around the rod 582 of the extension member 566, and open up into the low-pressure side 576 of the pressure chamber 564. In such a manner, the openings may be considered a low-pressure air duct 578 of the pneumatic engagement assembly 560.

Figure 129:
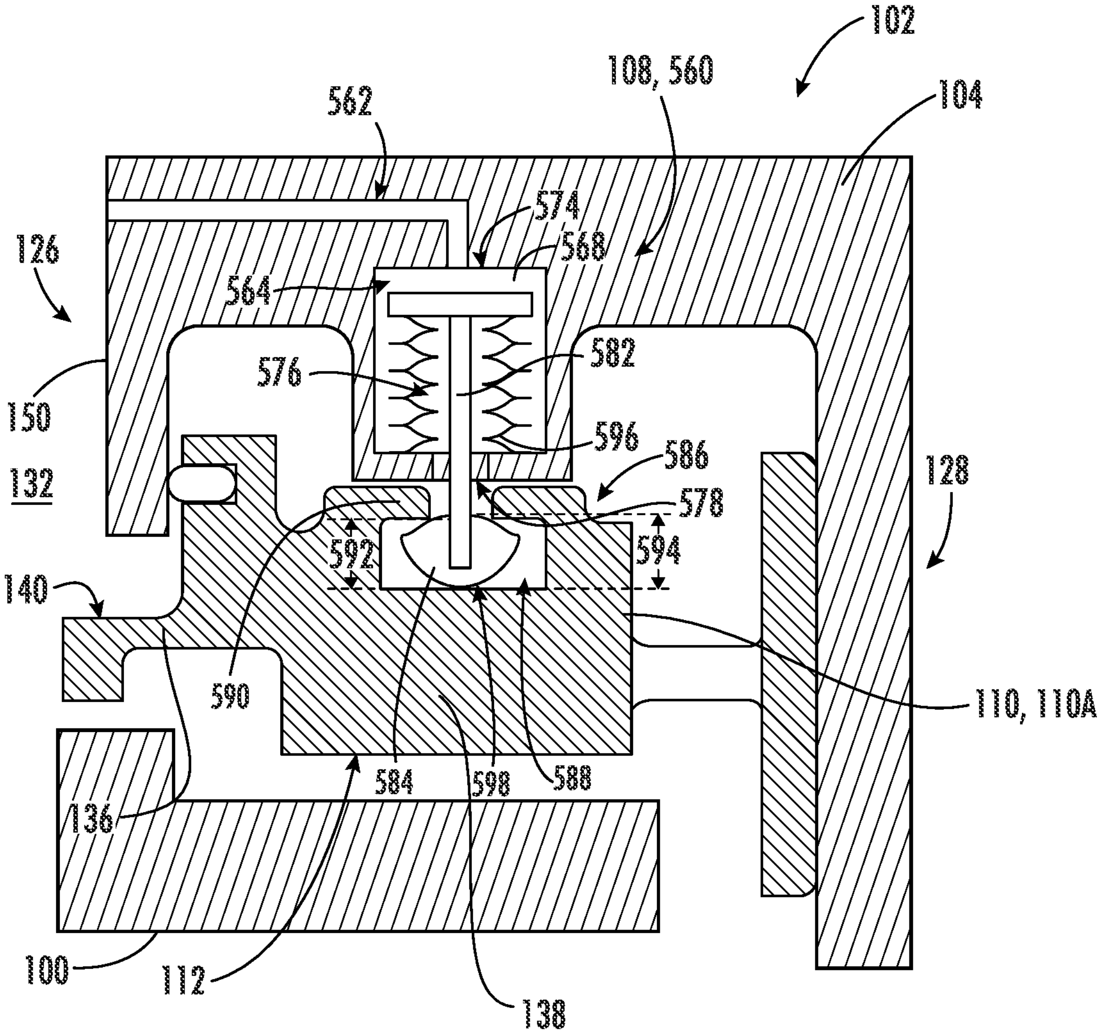

Further, referring now to FIG. 129, a pneumatic engagement assembly 560 in accordance with another exemplary embodiment of the present disclosure is provided. The pneumatic engagement assembly 560 of FIG. 129 may be configured in a similar manner as exemplary pneumatic engagement assembly 560 of FIG. 128. However, for the embodiment depicted, an engagement guide 584 of the extension member 566 defines a thickness 594 along the radial direction R at least equal to a height 592 of a cavity 588 of a hanger 586 of a first seal segment 110A. Further, for the embodiment of FIG. 129, an inner surface 598 along the radial direction R of the engagement guide 584 defines a rounded profile. Such a configuration may allow for first seal segment 110A to twist slightly relative to the extension member 566 during operation of the turbine engine.

Figure 130:
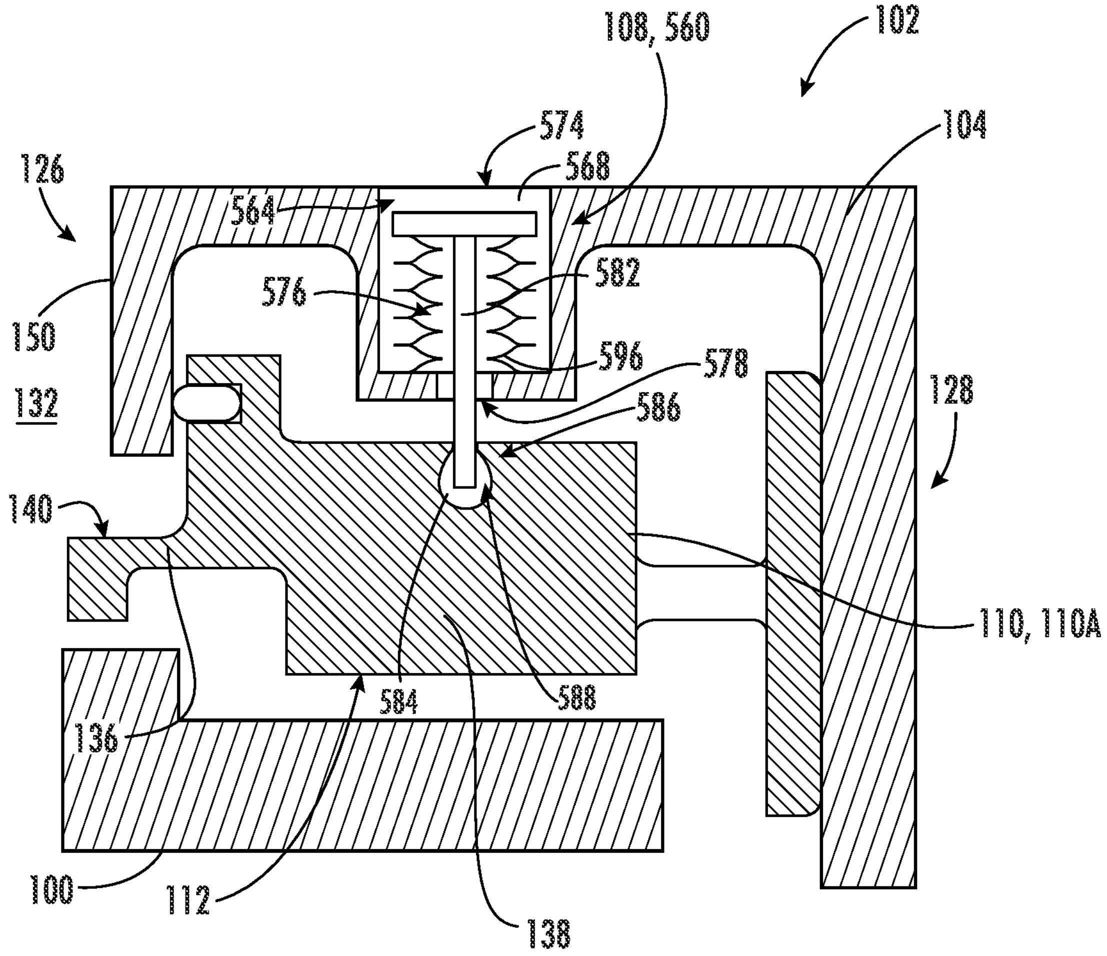

Further, still, referring now to FIG. 130, a pneumatic engagement assembly 560 in accordance with yet another exemplary embodiment of the present disclosure is provided. The pneumatic engagement assembly 560 of FIG. 130 may also be configured in a similar manner as exemplary pneumatic engagement assembly 560 of FIG. 128. However, for the embodiment of FIG. 130, the engagement guide 584 is a spherical member, and a cavity 588 of a hanger 586 of a first seal segment 110A defines a complementary spherical shape. Such a configuration may allow for the first seal segment 110A to twist relative to the extension member 566 and/or rotate relative to the extension member 566.

Figure 131:
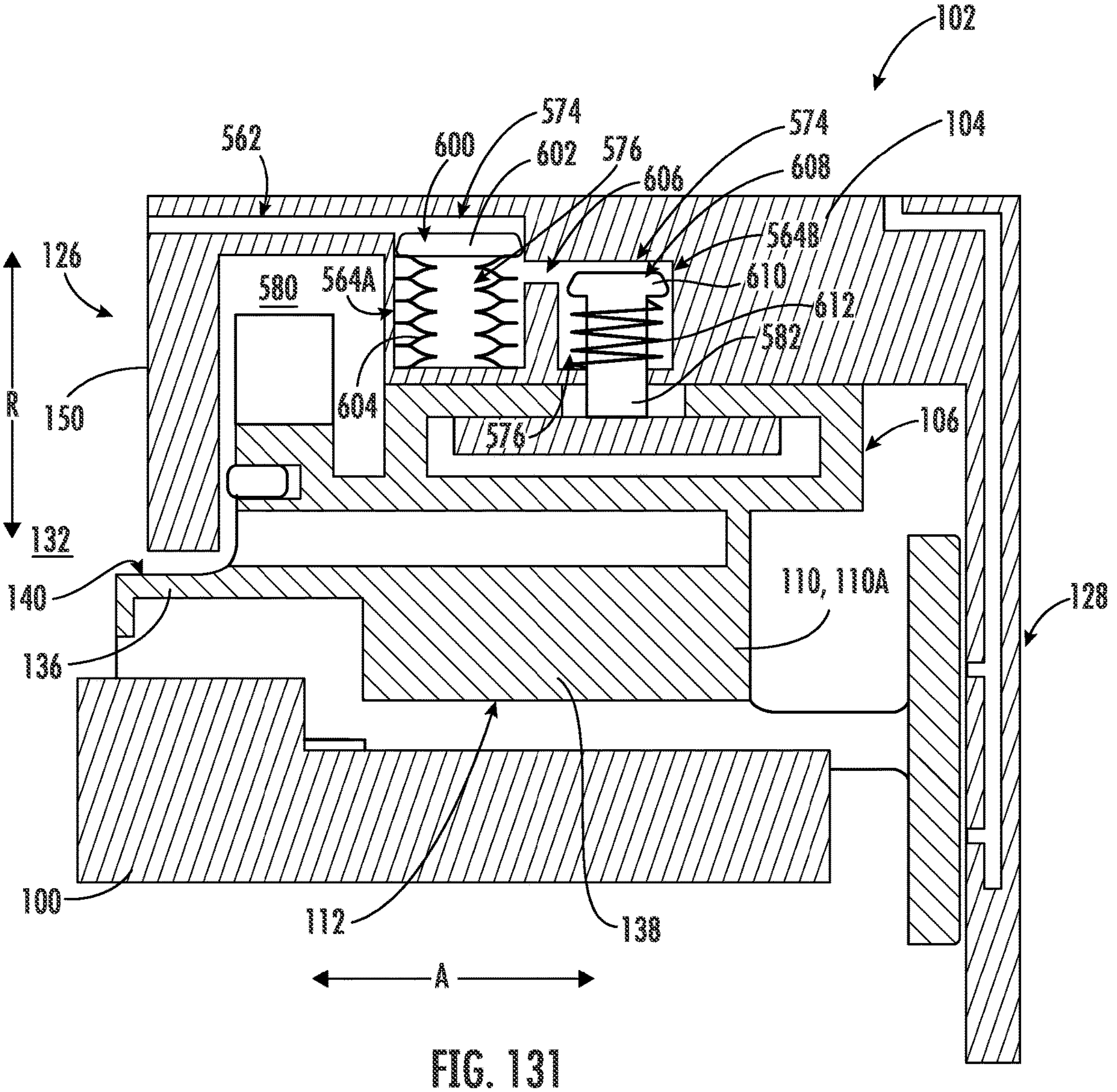
Figure 132:
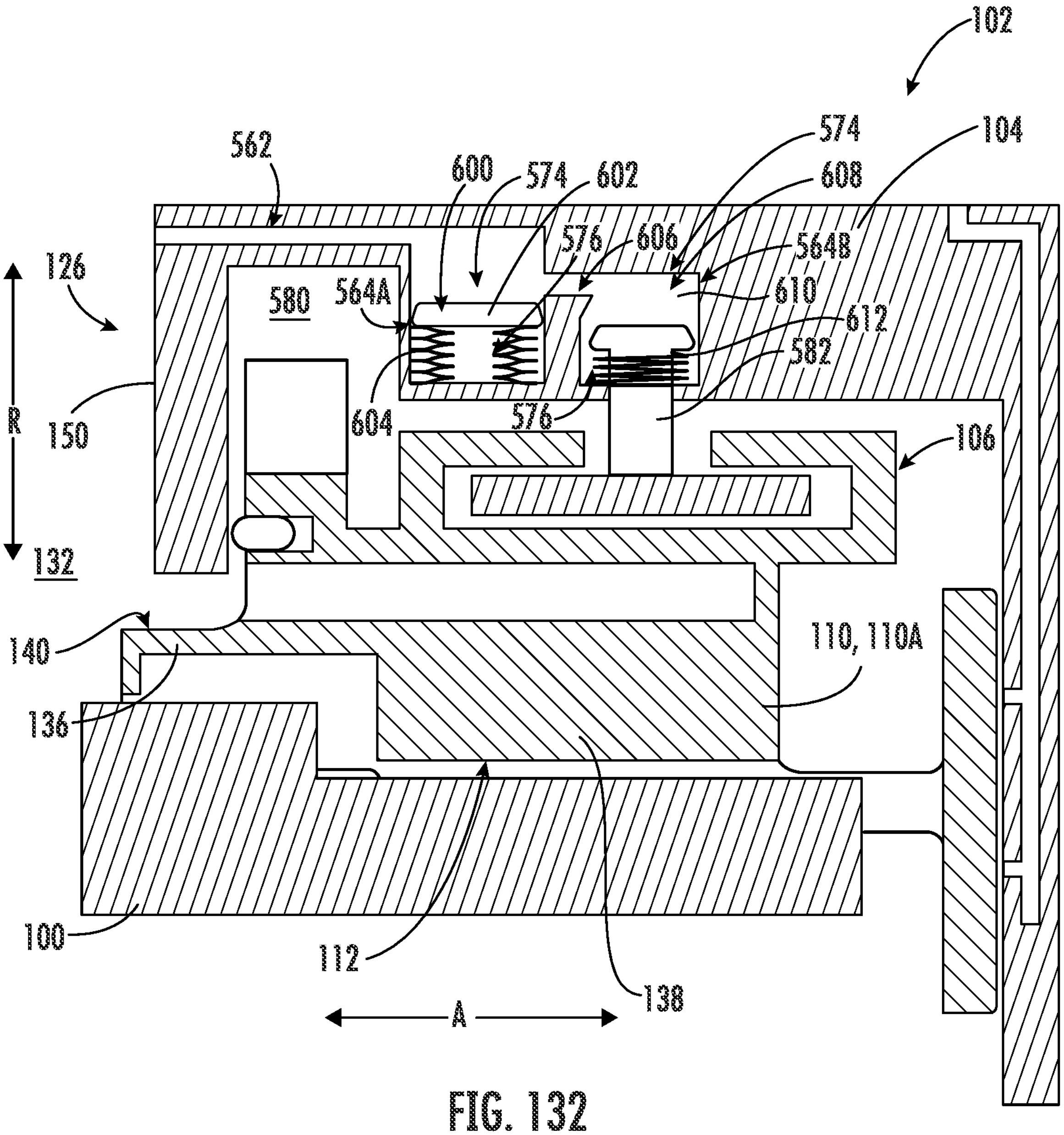

Referring now to FIGS. 131 and 132, a pneumatic engagement assembly 560 in accordance with yet another exemplary embodiment of the present disclosure is provided. The exemplary pneumatic engagement assembly 560 of FIGS. 131 and 132 may be configured in a similar manner as exemplary pneumatic engagement assembly 560 of FIGS. 125 and 126.

In particular, FIG. 131 depicts an assembly in accordance with an exemplary embodiment of the present disclosure in a first position and FIG. 132 depicts the assembly of FIG. 131 and a second position. The first position may correspond to a low power operating condition of a turbine engine, and the second position may correspond to a high power operating condition of the turbine engine.

The embodiment of FIGS. 131 and 132 includes a seal support assembly 108 having a pneumatic engagement assembly 560. The exemplary pneumatic engagement assembly 560 includes a pressure chamber 564 similar to the embodiment described above. However, for the embodiment of FIGS. 131 and 132, the pressure chamber 564 is a first pressure chamber 564A and the pneumatic engagement assembly 560 further includes a second pressure chamber 564B. The second pressure chamber 564B is located downstream of the first pressure chamber 564A.

Additionally, the pneumatic engagement assembly 560 includes a retraction member 600 positioned within the first pressure chamber 564A movable between a first position (see FIG. 131) and a second position (see FIG. 132) along a length of the first pressure chamber 564A. For the embodiment depicted, the retraction member 600 includes a first pressure head 602 and a spring extension 604. The first pressure chamber 564A defines a high-pressure side 574 and low-pressure side 576 on opposing sides of the pressure head 568. In the embodiment depicted, the spring extension 604 is positioned on the low-pressure side 576. The pressure head 568 may form a seal with a wall of the first pressure chamber 564A, creating a fluid seal between the low-pressure side 576 and the high-pressure side 574. The high-pressure side 574 is in fluid communication with a high-pressure air source, such as a high-pressure cavity 132 through a high-pressure air duct 562 of the pneumatic engagement assembly 560.

The first pressure chamber 564A further defines an air outlet 606 in fluid communication with the second pressure chamber 564B. The air outlet 606 is located at a location between the first position and the second position of the retraction member 600. In such a manner, when the first pressure chamber 564A receives a high-pressure airflow at a sufficiently high-pressure to overcome a spring force of the spring extension 604, moving the retraction member 600 from the first position (see FIG. 131) to the second position (see FIG. 132), the air outlet of the first pressure chamber 564A may become in fluid communication with the high-pressure air source through the first pressure chamber 564A and high-pressure air duct 562.

Referring particularly to FIG. 132, when the retraction member 600 is moved to the second position, the high-pressure air may flow through the air outlet 606 of the first pressure chamber 564A to the second pressure chamber 564B. The second pressure chamber 564B may be configured in a similar manner as the pressure chamber 564 described above with reference to FIGS. 125 and 126. Accordingly, in at least the embodiment depicted, the pneumatic engagement assembly 560 includes a second extension member 608 positioned at least partially within the second pressure chamber 564B, with the second extension member 608 including a second pressure head 610 in a rod 582 extending along the radial direction R from the second pressure head 610 to the first seal segment 110A. The second pressure head 610 may form a seal with a wall of the second pressure chamber 564B. A spring extension 612 is positioned within the second pressure chamber 564B on a low-pressure side 576 of the second pressure chamber 564B to bias the second extension member 608 outward along the radial direction R. A spring resistance of the spring extension 612 position within the second pressure chamber 564B may be less than a spring resistance of the spring extension 604 positioned within the first pressure chamber 564A.

Accordingly, in the embodiment depicted, once a pressure of the airflow provided to the first pressure chamber 564A is sufficient to move the retraction member 600 to the second position (see FIG. 132), the airflow may further be sufficient to move the second extension member 608 downward along the radial direction R to close a radial gap defined between a seal face 112 of the first seal segment 110A and the rotor 100. In such a manner, the pneumatic engagement assembly 560 may provide a substantially stepwise movement of the first seal segment 110A.

In still other exemplary embodiments, the pneumatic engagement assembly 560 may have still other suitable configurations. For example, referring now to FIGS. 133 and 134 an assembly in accordance with another example embodiment of the present disclosure is provided. The exemplary assembly of FIGS. 133 134 may be configured in a similar manner as one or the exemplary embodiments described above.

Figure 133:
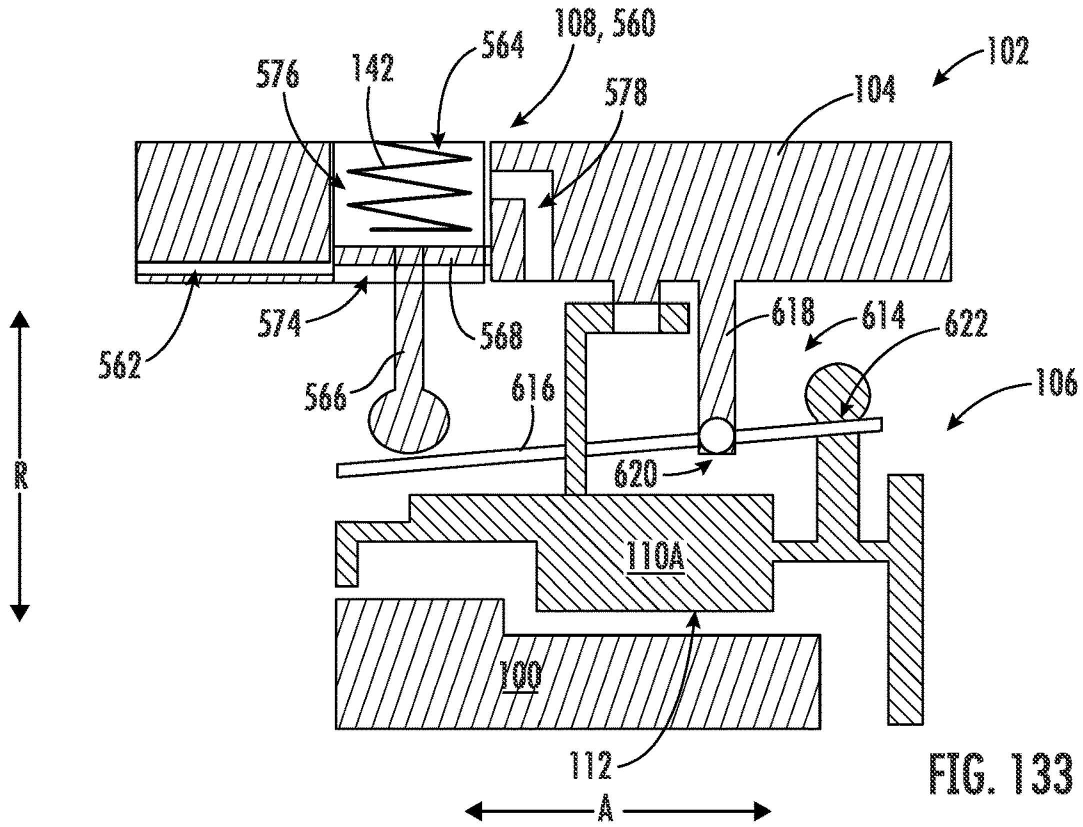
Figure 134:
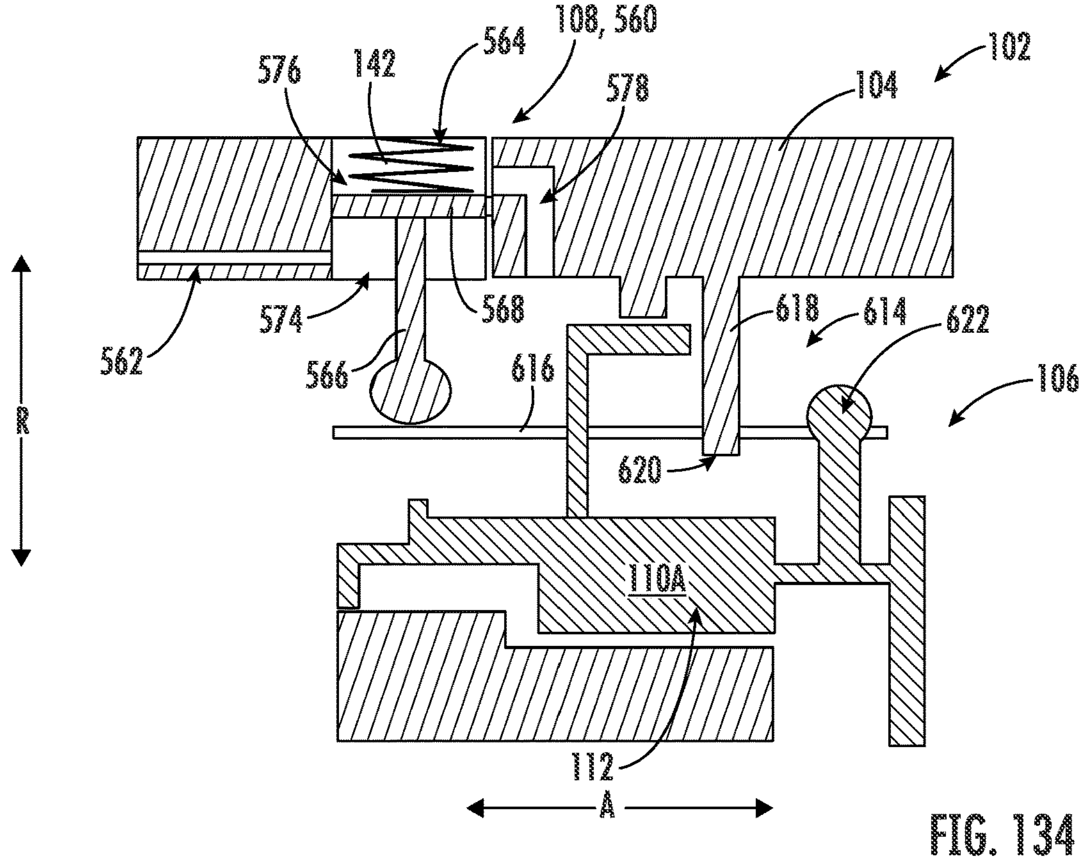

For example, the exemplary embodiment of FIGS. 133 and 134 includes a seal support assembly 108 having a pneumatic engagement assembly 560. The pneumatic engagement assembly 560 includes a pressure chamber 564 and an extension member 566 positioned at least partially within the pressure chamber 564. More specifically, the extension member 566 is movable along the radial direction R, and includes a pressure head 568 positioned within the pressure chamber 564. Further, the pressure chamber 564 defines a high-pressure side 574 and a low-pressure side 576 on opposing sides of the pressure head 568. However, for the embodiment of FIGS. 133 and 134, the high-pressure side 574 of the pressure chamber 564 is positioned inward along the radial direction R from the low-pressure side 576. Accordingly, as higher pressure airflow is provided to the high-pressure side 574 of the pressure chamber 564, the extension member 566 is configured to move outwardly along the radial direction R. In order to have such movement translate to inward movement of the first seal segment 110A, the pneumatic engagement assembly 560 includes a lever assembly 614, with the extension member 566 coupled to the first seal segment 110A through the lever assembly 614. For the embodiment shown, the lever assembly 614 generally includes a lever extension 616 and a radial extension 618 extending from the carrier 104 and defining a pivot point 620 for the lever extension 616. The lever extension 616 extends between the radial extension 618 and an attachment point 622 to the first seal segment 110A.

As will be appreciated, the view of FIG. 133 may represent a position of the first seal segment 110A during a low-power operating condition of the turbine engine, and the view of FIG. 134 may represent a position of the first seal segment 110A during a high-power operating condition of the turbine engine.

Figure 135:
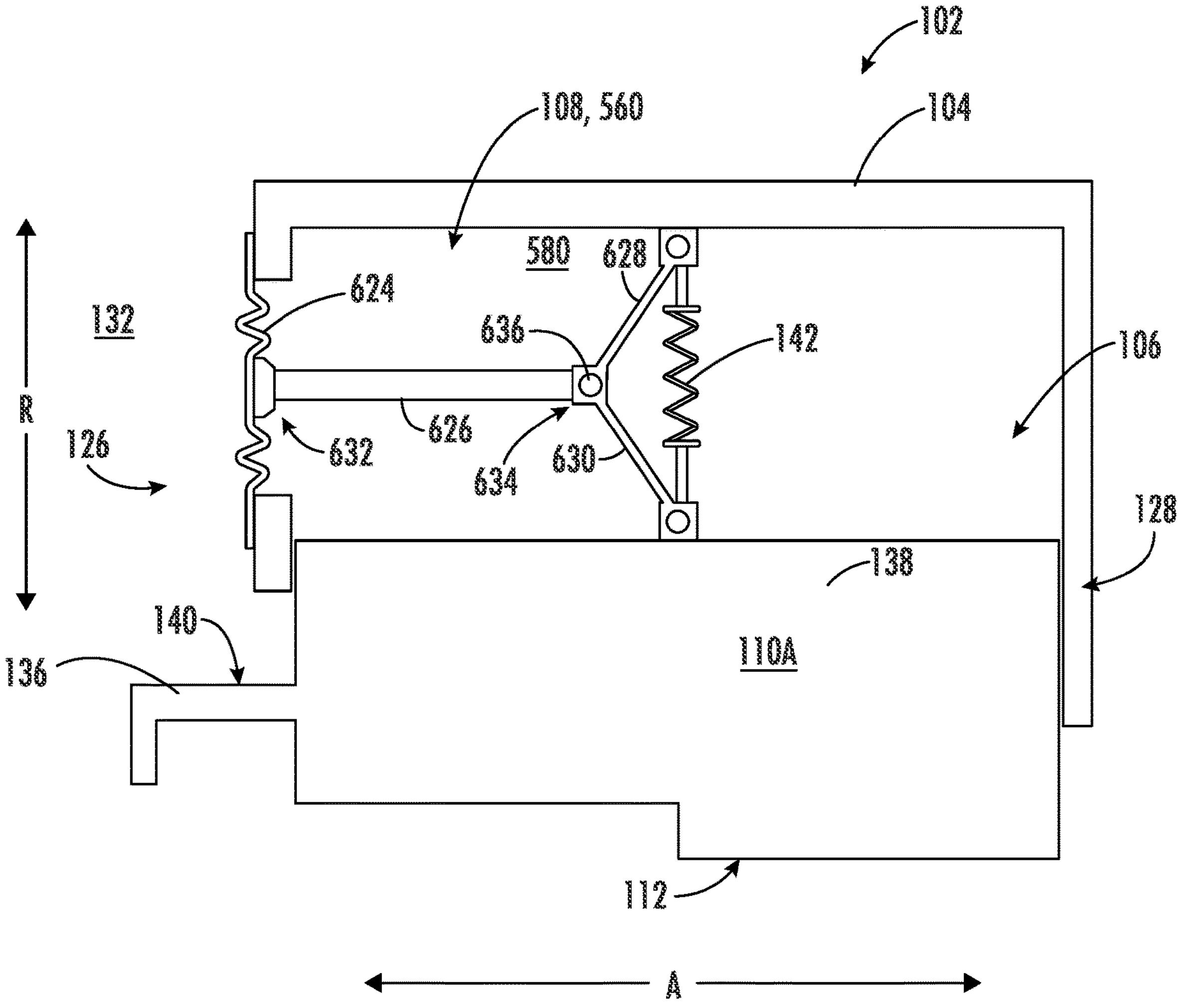

Referring now to FIG. 135, a pneumatic engagement assembly 560 in accordance with another exemplary embodiment of the present disclosure is provided. The exemplary embodiment of FIG. 135 may be configured in a similar manner as one or the exemplary embodiments described above.

For example, the embodiment of FIG. 135 includes a seal assembly 106, a carrier 104, and a seal support assembly 108 configured to support the seal assembly 106 relative to the carrier 104. In particular, the seal assembly 106 includes a first seal segment 110A. Further, the seal support assembly 108 includes the pneumatic engagement assembly 560.

However, for the embodiment of FIG. 135, the pneumatic engagement assembly 560 includes a diaphragm 624 positioned between a high-pressure cavity 132 and a low-pressure cavity 580. In addition, the pneumatic engagement assembly 560 includes a first engagement rod 626, a second engagement rod 628, a third engagement rod 630, and a spring extension 142. The first engagement rod 626 is coupled to the diaphragm 624 and configured to move in a direction perpendicular to a radial direction R of the turbine engine. The second engagement rod 628 and third engagement rod 630 are pivotably coupled to the first engagement rod 626. In particular, for the embodiment shown, the first engagement rod 626 extends between a first end 632 coupled to the diaphragm 624 and a second end 634 defining a pivot connection 636 with the second engagement rod 628 and the third engagement rod 630. The second engagement rod 628 is further coupled to the carrier 104 and the third engagement rod 630 is further coupled to the first seal segment 110A.

The spring extension 142 extends between the carrier 104 and the first seal segment 110A to bias the first seal segment 110A outwardly along the radial direction R.

During operation, an increase in pressure in the high-pressure cavity 132 relative to the low-pressure cavity 580 may cause the diaphragm 624 to deflect towards the low-pressure cavity 580, moving the rod 582 further into low-pressure cavity 580, and pressing the second engagement rod 628 and third engagement rod 630 away from one another to move the first seal segment 110A inwardly along the radial direction R relative to the carrier 104.

Notably, in other embodiments, the spring extension 142 may additionally or alternatively be coupled to the second engagement rod 628 and/or the third engagement rod 630.

Further, referring now to FIGS. 136 and 137, an assembly in accordance with another exemplary embodiment of the present disclosure is provided. The assembly of FIGS. 136 and 137 may be configured in a similar manner as one or more of the embodiments described hereinabove. The view of FIG. 136 is in a reference plane defined by an axial direction A of the turbine engine and a radial direction R of the turbine engine. The view of FIG. 137 is in a reference plane defined by the axial direction A and a circumferential direction C of the turbine engine.

For example, the embodiment of FIGS. 136 and 137 includes a seal assembly 106, a carrier 104, and a seal support assembly 108 configured to support the seal assembly 106 relative to the carrier 104. In particular, the seal assembly 106 includes a first seal segment 110A. Further, the seal support assembly 108 includes a pneumatic engagement assembly 560. However, for the embodiment of FIG. 135, the pneumatic engagement assembly 560 includes a pressurized sliding chamber 640. The pressurized sliding chamber 640 includes a slider 642 positioned at least partially within the pressurized sliding chamber 640. The pressurized sliding chamber 640 defines a high-pressure side 644 and a low-pressure side 646 on opposing sides of the slider 642. The high-pressure side 644 may be in fluid communication with a high-pressure cavity 132 and the low-pressure side 646 may be in fluid communication with a low-pressure cavity 580. The high-pressure cavity 132 may be in fluid communication with a working gas flowpath of the turbine engine, such that as the turbine engine moves from a low-power operating condition to a high-power operating condition, a pressure within the high-pressure cavity 132 (and within the high-pressure side 644 of the pressurized sliding chamber 640) increases.

The slider 642 includes a radial extension 650 extending inwardly along the radial direction R to the first seal segment 110A. The first seal segment 110A defines an engagement surface 652 having a slope relative to a direction in which the pressurized sliding chamber 640 extends. More particularly, for the embodiment depicted the pressurized sliding chamber 640 extends in the axial direction A and the first seal segment 110A defines the engagement surface 652 having the slope relative to the axial direction A.

A spring extension 142 extends between the first seal segment 110A and the carrier 104 to bias the first seal segment 110A outwardly along the radial direction R.

In such a manner, it will be appreciated that as a pressure within the high-pressure side 644 of the pressurized sliding chamber 640 increases, the slider 642 may move along a length of the pressurized sliding chamber 640, and the radial extension 650 may engage with the engagement surface 652 of the first seal segment 110A, moving the first seal segment 110A inwardly along the radial direction R.

Moreover, in still other exemplary embodiments a pneumatic engagement assembly 560 may have still other suitable configurations. For example, referring now to FIGS. 138 and 139, another example embodiment of the present disclosure is provided, with a pneumatic engagement assembly 560 moved between a first position (see FIG. 138) and a second position see FIG. 139). The embodiment of FIGS. 138 and 139 may be configured in substantially the same manner as the example embodiment described above with reference to FIGS. 136 and 137. For example, the exemplary embodiment of FIGS. 138 and 139 includes the pneumatic engagement assembly 560 defining a pressurized sliding chamber 640 coupled to the carrier 104 and including a slider 642 position at least partially within the pressurized sliding chamber 640.

Additionally, the pneumatic engagement assembly 560 includes a radial member 654 extending to the first seal segment 110A. The slider 642, however, in the embodiment depicted, includes an engagement surface 656 having a slope relative to a direction in which the pressurized sliding chamber 640 extends. In particular, for the embodiment depicted, the slider 642 includes the engagement surface 656 having the slope relative to the axial direction A. The engagement surface 656 is engaged with the radial member 654 to move the first seal segment 110A along the radial direction R relative to the carrier 104. A spring extension 660 is provided to bias the radial member 654 outward along the radial direction R.

In particular, as with the embodiment above, the pressurized sliding chamber 640 defines a high-pressure side 644 and a low-pressure side 646 on opposing sides of the slider 642, with a pressure differential from the high-pressure side 644 to the low-pressure side 646 driving the slider 642, and in turn moving the first seal segment 110A along the radial direction R relative to the carrier 104. A spring extension 658 is provided within the pressurized sliding chamber 640 to bias the slider 642 towards the high-pressure side 644 of the pressurized sliding chamber 640.

As will be appreciated, the view of FIG. 138 may correspond to a low power operating condition of the turbine engine, and the view of FIG. 139 may correspond to a high-power operating condition of the turbine engine.

Further, referring briefly to FIGS. 140 and 141, yet another example embodiment of the present disclosure is provided. The exemplary embodiment of FIGS. 140 and 141 may be configured in substantially the same manner as the exemplary embodiment of FIGS. 138 and 139. However, for the embodiment of FIGS. 140 and 141, a radial member is configured to move within an engagement slot 662 defined within the slider 642.

Referring now to FIG. 142, an assembly in accordance with another embodiment of the present disclosure is provided. The embodiment of FIG. 142 may be configured in a similar manner as one or the embodiments described herein. For example, the embodiment of FIG. 142 includes a stator 102 having a carrier 104, a rotor 100, a seal assembly 106 including a first seal segment 110A and positioned between the carrier 104 and the rotor 100, and a seal support assembly 108. The seal support assembly 108 includes a pneumatic engagement assembly 560 (see FIG. 143, below).

Referring also to FIG. 143, providing a schematic, cross-sectional view of a portion of the assembly of FIG. 142 along Line 143-143 in FIG. 142, it will be appreciated that the pneumatic engagement assembly 560 further includes a unison ring 664. More specifically, the seal assembly 106 includes a plurality of seal segments 110, the plurality of seal segments 110 including the first seal segment 110A and a second seal segment 110B (the remaining seal segments 110 are omitted in FIG. 143 for clarity). Each of the plurality of seal segments 110 is slidably coupled to the unison ring 664, as will be described in more detail below.

Further, the pneumatic engagement assembly 560 includes a pneumatic piston assembly 686 having a pressure chamber 564 and an extension member 566 positionally at least partially within the pressure chamber 564. The extension member 566 includes a pressure head 568 and a rod 582 extending from the pressure head 568. The pressure chamber 564 defines a high-pressure side 644 and a low-pressure side 646 on opposing sides of the pressure head 568. The unison ring 664 is coupled to the rod 582 at a pivotable attachment point 668. Currently, an increase in a pressure change across the high-pressure side 644 and low-pressure side 646 within the pressure chamber 564 may move the rod 582, and therefore may rotate the unison ring 664.

The unison ring 664 defines a plurality of angled slots 670 relative to the radial direction R. The unison ring 664 is slidably coupled to the plurality of seal segments 110 through the plurality of angled slots 670 and the pneumatic engagement assembly 560 is operable to rotate the unison ring 664 along a circumferential direction C of the turbine engine to move the plurality of seal segments 110 along the radial direction R. In particular, as will be appreciated from the description above, the pneumatic piston assembly 666 of the pneumatic engagement assembly 560 is configured for rotating the unison ring 664 along the circumferential direction C based on a pressure differential within the pneumatic piston assembly 666.

Briefly, referring back to FIG. 142, it will be appreciated that in at least certain exemplary embodiments, the pneumatic engagement assembly 560 may include a plurality of unison rings 664. For example, the unison ring 664 may be a first unison ring 664A and the pneumatic engagement assembly 560 may further include a second unison ring 664B slidably coupled to each of the plurality of seal segments 110 in a similar manner as the first unison ring 664A. The first unison ring 664A and second unison ring 664B are spaced from one another along an axial direction A of the turbine engine for the embodiment depicted. As will be appreciated, the embodiment depicted, the unison ring 664 extends 360 degrees in the circumferential direction C.

Inclusion of a unison ring 664 in accordance with such an exemplary embodiment may allow for a single pneumatic actuator to move a plurality of seal segments 110 along the radial direction R, potentially reducing a complexity and weight of the turbine engine.

Notably, although the unison rings of FIGS. 142 and 143 are depicted as part of a pneumatic engagement assembly, in other exemplary embodiments, the unison ring may be utilized with one or more spring actuators/spring assemblies, magnet assemblies, or the like.

Further aspects are provided by the subject matter of the following clauses:

A turbine engine defining an axial direction and a radial direction, the turbine engine comprising: a rotor; a stator comprising a carrier; a seal assembly disposed between the rotor and the stator, the seal assembly defining a high-pressure side and a low-pressure side and comprising a plurality of seal segments, the plurality of seal segments including a seal segment having a seal face forming a fluid bearing with the rotor, a lip, and a body, the lip extending from the body along the axial direction of the turbine engine on the high-pressure side and including an outer pressurization surface along the radial direction of the turbine engine; and a seal support assembly comprising a spring arrangement extending between the carrier and the seal segment to counter a pressure on the outer pressurization surface during operation of the turbine engine.

The turbine engine of any preceding clause, wherein the spring arrangement comprises plurality of spring extensions extending between the carrier and the seal segment.

The turbine engine of any preceding clause, wherein the seal segment defines a slot extending along the axial direction and a circumferential direction of the turbine engine, and wherein the plurality of spring extensions each includes a distal end positioned in the slot of the seal segment.

The turbine engine of any preceding clause, wherein the seal segment and the distal ends of the plurality of spring extensions define a clearance gap along the axial direction.

The turbine engine of any preceding clause, wherein the spring arrangement further includes a base extending along a circumferential direction, and wherein the plurality of spring extensions each extend from the base and are spaced along the circumferential direction.

The turbine engine of any preceding clause, wherein the base is coupled to the carrier.

The turbine engine of any preceding clause, wherein the seal support assembly comprises a plurality of spring arrangements spaced along a circumferential direction and an annular flange extending along the circumferential direction, wherein the annular flange is positioned between the plurality of spring arrangements and the carrier.

The turbine engine of any preceding clause, wherein the annular flange extends at least 170 degrees along the circumferential direction.

The turbine engine of any preceding clause, wherein a base of the spring arrangement is coupled to or formed integrally with the carrier proximate the high-pressure side of the seal assembly, and wherein the plurality of spring extensions contact the seal segment proximate the low-pressure side.

The turbine engine of any preceding clause, wherein the plurality of spring extensions are fixedly coupled to, or formed integrally with, the seal segment.

The turbine engine of any preceding clause, wherein the spring arrangement comprises a spring extension and a base, wherein the base is coupled to the carrier, wherein the spring extension has a distal end contacting the seal segment.

The turbine engine of any preceding clause, wherein the spring extension includes a first segment and a second segment extending at least partially along the axial direction of the turbine engine.

The turbine engine of any preceding clause, wherein the distal end of the spring extension contacts the seal segment at a location aligned along the axial direction of the turbine engine with an axial half-way point of the seal face.

The turbine engine of any preceding clause, wherein the carrier defines a radial face, and wherein the base is coupled to the carrier at the radial face.

The turbine engine of any preceding clause, wherein the spring arrangement comprises a spring extension and a base, wherein the base is coupled to the carrier, wherein the spring extension has a first segment and a second segment, wherein the first and second segments extend in parallel to the seal segment.

The turbine engine of any preceding clause, wherein the first segment contacts the seal segment proximate the high-pressure side of the seal assembly, and wherein the second segment contacts the seal segment proximate the low-pressure side of the seal assembly.

The turbine engine of any preceding clause, wherein the seal segment defines a first slot extending along the axial direction and a circumferential direction of the turbine engine from the high-pressure side of the seal assembly, wherein the seal segment further defines a second slot extending along the axial direction and the circumferential direction from the low-pressure side of the seal assembly, wherein the first segment includes a first distal end positioned in the first slot, and wherein the second segment includes a second distal end positioned in the second slot.

The turbine engine of any preceding clause, wherein the seal segment is a first seal segment, wherein the seal assembly further includes a second seal segment positioned adjacent the seal segment along a circumferential direction of the turbine engine and a piston seal extending along the circumferential direction and positioned between the carrier and the first and second seal segments.

The turbine engine of any preceding clause, wherein the spring arrangement comprises a spring extension extending between the carrier and the seal segment, the spring extension defining at least two points of contact with the carrier, at least two points of contact with the seal segment, or both.

The turbine engine of any preceding clause, wherein the spring extension includes at least two seal segments defining the at least two points of contact with the carrier.

The turbine engine of any preceding clause, wherein the spring extension includes at least two seal segments defining the at least two points of contact with the seal segment.

The turbine engine of any preceding clause, wherein the spring extension comprises a first segment and a second segment separately extending to the seal segment and defining in part a first point of contact and a second point of contact with the seal segment.

The turbine engine of any preceding clause, wherein the first segment and the second segment each define a length along the axial direction between 5% and 100% of an axial length of a seal face of the seal segment at the first point of contact and at the second point of contact respectively.

The turbine engine of any preceding clause, wherein the spring extension further comprises a third segment and a fourth segment separately extending to the carrier and defining in part a third point of contact and a fourth point of contact with the carrier.

The turbine engine of any preceding clause, wherein the spring extension further comprises a central segment, and wherein the first segment, the second segment, the third segment, and the fourth segment each extend from the central segment.

The turbine engine of any preceding clause, wherein the spring extension extends between a first end and a second end, and wherein the first and second ends define the at least two points of contact with the seal segment.

The turbine engine of any preceding clause, wherein the spring extension defines a point of contact with the carrier at a location between the first and second ends.

The turbine engine of any preceding clause, wherein the spring extension extends between a first end and a second end, and wherein the first and second ends define the at least two points of contact with the carrier.

The turbine engine of any preceding clause, wherein the first and second ends are connected to the carrier through a hinged pin connection, a sliding pin connection, or a combination thereof.

The turbine engine of any preceding clause, wherein the seal support assembly comprises a spring arrangement having a spring extension extending between the carrier and the plurality of seal segments, wherein the spring extension extends continuously across the plurality of seal segments in a circumferential direction.

The turbine engine of any preceding clause, wherein each seal segment of the plurality of seal segments includes a first tab defining a radially inward surface, and wherein the spring extension contacts the radially inward surface.

The turbine engine of any preceding clause, wherein each seal segment further includes a second tab defining a radially outer surface, and wherein the spring extension further contacts the radially outward surface.

The turbine engine of any preceding clause, wherein the carrier comprises a carrier axial extension, and wherein the seal segment comprises a segment axial extension located outward of the carrier axial extension, and wherein the spring arrangement is positioned within a gap defined between the carrier axial extension and the segment axial extension.

The turbine engine of any preceding clause, wherein the spring arrangement is a plate having a support and plurality of spring segments extending from the support.

The turbine engine of any preceding clause, wherein the plurality of spring segments are cantilevered from the support.

The turbine engine of any preceding clause, wherein the spring arrangement comprises a plate spring coupled to the carrier and to the seal segment.

The turbine engine of any preceding clause, wherein the plate spring extends within a reference plane perpendicular to the radial direction of the turbine engine.

The turbine engine of any preceding clause, wherein the plate spring defines a rectangular shape in the reference plane.

The turbine engine of any preceding clause, wherein the plate spring defines a circular shape in the reference plane.

The turbine engine of any preceding clause, wherein the carrier comprises a forward wall and an aft wall, and wherein the plate spring is coupled to the forward wall and to the aft wall of the carrier.

The turbine engine of any preceding clause, wherein the plate spring is coupled to the seal segment at a center of the plate spring.

The turbine engine of any preceding clause, wherein the seal segment includes an attachment column extending outward along the radial direction of the turbine engine, wherein the plate spring is coupled to the attachment column.

The turbine engine of any preceding clause, wherein the attachment column comprises a ledge with a post extending outwardly along the radial direction from the ledge, wherein the post extends through the plate spring and wherein the plate spring is pressed against the ledge.

The turbine engine of any preceding clause, wherein the spring arrangement further includes a deflection limiter positioned outward of the plate spring along the radial direction of the turbine engine, inward of the plate spring along the radial direction of the turbine engine, or both.

The turbine engine of any preceding clause, wherein the plate spring comprises a plurality of flex members extending from a perimeter to one or more attachment points defined with the seal segment.

The turbine engine of any preceding clause, wherein the plurality of flex members includes a first flex member extending from the perimeter to a first attachment point defined with the seal segment and a second flex member extending from the perimeter to a second attachment point defined with the seal segment.

The turbine engine of any preceding clause, wherein the first attachment point is spaced from the second attachment point along the axial direction of the turbine engine.

The turbine engine of any preceding clause, wherein a first flex member of the plurality of flex members defines a variable geometry along a length of the first flex member.

The turbine engine of any preceding clause, wherein the plate spring is coupled to the seal segment in a pre-strained condition.

The turbine engine of any preceding clause, wherein the plate spring is moveable between a free condition and an engaged position, and wherein the plate spring moves towards a more planar geometry when moved from the free condition to the engaged position.

The turbine engine of any preceding clause, wherein the seal plate is bolted to the carrier, press fit to the carrier, or both.

The turbine engine of any preceding clause, wherein the spring arrangement comprises one or more elements formed of shape memory alloy material, a bimetallic material, or both.

The turbine engine of any preceding clause, wherein the spring arrangement comprises a first spring extension formed of a shape memory alloy material.

The turbine engine of any preceding clause, wherein the shape memory alloy material is a temperature-dependent shape memory alloy material.

The turbine engine of any preceding clause, wherein the shape memory alloy material is a strain-dependent shape memory alloy material.

The turbine engine of any preceding clause, wherein the spring arrangement further comprises a second spring extension, wherein the first and second spring extensions extend between the carrier and the seal segment in series.

The turbine engine of any preceding clause, wherein the spring arrangement further comprises a second spring extension, the shape memory alloy material is a first shape memory alloy material, and wherein the second spring extension is formed of a second shape memory alloy material different than the first shape memory alloy material.

The turbine engine of any preceding clause, wherein the spring arrangement is in airflow communication with a working gas flowpath of the turbine engine.

The turbine engine of any preceding clause, wherein the spring arrangement comprises a first spring extension formed of a bimetallic material.

The turbine engine of any preceding clause, wherein the bimetallic material comprises a layer of a shape memory alloy material and a metal material.

The turbine engine of any preceding clause, wherein the spring arrangement includes a first cam and a second cam, wherein the first and second cams are rotatable about a common rotational axis, and wherein the spring arrangement includes a spring extension extending between the first and second cams.

The turbine engine of any preceding clause, wherein the first and second cams are rotatably coupled to one of the seal segment or the carrier, and wherein the first and second cams extend to and engage with a surface of the other of the seal segment or the carrier.

The turbine engine of any preceding clause, wherein the spring arrangement includes a cam extending between a first end and a second end, wherein the cam defines a rotational axis, and wherein the spring arrangement includes a first spring extension extending from the cam at the first end or between the first end and the rotational axis and a second spring extending from the cam at the second end or between the second end and the rotational axis.

The turbine engine of any preceding clause, wherein the first cam is rotatably coupled to one of the seal segment or the carrier, and wherein the first cam extends to and engage with a surface of the other of the seal segment or the carrier.

The turbine engine of any preceding clause, wherein the spring arrangement includes a spring extension arranged in tension.

The turbine engine of any preceding clause, wherein the spring arrangement forms a spherical joint with the seal segment for connecting the spring arrangement to the seal segment.

The turbine engine of any preceding clause, wherein the spring arrangement includes a first body extension fixed along the radial direction relative to the carrier and a second body extension fixed along the radial direction relative to the seal segment, and wherein the first body extension is slidable relative to the second body extension.

The turbine engine of any preceding clause, wherein the spring extension is a helical spring extension arranged coaxially with the first and second body extensions.

A turbine engine, comprising: a rotor; a stator comprising a carrier; a seal assembly disposed between the rotor and the stator, the seal assembly comprising a seal segment, the seal segment having a seal face configured to form a fluid bearing with the rotor; and a seal support assembly extending between the carrier and the seal segment and comprising a flexible extension and a driver extension, the driver extension coupled to and extending from the flexible extension, the driver extension formed of a first material, the first material being a material defining a different coefficient of thermal expansion than a material forming the flexible extension, a shape memory alloy material, a bimetallic material, or a combination thereof, wherein the driver extension is positioned to move the flexible extension during operation of the turbine engine.

The turbine engine of any preceding clause, wherein the flexible extension is a first flexible extension, wherein the seal support assembly further comprises a second flexible extension, and wherein the driver extension extends between the first and second flexible extensions.

The turbine engine of any preceding clause, wherein the first and second flexible extensions each include a diverging section and a converging section, and wherein the driver extension is coupled to the first flexible extension at a location between the diverging and converging sections of the first flexible extension and to the second flexible extension at a location between the diverging and converging sections of the second flexible extension.

The turbine engine of any preceding clause, wherein the seal support assembly comprises an outer support section along a radial direction of the turbine engine and an inner support section along the radial direction, wherein the driver extension extends between a first connection point with the first flexible extension and a second connection point with the second flexible extension, wherein the seal support assembly defines an extension axis along the radial direction, wherein the first and second flexible extensions are coupled to the outer support section at one or more locations closer to the extension axis than the first and second connection points.

The turbine engine of any preceding clause, wherein the outer support section is coupled to the carrier, and wherein the inner support section is coupled to the seal segment.

The turbine engine of any preceding clause, wherein the first material defines a coefficient of thermal expansion less than a coefficient of thermal expansion of the material forming the first and second flexible extensions.

The turbine engine of any preceding clause, wherein the seal support assembly comprises an outer support section along a radial direction of the turbine engine and an inner support section along the radial direction, wherein the driver extension extends between a first connection point with the first flexible extension and a second connection point with the second flexible extension, wherein the seal support assembly defines an extension axis along the radial direction, wherein the first and second flexible extensions are coupled to the outer support section at a location farther from the extension axis than the first and second connection points, respectively.

The turbine engine of any preceding clause, wherein the first material defines a coefficient of thermal expansion greater than a coefficient of thermal expansion of the material forming the first and second flexible extensions.

The turbine engine of any preceding clause, wherein the seal support assembly is coupled to the seal segment through a hanger attachment, and wherein the seal support assembly comprises a leaf spring support coupling the flexible extension and driver extension to the seal segment.

The turbine engine of any preceding clause, wherein the first material comprises a bimetallic material.

The turbine engine of any preceding clause, wherein the first material comprises a shape memory alloy material.

The turbine engine of any preceding clause, wherein the first flexible extension includes a diverging section and a converging section, and wherein the seal support assembly further comprises a support member extending between the converging and diverging sections.

The turbine engine of any preceding clause, wherein the support member is a bimetallic member.

The turbine engine of any preceding clause, wherein the driver extension and the flexible extension are arranged in series.

The turbine engine of any preceding clause, further comprising: a turbine, wherein the rotor is a turbine rotor of the turbine.

The turbine engine of any preceding clause, wherein the high-pressure side is located forward of the low-pressure side.

The turbine engine of any preceding clause, wherein the turbine defines in part a working gas flowpath of the engine, and wherein the seal support assembly is in airflow communication with the working gas flowpath.

The turbine engine of any preceding clause, further comprising: a compressor and a turbine arranged in serial flow order and together defining in part a working gas flowpath, wherein the rotor is a turbine rotor of the turbine and wherein the seal support assembly is in airflow communication with a portion of the working gas flowpath defined by the compressor.

The turbine engine of any preceding clause, wherein the seal face is in airflow communication with the high-pressure side of the seal assembly, and wherein the high-pressure side of the seal assembly is in airflow communication with the portion of the working gas flowpath defined by the compressor.

The turbine engine of any preceding clause, further comprising: a turbine, wherein the rotor is a turbine rotor of the turbine, wherein the turbine defines in part a working gas flowpath of the engine, and wherein the outer pressurization surface is in airflow communication with the working gas flowpath.

The turbine engine of any preceding clause, wherein the seal support assembly defines a resistance along the radial direction of the turbine engine, wherein the turbine engine is operable at a high power operating mode and at a low power operating mode, wherein the turbine engine defines a first high-pressure at the high-pressure side of the seal assembly when the turbine engine is operated at the high power operating mode and a second high-pressure at the high-pressure side of the seal assembly when the turbine engine is operated at the low power operating mode, wherein the seal support assembly holds the seal segment at a radial distance away from the rotor when the turbine engine defines the second high-pressure, and wherein the seal support assembly moves the seal segment towards the rotor when the turbine engine defines the first high-pressure.

A turbine engine defining a radial direction, comprising: a rotor; a stator comprising a carrier; a seal assembly disposed between the rotor and the stator, the seal assembly comprising a seal segment having a seal face forming a fluid bearing with the rotor; and a seal support assembly comprising a torsional spring extension extending from the carrier, from the seal segment, or both, to bias the seal segment along the radial direction.

The turbine engine of any preceding clause, wherein the seal support assembly further comprises a cam coupled to a distal end of the torsional spring extension.

The turbine engine of any preceding clause, wherein the torsional spring extension is coupled at a base to the carrier.

The turbine engine of any preceding clause, wherein the seal segment includes a support extension extending at least partially along an axial direction of the turbine engine, the support extension defining an inner support surface along the radial direction, and wherein the cam is positioned to engage the inner support surface.

The turbine engine of any preceding clause, wherein the cam defines an outer engagement surface, and wherein the outer engagement surface has a pear shape.

The turbine engine of any preceding clause, wherein the cam defines an outer engagement surface, and wherein the outer engagement surface has a non-pear shape.

The turbine engine of any preceding clause, wherein the seal assembly defines a high-pressure side and a low-pressure side, wherein the torsional spring extension is a first torsional spring extension positioned at the high-pressure side, and wherein the seal support assembly further comprises a second torsional spring extension positioned at the low-pressure side.

The turbine engine of any preceding clause, wherein the seal support assembly further comprises a first cam coupled to a distal end of the first torsional spring extension and a second cam coupled to a distal end of the second torsional spring extension, wherein the seal segment defines at least two inner support surfaces, and wherein the first and second cams are each positioned to engage a respective inner support surface of the seal segment.

The turbine engine of any preceding clause, wherein the torsional spring extension is a first torsional spring extension, and wherein the seal support assembly further comprises a second torsional spring extension spaced from the first torsional spring extension along a circumferential direction.

The turbine engine of any preceding clause, wherein the seal support assembly further comprises a first cam coupled to a distal end of the first torsional spring extension and a second cam coupled to a distal end of the second torsional spring extension, wherein the seal segment defines an inner support surface, and wherein the first and second cams are each positioned to engage the inner support surface of the seal segment.

The turbine engine of any preceding clause, wherein the first and second cams are configured to rotate in a common circumferential direction in an aft looking forward view.

The turbine engine of any preceding clause, wherein the first and second cams are configured to rotate in opposite circumferential directions in a forward looking aft view.

The turbine engine of any preceding clause, wherein the seal support assembly further comprises a conjugate cam coupled to a distal end of the torsional spring extension, wherein the conjugate cam comprises a first cam member and a second cam member, and wherein the first and second cam members define different shapes, different orientations, or both.

The turbine engine of any preceding clause, further comprising: a turbine, wherein the rotor is a turbine rotor of the turbine.

The turbine engine of any preceding clause, wherein the seal assembly includes a high-pressure side and a low-pressure side, and wherein the high-pressure side is located forward of the low-pressure side.

The turbine engine of any preceding clause, wherein the seal assembly includes a high-pressure side and a low-pressure side, wherein the seal segment includes a lip and a body, wherein the lip extends from the body along an axial direction of the turbine engine on the high-pressure side, and wherein the lip includes an outer pressurization surface along the radial direction of the turbine engine.

The turbine engine of any preceding clause, further comprising: a compressor, wherein the turbine and the compressor together define in part a working gas flowpath of the turbine engine, and wherein the outer pressurization surface is in airflow communication with the working gas flowpath.

The turbine engine of any preceding clause, further comprising: a compressor and a turbine arranged in serial flow order and together defining in part a working gas flowpath, wherein the rotor is a turbine rotor of the turbine and wherein the seal support assembly is in airflow communication with a portion of the working gas flowpath defined by the compressor.

The turbine engine of any preceding clause, wherein the seal assembly includes a high-pressure side and a low-pressure side, wherein the seal face is in airflow communication with the high-pressure side of the seal assembly, and wherein the high-pressure side of the seal assembly is in airflow communication with the portion of the working gas flowpath defined by the compressor.

A turbine engine defining a radial direction, comprising: a rotor; a stator comprising a carrier; a seal assembly disposed between the rotor and the stator, the seal assembly comprising a seal segment having a seal face forming a fluid bearing with the rotor; and a seal support assembly comprising a spring extension and a cam coupled to an end of the spring extension, the seal support assembly extending between the carrier and the seal segment to bias the seal segment along the radial direction.

A turbine engine defining a circumferential direction, comprising: a rotor; a stator comprising a carrier; a seal assembly disposed between the rotor and the stator, the seal assembly comprising a plurality of seal segments supported at least in part by the carrier, the plurality of seal segments having a first seal segment and a second seal segment, the first and second seal segments each having a seal face forming a fluid bearing with the rotor; and a seal support assembly comprising a tangential spring extension extending between the first seal segment and the second seal segment for biasing the first seal segment away from the second seal segment in the circumferential direction The turbine engine of any preceding clause, wherein the first seal segment extends between a first circumferential end and a second circumferential end, wherein the second seal segment extends between a first circumferential end and a second circumferential end of the second seal segment, wherein the tangential spring extension is coupled to the first seal segment proximate the second circumferential end and to the second seal segment proximate the first circumferential end.

The turbine engine of any preceding clause, wherein the first seal segment defines a tangential slot at a circumferential end adjacent to the second seal segment, wherein the second seal segment defines a tangential slot at a circumferential end adjacent to the first seal segment, wherein the tangential spring extension extends between a first end positioned in the tangential slot of the first seal segment and a second end positioned in the tangential slot of the second seal segment.

The turbine engine of any preceding clause, wherein the tangential spring extension defines in part a first point of contact with the first seal segment and a second point of contact with the second seal segment, wherein the tangential spring extension defines a length along an axial direction of the turbine engine between 5% and 100% of an axial length of the seal face of the first seal segment.

The turbine engine of any preceding clause, wherein the tangential spring extension is a bent plate spring.

The turbine engine of any preceding clause, wherein the bent plate spring includes a middle section, a first segment extending between the middle section and a first end, and a second segment extending between the middle section and a second end.

The turbine engine of any preceding clause, wherein the first segment, the second segment, or both defines one or more stiffness modifiers.

The turbine engine of any preceding clause, wherein the tangential spring extension is engaged with the carrier to support the seal assembly.

The turbine engine of any preceding clause, wherein the seal support assembly includes a pin fixedly or slidably coupled to the carrier, and wherein the tangential spring extension is engaged with the pin.

The turbine engine of any preceding clause, wherein the seal support assembly includes a radial spring, and wherein the tangential spring extension is engaged with the pin through the radial spring.

The turbine engine of any preceding clause, wherein the radial spring is positioned inward of the carrier along a radial direction of the turbine engine.

The turbine engine of any preceding clause, wherein the radial spring is positioned at least partially outward of the carrier along a radial direction of the turbine engine.

The turbine engine of any preceding clause, wherein the tangential spring extension is engaged with the carrier through a radial spring operable to bias the tangential spring extension outward along a radial direction.

The turbine engine of any preceding clause, wherein the first seal segment defines a first circumferential end adjacent to the second seal segment, wherein the wherein the second seal segment defines a second circumferential end adjacent to the first seal segment, and wherein the tangential spring extension is engaged with the first and second circumferential ends.

The turbine engine of any preceding clause, wherein the seal support assembly includes a wedge body, and wherein the tangential spring extension is a first tangential spring extension positioned on a first side of the wedge body and engaged with the first seal segment and wherein the seal support assembly further includes a second spring extension positioned on a second side of the wedge body and engaged with the second seal segment.

The turbine engine of any preceding clause, further comprising: a turbine, wherein the rotor is a turbine rotor of the turbine.

The turbine engine of any preceding clause, wherein the seal assembly includes a high-pressure side and a low-pressure side, and wherein the high-pressure side is located forward of the low-pressure side.

The turbine engine of any preceding clause, wherein the seal assembly includes a high-pressure side and a low-pressure side, wherein the first seal segment includes a lip and a body, wherein the lip extends from the body along an axial direction of the turbine engine on the high-pressure side, and wherein the lip includes an outer pressurization surface along a radial direction of the turbine engine.

The turbine engine of any preceding clause, further comprising: a compressor, wherein the turbine and the compressor together define in part a working gas flowpath of the engine, and wherein the outer pressurization surface is in airflow communication with the working gas flowpath.

The turbine engine of any preceding clause, further comprising: a compressor and a turbine arranged in serial flow order and together defining in part a working gas flowpath, wherein the rotor is a turbine rotor of the turbine and wherein the seal support assembly is in airflow communication with a portion of the working gas flowpath defined by the compressor.

A turbine engine defining a circumferential direction and a radial direction, comprising: a rotor; a stator comprising a carrier; a seal assembly disposed between the rotor and the stator, the seal assembly comprising a plurality of seal segments supported at least in part by the carrier, the plurality of seal segments having a first seal segment and a second seal segment, the first and second seal segments each having a seal face forming a fluid bearing with the rotor; and a seal support assembly comprising: a first engagement assembly extending between the first seal segment and the carrier, the first engagement assembly operable to bias the first seal segment along the radial direction; a second engagement assembly extending between the second seal segment and the carrier, the second engagement assembly operable to bias the second seal segment along the radial direction; and a tangential spring extension extending between the first engagement assembly and the second engagement assembly for biasing the first seal segment relative to the second seal segment in the circumferential direction.

The turbine engine of any preceding clause, wherein the first engagement assembly includes a first radial extension, wherein the second engagement assembly includes a second radial extension, and wherein the tangential spring extension extends between the first and second radial extensions.

The turbine engine of any preceding clause, wherein the seal support assembly further includes a first ring member coupled to the first engagement assembly and a second ring member coupled to the second engagement assembly, and wherein the tangential spring extension extends between the first and second ring members.

A turbine engine defining a radial direction, comprising: a rotor; a stator comprising a carrier; a seal assembly disposed between the rotor and the stator, the seal assembly comprising a seal segment having a seal face configured to form a fluid bearing with the rotor; and a seal support assembly including a magnet assembly having a magnet coupled to the carrier or the seal segment for biasing the seal segment along the radial direction.

The turbine engine of any preceding clause, wherein the magnet is a first magnet coupled to the carrier, and wherein the magnet assembly further comprises a second magnet coupled to the seal segment, and wherein the second magnet is in a magnetic field of the first magnet.

The turbine engine of any preceding clause, wherein the seal support assembly includes a first magnet base with the first magnet coupled to and positioned at least partially within the first magnet base, and wherein the seal support assembly includes a second magnet base with the second magnet coupled to and positioned at least partially within the second magnet base.

The turbine engine of any preceding clause, wherein the first and second magnet bases are each formed of a non-ferromagnetic material.

The turbine engine of any preceding clause, wherein the first magnet base is coupled to the carrier and wherein the second magnet base is coupled to the seal segment.

The turbine engine of any preceding clause, wherein the first and second magnet bases together form a bumper to prevent the first magnet from contacting the second magnet.

The turbine engine of any preceding clause, wherein the magnet assembly further comprises a non-ferromagnetic plate positioned between the first magnet and the second magnet.

The turbine engine of any preceding clause, wherein the non-ferromagnetic plate is a first non-ferromagnetic plate coupled to the first magnet base over a surface of the first magnet facing the second magnet, and wherein the magnet assembly further comprises a second non-ferromagnetic plate coupled to the second magnet base over a surface of the second magnet facing the first magnet.

The turbine engine of any preceding clause, wherein the seal support assembly further comprises a particle shield surrounding at least in part the magnet assembly.

The turbine engine of any preceding clause, wherein the particle shield is a bellows assembly extendable along the radial direction and coupled to the carrier and the seal segment.

The turbine engine of any preceding clause, wherein the first and second magnets form a magnetic attraction force.

The turbine engine of any preceding clause, wherein the first and second magnets form a magnetic repelling force.

The turbine engine of any preceding clause, wherein the first magnet comprises a first surface facing the second magnet, wherein the second magnet comprises a second surface facing the first magnet, and wherein the first surface has a non-planar geometry complementary to the second surface.

The turbine engine of any preceding clause, wherein the magnet comprises a plurality of sections arranged linearly, and wherein each section defines a north pole facing in a unique direction relative to one or both adjacent sections.

The turbine engine of any preceding clause, wherein the magnet is a permanent magnet.

The turbine engine of any preceding clause, wherein the magnet defines a Curie temperature greater than 1200 degrees Celsius.

The turbine engine of any preceding clause, further comprising: a turbine, wherein the rotor is a turbine rotor of the turbine.

The turbine engine of any preceding clause, wherein the seal assembly includes a high-pressure side and a low-pressure side, and wherein the high-pressure side is located forward of the low-pressure side.

The turbine engine of any preceding clause, wherein the seal assembly includes a high-pressure side and a low-pressure side, wherein the seal segment includes a lip and a body, wherein the lip extends from the body along an axial direction of the turbine engine on the high-pressure side, and wherein the lip includes an outer pressurization surface along the radial direction of the turbine engine.

The turbine engine of any preceding clause, further comprising: a compressor, wherein the turbine and the compressor together define in part a working gas flowpath of the turbine engine, and wherein the outer pressurization surface is in airflow communication with the working gas flowpath.

A turbine engine defining a radial direction, the turbine engine comprising: a rotor; a stator comprising a carrier; a seal assembly disposed between the rotor and the stator, the seal assembly comprising a seal segment having a seal face configured to form a fluid bearing with the rotor; and a seal support assembly comprising a prestressed spring assembly extending from the seal segment for biasing the seal segment along the radial direction.

The turbine engine of any preceding clause, wherein the prestressed spring assembly extends between the seal segment and the carrier.

The turbine engine of any preceding clause, wherein the seal segment includes a support extension having a seal segment spring seat, wherein the prestressed spring assembly comprises a spring extension and a compression plate having a compression plate spring seat, wherein the spring extension is a prestressed spring extension extending from the seal segment spring seat to the compression plate spring seat.

The turbine engine of any preceding clause, wherein the seal support assembly defines an assembly length from the seal segment spring seat to the compression plate spring seat, wherein the spring extension defines an unloaded length, and wherein the assembly length is less than or equal to 90% of the unloaded length of the spring extension.

The turbine engine of any preceding clause, wherein the compression plate is fixed to the carrier.

The turbine engine of any preceding clause, wherein the carrier comprises a bump stop to maintain the prestressed spring assembly in a prestressed condition.

The turbine engine of any preceding clause, wherein the compression plate defines an assembly opening, wherein the carrier defines a threaded opening aligned with the assembly opening to facilitate assembly of the prestressed spring assembly.

The turbine engine of any preceding clause, wherein the prestressed spring assembly comprises a spring extension, and wherein the spring extension is at least one of a linear helical spring, a progressive helical spring, a bellows assembly, a conical spring, an optimized super-elastic spring block, or an optimized metal foam structure.

The turbine engine of any preceding clause, wherein the seal segment comprises a support extension, wherein the prestressed spring assembly comprises a support ring positioned inward of the support extension, and wherein the prestressed spring assembly includes a spring extension extending between the seal segment and the support ring.

The turbine engine of any preceding clause, wherein the seal segment is a one of a plurality of seal segments extending along a circumferential direction, wherein each of the plurality of seal segments includes a support extension, wherein the prestressed spring assembly comprises a support ring positioned inward of the support extensions of the plurality of seal segments, and wherein the support ring extends 360 degrees in the circumferential direction.

The turbine engine of any preceding clause, further comprising: a turbine, wherein the rotor is a turbine rotor of the turbine.

The turbine engine of any preceding clause, wherein the seal assembly includes a high-pressure side and a low-pressure side, and wherein the high-pressure side is located forward of the low-pressure side.

The turbine engine of any preceding clause, wherein the seal assembly includes a high-pressure side and a low-pressure side, wherein the seal segment includes a lip and a body, wherein the lip extends from the body along an axial direction of the turbine engine on the high-pressure side, and wherein the lip includes an outer pressurization surface along the radial direction of the turbine engine.

The turbine engine of any preceding clause, further comprising: a compressor, wherein the turbine and the compressor together define in part a working gas flowpath of the turbine engine, and wherein the outer pressurization surface is in airflow communication with the working gas flowpath.

A method for assembling a seal segment for a turbine engine, the method comprising: moving a compression plate of a seal support assembly over an attachment mechanism of a carrier, the attachment mechanism of the carrier extending along a radial direction of the turbine engine, the seal support assembly including a spring extension extending between the compression plate and the carrier; inserting a tightening rod through a tightening rod opening defined in the compression plate and into an engagement opening in the carrier; moving the tightening rod through the engagement opening in the carrier by contacting the compression plate with a ledge of the tightening rod to move the compression plate closer to the carrier; and affixing a mechanical fastener to the attachment mechanism to maintain a maximum distance between the compression plate and the carrier.

The method of any preceding clause, further comprising: removing the tightening rod from the engagement opening and from the tightening rod opening after affixing the mechanical fastener to the attachment mechanism.

The method of any preceding clause, wherein the mechanical fastener defines a threaded opening, and wherein affixing the mechanical fastener to the attachment mechanism comprises rotating the mechanical fastener about the attachment mechanism to engage the threaded opening with threads of the attachment mechanism.

The method of any preceding clause, wherein moving the tightening rod through the engagement opening in the carrier comprises compressing the spring extension to an assembly length from an unloaded length, and wherein the assembly length is less than or equal to 90% of the unloaded length of the spring extension.

The method of any preceding clause, wherein the compression plate is fixed to the carrier.

The method of any preceding clause, further comprising: a turbine, wherein the rotor is a turbine rotor of the turbine.

A turbine engine defining a radial direction, comprising: a rotor; a stator comprising a carrier; a seal assembly disposed between the rotor and the stator, the seal assembly comprising a plurality of seal segments, the plurality of seal segments having a seal segment having a seal face forming a fluid bearing with the rotor; and a seal support assembly comprising a pneumatic engagement assembly operable to bias the seal segment along the radial direction during operation of the turbine engine.

The turbine engine of any preceding clause, wherein the pneumatic engagement assembly is in fluid communication with a working gas flowpath defined by the turbine engine.

The turbine engine of any preceding clause, wherein the pneumatic engagement assembly includes a high pressure air supply, wherein the high pressure air supply is in fluid communication with the working gas flowpath at a high pressure location.

The turbine engine of any preceding clause, wherein the pneumatic engagement assembly includes an extension member coupled to the seal segment, and wherein the extension member is moveable along the radial direction.

The turbine engine of any preceding clause, wherein the pneumatic engagement assembly defines a pressure chamber, and wherein the extension member is positioned at least in part within the pressure chamber.

The turbine engine of any preceding clause, wherein the extension member includes a pressure head defining a pressure surface positioned in the pressure chamber.

The turbine engine of any preceding clause, wherein the extension member further includes a rod extending from the pressure head, and wherein the pneumatic engagement assembly includes a bellows positioned around the rod within the pressure chamber.

The turbine engine of any preceding clause, wherein the pressure head defines a head crosswise measure, wherein the pressure chamber defines a chamber crosswise measure, and wherein the head crosswise measure is within 5% of the chamber crosswise measure.

The turbine engine of any preceding clause, wherein the extension member further includes a rod extending from the pressure head, and wherein the pneumatic engagement assembly includes a spring extension positioned within the pressure chamber to bias the pressure head outward along the radial direction.

The turbine engine of any preceding clause, wherein the extension member includes a rod and an engagement guide positioned at an end of the rod, wherein the seal segment comprises a hanger defining an opening, and wherein the engagement guide is positioned within the opening.

The turbine engine of any preceding clause, wherein the opening defines a height along the radial direction greater than a thickness of the engagement guide along the radial direction.

The turbine engine of any preceding clause, wherein the engagement guide is a circular member, and wherein the opening is a circular opening.

The turbine engine of any preceding clause, wherein the pressure head forms a seal with a wall of the pressure chamber.

The turbine engine of any preceding clause, wherein the pneumatic engagement assembly defines one or more openings to the pressure chamber to provide a low pressure airflow to a low-pressure side of the pressure head.

The turbine engine of any preceding clause, wherein the pneumatic engagement assembly defines a first pressure chamber and a second pressure chamber located downstream of the first pressure chamber, wherein the pneumatic engagement assembly includes a retraction member positioned within the first pressure chamber moveable between a first position and a second position along a length of the first pressure chamber, and wherein the first pressure chamber defines an air outlet in fluid communication with the second pressure chamber at a location between the first position and the second position.

The turbine engine of any preceding clause, wherein the pneumatic engagement assembly includes a diaphragm, a first engagement rod, a second engagement rod, a third engagement rod, and a radial spring extension, wherein the first engagement rod is coupled to the diaphragm and configured to move in a direction perpendicular to the radial direction, wherein the second and third engagement rods are pivotably coupled to the first engagement rod, wherein the second engagement rod is coupled to the carrier, wherein the third engagement rod is coupled to the seal segment, and wherein the radial spring extension extends between the carrier and the seal segment.

The turbine engine of any preceding clause, wherein the seal segment defines an engagement surface having a slope relative to an axial direction, wherein the pneumatic engagement assembly defines a pressurized sliding chamber and includes a slider positioned at least partially within the pressurized sliding chamber, wherein the slider includes a radial extension engaged with the engagement surface of the seal segment.

The turbine engine of any preceding clause, wherein the pneumatic engagement assembly defines a pressurized sliding chamber and includes a slider positioned at least partially within the pressurized sliding chamber and a radial member extending to the seal segment, wherein the slider includes an engagement surface having a slope relative to an axial direction, wherein the engagement surface is engaged with the radial member to move the seal segment along the radial direction.

The turbine engine of any preceding clause, wherein the pneumatic engagement assembly comprises an extension member moveable along the radial direction and a lever assembly, wherein the extension member is coupled to the seal segment through the lever assembly.

The turbine engine of any preceding clause, wherein the seal segment is one of the plurality of seal segments of the seal assembly, wherein the pneumatic engagement assembly comprises a unison ring defining a plurality of angled slots, wherein the unison ring is slidably coupled to the plurality of seal segments through the plurality of angled slots, and wherein the pneumatic engagement assembly is operable to rotate the unison ring along a circumferential direction to move the plurality of seal segments along the radial direction.

The turbine engine of any preceding clause, wherein the pneumatic engagement assembly comprises a piston arrangement coupled to the unison ring for rotating the unison ring along the circumferential direction based on a pressure differential within the piston arrangement.

The turbine engine of any preceding clause, wherein the unison ring is a first unison ring, wherein the pneumatic engagement assembly further comprises a second unison ring slidably coupled to the plurality of seal segments through a plurality of angled slots of the second unison ring, and wherein the first and second unison rings are spaced along an axial direction of the turbine engine.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A turbine engine defining a radial direction, comprising:
- a rotor;
- a stator comprising a carrier;
- a seal assembly disposed between the rotor and the stator, the seal assembly comprising a seal segment having a seal face configured to form a fluid bearing with the rotor; and
- a seal support assembly including a magnet assembly having:
  - a magnet,
  - a magnet base, the magnet coupled to and positioned at least partially within the magnet base, and
  - a plate coupling the magnet base to the carrier or the seal segment, wherein the magnet is configured for biasing the seal segment along the radial direction.

2. The turbine engine of claim 1, wherein the magnet is a first magnet coupled to the carrier, and wherein the magnet assembly further comprises a second magnet coupled to the seal segment, and wherein the second magnet is in a magnetic field of the first magnet.

3. The turbine engine of claim 2, wherein the magnet base is a first magnet base, the first magnet coupled to and positioned at least partially within the first magnet base, and wherein the seal support assembly includes a second magnet base with the second magnet coupled to and positioned at least partially within the second magnet base.

4. The turbine engine of claim 3, wherein the first and second magnet bases are each formed of a non-ferromagnetic material.

5. The turbine engine of claim 3, wherein the first magnet base is coupled to the carrier and wherein the second magnet base is coupled to the seal segment.

6. The turbine engine of claim 3, wherein the first magnet base includes a first bumper and the second magnet base includes a second bumper disposed inward of the first bumper in the radial direction, wherein the first bumper and the second bumper are configured to contact to prevent the first magnet from contacting the second magnet in the radial direction.

7. The turbine engine of claim 3, wherein the magnet assembly further comprises a non-ferromagnetic plate positioned between the first magnet and the second magnet.

8. The turbine engine of claim 7, wherein the non-ferromagnetic plate is a first non-ferromagnetic plate coupled to the first magnet base over a surface of the first magnet facing the second magnet, and wherein the magnet assembly further comprises a second non-ferromagnetic plate coupled to the second magnet base over a surface of the second magnet facing the first magnet.

9. The turbine engine of claim 2, wherein the first and second magnets form a magnetic attraction force.

10. The turbine engine of claim 2, wherein the first and second magnets form a magnetic repelling force.

11. The turbine engine of claim 2, wherein the first magnet comprises a first surface facing the second magnet, wherein the second magnet comprises a second surface facing the first magnet, and wherein the first surface has a non-planar geometry complementary to the second surface.

12. The turbine engine of claim 1, wherein the seal support assembly further comprises a particle shield surrounding at least in part the magnet assembly.

13. The turbine engine of claim 12, wherein the particle shield is a bellows assembly extendable along the radial direction and coupled to the carrier and the seal segment.

14. The turbine engine of claim 1, wherein the magnet comprises a plurality of sections arranged linearly, and wherein each section defines a north pole facing in a unique direction relative to one or both adjacent sections.

15. The turbine engine of claim 1, wherein the magnet is a permanent magnet.

16. The turbine engine of claim 15, wherein the magnet defines a Curie temperature greater than 1200 degrees Celsius.

17. The turbine engine of claim 1, further comprising:

a turbine, wherein the rotor is a turbine rotor of the turbine.

18. The turbine engine of claim 17, wherein the seal assembly includes a high-pressure side and a low-pressure side, and wherein the high-pressure side is located forward of the low-pressure side.

19. The turbine engine of claim 17, wherein the seal assembly includes a high-pressure side and a low-pressure side, wherein the seal segment includes a lip and a body, wherein the lip extends from the body along an axial direction of the turbine engine on the high-pressure side, and wherein the lip includes an outer pressurization surface along the radial direction of the turbine engine.

20. The turbine engine of claim 19, further comprising:

a compressor, wherein the turbine and the compressor together define in part a working gas flowpath of the turbine engine, and wherein the outer pressurization surface is in airflow communication with the working gas flowpath.

* * * * *